(12) United States Patent
Kondo et al.

(10) Patent No.: US 8,126,056 B2
(45) Date of Patent: *Feb. 28, 2012

(54) MOVING PICTURE CODING METHOD, AND MOVING PICTURE DECODING METHOD

(75) Inventors: Satoshi Kondo, Yawata (JP); Shinya Kadono, Nishinomiya (JP); Makoto Hagai, Moriguchi (JP)

(73) Assignee: Panasonic Corporation, Osaka (JP)

( * ) Notice: Subject to any disclaimer, the term of this patent is extended or adjusted under 35 U.S.C. 154(b) by 1095 days.

This patent is subject to a terminal disclaimer.

(21) Appl. No.: 11/980,563

(22) Filed: Oct. 31, 2007

(65) Prior Publication Data

US 2008/0205522 A1    Aug. 28, 2008

Related U.S. Application Data

(62) Division of application No. 10/478,484, filed as application No. PCT/JP02/11554 on Nov. 6, 2002, now Pat. No. 7,310,373.

(30) Foreign Application Priority Data

| Nov. 6, 2001 | (JP) | 2001-340698 |
| Dec. 6, 2001 | (JP) | 2001-373311 |
| Dec. 20, 2001 | (JP) | 2001-388466 |
| Jan. 21, 2002 | (JP) | 2002-012117 |
| Apr. 19, 2002 | (JP) | 2002-118598 |

(51) Int. Cl.
*H04N 7/32* (2006.01)
*H04N 7/12* (2006.01)

(52) U.S. Cl. .............. 375/240.15; 348/416.1

(58) Field of Classification Search .......... 348/400, 348/401, 402, 407, 413, 415, 416, 420, 409, 348/412; 382/232, 236, 238, 233; 375/240.15, 375/240.24, 240.01, 240.03, 240.12, 240.16, 375/240.17, 240.18, 240.25, 240.26
See application file for complete search history.

(56) References Cited

U.S. PATENT DOCUMENTS 5,321,508 A * 6/1994 Veltman et al. ............ 348/439.1
(Continued)

FOREIGN PATENT DOCUMENTS

EP    0 542 195    5/1993
(Continued)

OTHER PUBLICATIONS

U.S. Office Action issued Nov. 26, 2008 in U.S. Appl. No. 11/980,484.
(Continued)

*Primary Examiner* — Behrooz Senfi
(74) *Attorney, Agent, or Firm* — Wenderoth, Lind & Ponack, L.L.P.

(57) ABSTRACT

A moving picture coding apparatus for performing inter-picture predictive coding on pictures constituting a moving picture is provided with a coding unit for performing predictive error coding on image data; a decoding unit for performing predictive error decoding on an output from the coding unit; a reference picture memory for holding output data from the decoding unit; and a motion vector detection unit for detecting forward and backward motion vectors on the basis of decoded image data stored in the memory. When coding a B picture, a picture that is timewise closest to the target picture is used as a candidate picture for forward reference, and an I or P picture that is timewise closest to the target picture is used as a candidate picture for backward reference. The moving picture coding apparatus so constructed can improve coding efficiency of a B picture to be subjected to bidirectional predictive coding.

1 Claim, 51 Drawing Sheets

U.S. PATENT DOCUMENTS

| | | | |
|---|---|---|---|
| 5,329,365 A * | 7/1994 | Uz | 348/469 |
| 5,386,234 A * | 1/1995 | Veltman et al. | 375/240.13 |
| 5,410,354 A | 4/1995 | Uz | |
| 5,481,553 A | 1/1996 | Suzuki et al. | |
| 5,666,461 A | 9/1997 | Igarashi et al. | |
| 5,724,446 A | 3/1998 | Liu et al. | |
| 5,774,206 A | 6/1998 | Wasserman et al. | |
| 5,809,173 A | 9/1998 | Liu et al. | |
| 5,841,474 A | 11/1998 | Ueda et al. | |
| 5,946,042 A | 8/1999 | Kato | |
| 5,991,447 A | 11/1999 | Eifrig et al. | |
| 6,005,628 A | 12/1999 | Ogura et al. | |
| 6,005,980 A | 12/1999 | Eifrig et al. | |
| 6,026,195 A | 2/2000 | Eifrig et al. | |
| 6,091,460 A | 7/2000 | Hatano et al. | |
| RE37,222 E * | 6/2001 | Yonemitsu et al. | 375/240.16 |
| 6,282,240 B1 | 8/2001 | Fukunaga et al. | |
| 6,381,275 B1 | 4/2002 | Fukuhara et al. | |
| 6,504,872 B1 | 1/2003 | Fimoff et al. | |
| 6,621,864 B1 | 9/2003 | Choo | |
| 6,704,363 B1 | 3/2004 | Kim | |
| 6,792,047 B1 | 9/2004 | Bixby et al. | |
| 6,891,893 B2 | 5/2005 | Sullivan et al. | |
| 7,310,373 B2 | 12/2007 | Kondo et al. | |
| RE40,080 E | 2/2008 | Tan | |
| 7,356,081 B1 | 4/2008 | Haskell et al. | |
| 2002/0172284 A1 | 11/2002 | Peng et al. | |
| 2002/0181790 A1 | 12/2002 | Nakata | |
| 2003/0099294 A1 | 5/2003 | Wang et al. | |
| 2003/0227970 A1 | 12/2003 | Fert et al. | |
| 2004/0008784 A1 | 1/2004 | Kikuchi et al. | |
| 2004/0066848 A1 | 4/2004 | Jeon | |
| 2004/0071354 A1 | 4/2004 | Adachi et al. | |
| 2004/0086044 A1 | 5/2004 | Kondo et al. | |
| 2004/0105499 A1 | 6/2004 | Kawa et al. | |
| 2004/0264570 A1 | 12/2004 | Kondo et al. | |
| 2005/0058206 A1 | 3/2005 | Lim et al. | |
| 2007/0076801 A1 | 4/2007 | Lim et al. | |
| 2007/0211802 A1 | 9/2007 | Kikuchi et al. | |
| 2008/0112485 A1 | 5/2008 | Adachi et al. | |
| 2008/0205522 A1 | 8/2008 | Kondo et al. | |
| 2010/0098174 A1 | 4/2010 | Adachi et al. | |

FOREIGN PATENT DOCUMENTS

| | | |
|---|---|---|
| EP | 0 817 491 | 1/1998 |
| EP | 0 863 674 | 9/1998 |
| EP | 0 863 675 | 9/1998 |
| EP | 1 263 239 | 12/2002 |
| EP | 1 377 067 | 1/2004 |
| EP | 1 381 238 | 1/2004 |
| EP | 1 406 451 | 4/2004 |
| EP | 1 406 453 | 4/2004 |
| EP | 1 408 698 | 4/2004 |
| EP | 1 422 946 | 5/2004 |
| JP | 10-42295 | 2/1998 |
| JP | 10-191356 | 7/1998 |
| JP | 10-234045 | 9/1998 |
| JP | 11-155147 | 6/1999 |
| JP | 11155147 | 6/1999 |
| WO | 01/86960 | 11/2001 |
| WO | 02/080571 | 10/2002 |
| WO | 03/047271 | 6/2003 |
| WO | 03/047272 | 6/2003 |
| WO | 2004/004310 | 1/2004 |

OTHER PUBLICATIONS

U.S. Office Action issued Dec. 22, 2008 in U.S. Appl. No. 10/250,456.

U.S. Office Action issued Jan. 28, 2008 in U.S. Appl. No. 10/250,456.

U.S. Office action issued Apr. 3, 2008 in U.S. Appl. No. 11/586,590.

U.S. Office Action issued May 28, 2009 in U.S. Appl. No. 11/980,484.

European Search Report issued Jun. 24, 2010 in corresponding European Application No. 08 16 6968.

European Search Report issued Jun. 29, 2010 in corresponding European Application No. 09 17 4081.

European Search Report issued Jul. 20, 2010 in corresponding European Application No. 08 16 6965.

Gisle Bjontegaard, "H.26L Test Model Long Term No. 8 (TML-8) draft0", ITU-T Telecommunication Standardization Sector of ITU, Geneva, CH, Apr. 2, 2001, pp. 1-54, XP001089814.

Thomas Wiegand, "Modification of Annex U for Enhanced Error Resilience", ITU Telecommunications Standardization Sector, Mar. 13, 2000, pp. 1-17, XP002183258.

Markus Flierl et al., "Multihypothesis Pictures for H.26L", Proceedings 2001 International Conference on Image Processing, ICIP 2001, Thessaloniki, Greece, Oct. 7-10, 2001, International Conference on Image Processing, New York, NY, IEEE, US, vol. vol. 1 of 3, Conf. 8, Oct. 7, 2001, pp. 526-529, XP010563399, ISBN: 0-7803-6725-1.

Committee Draft, "Information Technology—Coding of Audio-Visual Objects: Visual ISO/IEC 14496-2", International Organization for Standardization, No. N2202, Mar. 1998, pp. 1-329, XP000861689.

Gary Sullivan, "Draft for "H.263++" Annexes U, V, and W to Recommendation H.263", ITU-T H.263++ Draft for H.263++ Annexes U, V and W to Recommendation H.263, Nov. 2000, pp. 1-46, XP000986538.

Thomas Wiegand et al., "Long-Term Memory Motion-Compensated Prediction", IEEE Transaction on Circuits and Systems for Video Technology, IEEE Inc., New York, US, vol. 9, No. 1, Feb. 1999, pp. 70-84, XP000802288, ISSN: 1051-8215.

Satoshi Kondo et al., "New Prediction Method to Improve B-picture Coding Efficiency", ITU Telecommunications Standardization Sector, VCEG, Document VCEG-026, Revision 1, Nov. 26, 2001, pp. 1-11, XP002249660.

Satoshi Kondo et al., "New Prediction Method to Improve B-picture Coding Efficiency", ITU Telecommunications Standardization Sector, VCEG, Document VCEG-026, Nov. 26, 2001, pp. 1-8, XP002249661.

Satoshi Kondo et al., "Proposal of Minor Changes to Multi-France Buffering Syntax for Improving Coding Efficiency of B-pictures", JVT of ISO/IEC MEPG & ITU-T VCEG, $2^{nd}$ Meeting, Document: JVT-B057, Jan. 29, 2002-Feb. 1, 2002, pp. 1-10, XP002249662, Genva, CH.

Marta Karczewicz et al., "A Proposal for SP-frames", ITU Telecommunications Standardization Sector VCEG-L27, Jan. 9, 2001, pp. 1-9, XP002287038.

Ismaeil Ismaeil et al., "Efficient Motion Estimation Using Spatial and Temporal Motion Vector Prediction", Proceedings 1999 International Conference on Image Processing (Cat. 99CH36348) IEEE, Piscataway, NJ, USA, vol. 1, Oct. 1999, pp. 70-74, XP002587842, ISBN: 0-7803-5467-2.

Michael Gallant et al., "High Rate, High Resolution Video Using H26L", VCEG-N84, ITU Study Group 16—Video Coding Experts Group, Sep. 24, 2001, pp. 1-8, XP002376024.

Pankaj Topiwala et al., "Overview and Performance Evaluation of the ITU-T Draft H.26L Video Coding Standard", Proceedings of the International Society for Optical Engineering (SPIE), SPIE, USA, LNKD-DOI: 10.1117/12.449763, vol. 4472, Jul. 31, 2001, pp. 290-306, XP008019603, ISSN: 0277-786X.

"Information Technology—Coding of Audio-Visual Objects: Visual ISO/IEC 14496-02", International Organization for Standardization—Organisation Internationale De Normalisation, No. N2202, Mar. 1998, pp. 1-329.

G. Sullivan "Draft for H.263++ Annexes U, V, and W to Recommendation H.263" ITU-T H.263++ Draft for H.263++ Annexes U, V and W to Recommendation H.263, Nov. 2000, pp. 1-46.

T. Wiegand et al., "Long-Term Memory Motion-Compensated Prediction", IEEE Transactions on Circuits and Systems for Video Technology, IEEE Inc., New York, US, vol. 9, No. 1, Feb. 1999, pp. 70-84.

Satoshi Kondo et al., "New Prediction Method to Improve B-picture Coding Efficiency", ITU Telecommunications Standardization Sector, VCEG, Document VCEG-026, Revision 1, Nov. 26, 2001, pp. 1-11.

Satoshi Kondo et al., "New Prediction Method to Improve B-picture Coding Efficiency", ITU Telecommunications Standardization Sector, VCEG, Document VCEG-026, Nov. 26, 2001, pp. 1-8.

Satoshi Kondo et al., "Proposal for Minor Changes to Multi-Frame Buffering Syntax for Improving Coding Efficiency of B-pictures", JVT of ISO/IEC MPEG & ITU-T VCEG, $2^{nd}$ Meeting, Document: JVT-B057, Jan. 29, 2002-Feb. 1, 2002, pp. 1-10.

Supplementary European Search Report issued Jun. 1, 2005 in European Patent Application No. EP 02 78 0003.

International Search Report issued Aug. 12, 2003 in International Application No. PCT/JP02/11554.

Office Action dated Jul. 18, 2007 issued in U.S. Appl. No. 10/250,456.

ISO/IEC 13818-2, "Intro. 4.1.1", p. vii, "3.111", p. 6, and "7.6.2", p. 71-73.

"7.6.7 Temporal prediction structure", p. 150, ISO/IEC 14496-2.

Markus Flierl, Telecommunications Institute I, University of Erlangen-Nuremberg, Cauerstr. 7, D-91058 Erlangen, Germany; and Bernd Girod, Information Systems Laboratory, Stanford University, Stanford, CA 94305, USA; "Multihypothesis Prediction for B frames"; Sep. 18, 2001; pp. 1-11.

"H.26L Test Model Long Term No. 8 (TML-8) draft0", ITU-Telecommunication Standardization Sector of ITU, Geneva, CH, Apr. 2, 2001, p. 1-54.

T. Wiegand, "Modification of Annex U for Enhanced Error Resilience + Annex U", ITU Telecommunications Standardization Sector, Mar. 13, 2000, p. 1-17.

M. Flierl, "Multihypothesis Pictures for H.26L", Proceedings 2001 International Conference on Image Processing. ICIP 2001, Thessaloniki, Greeece, Oct. 7-10, 2001, International Conference on Image Processing, New York, NY, IEEE, US, vol. 1 of 3, Conf. 8, Oct. 7, 2001, pp. 526-529.

U.S. Office Action issued Sep. 1, 2009 in U.S. Appl. No. 10/250,456.

Office Action issued Oct. 5, 2011 in Canadian Application No. 2,456,377.

Form PTO-892 ("Notice of References Cited") attached to Office Action issued Jul. 7, 2011 in U.S. Appl. No. 11/980,598.

United States Office Action issued Oct. 18, 2011 in U.S. Appl. No. 12/570,486.

* cited by examiner

Fig.3

| target picture | B5 | B6 | P10 | B8 | B9 | P13 | B11 | B12 | P16 |
|---|---|---|---|---|---|---|---|---|---|
| memory area(#1) ...... | P1 [2] | P1 [2] | P1 [2] | B8 [0] | B8 [0] | (P13) | P13 [b] | P13 [b] | P13 [0] |
| memory area(#2) ...... | P4 [0] | P4 [1] | P4 [1] | P4 [2] | P4 [2] | P4 [2] | (B11) | (B11) | (P16) |
| memory area(#3) ...... | P7 [b] | P7 [b] | P7 [0] | P7 [0] | P7 [1] | P7 [1] | P7 [2] | P7 [2] | P7 [2] |
| memory area(#4) ...... | (B5) | B5 [0] | (P10) | P10 [b] | P10 [b] | P10 [0] | P10 [0] | P10 [1] | P10 [1] |
| memory area(#5) ...... | B3 [1] | (B6) | B6 | B6 [1] | (B9) | B9 | B9 [1] | (B12) | B12 |

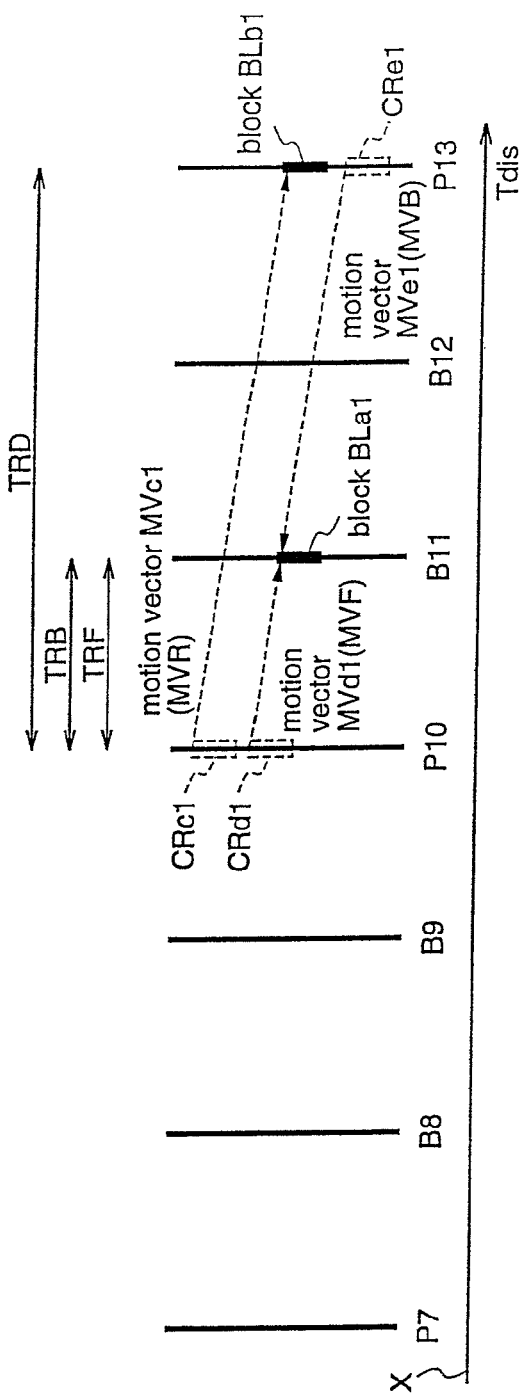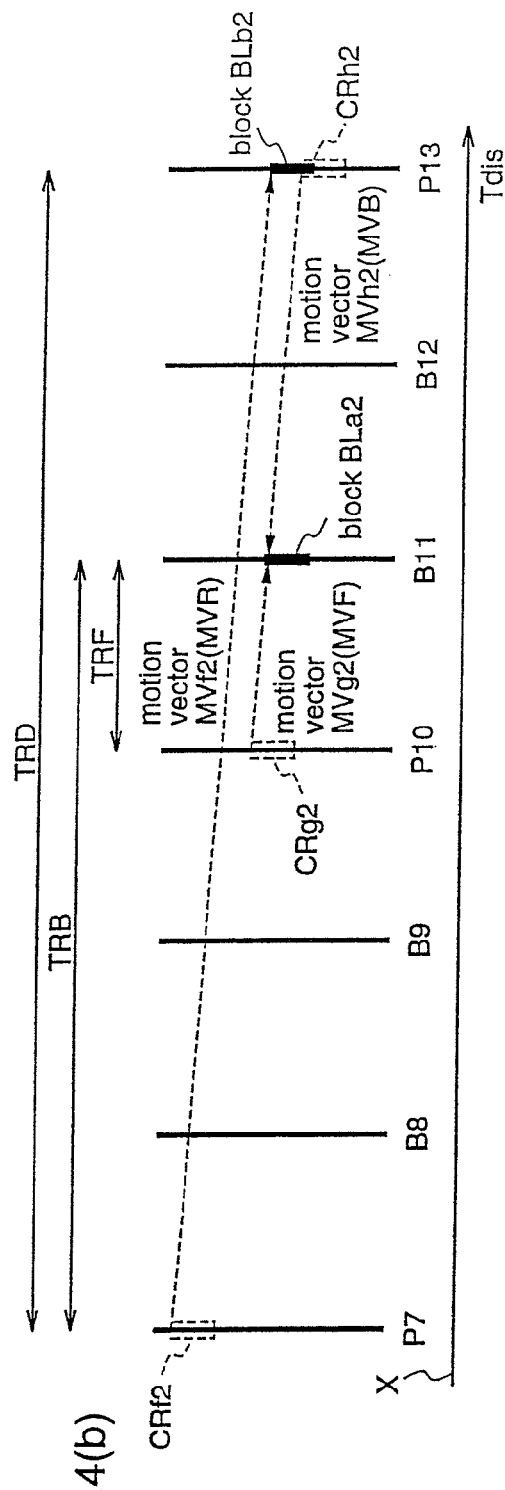

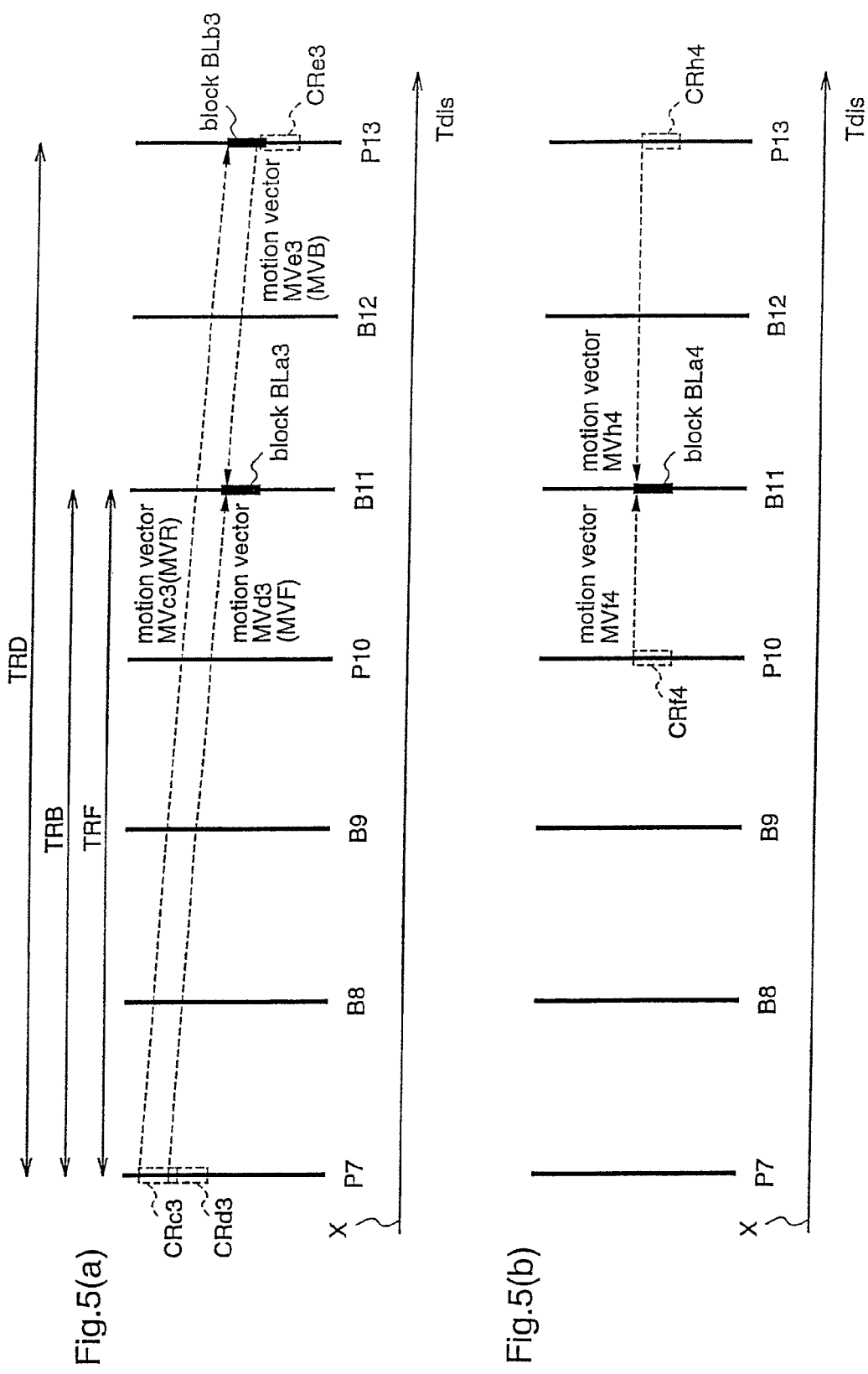

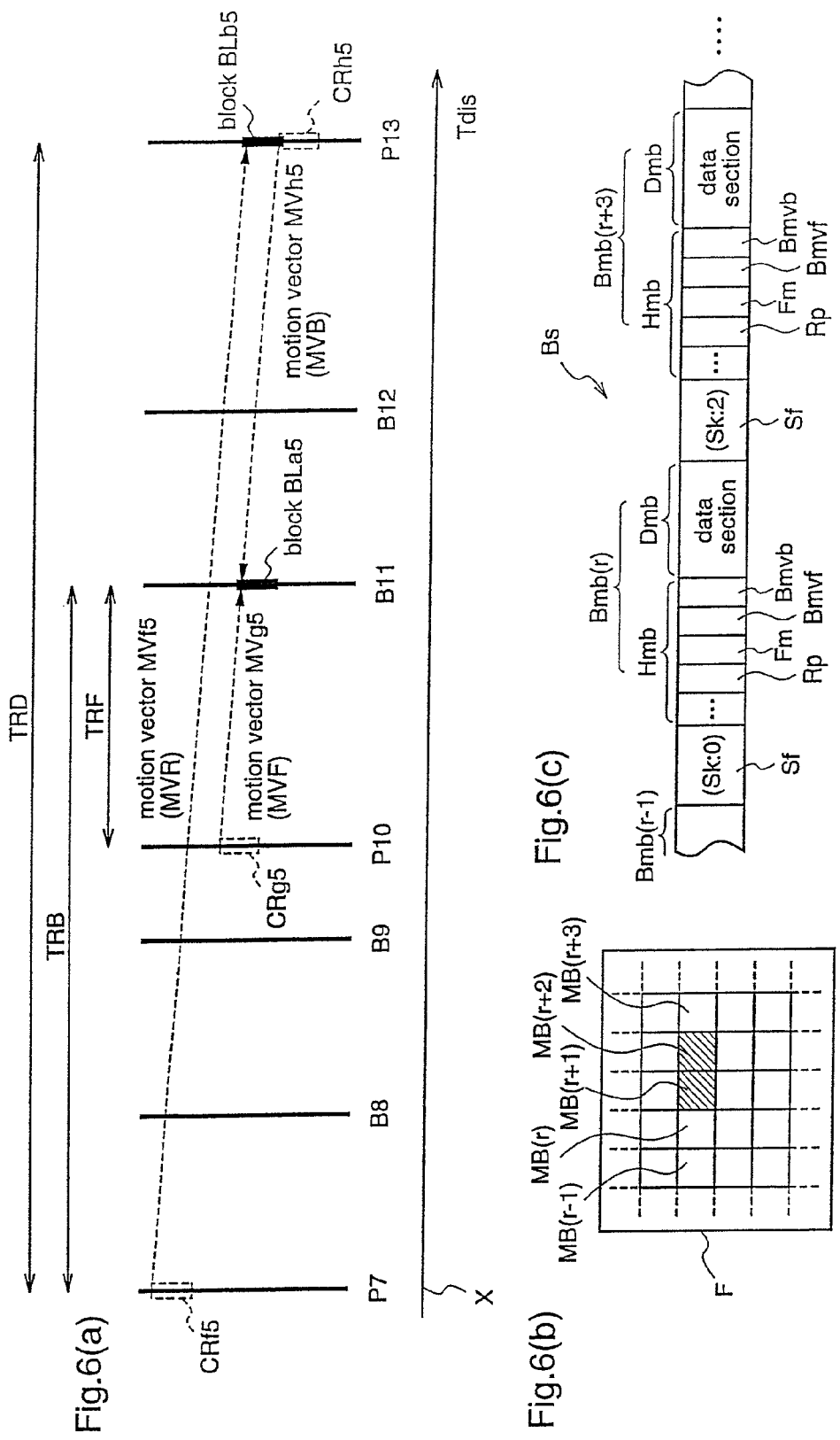

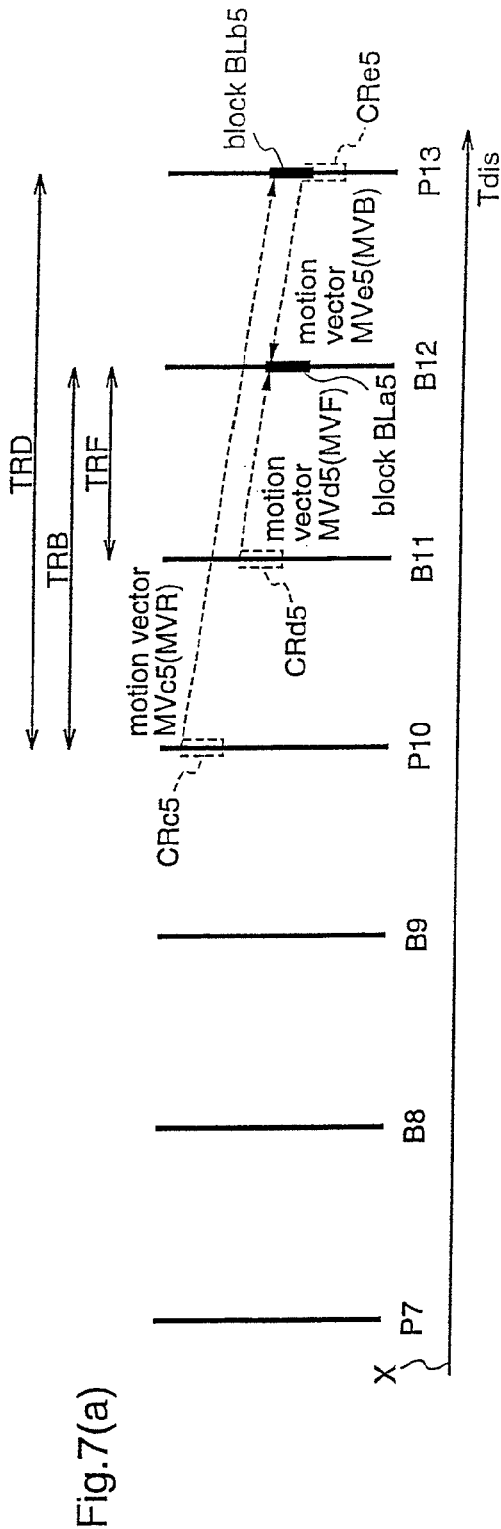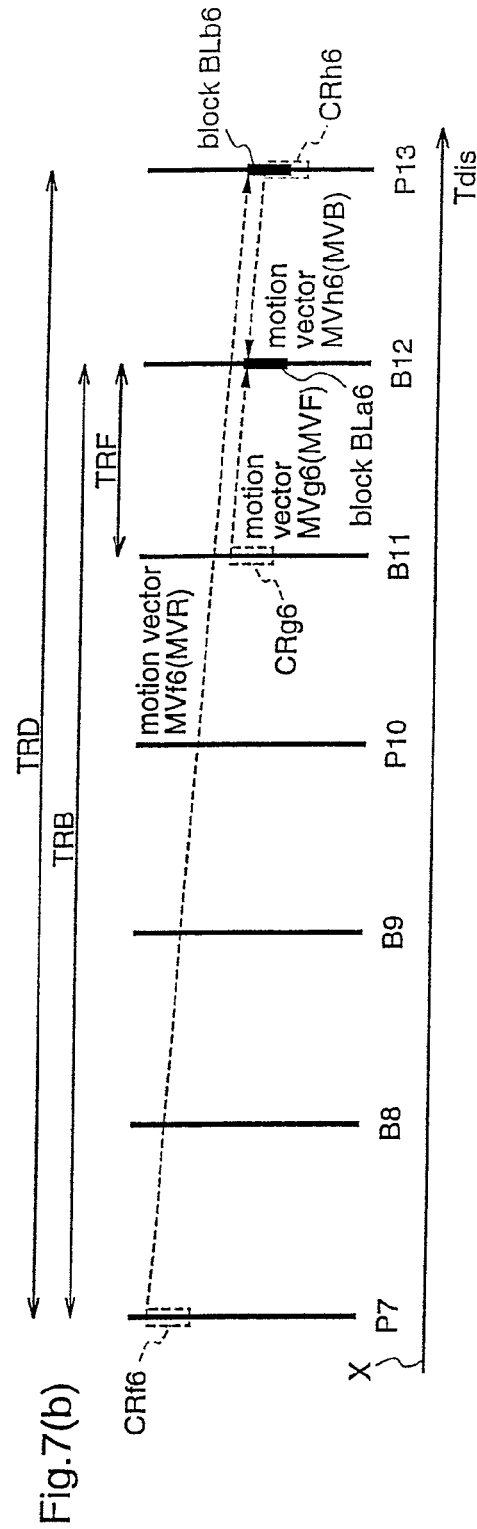

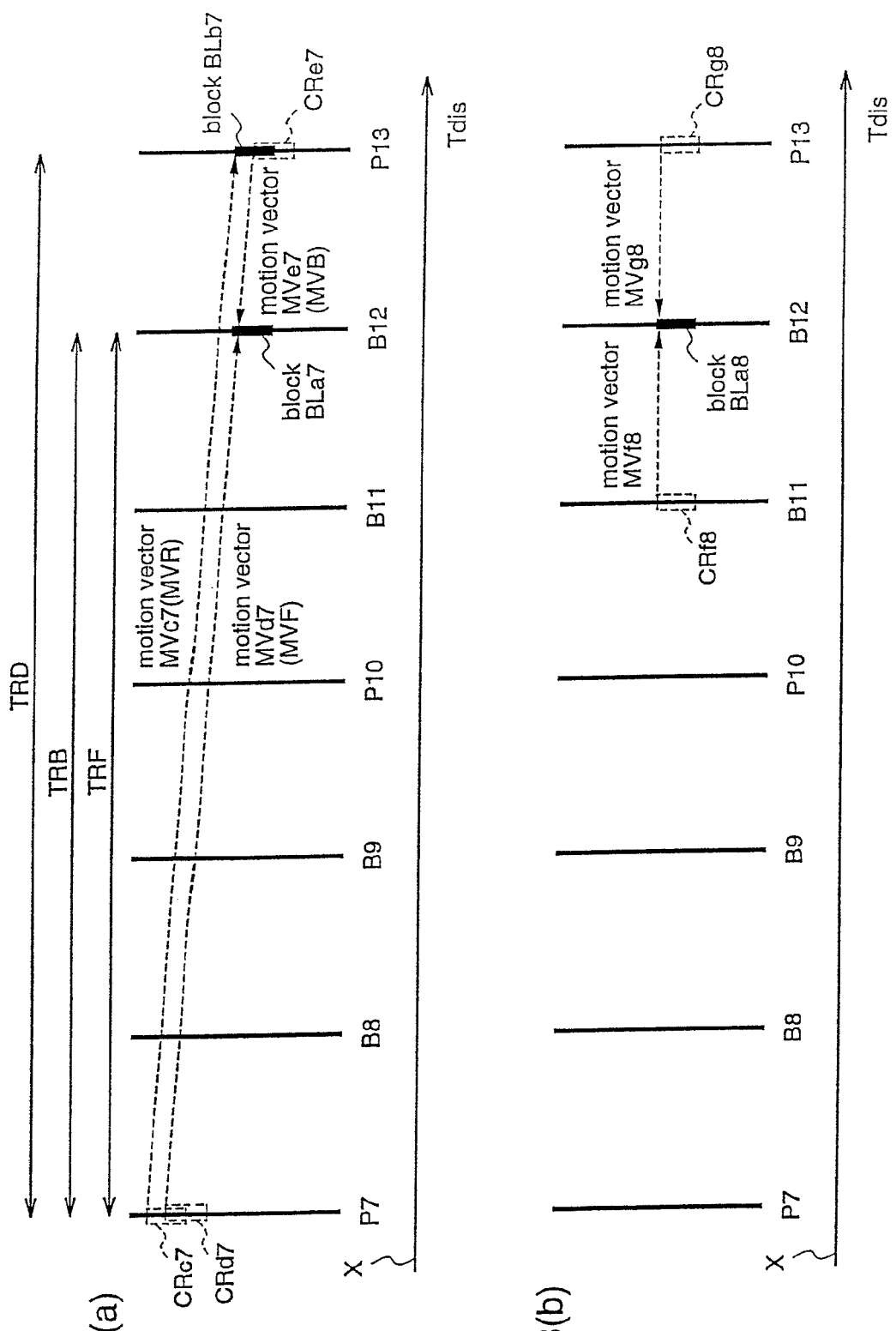

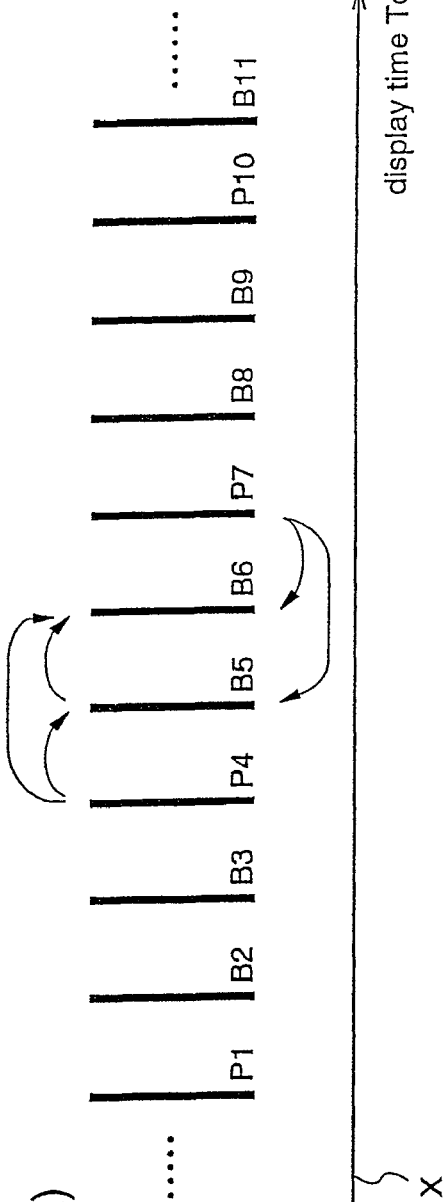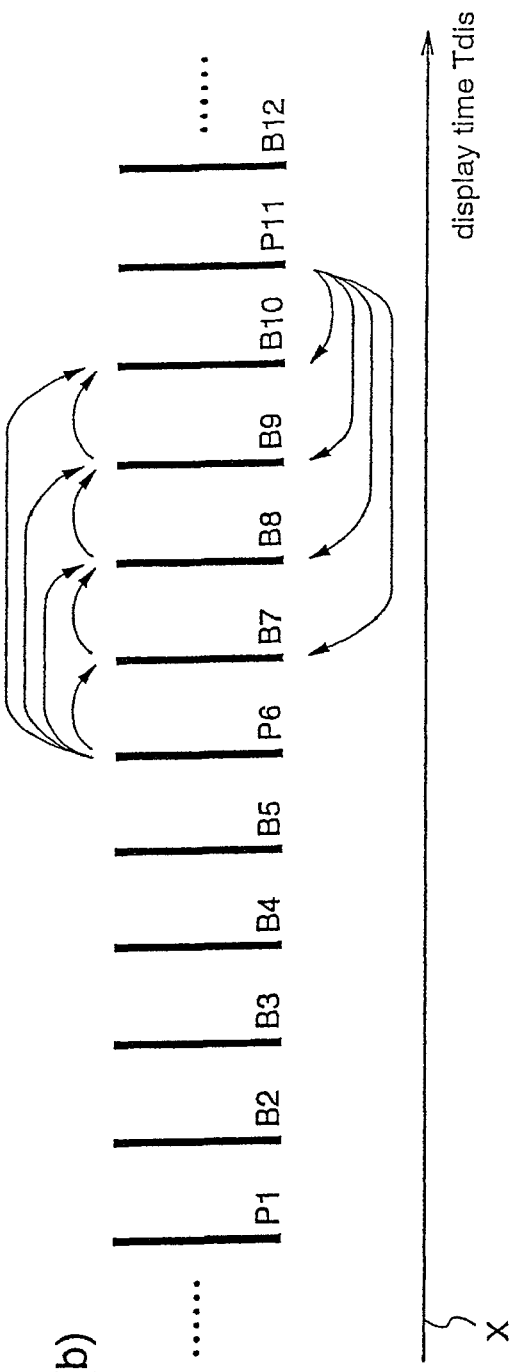

Fig.11

| target picture | | B5 | B6 | P10 | B8 | B9 | P13 | B11 | B12 | P16 |
|---|---|---|---|---|---|---|---|---|---|---|
| P picture memory area(#1) | ...... | P1[2] | P1[2] | P1[2] | P1[n] | P1[n] | P13 | P13[b] | P13[b] | P13[0] |
| P picture memory area(#2) | ...... | P4[0] | P4[1] | P4[1] | P4[2] | P4[2] | P4[2] | P4[n] | P4[n] | (P16) |
| P picture memory area(#3) | ...... | P7[b] | P7[b] | P7[0] | P7[0] | P7[1] | P7[1] | P7[2] | P7[2] | P7[2] |
| P picture memory area(#4) | ...... | [n] | [n] | (P10) | P10[b] | P10[b] | P10[0] | P10[0] | P10[1] | P10[1] |
| B picture memory area(#1) | ...... | (B5) | (B6) | B5[n] | (B8) | B8[0] | B8[n] | (B11) | B11[0] | B11[n] |
| B picture memory area(#2) | ...... | B3[2] | B6[1] | B6 | B6[1] | (B9) | B9 | B9[1] | (B12) | B12 |

Fig.12

| target picture | B5 | B6 | P10 | B8 | B9 | P13 | B11 | B12 | P16 |
|---|---|---|---|---|---|---|---|---|---|
| P picture memory area(#1) ...... | P1 [1] | P1 [1] | P1 [2] | P1 [n] | P1 [n] | (P13) | P13 [b] | P13 [b] | P13 [0] |
| P picture memory area(#2) ...... | P4 [0] | P4 [0] | P4 [1] | P4 [1] | P4 [1] | P4 [2] | P4 [n] | P4 [n] | (P16) |
| P picture memory area(#3) ...... | P7 [b] | P7 [b] | P7 [0] | P7 [0] | P7 [0] | P7 [1] | P7 [1] | P7 [1] | P7 [2] |
| P picture memory area(#4) ...... | [n] | [n] | (P10) | P10 [b] | P10 [b] | P10 [0] | P10 [0] | P10 [0] | P10 [1] |
| B picture memory area(#1) ...... | (B5) | (B6) | B5 [n] | (B8) | B8 [2] | B8 [n] | (B11) | B11 [2] | B11 [n] |
| B picture memory area(#2) ...... | B3 [2] | B5 [2] | B6 | B6 [2] | (B9) | B9 | B9 [2] | (B12) | B12 |

Fig.13

| target picture | B5 | B6 | P10 | B8 | B9 | P13 | B11 | B12 | P16 | |
|---|---|---|---|---|---|---|---|---|---|---|
| P picture memory area(#1) ...... | P1[2] | P1[2] | P1[2] | P1[n] | P1[n] | (P13) | P13[b] | P13[b] | P13[0] | ...... |
| P picture memory area(#2) ...... | P4[1] | P4[1] | P4[1] | P4[2] | P4[2] | P4[2] | P4[n] | P4[n] | (P16) | ...... |
| P picture memory area(#3) ...... | P7[b] | P7[b] | P7[0] | P7[1] | P7[1] | P7[1] | P7[2] | P7[2] | P7[2] | ...... |
| P picture memory area(#4) ...... | [n] | [n] | (P10) | P10[b] | P10[b] | P10[0] | P10[1] | P10[1] | P10[1] | ...... |
| B picture memory area(#1) ...... | (B5) | B5[0] | B5[n] | (B8) | B8[0] | B8[n] | (B11) | B11[0] | B11[n] | |
| B picture memory area(#2) ...... | B3[0] | (B6) | B6 | B6[0] | (B9) | B9 | B9[0] | (B12) | B12 | |

Fig.14

| target picture | B5 | B6 | P10 | B8 | B9 | P13 | B11 | B12 | P16 |
|---|---|---|---|---|---|---|---|---|---|
| P picture memory area(#1) ...... | P1 [1] | P1 [2] | P1 [2] | P1 [n] | P1 [n] | (P13) | P13 [b] | P13 [b] | P13 [0] |
| P picture memory area(#2) ...... | P4 [0] | P4 [1] | P4 [1] | P4 [1] | P4 [2] | P4 [2] | P4 [n] | P4 [n] | (P16) |
| P picture memory area(#3) ...... | P7 [b] | P7 [0] | P7 [0] | P7 [0] | P7 [1] | P7 [1] | P7 [1] | P7 [2] | P7 [2] |
| P picture memory area(#4) ...... | [n] | [n] | (P10) | P10 [b] | P10 [b] | P10 [0] | P10 [0] | P10 [1] | P10 [1] |
| B picture memory area(#1) ...... | (B5) | B5 [0] | B5 [n] | B8 [0] | B8 [0] | B8 [n] | (B11) | B11 [0] | B11 [n] |
| B picture memory area(#2) ...... | B3 [2] | (B6) | B6 | B6 [2] | (B9) | B9 | B9 [2] | (B12) | B12 |

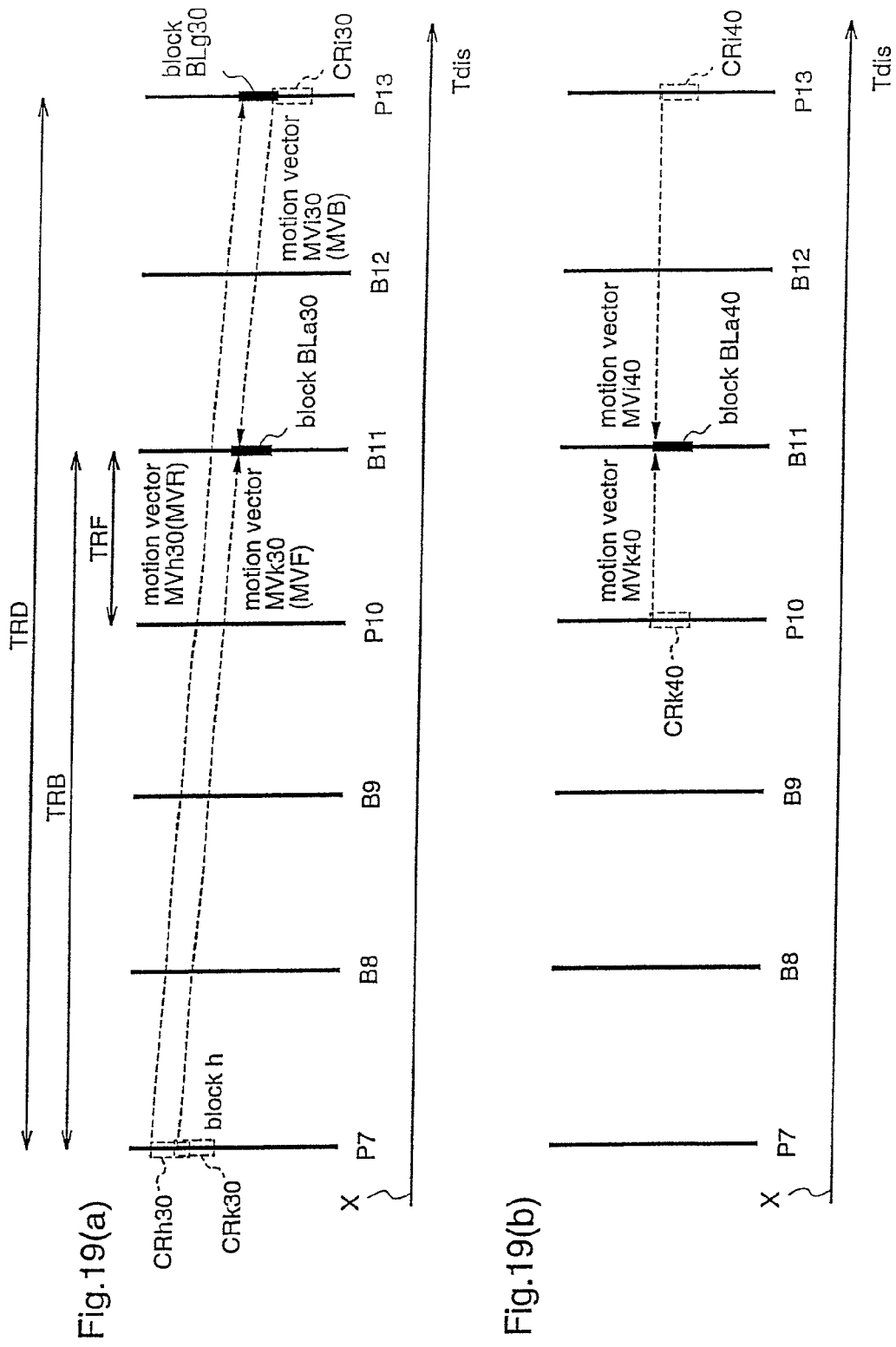

Fig.24

| target picture | B5 | B6 | P10 | B8 | B9 | P13 | B11 | B12 | P16 | |
|---|---|---|---|---|---|---|---|---|---|---|
| memory area(#1) ...... | P1[2] | P1[2] | P1[2] | B8 | P8[0] | P13 | P13[b] | P13[b] | P13[0] | ...... |
| memory area(#2) ...... | P4[0] | P4[1] | P4[1] | P4[2] | P4[2] | P4[2] | B11[1] | B11[1] | P16 | ...... |
| memory area(#3) ...... | P7[b] | P7[b] | P7[0] | P7[0] | P7[1] | P7[1] | P7[2] | P7[2] | P7[2] | ...... |
| memory area(#4) ...... | B5 | B5[0] | P10 | P10[b] | P10[0] | P10[0] | P10[0] | P10[0] | P10[1] | ...... |
| memory area(#5) ...... | B3[1] | B6 | B6 | B6[1] | B9 | B9 | B9[1] | B12 | B12 | ...... |

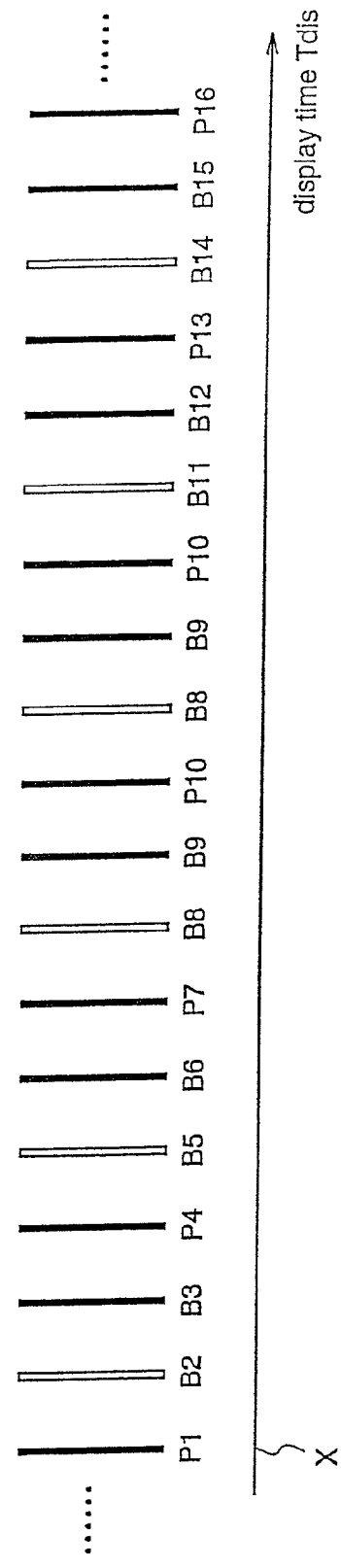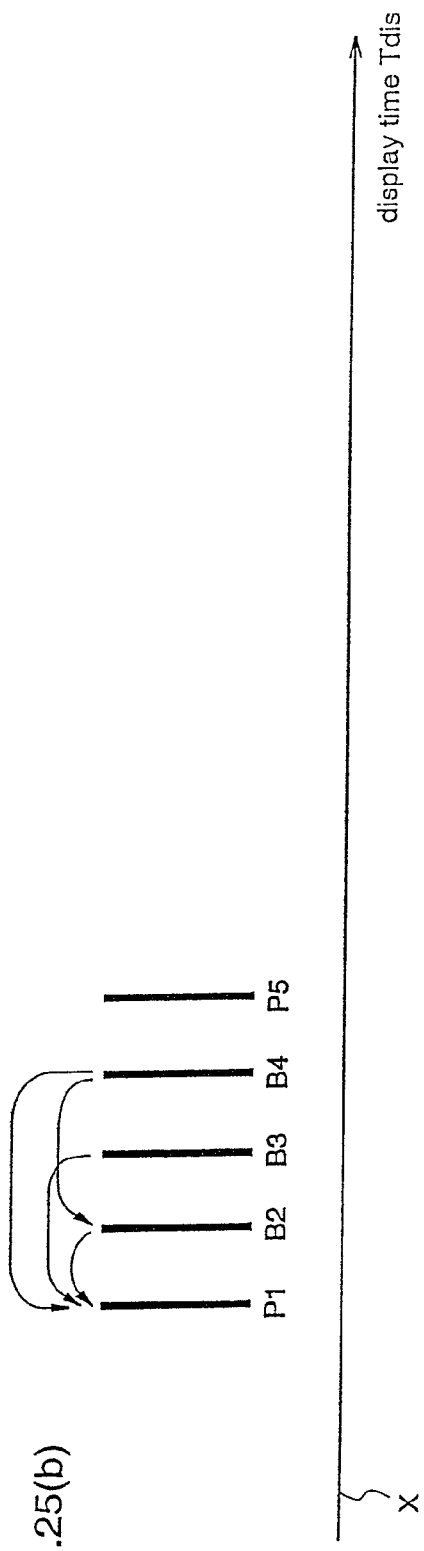

Fig.28

| | logical memory No. | (0) | (1) | (2) | (3) | (4) | (5) |
|---|---|---|---|---|---|---|---|
| at coding/decoding of picture P15 | picture | P12 | B11 | P9 | P6 | P3 | — |
| | reference picture index | [0] | — | [1] | [2] | [3] | — |
| at coding/decoding of picture B13 | picture | P15 | P12 | B11 | P9 | P6 | P3 |
| | reference picture index | [b] | [0] | [1] | [2] | [3] | [4] |
| at coding/decoding of picture B14 | picture | P15 | B13 | P12 | P9 | P6 | P3 |
| | reference picture index | [b] | [0] | [1] | [2] | [3] | [4] |
| at coding/decoding of picture P18 | picture | P15 | B14 | P12 | P9 | P6 | — |
| | reference picture index | [0] | — | [1] | [2] | [3] | — |

Fig.30

| | logical memory No. | 0 | 1 | 2 | 3 | 4 | 5 |
|---|---|---|---|---|---|---|---|
| at coding/decoding of picture P15 | picture | B11 | P12 | P9 | P6 | P3 | — |
| | reference picture index | [0] | [1] | [2] | [3] | [4] | — |
| at coding/decoding of picture B13 | picture | P15 | B11 | P12 | P9 | P6 | P3 |
| | reference picture index | [b] | [0] | [1] | [2] | [3] | [4] |
| at coding/decoding of picture B14 | picture | B13 | P15 | B11 | P12 | P9 | P6 |
| | reference picture index | [b] | [0] | [1] | [2] | [3] | [4] |

Fig.37

| decoding target picture | ..... P4 | B2 | B3 | P7 | B5 | B6 | P10 | B8 | B9 | P13 | B11 | B12 | P16 | B14 | B15 | P19 | B17 | B18 ..... |
|---|---|---|---|---|---|---|---|---|---|---|---|---|---|---|---|---|---|---|
| frame memory area R1 | (P4) | P4 | P4 | P4 | P4 | P4 | P4 | (B8) | B8 | (P13) | P13 | P13 | P13 | P13 | P13 | P13 | (B17) | B17 |
| frame memory area R2 | ..... | (B2) | B2 | (P7) | P7 | P7 | P7 | P7 | P7 | P7 | (B11) | B11 | (P16) | P16 | P16 | P16 | P16 | P16 |
| frame memory area R3 | ..... | (B2) | B2 | B2 | (B5) | B5 | (P10) | P10 | P10 | P10 | P10 | P10 | P10 | (B14) | B14 | (P19) | P19 | P19 |

FC : flexible disk case
FD : flexible disk
D : flexible disk body
Se : sector
Tr : track Csys : computer system
FDD : flexible disk drive

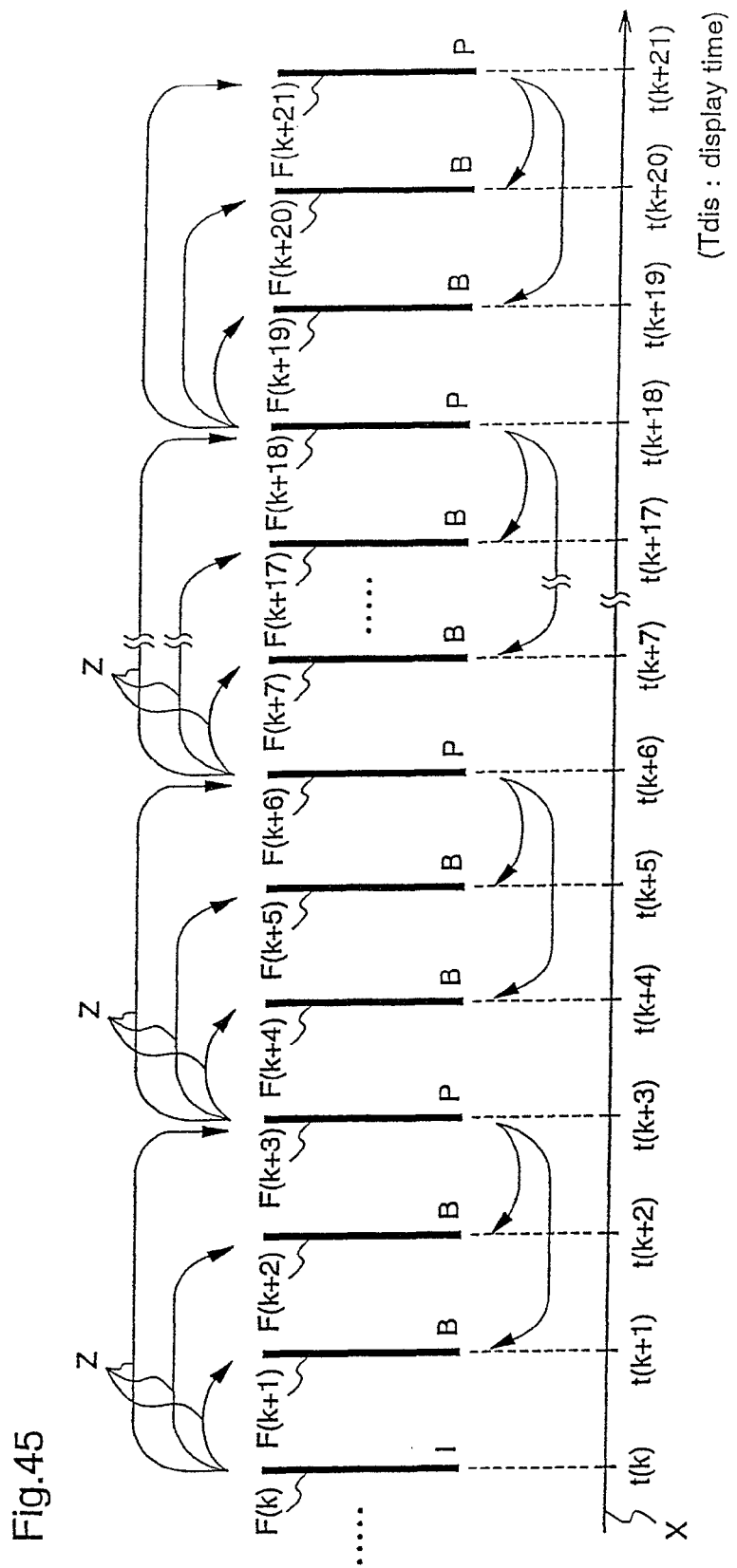

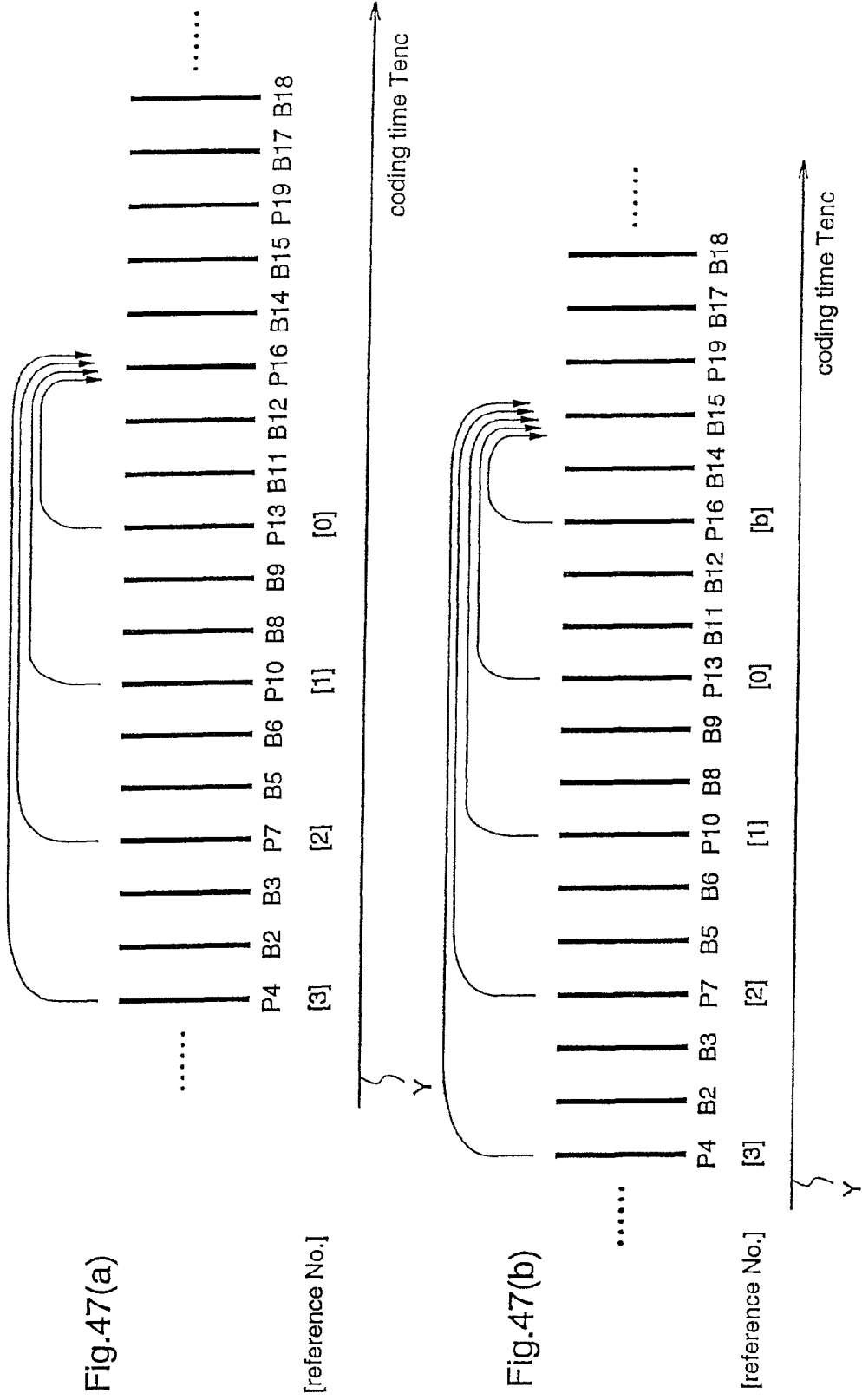

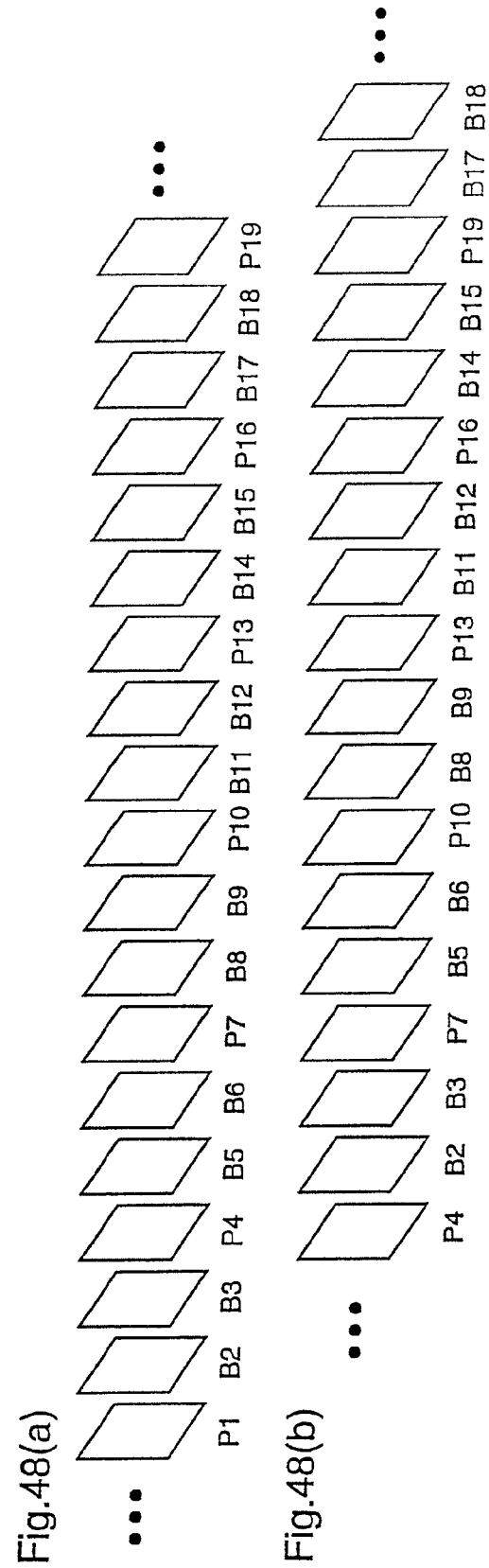

Fig.49

| | logical memory No. | (0) | (1) | (2) | (3) | (4) |
|---|---|---|---|---|---|---|
| at coding/decoding of picture P16 | picture | P13 | P10 | P7 | P4 | — |
| | reference picture index | [0] | [1] | [2] | [3] | |
| at coding/decoding of picture B14 | picture | P16 | P13 | P10 | P7 | P4 |
| | reference picture index | [b] | [0] | [1] | [2] | [3] |
| at coding/decoding of picture B15 | picture | P16 | P13 | P10 | P7 | P4 |
| | reference picture index | [b] | [0] | [1] | [2] | [3] |

MOVING PICTURE CODING METHOD, AND MOVING PICTURE DECODING METHOD

This application is a Divisional of application Ser. No. 10/478,484 filed on Nov. 21, 2003 now U.S Pat. No. 7,310,373, which is the National Stage of International Application No. PCT/JP02/11554, filed Nov. 6, 2002.

TECHNICAL FIELD

The present invention relates to a moving picture coding (video coding) method and a moving picture decoding (video decoding) method and, more particularly, to a method for coding or decoding each of pictures constituting a moving picture, with reference to another picture of the moving picture.

BACKGROUND ART

Generally, in coding of pictures constituting a moving picture, each picture is divided into plural blocks, and compressive coding (hereinafter, also referred to simply as "coding") of image information possessed by each picture is carried out for every block, utilizing redundancies in the space direction and time direction of the moving picture. As a coding process utilizing redundancy in the space direction, there is intra-picture coding utilizing correlation of pixel values in a picture. As a coding process utilizing redundancy in the time direction, there is inter-picture predictive coding utilizing correlation of pixel values between pictures. The inter-picture predictive coding is a process of coding a target picture (a picture to be coded) with reference to a picture which is positioned timewise forward the target picture (forward picture or forward reference picture), or a picture which is positioned timewise backward the target picture (backward picture or backward reference picture).

The forward picture is a picture which is earlier in display order than the target picture, and it is positioned forward the target picture on a time axis indicating display times of the respective pictures (hereinafter, referred to as "display time axis"). The backward picture is a picture which is later in display order than the target picture, and it is positioned backward the target picture on the display time axis. Further, in the following description, a picture to be referred to in coding the target picture is called a reference picture.

In the inter-picture predictive coding, specifically, a motion vector of the target picture with respect to the reference picture is detected, and prediction data for image data of the target picture is obtained by motion compensation based on the motion vector. Then, the amount of data of the target picture is compressively coded by removing redundancy in the space direction of the picture, of difference data between the prediction data and the image data of the target picture.

On the other hand, as a process for decoding a coded picture, there are intra-picture decoding corresponding to the intra-picture coding, and inter-picture decoding corresponding to the inter-picture coding. In the inter-picture decoding, the same picture as a picture that is referred to in the inter-picture coding, is referred to. That is, a picture Xtg that is coded with reference to pictures Xra and Xrb is decoded with reference to the pictures Xra and Xrb.

FIGS. 43(a)-43(c) are diagrams illustrating plural pictures constituting a moving picture.

In FIG. 43(a), part of plural pictures constituting one moving picture Mpt, i.e., pictures F(k)~F(k+2n−1) [k, n: integer], are shown. Display times t(k)~t(k+2n−1) are set on the respective pictures F(k)~F(k+2n−1). As shown in FIG. 43(a), the respective pictures are arranged in order of display times, on a display time axis X indicating display times Tdis of the respective pictures, and these pictures are grouped for every predetermined number (n) of pictures. Each of these picture groups is called a GOP (Group of Pictures), and this is a minimum unit of random access to coded data of a moving picture. In the following description, a picture group is sometimes abbreviated as a GOP.

For example, an (i)th picture group Gp(i) is constituted by pictures F(k)~F(k+n−1). An (i+1)th picture group Gp(i+1) is constituted by pictures F(n+k)~F(k+2n−1).

Each picture is divided into plural slices each comprising plural macroblocks. For example, a macroblock is a rectangle area comprising 16 pixels in the vertical direction×16 pixels in the horizontal direction. Further, as shown in FIG. 43(b), a picture F(k+1) is divided into plural slices SL1~SLm [m: natural number]. A slice SL2 is constituted by plural macroblocks MB1~MBr [r: natural number] as shown in FIG. 43(c).

FIG. 44 is a diagram for explaining coded data of a moving picture, and illustrates a structure of a stream obtained by coding the respective pictures constituting the moving picture.

A stream Smp is coded data corresponding to one image sequence (e.g., one moving picture). The stream Smp is composed of an area (common information area) Cstr where bit streams corresponding to common information such as a header are arranged, and an area (GOP area) Dgop where bit streams corresponding to the respective GOPs are arranged. The common information area Cstr includes sync data Sstr and a header Hstr corresponding to the stream. The GOP area Dgop includes bit streams Bg(1)~Bg(i−1), Bg(i), Bg(i+1) ~Bg(I) corresponding to picture groups (GOPs) Gp(1)~Gp(i−1), Gp(i), Gp(i+1) Gp(I) [i, I: integer].

Each bit stream corresponding to each GOP is composed of an area (common information area) Cgop in which bit streams corresponding to common information such as a header are arranged, and an area (picture area) Dpct in which bit streams corresponding to the respective pictures are arranged. The common information area Cgop includes sync data Sgop and a header Hgop corresponding to the GOP. A picture area Dpct in the bit stream Bg(i) corresponding to the picture group G(i) includes bit streams Bf(k'), Bf(k'+1), Bf(k'+2), Bf(k'+3), . . . , Bf(k'+s) corresponding to pictures F(k'), F(k'+1), F(k'+2), F(k'+3), . . . , F(k'+s) [k', s: integer]. The pictures F(k'), F(k'+1), F(k'+2), F(k'+3), . . . , F(k'+s) are obtained by rearranging the pictures F(k)~F(k+n−1) arranged in order of display times, in order of coding.

Each bit stream corresponding to each picture is composed of an area (common information area) Cpct where bit streams corresponding to common information such as a header are arranged, and an area (slice area) Dslc where bit streams corresponding to the respective slices are arranged. The common information area Cpct includes sync data Spct and a header Hpct corresponding to the picture. For example, when the picture F(k'+1) in the arrangement in order of coding times (coding order arrangement) is the picture F(k+1) in the arrangement in order of display times (display order arrangement), the slice area Dslc in the bit stream Bf(k'+1) corresponding to the picture F(k'+1) includes bit streams Bs1~Bsm corresponding to the respective slices SL1~SLm.

Each bit stream corresponding to each slice is composed of an area (common information area) Cslc where bit streams corresponding to common information such as a header are arranged, and an area (macroblock area) Dmb where bit streams corresponding to the respective macroblocks are arranged. The common information area Cslc includes sync data Sslc and a header Hslc corresponding to the slice. For example, when the picture F(k'+1) in the coding order arrangement is the picture F(k+1) in the display order arrangement, the macroblock area Dmb in the bit stream Bs2 corresponding to the slice SL2 includes bit streams Bm1~Bmr corresponding to the respective macroblocks MB1~MBr.

As described above, coded data corresponding to one moving picture (i.e., one image sequence) has a hierarchical structure comprising a stream layer corresponding to a stream Smp as the coded data, GOP layers corresponding to GOPs constituting the stream, picture layers corresponding to pictures constituting each of the GOPs, and slice layers corresponding to slices constituting each of the pictures.

By the way, in moving picture coding methods such as MPEG (Moving Picture Experts Group)-1, MPEG-2, MPEG-4, ITU-T recommendation H.263, H.26L, a picture to be subjected to intra-picture coding is called an I picture, and a picture to be subjected to inter-picture predictive coding is called a P picture or a B picture.

Hereinafter, definitions of an I picture, a P picture, and a B picture will be described.

An I picture is a picture to be coded without referring to another picture. A p picture or B picture is a picture to be coded with reference to another picture. To be exact, a P picture is a picture for which either I mode coding or P mode coding can be selected when coding each block in the picture. A B picture is a picture for which one of I mode coding, P mode coding, and B mode coding can be selected when coding each block in the picture.

The I mode coding is a process of performing intra-picture coding on a target block in a target picture without referring to another picture. The P mode coding is a process of performing inter-picture predictive coding on a target block in a target picture with reference to an already-coded picture. The B mode coding is a process of performing inter-picture predictive coding on a target block in a target picture with reference to two already-coded pictures.

A picture to be referred to in the P mode coding or B mode coding is an I picture or a B picture other than the target picture, and it may be either a forward picture positioned forward the target picture or a backward picture positioned backward the target picture.

However, there are three ways of combining two pictures to be referred to in the B mode coding. That is, there are three cases of B mode coding as follows: a case where two forward pictures are referred to, a case where two backward pictures are referred to, and a case where one forward picture and one backward picture are referred to.

FIG. 45 is a diagram for explaining a moving picture coding method such as the above-mentioned MPEG. FIG. 45 illustrates relationships between target pictures and the corresponding reference pictures (pictures to be referred to when coding the respective target pictures).

Coding of the respective pictures F(k)~F(k+7), . . . , F(k+17)~F(k+21) constituting the moving picture is carried out with reference to other pictures as shown by arrows Z. To be specific, a picture at the end of one arrow Z is coded by inter-picture predictive coding with reference to a picture at the beginning of the same arrow Z. In FIG. 45, the pictures F(k)~F(k+7), . . . , F(k+17)~F(k+21) are identical to the pictures F(k)~F(k+4), . . . , F(k+n−2)~F(k+n+4), . . . , F(k+2n−2), F(k+2n−1) shown in FIG. 43(a). These pictures are arranged in order of display times on the display time axis X. The display times of the pictures F(k)~F(k+7), . . . , F(k+17)~F(k+21) are times t(k)~t(k+7), . . . , t(k+17)~t(k+21). The picture types of the pictures F(k)~F(k+7) are I, B, B, P, B, B, P, B, and the picture types of the pictures F(k+17)~F(k+21) are B, P, B, B, P.

For example, in B mode coding of the second B picture F(k+1) from the beginning shown in FIG. 45, the I picture F(k) at the beginning and the fourth P picture F(k+3) are referred to. Further, in P mode coding of the fourth P picture F(k+3) from the beginning shown in FIG. 45, the I picture F(k) at the beginning is referred to.

Although, in FIG. 45, a forward picture is referred to in P mode coding of a P picture, a backward picture may be referred to. Further, although, in FIG. 45, a forward picture and a backward picture are referred to in B mode coding of a B picture, two forward pictures or two backward pictures may be referred to.

Furthermore, in a moving picture coding method such as MPEG-4 or H.26L, a coding mode called "direct mode" may be selected when coding a B picture.

FIGS. 46($a$) and 46($b$) are diagrams for explaining inter-picture predictive coding to be performed in the direct mode. FIG. 467($a$) shows motion vectors to be used in the direct mode.

In FIG. 46($a$), pictures P1, B2, B3, and P4 correspond to the pictures F(k+3)~F(k+6) [k=−2] shown in FIG. 45, and times t(1), t(2), t(3), and t(4) (t(1)<t(2)<t(3)<t(4)) are display times of the pictures P1, B2, B3, and P4, respectively. Further, X is a display time axis indicating display times Tdis.

Hereinafter, a case where a block BL3 in the picture B3 is coded in the direct mode will be specifically described.

In this case, a target picture to be coded is the picture B3, and a target block to be coded is a block BL3.

In predictive coding of the block BL3 in the picture B3, a motion vector MV4 of a block BL4 in the picture P4, which block has been most-recently coded and is positioned backward the picture B3, is utilized. The relative position of the block BL4 to the picture P4 is equal to the relative position of the block BL3 to the picture B3. That is, as shown in FIG. 46($b$), coordinates (x4, y4) of an origin Ob4 of the block BL4 with respect to an origin O4 of the picture P4 are equal to coordinates (x3, y3) of an origin Ob3 of the block BL3 with respect to an origin O3 of the picture P3. Further, the motion vector MV4 of the block BL4 is the motion vector that is used in predictive coding of the block BL4. The motion vector MV4 of the block BL4 is obtained by motion detection of the block BL4 with reference to the forward picture P1, and it shows a region R4$f$ corresponding to the block BL4, of the forward picture P1.

Then, the block BL3 in the picture B3 is subjected to bidirectional predictive coding with reference to the forward picture P1 and the backward picture P4, by using motion vectors MV3$f$ and MV3$b$ which are parallel to the motion vector MV4. The motion vector MV3$f$ indicates a region R3$f$ corresponding to the block BL3, of the forward picture P1 to be referred to when coding the block BL3. The motion vector MV3$b$ indicates a region R3$b$ corresponding to the block BL3, of the backward picture P4 to be referred to when coding the block BL3.

By the way, the ITU-T recommendation (H.263++ Annex U) describes about a framework in a case where plural pictures are used as candidates for a reference picture. In this description, a reference picture memory for holding image data of pictures to be candidates for a reference picture (candidate pictures) is separated into a short-term picture memory and a long-term picture memory. The short-term picture memory is a memory area for holding data of candidate pictures which are timewise close to a target picture (neighboring candidate pictures). The long-term picture memory is a memory area for holding candidate pictures which are timewise far from the target picture (distant candidate pictures). To be specific, a distant candidate picture is apart from the target picture by such a distance that the number of candidate pictures from the target picture to the distant candidate picture exceeds the number of candidate pictures which can be stored in the short-term picture memory.

Further, the ITU-T recommendation (H.263++ Annex U) describes about a method of utilizing the short-term picture memory and the long-term picture memory, and further, it also describes a method of designating reference picture indices (hereinafter, also referred to simply as reference indices) to pictures.

Initially, the method of designating reference indices to pictures will be briefly described.

FIGS. 47(a) and 47(b) are diagrams for explaining the method of designating reference indices to plural pictures constituting a moving picture. FIG. 47(a) shows candidates (candidate pictures) for a picture to be referred to when coding a picture P16. FIG. 47(b) shows candidates (candidate pictures) for a picture to be referred to when coding a picture B15.

Pictures P4, B2, B3, P7, B5, B6, P10, B8, B9, P13, B11, B12, P16, B14, B15, P19, B17, and P18 shown in FIG. 47(a) are obtained by rearranging the pictures F(k+1)~F(k+17) [k=1] shown in FIG. 45, in order of coding. The arrangement of plural pictures shown in FIG. 47(a) is an arrangement of pictures on a time axis (coding time axis) Y indicating times (coding times) Tenc for coding the respective pictures.

A description will be given of a case where, as shown in FIG. 47(a), a block in the P picture P16 is subjected to P mode coding.

In this case, among four forward P pictures (pictures P4, P7, P10, and P13), a picture suited for coding is referred to. That is, the forward P pictures P4, P7, P10, and P13 are candidate pictures which can be designated as a reference picture in performing P mode coding of the picture P16. These candidate pictures P4, p7, P10, and P13 are assigned reference indices, respectively.

When assigning reference indices to these candidate pictures, a reference index having a smaller value is assigned to a candidate picture that is closer to the target picture P16 to be coded. To be specific, as shown in FIG. 47(a), reference indices [0], [1], [2], and [3] are assigned to the pictures P13, P10, P7, and P4, respectively. Further, information indicating the reference indices assigned to the respective candidate pictures is described, as a parameter of motion compensation, in a bit stream corresponding to a target block in the picture p16.

Next, a description will be given of a case where, as shown in FIG. 47(b), a block in the B picture B15 is subjected to B mode coding.

In this case, among four forward pictures (pictures P4, P7, P10, and P13) and one backward picture (picture P16), two pictures suited for coding are referred to. That is, the forward pictures P4, P7, P10, and P13 and the backward picture P16 are candidate pictures which can be designated as a reference picture in performing B mode coding on the B picture B15. When four forward pictures and one backward picture are candidate pictures, the forward pictures P4, P7, P10, and P13 are assigned reference indices, and the backward picture P16 is assigned a code [b] indicating that this picture is a candidate picture to be referred to backward.

In assigning reference indices to the candidate pictures, as for forward pictures as candidate pictures, a smaller reference index is assigned to a forward picture (candidate picture) which is closer to the target picture B15 to be coded on the coding time axis Y. To be specific, as shown in FIG. 47(b), reference indices [0], [1], [2], and [3] are assigned to the pictures P13, P10, P7, and P4, respectively. Further, information indicating the reference index assigned to each candidate picture is described, as a parameter of motion picture, in a bit stream corresponding to a target block in the picture B15.

Next, the method of assigning reference indices, which is described in the ITU-T recommendation (H.263++ Annex U), will be described in association with the method of utilizing the short-term picture memory and the long-term picture memory.

In the short-term picture memory, candidate pictures which can be designated as a reference picture for a target picture are successively stored, and the stored candidate pictures are assigned reference index in order of storage into the memory (i.e., in order of decoding, or in order of bit streams). Further, when decoding a B picture, a picture that has most-recently been stored in the memory is treated as a backward reference picture while the other pictures are assigned reference indices in order of storage into the memory.

Hereinafter, a description will be given of a case where four forward pictures can be used as candidates for a reference picture for a target picture.

FIGS. 48(a) and 48(b) are diagrams illustrating part of plural pictures constituting a moving picture, wherein pictures are arranged in order of display (48(a)), and pictures are arranged in order of coding (48(b)). Pictures P1, B2, B3, P4, B5, B6, P7, B8, B9, P10, B11, B12, P13, B14, B15, P16, B17, B18, and P19 shown in FIG. 48(a) correspond to the pictures F(k+3)~F(k+21) [k=−2] shown in FIG. 45.

FIG. 49 is a diagram for explaining management of a memory for reference pictures for the pictures arranged as described above.

In FIG. 49, already-coded pictures which are stored in the reference picture memory when coding target pictures are shown in association with logical memory numbers corresponding to memory areas where the already-coded pictures are stored, and reference indices assigned to the already-coded pictures.

In FIG. 49, pictures P16, B14, and B15 are target pictures. Logical memory numbers (0)~(4) indicate logical positions (memory areas) in the reference picture memory. The later the time when coding (or decoding) an already-processed picture stored in a memory area is, the smaller the logical memory number corresponding to the memory area is.

Hereinafter, management of the reference picture memory will be described more specifically.

When coding (decoding) the picture P16, the pictures P13, P10, P7, and P4 are stored in the memory areas indicated by the logical memory numbers (0), (1), (2), and (3) in the reference picture memory, respectively. The pictures P13, P10, P7, and P4 are assigned reference indices [0], [1], [2], and [3], respectively.

When coding (decoding) the pictures B14 and B15, the pictures P16, P13, P10, P7, and P4 are stored in the memory areas indicated by the logical memory numbers (0), (1), (2), (3), and (4) in the reference picture memory, respectively. At this time, the picture P16 is assigned a code [b] indicating that this picture is a candidate picture to be backward referred to, and the remaining candidate pictures p13, P10, P7, and P4 to be forward referred to are assigned reference indices [0], [1], [2], and [3], respectively.

Information indicating the reference indices assigned to the respective candidate pictures is a parameter of motion compensation and, when coding a block in a target picture, it is described in a bit stream corresponding to the block as information indicating which one of the plural candidate pictures is used as a reference picture. At this time, a shorter code is assigned to a smaller reference index.

In the conventional coding method described above, however, since an I picture or a P picture is designated as a reference picture when performing predictive coding on a block in a B picture, a distance (hereinafter, also referred to as a time-basis distance) between the target picture and the reference picture on the display time axis might be increased.

For example, in predictive coding on a block in the B picture B15 shown in FIG. 48(b), when the forward picture P13 and the backward picture P16 are designated as reference pictures, the time-basis distance Ltd (=t(15)-t(13)) between the B picture B15 (target picture) and the forward picture P13 (reference picture) becomes a two-picture interval (2Pitv) as shown in FIG. 50(a).

Furthermore, in predictive coding for a block in the B picture B15 shown in FIG. 48(b), when the forward pictures P13 and P10 are designated as reference pictures, the time-basis distance Ltd (=t(15)-t(10)) between the B picture B15 (target picture) and the forward picture P10 (reference picture) becomes a five-picture interval (5Pitv) as shown in FIG. 50(b).

Especially when the number of B pictures inserted between an I picture and a P picture or between adjacent two P pictures is increased, the time-basis distance Ltd between the target picture and the reference picture is increased, resulting in a considerable reduction in coding efficiency.

Further, in the conventional coding method, when performing B mode coding in which plural backward pictures can be referred to, there are cases where a neighboring picture which is timewise close to a target picture is assigned a reference index larger than a reference index assigned to a distant picture which is timewise far from the target picture.

In this case, in motion detection for a block in the target picture, a candidate picture that is timewise closer to the target picture is likely to be referred to, in other words, a candidate picture that is timewise closer to the target picture is likely to be designated as a reference picture, resulting in degradation of coding efficiency.

Hereinafter, a description will be given of a case where two backward pictures P16 and p19 are referred to in B mode coding for a block in a B picture B15 shown in FIG. 51(a).

In this case, pictures B2, B3, P4, B5, B6, P7, B8, B9, P10, B11, B12, P13, B14, B15, P16, B17, B18, and P19 which are arranged in order of display as shown in FIG. 51(a) are rearranged in order of cording like, P7, B2, B3, P10, B5, B6, P13, B8, B9, P16, B11, B12, P19, B14, and B15 as shown in FIG. 51(b).

Further, in this case, among three forward pictures (pictures P7, P10, and P13) and two backward pictures (pictures P16 and P19), two pictures suited to coding are referred to. To be specific, the forward pictures p7, P10, and P13 and the backward pictures P16 and P19 are candidate pictures which can be designated as a reference picture when coding a block in the picture B15. When three forward pictures and two backward pictures are candidate pictures as described above, reference indices are assigned to the forward pictures P7, P10, and P13 and the backward pictures P16 and P19.

In assigning reference indices to the candidate pictures, a smaller reference index is assigned to a candidate picture that is closer to the target picture B15 to be coded on the coding time axis Y. To be specific, as shown in FIG. 51(b), reference indices [0], [1], [2], [3], and [4] are assigned to the pictures P19, P16, P13, P10, and P7, respectively.

In this case, however, the reference index [1] assigned to the P picture P16 that is closer to the target picture (B picture B15) on the display time axis X becomes larger than the reference index [0] assigned to the P picture P19 that is far from the B picture B15, resulting in degradation of coding efficiency.

The present invention is made to solve the above-described problems and has for its object to provide a moving picture coding method which can prevent a reduction in coding efficiency due to an increase in a time-basis distance between a target picture and a reference picture, and a moving picture decoding method corresponding to the moving picture coding method which can prevent a reduction in coding efficiency.

Further, it is another object of the present invention to provide a moving picture coding method which can assign reference indices to candidate pictures that can be referred to in predictive coding, without degrading coding efficiency, and a moving picture decoding method corresponding to the moving picture coding method which can avoid degradation in coding efficiency.

SUMMARY OF THE INVENTION

According to the present invention, there is provided a moving picture coding method for dividing each of plural pictures constituting a moving picture into plural blocks, and coding each picture for every block, which method includes a coding step of performing predictive coding on a block of a target picture to be coded, with reference to an already-coded picture; and, in the coding step, when the target picture is a B picture whose block is to be predictive-coded with reference to two already-coded pictures, a block of the target picture is predictive-coded with reference to at least one already-coded B picture.

According to the present invention, in the above-described moving picture coding method, in the coding step, when the target picture is a B picture, a block of the target picture is predictive-coded with reference to an already-coded B picture, and when the target picture is a P picture whose block is to be predictive-coded with reference to one already-coded picture, each block of the target picture is predictive-coded without referring to any already-coded B picture.

According to the present invention, in the above-described moving picture coding method, each of the plural pictures constituting the moving picture is, in the coding step, coded as one of the following pictures: an I picture whose block is to be coded without referring to an already-coded picture, a P picture whose block is to be predictive-coded with reference to one already-coded picture, and a B picture whose block is to be predictive-coded with reference to two already-coded pictures; and, in the coding step, when the target picture is a B picture, a block of the target picture is predictive-coded with reference to at least one already-coded B picture, and when the number of candidate pictures for a reference picture to be referred to when coding the target picture as a B picture is equal to or smaller than the number of candidate pictures for a reference picture to be referred to when coding the target picture as a P picture.

According to the present invention, in the above-described moving picture coding method, each of the plural pictures constituting the moving picture is, in the coding step, coded as one of the following pictures: an I picture whose block is to be coded without referring to an already-coded picture, a P picture whose block is to be predictive-coded with reference to one already-coded picture, and a B picture whose block is to be predictive-coded with reference to two already-coded pictures; and, in the coding step, when the target picture is a B picture, a B picture to be referred to in predictive-coding a block of the target picture is only a B picture which is inserted between the target picture and an I or a P picture that is closest to the target picture in display order.

According to the present invention, in the above-described moving picture coding method, in the coding step, when the target picture is a B picture, a block of the target picture is predictive-coded with reference to at least one already-coded B picture, and picture position information indicating the position of the referred already-coded B picture on the display time axis, is included in a bit stream that is obtained by coding the pictures constituting the moving picture.

According to the present invention, in the above-described moving picture coding method, the picture position information is expressed with a shorter length code as the distance on the display time axis from the target picture to the already-coded B picture that is referred to in coding the target picture is shorter.

According to the present invention, in the above-described moving picture coding method, in the coding step, when the target picture is a B picture, a block of the target picture is predictive-coded with reference to at least one already-coded B picture; and information indicating that the already-coded B picture is referred to when coding the target B picture, is included as header information in a bit stream that is obtained by coding the pictures constituting the moving picture.

According to the present invention, there is provided a moving picture coding method for dividing each of plural pictures constituting a moving picture into plural blocks, and coding each picture for every block, which method includes a coding step of coding a target picture to be coded, with reference to, at least, a P picture whose block is to be predictive-coded with reference to one already-coded picture, and a B picture whose block is to be predictive-coded with reference to two already-coded pictures; and, in the coding step, an already-coded picture determined according to a certain rule is referred to when coding a target block of a B picture as a target picture in a direct mode which uses a motion vector of a base block that is located at spatially the same position as the target block, in an already-coded base picture that is positioned close to the target picture.

According to the present invention, in the above-described moving picture coding method, in the coding step, when coding the target block in the direct mode, a first already-coded picture which is positioned immediately before the target picture and is earlier in display order than the target picture, is referred to.

According to the present invention, in the above-described moving picture coding method, the already-coded base picture including the base block is a backward base P picture which is later in display order than the target picture; and, in the coding step, a forward motion vector (MVR×TRF/TRD) and a backward motion vector ((TRB-TRD)×MVR/TRD) of the target block are obtained, on the basis of a magnitude MVR of the motion vector of the base block, a distance TRD between the backward base P picture and a second picture which is referred to in coding the base block, on the display time axis, a distance TRF between the target picture and the first picture on the display time axis, and a distance TRB between the target picture and the second picture on the display time axis, and bidirectional prediction is carried out using the forward motion vector and the backward motion vector.

According to the present invention, in the above-described moving picture coding method, in the coding step, when coding the target block in the direct mode, bidirectional prediction with the motion vector of the target block being zero is carried out, with reference to an already-coded forward picture which is positioned closest to the target picture and is earlier in display order than the target picture, and an already-coded backward picture which is positioned closest to the target picture and is later in display order than the target picture.

According to the present invention, in the above-described moving picture coding method, in the coding step, when coding the target block in the direct mode, no image information of the target block whose prediction error information becomes zero, into the bit stream corresponding to the moving picture, is inserted.

According to the present invention, in the above-described moving picture coding method, in the coding step, when the prediction error information of the target block becomes zero, insertion of the image information of the target block into the bit stream corresponding to the moving picture, is omitted.

According to the present invention, in the above-described moving picture coding method, in the coding step, reference picture indices are assigned to candidate pictures for a reference picture to be referred to when coding the target picture, and when coding the target block in the direct mode, a candidate picture to which a specific reference picture index is assigned is referred to.

According to the present invention, in the above-described moving picture coding method, in the coding step, when a picture immediately before the target picture is a picture to be used as a candidate picture for a reference picture only when coding the target picture, the specific reference picture index is assigned to a picture which is positioned forward the target picture, except the picture immediately before the target picture, among the candidate pictures to be referred to in coding the target picture.

According to the present invention, in the above-described moving picture coding method, in the coding step, the specific reference picture index is assigned to a candidate picture which is earlier in display order than the target picture and is closest to the target picture, except the picture immediately before the target picture, among the candidate pictures to be referred to in decoding the target picture.

According to the present invention, in the above-described moving picture coding method, the already-coded base picture including the base block is a backward base P picture which is later in display order than the target picture; and, in the coding step, when coding the target block in the direct mode, a first forward picture which is earlier in display order than the target block, which is referred to in coding the base block, is referred to.

According to the present invention, in the above-described moving picture coding method, in the coding step, when coding the target block in the direct mode, a second forward picture which is positioned immediately before the target picture and is earlier in display order than the target picture, is referred to; and a forward motion vector (MVR×TRF/TRD) and a backward motion vector ((TRB-TRD)×MVR/TRD) of the target block are obtained, on the basis of a magnitude MVR of the motion vector of the base block, a distance TRD between the backward base P picture and the first forward picture on the display time axis, a distance TRF between the target picture and the second forward picture on the display time axis, and a distance TRB between the target picture and the first forward picture on the display time axis.

According to the present invention, in the above-described moving picture coding method, in the coding step, when coding the target block in the direct mode, if a forward picture to be referred to, which is earlier in display order than the target picture, does not exist in a memory for holding reference pictures, a picture which is closest to the target picture and is earlier in display order than the target picture, is referred to.

According to the present invention, there is provided a moving picture coding method for coding each of plural pictures constituting a moving picture to generate a bit stream corresponding to each picture, which method includes a coding step of coding a target picture to be coded, with reference to an already-coded picture; and the coding step includes: an index assignment step of assigning reference picture indices to plural reference candidate pictures which are candidates for a reference picture to be referred to in coding the target picture, in such a manner that a smaller reference picture index is assigned to a candidate picture which is closer in display order to the target picture to be coded, and an index addition step of adding the reference picture index which is assigned to a picture that is referred to in coding the target picture, to the bit stream.

According to the present invention, there is provided a moving picture coding method for coding each of plural pictures constituting a moving picture to generate a bit stream corresponding to each picture, which method includes a coding step of coding a target picture to be coded, with reference to at least one already-coded picture; and, in the coding step, a flag indicating whether or not the target picture is to be used as a candidate for a reference picture when coding another picture after the target picture, is described in the bit stream.

According to the present invention, there is provided a moving picture decoding method for decoding each of plural pictures constituting a moving picture, for every block that is a processing unit of each picture, thereby converting a bit stream corresponding to each picture into image data, which method includes a decoding step of performing predictive decoding on a block of a target picture to be decoded, with reference to an already-decoded picture; and, in the decoding step, when the target picture is a B picture whose block is to be predictive-decoded with reference to two already-decoded pictures, a block of the target picture is predictive-decoded with reference to at least one already-decoded B picture.

According to the present invention, in the above-described moving picture decoding method, in the decoding step, when the target picture is a B picture, a block of the target picture is predictive-decoded with reference to an already-decoded B picture, and when the target picture is a P picture whose block is to be predictive-decoded with reference to one already-decoded picture, each block of the target picture is predictive-decoded without referring to any already-decoded B picture.

According to the present invention, in the above-described moving picture decoding method, each of the plural pictures constituting the moving picture is, in the decoding step, decoded as one of the following pictures: an I picture whose block is to be decoded without referring to an already-decoded picture, a P picture whose block is to be predictive-decoded with reference to one already-decoded picture, and a B picture whose block is to be predictive-decoded with reference to two already-decoded pictures; and, in the decoding step, when the target picture is a B picture, a block of the target picture is predictive-decoded with reference to at least one already-decoded B picture, and the number of candidate pictures for a forward reference picture to be referred to when decoding the target picture as a B picture is equal to or smaller than the number of candidate pictures for a reference picture to be referred to when decoding target picture as a P picture.

According to the present invention, in the above-described moving picture decoding method, each of the plural pictures constituting the moving picture is, in the decoding step, decoded as one of the following pictures: an I picture whose block is to be decoded without referring to an already-decoded picture, a P picture whose block is to be predictive-decoded with reference to one already-decoded picture, and a B picture whose block is to be predictive-decoded with reference to two already-decoded pictures; and, in the decoding step, when the target picture is a B picture, a B picture to be referred to in predictive-decoding a block of the target picture is only a B picture which is inserted between the target picture and an I or a P picture that is closest to the target picture in display order.

According to the present invention, in the above-described moving picture decoding method, in the decoding step, when the target picture is a B picture, a process of predictive-decoding a block of the target picture with reference to an already-decoded B picture, is carried out on the basis of picture position information indicating the position of the already-decoded B picture on the display time axis, which information is included in the bit stream.

According to the present invention, in the above-described moving picture decoding method, the picture position information is expressed with a shorter length code as the distance on the display time axis from the target picture to the already-decoded forward B picture that is referred to in decoding the target picture is shorter.

According to the present invention, in the above-described moving picture decoding method, in the decoding step, when the target picture is a B picture, a process of predictive-decoding a block of the target picture with reference to at least one already-decoded B picture, is carried out with reference to header information indicating that an already-coded B picture is referred to when coding the target B picture, which header information is included in the bit stream corresponding to the picture as a component of the moving picture.

According to the present invention, there is provided a moving picture decoding method for decoding each of plural pictures constituting a moving picture, for every block that is a processing unit of each picture, thereby converting a bit stream corresponding to each picture into image data, which method includes a decoding step of decoding a target picture to be decoded, with reference to, at least, a P picture whose block is to be predictive-decoded with reference to one already-decoded picture, and a B picture whose block is to be predictive-decoded with reference to two already-decoded pictures; and, in the decoding step, an already-decoded picture determined according to a certain rule is referred to when decoding a target block of a B picture as a target picture in a direct mode which uses a motion vector of a base block that is located at spatially the same position as the target block, in an already-decoded base picture that is positioned close to the target picture.

According to the present invention, in the above-described moving picture decoding method, in the decoding step, when decoding the target block in the direct mode, a first already-coded picture which is positioned immediately before the target picture and is earlier in display order than the target picture, is referred to.

According to the present invention, in the above-described moving picture decoding method, the already-decoded base picture including the base block is a backward base P picture which is later in display order than the target picture; and, in the decoding step, a forward motion vector (MVR×TRF/TRD) and a backward motion vector ((TRB-TRD)×MVR/TRD) of the target block are obtained, on the basis of a magnitude MVR of the motion vector of the base block, a distance TRD between the backward base P picture and a second picture which is referred to in decoding the base block, on the display time axis, a distance TRF between the target picture and the first picture on the display time axis, and a distance TRB between the target picture and the second picture on the display time axis.

According to the present invention, in the above-described moving picture decoding method, in the decoding step, when decoding the target block in the direct mode, bidirectional prediction with the motion vector of the target block being zero is carried out, with reference to an already-decoded forward picture which is positioned closest to the target picture and is earlier in display order than the target picture, and an already-decoded backward picture which is positioned closest to the target picture and is later in display order than the target picture.

According to the present invention, in the above-described moving picture decoding method, in the decoding step, when decoding the target block in the direct mode, image information of the target block whose prediction error information is zero, which image information is not included in the bit stream, is restored using the motion vector of the base block.

According to the present invention, in the above-described moving picture decoding method, in the decoding step, image information of the target block whose prediction error information is zero, which image information is not included in the bit stream, is restored using the motion vector of the base block.

According to the present invention, in the above-described moving picture decoding method, reference picture indices are assigned to candidate pictures for a reference picture to be referred to when decoding the target picture; and, in the decoding step, when decoding the target block in the direct mode, a candidate picture to which a specific reference picture index is assigned is referred to.

According to the present invention, in the above-described moving picture decoding method, when a picture immediately before the target picture is a picture to be used as a candidate picture for a reference picture only when decoding the target picture, the specific reference picture index is assigned to a target picture which is positioned forward the target picture, except the picture immediately before the target picture, among the candidate pictures to be referred to in decoding the target picture; and, in the decoding step, when decoding the target block in the direct mode, the picture to which the specific reference picture index is assigned is referred to.

According to the present invention, in the above-described moving picture decoding method, the specific reference picture index is assigned to a candidate picture which is earlier in display order than the target picture and is closest to the target picture, except the picture immediately before the target picture, among the candidate pictures to be referred to in decoding the target picture; and, in the decoding step, when decoding the target block in the direct mode, the picture to which the specific reference picture index is assigned is referred to.

According to the present invention, in the above-described moving picture decoding method, the already-decoded base picture including the base block is a backward base P picture which is later in display order than the target picture; and, in the decoding step, when decoding the target block in the direct mode, a first forward picture which is earlier in display order than the target block, which is referred to in decoding the base block, is referred to.

According to the present invention, in the above-described moving picture decoding method, in the decoding step, when decoding the target block in the direct mode, a second forward picture which is positioned immediately before the target picture and is earlier in display order than the target picture, is referred to; and a forward motion vector (MV×TRF/TRD) and a backward motion vector ((TRB−TRD)×MVR/TRD) of the target block are obtained, on the basis of a magnitude MVR of the motion vector of the base block, a distance TRD between the backward base P picture and the first forward picture on the display time axis, a distance TRF between the target picture and the second forward picture on the display time axis, and a distance TRB between the target picture and the first forward picture on the display time axis.

According to the present invention, in the above-described moving picture decoding method, in the decoding step, when decoding the target block in the direct mode, if a forward picture to be referred to, which is earlier in display order than the target picture, does not exist in a memory for holding reference pictures, a picture which is closest to the target picture and is earlier in display order than the target picture is referred to.

According to the present invention, there is provided a moving picture decoding method for decoding each of plural pictures constituting a moving picture to convert a bit stream corresponding to each picture into image data, which method includes a decoding step of decoding a target picture to be decoded, with reference to an already-decoded picture; and the decoding step includes: an index assignment step of assigning reference picture indices to plural reference candidate pictures which are candidates for a reference picture to be referred to in decoding the target picture, in such a manner that a smaller reference picture index is assigned to a candidate picture which is closer in display order to the target picture to be decoded, and a reference picture determination step of determining a picture to be referred to in decoding the target picture, on the basis of a reference picture index assigned to a picture that is referred to in coding the target picture, which index is added to the bit stream of the target picture, and the reference picture indices assigned to the reference candidate pictures in the index assignment step.

According to the present invention, there is provided a moving picture decoding method for decoding each of plural pictures constituting a moving picture to convert a bit stream corresponding to each picture into image data, which method includes a decoding step of decoding a target picture to be decoded, with reference to at least one already-decoded picture, wherein a flag indicating whether or not the target picture is to be used as a candidate for a reference picture when decoding another picture after the target picture, is described in the bit stream, and in the decoding step, the decoded target picture is managed according to the flag.

As described above, in the present invention, there is provided a moving picture coding method for dividing each of plural pictures constituting a moving picture into plural blocks, and coding each picture for every block, which method includes a coding step of performing predictive coding on a block of a target picture to be coded, with reference to an already-coded picture; and, in the coding step, when the target picture is a B picture whose block is to be predictive-coded with reference to two already-coded pictures, a block of the target picture is predictive-coded with reference to at least one already-coded B picture. Therefore, when coding a B picture, a forward reference picture that is closest to the B picture can be used. Thereby, prediction accuracy in motion compensation for a B picture can be increased, resulting in enhanced coding efficiency.

In the above-described moving picture coding method, in the coding step, when the target picture is a B picture, a block of the target picture is predictive-coded with reference to an already-coded B picture, and when the target picture is a P picture whose block is to be predictive-coded with reference to one already-coded picture, each block of the target picture is predictive-coded without referring to any already-coded B picture. Therefore, in a memory where pictures to be candidates for a reference picture are stored, management of the candidate pictures is facilitated.

In the above-described moving picture coding method, each of the plural pictures constituting the moving picture is, in the coding step, coded as one of the following pictures: an I picture whose block is to be coded without referring to an already-coded picture, a P picture whose block is to be predictive-coded with reference to one already-coded picture, and a B picture whose block is to be predictive-coded with reference to two already-coded pictures; and, in the coding step, when the target picture is a B picture, a block of the target picture is predictive-coded with reference to at least one already-coded B picture, and when the number of candidate pictures for a reference picture to be referred to when coding the target picture as a B picture is equal to or smaller than the number of candidate pictures for a reference picture to be referred to when coding the target picture as a P picture. Therefore, an increase in capacity of a memory for holding reference candidate pictures, which is caused by that another B picture is referred to when coding a B picture, can be avoided.

In the above-described moving picture coding method, each of the plural pictures constituting the moving picture is, in the coding step, coded as one of the following pictures: an I picture whose block is to be coded without referring to an already-coded picture, a P picture whose block is to be predictive-coded with reference to one already-coded picture, and a B picture whose block is to be predictive-coded with reference to two already-coded pictures; and, in the coding step, when the target picture is a B picture, a B picture to be referred to in predictive-coding a block of the target picture is only a B picture which is inserted between the target picture and an I or a P picture that is closest to the target picture in display order. Therefore, prediction accuracy in motion compensation for a B picture can be increased, resulting in enhanced coding efficiency.

In the above-described moving picture coding method, in the coding step, when the target picture is a B picture, a block of the target picture is predictive-coded with reference to at least one already-coded B picture, and picture position information indicating the position of the referred already-coded B picture on the display time axis, is included in a bit stream that is obtained by coding the pictures constituting the moving picture. Therefore, the decoding end can easily detect a reference candidate B picture that is used as a reference picture in coding a B picture.

In the above-described moving picture coding method, the picture position information is expressed with a shorter length code as the distance on the display time axis from the target picture to the already-coded B picture that is referred to in coding the target picture is shorter. Therefore, it is possible to reduce the amount of codes which express information for identifying, at the decoding end, a candidate picture that is forward referred to in coding a B picture.

In the above-described moving picture coding method, in the coding step, when the target picture is a B picture, a block of the target picture is predictive-coded with reference to at least one already-coded B picture; and information indicating that the already-coded B picture is referred to when coding the target B picture, is included as header information in a bit stream that is obtained by coding the pictures constituting the moving picture. Therefore, the decoding end can easily detect that another B picture is forward referred to in coding a B picture.

Further, in the present invention, there is provided a moving picture coding method for dividing each of plural pictures constituting a moving picture into plural blocks, and coding each picture for every block, which method includes a coding step of coding a target picture to be coded, with reference to, at least, a P picture whose block is to be predictive-coded with reference to one already-coded picture, and a B picture whose block is to be predictive-coded with reference to two already-coded pictures; and, in the coding step, an already-coded picture determined according to a certain rule is referred to when coding a target block of a B picture as a target picture in a direct mode which uses a motion vector of a base block that is located at spatially the same position as the target block, in an already-coded base picture that is positioned close to the target picture. Therefore, prediction efficiency can be optimized according to the coding status.

In the above-described moving picture coding method, in the coding step, when coding the target block in the direct mode, a first already-coded picture which is positioned immediately before the target picture and is earlier in display order than the target picture, is referred to. Therefore, prediction efficiency in coding a B picture in direct mode can be enhanced.

In the above-described moving picture coding method, the already-coded base picture including the base block is a backward base P picture which is later in display order than the target picture; and, in the coding step, a forward motion vector (MVR×TRF/TRD) and a backward motion vector ((TRB-TRD)×MVR/TRD) of the target block are obtained, on the basis of a magnitude MVR of the motion vector of the base block, a distance TRD between the backward base P picture and a second picture which is referred to in coding the base block, on the display time axis, a distance TRF between the target picture and the first picture on the display time axis, and a distance TRB between the target picture and the second picture on the display time axis, and bidirectional prediction is carried out using the forward motion vector and the backward motion vector. Therefore, a motion vector of a target block to be used in direct mode can be accurately generated from a motion vector of a block other than the target block.

In the above-described moving picture coding method, in the coding step, when coding the target block in the direct mode, bidirectional prediction with the motion vector of the target block being zero is carried out, with reference to an already-coded forward picture which is positioned closest to the target picture and is earlier in display order than the target picture, and an already-coded backward picture which is positioned closest to the target picture and is later in display order than the target picture. Therefore, when coding a B picture in direct mode, scaling of a motion vector becomes unnecessary, resulting in a reduction in volume of processing.

In the above-described moving picture coding method, in the coding step, when coding the target block in the direct mode, no image information of the target block whose prediction error information becomes zero, into the bit stream corresponding to the moving picture, is inserted. Therefore, the amount of codes can be reduced.

In the above-described moving picture coding method, in the coding step, when the prediction error information of the target block becomes zero, insertion of the image information of the target block into the bit stream corresponding to the moving picture, is omitted. Therefore, the amount of codes can be reduced.

In the above-described moving picture coding method, in the coding step, reference picture indices are assigned to candidate pictures for a reference picture to be referred to when coding the target picture, and when coding the target block in the direct mode, a candidate picture to which a specific reference picture index is assigned is referred to. Therefore, prediction efficiency can be optimized according to the coding status.

In the above-described moving picture coding method, in the coding step, when a picture immediately before the target picture is a picture to be used as a candidate picture for a reference picture only when coding the target picture, the specific reference picture index is assigned to a picture which is positioned forward the target picture, except the picture immediately before the target picture, among the candidate pictures to be referred to in coding the target picture. Therefore, prediction efficiency in coding a B picture in direct mode can be enhanced.

In the above-described moving picture coding method, in the coding step, the specific reference picture index is assigned to a candidate picture which is earlier in display order than the target picture and is closest to the target picture, except the picture immediately before the target picture, among the candidate pictures to be referred to in decoding the target picture. Therefore, prediction efficiency in coding a B picture in direct mode can be enhanced.

In the above-described moving picture coding method, the already-coded base picture including the base block is a backward base P picture which is later in display order than the target picture; and, in the coding step, when coding the target block in the direct mode, a first forward picture which is earlier in display order than the target block, which is referred to in coding the base block, is referred to. Therefore, prediction efficiency in coding a B picture in direct mode can be enhanced.

In the above-described moving picture coding method, in the coding step, when coding the target block in the direct mode, a second forward picture which is positioned immediately before the target picture and is earlier in display order than the target picture, is referred to; and a forward motion vector (MVR×TRF/TRD) and a backward motion vector ((TRB-TRD)×MVR/TRD) of the target block are obtained, on the basis of a magnitude MVR of the motion vector of the base block, a distance TRD between the backward base P picture and the first forward picture on the display time axis, a distance TRF between the target picture and the second forward picture on the display time axis, and a distance TRB between the target picture and the first forward picture on the display time axis. Therefore, a motion vector of a target block to be used in direct mode can be accurately generated from a motion vector of a block other than the target block.

In the above-described moving picture coding method, in the coding step, when coding the target block in the direct mode, if a forward picture to be referred to, which is earlier in display order than the target picture, does not exist in a memory for holding reference pictures, a picture which is closest to the target picture and is earlier in display order than the target picture, is referred to. Therefore, prediction efficiency in direct mode coding for a B picture is prevented from being significantly degraded.

Further, in the present invention, there is provided a moving picture coding method for coding each of plural pictures constituting a moving picture to generate a bit stream corresponding to each picture, which method includes a coding step of coding a target picture to be coded, with reference to an already-coded picture; and the coding step includes: an index assignment step of assigning reference picture indices to plural reference candidate pictures which are candidates for a reference picture to be referred to in coding the target picture, in such a manner that a smaller reference picture index is assigned to a candidate picture which is closer in display order to the target picture to be coded, and an index addition step of adding the reference picture index which is assigned to a picture that is referred to in coding the target picture, to the bit stream. Therefore, a smaller reference picture index can be assigned to a picture which is timewise closer to the target picture and is more likely to be used as a reference picture, whereby the amount of codes expressing reference picture indices can be minimized, resulting in enhanced coding efficiency.

Further, in the present invention, there is provided a moving picture coding method for coding each of plural pictures constituting a moving picture to generate a bit stream corresponding to each picture, which method includes a coding step of coding a target picture to be coded, with reference to at least one already-coded picture; and, in the coding step, a flag indicating whether or not the target picture is to be used as a candidate for a reference picture when coding another picture after the target picture, is described in the bit stream. Therefore, for example, when coding a B picture to be subjected to bidirectional predictive coding, a forward picture that is closest to the B picture can be used as a reference picture. Thereby, prediction accuracy in motion compensation for a B picture can be increased, resulting in enhanced coding efficiency.

In the present invention, there is provided a moving picture decoding method for decoding each of plural pictures constituting a moving picture, for every block that is a processing unit of each picture, thereby converting a bit stream corresponding to each picture into image data, which method includes a decoding step of performing predictive decoding on a block of a target picture to be decoded, with reference to an already-decoded picture; and, in the decoding step, when the target picture is a B picture whose block is to be predictive-decoded with reference to two already-decoded pictures, a block of the target picture is predictive-decoded with reference to at least one already-decoded B picture. Therefore, a block of a B picture, which is coded using a B picture as a candidate picture for forward reference, can be correctly decoded.

In the above-described moving picture decoding method, in the decoding step, when the target picture is a B picture, a block of the target picture is predictive-decoded with reference to an already-decoded B picture, and when the target picture is a P picture whose block is to be predictive-decoded with reference to one already-decoded picture, each block of the target picture is predictive-decoded without referring to any already-decoded B picture. Therefore, in a memory where pictures to be candidates for a reference picture are stored, management of the candidate pictures is facilitated.

In the above-described moving picture decoding method, each of the plural pictures constituting the moving picture is, in the decoding step, decoded as one of the following pictures: an I picture whose block is to be decoded without referring to an already-decoded picture, a P picture whose block is to be predictive-decoded with reference to one already-decoded picture, and a B picture whose block is to be predictive-decoded with reference to two already-decoded pictures; and, in the decoding step, when the target picture is a B picture, a block of the target picture is predictive-decoded with reference to at least one already-decoded B picture, and the number of candidate pictures for a forward reference picture to be referred to when decoding the target picture as a B picture is equal to or smaller than the number of candidate pictures for a reference picture to be referred to when decoding target picture as a P picture. Therefore, an increase in capacity of a memory for holding reference candidate pictures, which is caused by that another B picture is referred to in decoding a B picture, can be avoided.

In the above-described moving picture decoding method, each of the plural pictures constituting the moving picture is, in the decoding step, decoded as one of the following pictures: an I picture whose block is to be decoded without referring to an already-decoded picture, a P picture whose block is to be predictive-decoded with reference to one already-decoded picture, and a B picture whose block is to be predictive-decoded with reference to two already-decoded pictures; and, in the decoding step, when the target picture is a B picture, a B picture to be referred to in predictive-decoding a block of the target picture is only a B picture which is inserted between the target picture and an I or a P picture that is closest to the target picture in display order. Therefore, prediction accuracy in motion compensation for a B picture can be increased.

In the above-described moving picture decoding method, in the decoding step, when the target picture is a B picture, a process of predictive-decoding a block of the target picture with reference to an already-decoded B picture, is carried out on the basis of picture position information indicating the position of the already-decoded B picture on the display time axis, which information is included in the bit stream. Therefore, the decoding end can correctly identify a reference candidate B picture that is used as a reference picture in coding a B picture.

In the above-described moving picture decoding method, the picture position information is expressed with a shorter length code as the distance on the display time axis from the target picture to the already-decoded forward B picture that is referred to in decoding the target picture is shorter. Therefore, it is possible to reduce the amount of codes which express information for identifying, at the decoding end, a candidate picture that is forward referred to in coding a B picture.

In the above-described moving picture decoding method, in the decoding step, when the target picture is a B picture, a process of predictive-decoding a block of the target picture with reference to at least one already-decoded B picture, is carried out with reference to header information indicating that an already-coded B picture is referred to when coding the target B picture, which header information is included in the bit stream corresponding to the picture as a component of the moving picture. Therefore, in predictive decoding for a target block, it can be reliably and speedily determined that another B picture is forward referred to in coding a B picture.

Further, in the present invention, there is provided a moving picture decoding method for decoding each of plural pictures constituting a moving picture, for every block that is a processing unit of each picture, thereby converting a bit stream corresponding to each picture into image data, which method includes a decoding step of decoding a target picture to be decoded, with reference to, at least, a P picture whose block is to be predictive-decoded with reference to one already-decoded picture, and a B picture whose block is to be predictive-decoded with reference to two already-decoded pictures; and, in the decoding step, an already-decoded picture determined according to a certain rule is referred to when decoding a target block of a B picture as a target picture in a direct mode which uses a motion vector of a base block that is located at spatially the same position as the target block, in an already-decoded base picture that is positioned close to the target picture. Therefore, it is possible to realize a decoding method adaptive to a coding method that can optimize prediction efficiency according to the coding status.

In the above-described moving picture decoding method, in the decoding step, when decoding the target block in the direct mode, a first already-coded picture which is positioned immediately before the target picture and is earlier in display order than the target picture, is referred to. Therefore, prediction efficiency in decoding a B picture in direct mode can be enhanced.

In the above-described moving picture decoding method, the already-decoded base picture including the base block is a backward base P picture which is later in display order than the target picture; and, in the decoding step, a forward motion vector (MVR×TRF/TRD) and a backward motion vector ((TRB-TRD)×MVR/TRD) of the target block are obtained, on the basis of a magnitude MVR of the motion vector of the base block, a distance TRD between the backward base P picture and a second picture which is referred to in decoding the base block, on the display time axis, a distance TRF between the target picture and the first picture on the display time axis, and a distance TRB between the target picture and the second picture on the display time axis. Therefore, a motion vector of a target block to be used in direct mode can be accurately generated from a motion vector of a block other than the target block.

In the above-described moving picture decoding method, in the decoding step, when decoding the target block in the direct mode, bidirectional prediction with the motion vector of the target block being zero is carried out, with reference to an already-decoded forward picture which is positioned closest to the target picture and is earlier in display order than the target picture, and an already-decoded backward picture which is positioned closest to the target picture and is later in display order than the target picture. Therefore, in direct mode decoding for a B picture, scaling of a motion vector becomes unnecessary, resulting in reduced volume of processing.

In the above-described moving picture decoding method, in the decoding step, when decoding the target block in the direct mode, image information of the target block whose prediction error information is zero, which image information is not included in the bit stream, is restored using the motion vector of the base block. Therefore, a target block whose prediction error information is zero, which is not included in the bit stream, can be predictive-decoded using a motion vector of another block.

In the above-described moving picture decoding method, in the decoding step, image information of the target block whose prediction error information is zero, which image information is not included in the bit stream, is restored using the motion vector of the base block. Therefore, a target block whose prediction error information is zero, which is not included in the bit stream, can be predictive-decoded using a motion vector of another block.

In the above-described moving picture decoding method, reference picture indices are assigned to candidate pictures for a reference picture to be referred to when decoding the target picture; and, in the decoding step, when decoding the target block in the direct mode, a candidate picture to which a specific reference picture index is assigned is referred to. Therefore, it is possible to realize a decoding method adaptive to a coding method that can optimize prediction efficiency according to the coding status.

In the above-described moving picture decoding method, when a picture immediately before the target picture is a picture to be used as a candidate picture for a reference picture only when decoding the target picture, the specific reference picture index is assigned to a target picture which is positioned forward the target picture, except the picture immediately before the target picture, among the candidate pictures to be referred to in decoding the target picture; and, in the decoding step, when decoding the target block in the direct mode, the picture to which the specific reference picture index is assigned is referred to. Therefore, prediction efficiency in decoding a B picture in direct mode can be enhanced.

In the above-described moving picture decoding method, the specific reference picture index is assigned to a candidate picture which is earlier in display order than the target picture and is closest to the target picture, except the picture immediately before the target picture, among the candidate pictures to be referred to in decoding the target picture; and, in the decoding step, when decoding the target block in the direct mode, the picture to which the specific reference picture index is assigned is referred to. Therefore, prediction efficiency in decoding a B picture in direct mode can be enhanced.

In the above-described moving picture decoding method, the already-decoded base picture including the base block is a backward base P picture which is later in display order than the target picture; and, in the decoding step, when decoding the target block in the direct mode, a first forward picture which is earlier in display order than the target block, which is referred to in decoding the base block, is referred to. Therefore, prediction efficiency in decoding a B picture in direct mode can be enhanced.

In the above-described moving picture decoding method, in the decoding step, when decoding the target block in the direct mode, a second forward picture which is positioned immediately before the target picture and is earlier in display order than the target picture, is referred to; and a forward motion vector (MV×TRF/TRD) and a backward motion vector ((TRB-TRD)×MVR/TRD) of the target block are obtained, on the basis of a magnitude MVR of the motion vector of the base block, a distance TRD between the backward base P picture and the first forward picture on the display time axis, a distance TRF between the target picture and the second forward picture on the display time axis, and a distance TRB between the target picture and the first forward picture on the display time axis. Therefore, a motion vector of a target block to be used in direct mode can be accurately generated from a motion vector of a block other than the target block.

In the above-described moving picture decoding method, in the decoding step, when decoding the target block in the direct mode, if a forward picture to be referred to, which is earlier in display order than the target picture, does not exist in a memory for holding reference pictures, a picture which is closest to the target picture and is earlier in display order than the target picture is referred to. Therefore, prediction efficiency in decoding a B picture in direct mode is prevented from being significantly degraded.

Further, in the present invention, there is provided a moving picture decoding method for decoding each of plural pictures constituting a moving picture to convert a bit stream corresponding to each picture into image data, which method includes a decoding step of decoding a target picture to be decoded, with reference to an already-decoded picture; and the decoding step includes: an index assignment step of assigning reference picture indices to plural reference candidate pictures which are candidates for a reference picture to be referred to in decoding the target picture, in such a manner that a smaller reference picture index is assigned to a candidate picture which is closer in display order to the target picture to be decoded, and a reference picture determination step of determining a picture to be referred to in decoding the target picture, on the basis of a reference picture index assigned to a picture that is referred to in coding the target picture, which index is added to the bit stream of the target picture, and the reference picture indices assigned to the reference candidate pictures in the index assignment step. Therefore, it is possible to correctly decode a bit stream which is generated by a highly-efficient coding method in which a smaller reference picture index can be assigned to a picture that is timewise closer to the target picture and is more likely to be selected.

Further, in the present invention, there is provided a moving picture decoding method for decoding each of plural pictures constituting a moving picture to convert a bit stream corresponding to each picture into image data, which method includes a decoding step of decoding a target picture to be decoded, with reference to at least one already-decoded picture, wherein a flag indicating whether or not the target picture is to be used as a candidate for a reference picture when decoding another picture after the target picture, is described in the bit stream, and in the decoding step, the decoded target picture is managed according to the flag. Therefore, it is possible to correctly decode a bit stream corresponding to a B picture, which is generated by using, as forward reference pictures, not only a P picture subjected to forward predictive coding but also a B picture subjected to bidirectional predictive coding.

BRIEF DESCRIPTION OF THE DRAWINGS

FIGS. 2(a) and 2(b) are schematic diagrams for explaining a moving picture coding method according to the first embodiment, wherein FIG. 2(a) shows pictures arranged in order of display, and FIG. 2(b) shows pictures arranged in order of coding.

FIG. 3 is a schematic diagram for explaining the moving picture coding apparatus according to the first embodiment and a moving picture decoding apparatus according to a second embodiment, illustrating a method for collectively managing P and B pictures in a memory.

FIGS. 4(a) and 4(b) are diagrams for explaining the first embodiment, illustrating a first example (4(a)) and a second example (4(b)) of direct mode coding (for picture B11).

FIGS. 5(a) and 5(b) are diagrams for explaining the first embodiment, illustrating a third example (5(a)) and a fourth example (5(b)) of direct mode coding (for picture B11).

FIGS. 6(a)-6(c) are diagrams for explaining the first embodiment, illustrating a fifth example (6(a)) of direct mode coding (for picture B11), a skip block (6(b)), and a skip identifier (6(c)).

FIGS. 7(a) and 7(b) are diagrams for explaining the first embodiment, illustrating a first example (7(a)) and a second example (7(b)) of direct mode coding (for picture B12).

FIGS. 8(a) and 8(b) are diagrams for explaining the first embodiment, illustrating a third example (8(a)) and a fourth example (8(b)) of direct mode coding (for picture B12).

FIGS. 9(a) and 9(b) are diagrams for explaining the first embodiment, illustrating a first example (9(a)) and a second example (9(b)) of coding wherein a B picture positioned forward a closest forward P picture is referred to.

FIGS. 10(a) and 10(b) are diagrams for explaining the first embodiment, illustrating a first example (10(a)) and a second example (10(b)) of coding wherein a B picture positioned forward a closest forward I or P picture is not referred to.

FIG. 11 is a diagram for explaining the first and second embodiments, illustrating a first method for managing P pictures and B pictures in a memory, separately from each other.

FIG. 12 is a diagram for explaining the first and second embodiments, illustrating a second method for managing P pictures and B pictures in a memory, separately from each other.

FIG. 13 is a diagram for explaining the first and second embodiments, illustrating a third method for managing P pictures and B pictures in a memory, separately from each other.

FIG. 14 is a diagram for explaining the first and second embodiments, illustrating a fourth method for managing P pictures and B pictures in a memory, separately from each other.

FIGS. 16(a) and 16(b) are schematic diagrams for explaining a moving picture decoding method according to the second embodiment, wherein FIG. 16(a) shows pictures arranged in order of decoding, and FIG. 16(b) shows pictures arranged in order of display.

FIGS. 19(a) and 19(b) are diagrams for explaining the second embodiment, illustrating a third example (19(a)) and a fourth example (19(b)) of direct mode decoding (for picture B11).

FIG. 24 is a schematic diagram for explaining the moving picture coding apparatus according to the third embodiment, illustrating a method for collectively managing P and B pictures in a memory.

FIGS. 25(a) and 25(b) are diagrams for explaining the third embodiment, illustrating a case where decoding of a B picture immediately after a P picture is not carried out (25(a)), and a case where a predetermined picture is not decoded.

FIG. 28 is a diagram for explaining the fifth embodiment, illustrating a method for managing a picture memory, and a method for assigning reference picture indices.

FIG. 30 is a diagram for explaining the fifth embodiment, illustrating a method for managing a picture memory, and a method for assigning reference picture indices.

FIG. 37 is a diagram for explaining the eighth embodiment, illustrating a method for managing a picture memory.

FIG. 45 is a diagram for explaining a conventional moving picture coding method such as MPEG, illustrating the relationships between target pictures and pictures to be referred to when coding the target pictures.

FIGS. 47(a) and 47(b) are diagrams for explaining a conventional method for assigning reference picture indices, illustrating reference indices to be assigned to candidate pictures which are referred to when coding P pictures and B pictures, respectively.

FIGS. 48(a) and 48(b) are diagrams for explaining a conventional moving picture coding method, illustrating pictures constituting a moving picture which are arranged in order of display (48(a)), and those pictures arranged in order of coding (48(b)).

FIG. 49 is a diagram for explaining a conventional moving picture coding method, illustrating an example of management of a reference picture memory for the pictures arranged in order of coding.

DETAILED DESCRIPTION OF THE INVENTION

Embodiment 1

Figure 1:
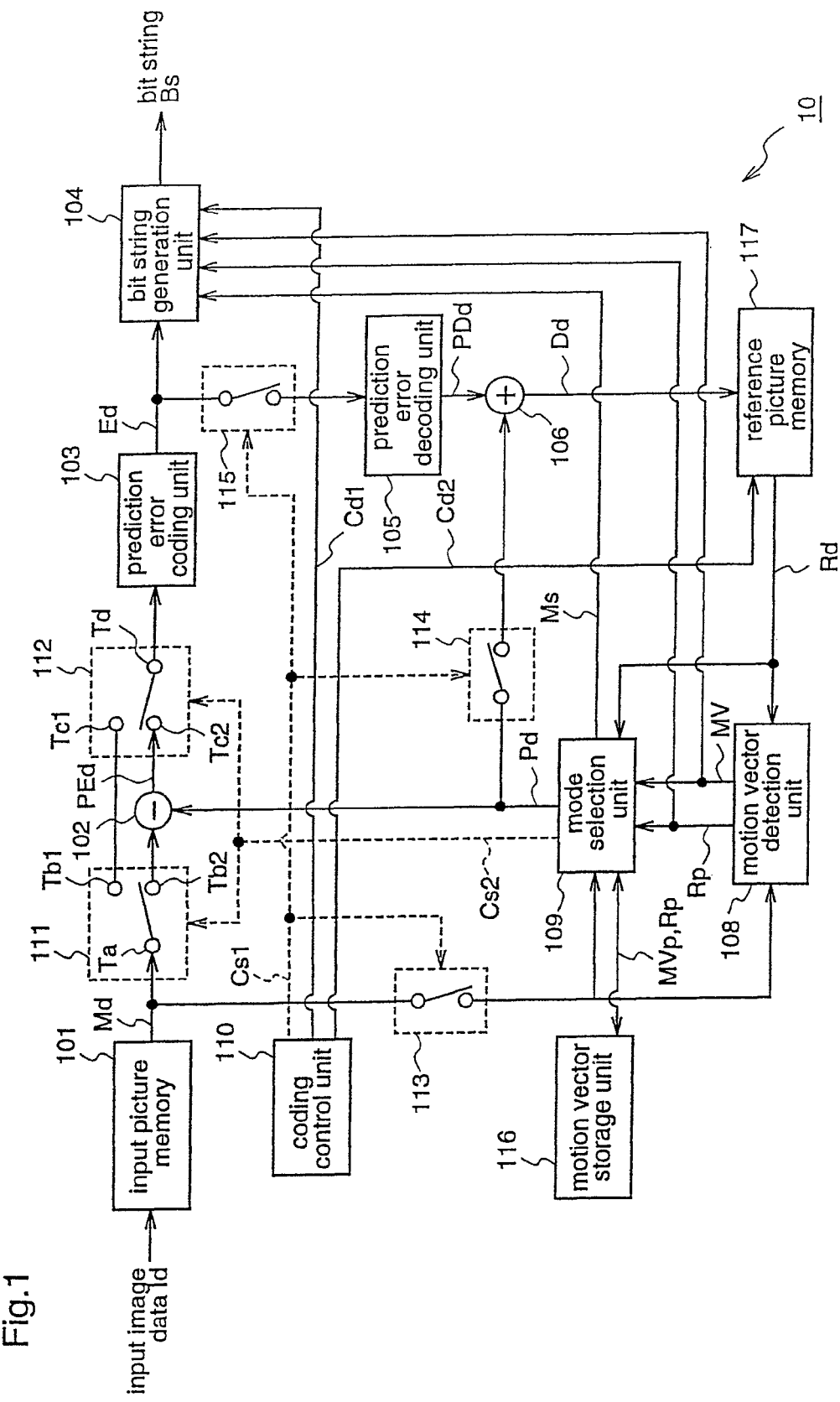
FIG. 1 is a block diagram for explaining a moving picture coding apparatus according to a first embodiment of the present invention.

FIG. 1 is a block diagram for explaining a moving picture coding apparatus 10 according to a first embodiment of the present invention.

The moving picture coding apparatus 10 according to this first embodiment divides each of plural pictures constituting a moving picture into predetermined data processing units (blocks), and encodes image data of each picture for every block.

To be specific, the moving picture coding apparatus 10 includes an input picture memory 101 for holding image data (input data) Id of inputted pictures, and outputting the stored data Id for every block; a difference calculation unit 102 for calculating difference data between image data Md of a target block to be coded, which is outputted from the reference picture memory 101, and prediction data Pd of the target block, as prediction error data PEd of the target block; and a prediction error coding unit 103 for compressively coding the image data Md of the target block or the prediction error data PEd. In the reference picture memory 101, the image data of the respective pictures which have been inputted in order of display are rearranged in order of picture coding, and this rearrangement is carried out on the basis of the relationship between each target picture and a picture to be referred to (reference picture) in predictive coding of the target picture.

The moving picture coding apparatus 10 further includes a prediction error decoding unit 105 for expandingly decoding output data (coded data) Ed from the prediction error coding unit 103 to output decoded difference data PDd of the target block; an addition unit 106 for adding the decoded difference data PDd of the target block and the prediction data Pd of the target block to output decoded data Dd of the target block; and a reference picture memory 117 for holding the decoded data Dd according to a memory control signal Cd2, and outputting the stored decoded data Dd, as data Rd of candidates (candidate pictures) of pictures to be referred to when coding the target block.

The moving picture coding apparatus 10 further includes a motion vector detection unit 108 for detecting a motion vector MV of the target block, on the basis of the output data (image data of the target block) Md from the reference picture memory 101, and the output data (candidate picture data) Rf from the reference picture memory 117; and a mode selection unit 109 for determining a coding mode suited to the target block, on the basis of the motion vector MV of the target block, and the output data Md and Rd from the respective memories 101 and 117, and outputting a switch control signal Cs2. The motion vector detection unit 108 performs motion detection for detecting the above-mentioned motion vector with reference to plural candidate pictures that can be referred to in predictive coding of the target block. Further, the mode selection unit 109 selects one coding mode for the target block from among plural coding modes, which coding mode provides optimum coding efficiency. At this time, when inter-picture predictive coding is selected, an optimum picture is selected from among the plural candidate pictures that can be referred to.

In the moving picture coding apparatus 10 according to the first embodiment, for a P picture (i.e., a picture for which one already-coded picture is referred to when one block in this picture is subjected to predictive coding), one of the following coding modes is selected: intra-picture coding mode, inter-picture predictive coding mode using a motion vector, and inter-picture predictive coding mode using no motion vector (i.e., motion vector is regarded as 0). Further, for a B picture (i.e., a picture for which two already-coded pictures are referred to when one block in this picture is subjected to predictive coding), one of the following coding modes is selected: intra-picture coding mode, inter-picture predictive coding mode using a forward motion vector, inter-picture predictive coding mode using a backward motion picture, inter-picture predictive coding mode using bidirectional motion vectors, and direct mode. Further, in this first embodiment, when a block in the B picture is coded in the direct mode, an already coded picture that is positioned just previous to the target picture on the display time axis is referred to.

Furthermore, the moving picture coding apparatus 10 includes a selection switch 111 placed between the reference picture memory 101 and the difference calculation unit 102; a selection switch 112 placed between the difference calculation unit 102 and the prediction error coding unit 103; an ON/OFF switch 113 placed between the reference picture memory 101, and the mode selection unit 109 and the motion vector detection unit 108; an ON/OFF switch 114 placed between the mode selection unit 109 and the addition unit 106; and an ON/OFF switch 115 placed between the prediction error coding unit 103 and the prediction error decoding unit 105.

Moreover, the moving picture coding apparatus 10 includes a coding control unit 110 for controlling ON/OFF operations of the switches 113~115 according to a switch control signal Cs1, and outputting a code generation control signal Cd1 and a memory control signal Cd2; and a bit stream generation unit 104 for performing variable-length coding on the output data (coded data) Ed from the prediction error coding unit 103 on the basis of the code generation control signal Cd1 to output a bit stream Bs corresponding to the target block. The bit stream generation unit 104 is supplied with the motion vector detected by the motion vector detection unit 108, and information indicating the coding mode Ms determined by the mode selection unit 109. The bit stream Bs corresponding to the target bock includes the motion vector MV corresponding to the target block, and the information indicating the coding mode Ms.

The selection switch 111 has an input terminal Ta and two output terminals Tb1 and Tb2, and the input terminal Ta is connected to one of the output terminals Tb1 and Tb2, according to the switch control signal Cs2. The selection switch 112 has two input terminals Tc1 and Tc2 and an output terminal Td, and the output terminal Td is connected to one of the input terminals Tc1 and Tc2, according to the switch control signal Cs2. Further, in the selection switch 111, the image data Md outputted from the reference picture memory 101 is applied to the input terminal Ta, and the image data Md is output through one output terminal Tb1 to the input terminal Tc1 of the selection switch 112 while the image data Md is output through the other output terminal Tb2 to the difference calculation unit 102. In the selection switch 112, the image data Md from the reference picture memory 101 is applied to one input terminal Tc1 while the difference data PEd obtained in the difference calculation unit 102 is applied to the other input terminal Tc2, and either the image data Md or the difference data PEd is output through the output terminal Td to the prediction error coding unit 103.

Next, the operation of the moving picture coding apparatus 10 will be described.

In the following description, a picture (forward picture) whose display time is earlier than that of a picture to be coded (target picture) is referred to as a picture which is positioned timewise forward the target picture, or simply as a picture which is positioned forward the target picture. Further, a picture (backward picture) whose display time is later than that of the target picture is referred to as a picture which is positioned timewise backward the target picture, or simply as a picture which is positioned backward the target picture. Furthermore, in the following descriptions of the respective embodiments, "timewise" means "in order of display times" unless otherwise specified.

In the moving picture coding apparatus 10 according to the first embodiment, the input image data Id is stored in the reference picture memory 101, in units of pictures, according to order of display times.

Figure 2:
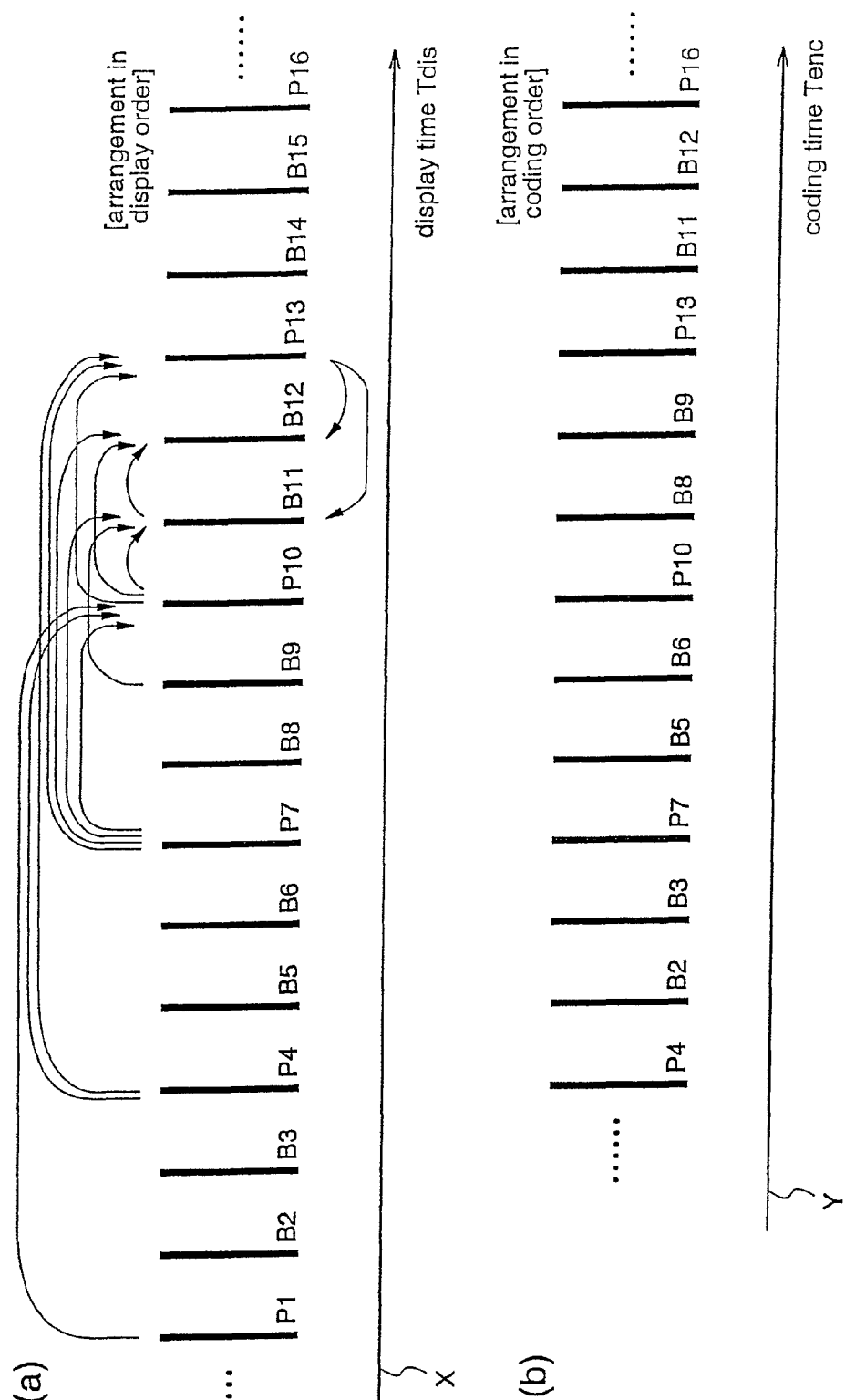

FIG. 2(a) is a diagram for explaining the order in which the image data of the respective pictures are stored in the reference picture memory 101. In FIG. 2(a), vertical lines indicate pictures. As for a symbol at the lower right side of each picture, the first letter of alphabet indicates a picture type (I, P, or B), and the following numeral indicates a picture number in order of time. That is, pictures P1, B2, B3, P4, B5, B6, P7, B8, B9, P10, B11, B12, P13, B14, B15, and P16 shown in FIG. 2(a) correspond to the pictures F(k+3)~F(k+18) [k=−2] shown in FIG. 45, and these pictures are arranged in order of display, i.e., in order of display times of the pictures along the display time axis X.

The image data of the pictures are stored in the reference picture memory 101 in order of picture display. The image data of the pictures stored in the reference picture memory 101, which are arranged in order of picture display, are rearranged in order of picture coding. Hereinafter, for simplification, the image data of each picture is simply referred to as a picture.

To be specific, the process of rearranging the pictures stored in the reference picture memory 101 from order of input (order of display) to order of coding is carried out on the basis of the relationships between target pictures and reference pictures in inter-picture predictive coding. That is, this rearrangement process is carried out such that a second picture to be used as a reference picture when coding a first picture should be coded prior to the first picture.

When coding a P picture, three pictures (I or P pictures) which are positioned close to and timewise forward the target picture to be coded (P picture) are used as candidate pictures for a reference picture. In predictive coding for a block in the P picture, one of the three candidate pictures at maximum is referred to.

Further, when coding a B picture, two pictures (I or P pictures) which are positioned close to and timewise forward the target picture (B picture), a B picture which is positioned closest to and timewise forward the target picture, and an I or P picture which is positioned timewise backward the target picture, are used as candidate pictures for a reference picture. In predictive coding for a block in the B picture, two of the four candidate pictures at maximum is referred to.

To be specific, the correspondences between the pictures P10, B11, B12, and P13, and the candidate pictures for reference pictures corresponding to the respective pictures are shown by arrows in FIG. 2(a). That is, when coding the P picture P10, the pictures P1, P4, and P7 are used as candidate pictures for a reference picture. When coding the P picture P13, the pictures P4, P7, and P10 are used as candidate pictures for a reference picture. Further, when coding the B picture B11, the pictures P7, B9, P10, and P13 are used as candidate pictures for a reference picture. When coding the B picture B12, the pictures P7, P10, B11, and P13 are used as candidate pictures for a reference picture.

FIG. 2(b) shows the pictures arranged in order of coding, which are obtained by changing the arrangement of the pictures P1~P16 shown in FIG. 2(a) from order of display to order of coding. After the rearrangement, as shown in FIG. 2(b), the pictures shown in FIG. 2(a) are arranged in order of their coding times, on the time axis Y indicating the coding times (coding time axis), i.e., the pictures are arranged in order of P4, B2, B3, P7, B5, B6, P10, B8, B9, P13, B11, B12, and P16.

The data of the pictures rearranged in the reference picture memory 101 are successively read out, for each predetermined data processing unit, in order of coding times. In this first embodiment, the data processing unit is a unit of data on which motion compensation is carried out and, more specifically, it is a rectangle image space (macroblock) in which 16 pixels are arranged in both the horizontal direction and the vertical direction. In the following description, a macroblock is also referred to simply as a block.

Hereinafter, coding processes for the pictures P13, B11, and B12 will be described in this order.

Coding Process for Picture P13

Initially, the coding process for the picture P13 will be described.

Since the picture P13 to be coded (target picture) is a P picture, inter-picture predictive coding for a target block in the picture P13 is one-directional inter-picture predictive coding in which one already-coded picture that is positioned timewise forward or backward the target picture is referred to.

In the following description, a P picture that is positioned forward the target picture is used as a reference picture.

In this case, inter-picture predictive coding using a forward reference picture is carried out as a coding process for the picture P13. Further, B pictures are not used as reference pictures when coding P pictures. Accordingly, three forward pictures (I or P pictures) are used as candidate pictures for a reference picture, more specifically, the pictures P4, P7, and P10 are used. Coding of these candidate pictures has already been completed when coding of the target picture is started, and the data (decoded data) Dd corresponding to the candidate pictures are stored in the reference picture memory 101.

When coding a P picture, the coding control unit 110 controls the respective switches with the switch control signal Cs1 so that the switches 113, 114, and 115 are in their ON states. The image data Md corresponding to the macroblock in the picture P13, which is read from the reference picture memory 101, is input to the motion vector detection unit 108, the mode selection unit 109, and the difference calculation unit 102.

The motion vector detection unit 108 detects the motion vector MV of the macroblock in the picture P13, using the coded image data Rd of the pictures P4, P7, and P10 stored in the reference picture memory 117. Then, the detected motion vector MV is output to the mode selection unit 109.

The mode selection unit 109 determines a coding mode for the block in the picture P13, using the motion vector detected by the motion vector detection unit 108. The coding mode indicates a method for coding the block. For example, in the case of coding a P picture, as described above, a coding mode is selected from among the following coding modes: intra-picture coding, inter-picture predictive coding using a motion vector, and an inter-picture predictive coding using no motion vector (i.e., motion is regarded as 0). In determining a coding mode, generally, a coding mode which minimizes coding error when a predetermined amount of bits is given to the block as an amount of codes, is selected. At this time, when inter-picture predictive coding is selected, a most suitable picture is selected as a reference picture from among the pictures P4, P7, and P10.

The coding mode Ms determined by the mode selection unit 109 is output to the bit stream generation unit 104. Further, when the determined coding mode Ms is the coding mode which refers to a forward picture, information Rp indicating a vector (forward motion vector) MVp that is obtained by motion detection with reference to the forward picture, and which one of the pictures P4, P7, and P10 is referred to when detecting the motion vector, is also output to the bit stream generation unit 104.

When the coding mode Ms determined by the mode selection unit 109 is the inter-picture predictive coding mode, the motion vector MVp to be used in the inter-picture predictive coding, and information Rp indicating which one of the pictures P4, P7, and P10 is referred to when detecting the motion vector, are stored in the motion vector storage unit 116.

Further, the mode selection unit 109 performs motion compensation according to the coding mode determined for the target block, using the motion vectors corresponding to the reference picture and the target block. Then prediction data Pd for the target block, which is obtained by the motion compensation, is output to the difference calculation unit 102 and the addition unit 106.

However, when the intra-picture coding mode is selected, the mode selection unit 109 does not generate prediction data Pd. Further, when the intra-picture coding mode is selected, the switch 111 is controlled so that the input terminal Ta is connected to the output terminal Tb1, and the switch 112 is controlled so that the output terminal Td is connected to the input terminal Tc1. On the other hand, when the inter-picture predictive coding is selected, the switch 111 is controlled so that the input terminal Ta is connected to the output terminal Tb2, and the switch 112 is controlled so that the output terminal Td is connected to the input terminal Tc2.

Hereinafter, a description will be given of a case where the inter-picture predictive coding mode is selected as the coding mode Ms.

The difference calculation unit 102 is supplied with the image data Md of the target block in the picture P13, and the corresponding prediction data Pd from the mode selection unit 109. The difference calculation unit 102 calculates difference data between the image data of the block in the picture P13 and the corresponding predictive data Pd, and outputs the difference data as prediction error data PEd.

The prediction error data PEd is input to the prediction error coding unit 103. The prediction error coding unit 103 subjects the inputted prediction error data PEd to coding processes such as frequency conversion and quantization to generate coded data Ed. The processes such as frequency conversion and quantization are carried out in units of data corresponding to a rectangle image space (sub-block) in which eight pixels are arranged in both the horizontal direction and the vertical direction.

The coded data Ed outputted from the prediction error coding unit 103 is input to the bit stream generation unit 104 and the prediction error decoding unit 105.

The bit stream generation unit 104 generates a bit stream by subjecting the inputted coded data Ed to variable-length coding. Further, the bit stream generation unit 104 adds, to the bit stream, information such as the motion vector MVp and the coding mode Ms, header information supplied from the coding control unit 110, and the like, thereby generating a bit stream Bs.

When the coding mode Ms is one performing forward reference, information (reference picture information) Rp indicating which one of the pictures P4, P7, and P10 is referred to when detecting the forward motion vector is also added to the bit stream.

Next, a description will be given of a method for managing the reference picture memory, and information indicating a reference picture among candidate pictures (reference picture information).

FIG. 3 is a diagram illustrating how the pictures stored in the reference picture memory 117 change with time. Management of this reference picture memory 117 is carried out according to the memory control signal Cd2 from the coding control unit 110. Further, the reference picture memory 117 has memory areas (#1)~(#5) for five pictures. Each memory area can hold image data corresponding to one picture. However, each memory area is not necessarily an area in one reference picture memory, it may be one memory.

Initially, a method for managing the reference picture memory will be described.

When coding of a picture P13 is started, pictures B8, P4, P7, P10, and B9 are stored in the respective memory areas (#1)~(#5) in the reference picture memory 117, respectively. Although the picture B9 is not used for coding of the picture P13, the picture B9 is stored in the reference picture memory 117 because it is used for coding of the picture B11. The picture P13 is coded using the pictures P4, P7, and P10 as candidate pictures for a reference picture. The coded picture P13 is stored in the memory area (#1) where the picture P8 had been stored. The reason is as follows. Although the pictures P4, P7, P10, and B9 are used as candidate pictures for a reference picture when coding the picture P13 and the subsequent pictures, the picture B8 is not used as a reference picture when coding these pictures. In FIG. 3, each circled picture is a picture (target picture) which is finally stored in the reference picture memory 117 when coding of the target picture has completed.

Next, a description will be given of a method for assigning a specific reference picture index as reference picture information, to each candidate picture.

The reference picture index is information indicating which one of plural candidate pictures for a reference picture is used as a reference picture when coding each block. In other words, the reference picture index is information indicating which one of the candidate pictures P4, P7, and P10 for a reference picture is used when detecting the motion vector of the target block in the target picture (picture P13). Reference picture indices are successively assigned to the respective candidate pictures, starting from a candidate picture that is timewise closest to the target picture.

To be specific, when the picture P10 is designated as a reference picture in coding the target block in the target picture p13, information indicating that a candidate picture just previous to the target picture P13 is designated as a reference picture (reference picture index [0]) is added into the bit stream of the target picture P13. When the picture P7 is referred to in coding the block in the target picture P13, information indicating that a candidate picture two-pictures previous to the target picture P13 is designated as a reference picture (reference picture index [1]) is added into the bit stream of the target picture P13. When the picture P4 is referred to in coding the block in the target picture P13, information indicating that a candidate picture three-pictures previous to the target picture P13 is designated as a reference picture (reference picture index [2]) is added into the bit stream of the target picture P13.

In FIG. 3, a picture that is assigned a code [b] as reference picture information will be a candidate for a backward reference picture when coding the target picture.

Coding Process for Picture B11

Next, the coding process for the picture B11 will be described.

Since the picture to be coded (target picture) is the picture B11, inter-picture predictive coding to be performed on a target block in the picture B11 is bidirectional inter-picture predictive coding in which two already-coded pictures that are timewise forward or backward the target picture are referred to.

Hereinafter, a description will be given of a case where one picture (I picture, P picture or B picture) positioned forward the target picture and one picture (I picture or P picture) positioned backward the target picture are used as reference pictures.

That is, in this case, as candidates for a forward reference picture, two pictures (I or P pictures) positioned timewise close to the target picture (picture B11) and a B picture positioned timewise closest to the target picture are used. Further, as a backward reference picture, an I or P picture positioned timewise closest to the target picture is used. Accordingly, in this case, candidate pictures for a reference picture for the picture B11 are the pictures P7, B9, and P10 (forward pictures) and the picture P 13 (backward picture).

In coding a B picture to be used as a reference picture when coding another picture, the coding control unit 110 controls the respective switches with the switch control signal Cs1 so that the switches 113, 114, and 115 are turned ON. Since the picture B11 is to be used as a reference picture when coding another picture, the coding control unit 110 controls the respective switches with the switch control signal Cs2 so that the switches 113, 114, and 115 are turned ON. The image data Md corresponding to the block in the picture B11, which is read from the reference picture memory 101, is input to the motion vector detection unit 108, the mode selection unit 109, and the difference calculation unit 102.

The motion vector detection unit 108 detects a forward motion vector and a backward motion vector of the target block in the picture B11. In detecting these motion vectors, the pictures P7, B9, and P10 stored in the reference picture memory 117 are used as forward reference pictures, and the picture P13 is used as a backward reference picture. Detection of a backward motion vector is carried out based on the picture P13 as a backward reference picture. The motion vectors detected by the motion vector detection unit 108 are output to the mode selection unit 109.

The mode selection unit 109 determines a coding mode for the target block in the picture B11, using the motion vectors detected by the motion vector detection unit 108. In this case, as a coding mode for the B picture B11, one of the following coding modes is selected: intra-picture coding mode, inter-picture predictive coding mode using a forward motion vector, inter-picture predictive coding mode using a backward motion picture, inter-picture predictive coding mode using bidirectional motion vectors, and direct mode. When the coding mode is inter-picture predictive coding using a forward motion vector, a most suitable picture is selected as a reference picture from among the pictures P7, B9, and P10.

Hereinafter, a process of coding the blocks in the picture B11 by the direct mode will be described.

First Example of Direct Mode Coding

FIG. 4(a) shows a first example of direct mode coding for a block (target block) BLa1 in the picture (target picture) B11. This direct mode coding utilizes a motion vector (base motion vector) MVc1 of a block (base block) BLb1 which is included in the picture (base picture) P13 as a reference picture positioned backward the picture B11 and is located in the same position as the target block BLa1. The motion vector MVc1 is a motion vector which is used when coding the block BLb1 in the picture P13, and it is stored in the motion vector storage unit 116. This motion vector MVc1 is detected with reference to the picture P10, and indicates an area CRc1 in the picture P10, which area corresponds to the block BLb1. The block BLa1 is subjected to bidirectional predictive coding, using motion vectors MVd1 and MVe1 which are parallel to the motion vector MVc1, and the pictures P10 and P13 which are selected as reference pictures. The motion vectors MVd1 and MVe1 which are used in coding the block BLa1 are a forward motion vector indicating an area CRd1 in the picture P10, corresponding to the block BLa1, and a backward motion vector indicating an area CRe1 in the picture P13, corresponding to the block BLa1, respectively.

In this case, the magnitude MVF of the forward motion vector MVd1 and the magnitude MVB of the backward motion vector MVe1 are obtained by formulae (1) and (2) as follows, respectively.

$$MVF = MVR \times TRF/TRD \quad (1)$$

$$MVB = (TRB - TRD) \times MVR/TRD \quad (2)$$

where MVF and MVB represent the horizontal component and the vertical component of the motion vectors, respectively.

Further, MVR is the magnitude of the motion vector MVc1 (a direction on a two-dimensional space is expressed by a sign), and TRD is the time-basis distance between the backward reference picture (picture P13) for the target picture (picture B11) and the picture P10 which is referred to when coding the block BLb1 in the backward reference picture (picture P13). Further, TRF is the time-basis distance between the target picture (picture B11) and the just-previous reference picture (picture P10), and TRB is the time-basis distance between the target picture (picture B11) and the picture P10 which is referred to when coding the block BLb1 in the backward reference picture (picture P13).

Second Example of Direct Mode Coding

Next, a second example of direct mode coding will be described.

FIG. 4(b) shows a second example of a process for coding a block (target block) BLa2 in the picture (target picture) B11 by the direct mode.

This direct mode coding utilizes a motion vector (base motion vector) MVf2 of a block (base block) BLb2 which is included in the picture (base picture) P13 as a reference picture positioned backward the picture B11 and is located in the same position as the target block BLa2. The motion vector MVf2 is a motion vector which is used when coding the block BLb2, and it is stored in the motion vector storage unit 116. This motion vector MVf2 is detected with reference to the picture P7, and indicates an area CRf2 in the picture P7, which area corresponds to the block BLb2. The block BLa2 is subjected to bidirectional predictive coding, using motion vectors MVg2 and MVh2 which are parallel to the motion vector MVf2, and the pictures P10 and P13 which are selected as reference pictures. The motion vectors MVg2 and MVh2 which are used in coding the block BLa2 are a forward motion vector indicating an area CRg2 in the picture P10, corresponding to the block BLa2, and a backward motion vector indicating an area CRh2 in the picture P13, corresponding to the block BLa2, respectively.

In this case, the magnitudes MVF and MVB of the motion vectors MVg2 and MVh2 are obtained by the above-described formulae (1) and (2), respectively.

As described above, in the direct mode, the motion vector MVf2 of the block BLb2, which is included in the picture to be used as a backward reference picture when coding the target block BLa2 and is located in relatively the same position as the target block, is scaled, thereby obtaining the forward motion vector MVg2 and the backward motion vector MVh2 for the target block. Therefore, when the direct mode is selected, it is not necessary to send information of the motion vector of the target block. Furthermore, since the already-coded picture which is positioned timewise closest to the target picture is used as a forward reference picture, prediction efficiency can be improved.

Third Example of Direct Mode Coding

Next, a third example of direct mode coding will be described.

FIG. 5(a) shows a third example of a process of coding a block (target block) BLa3 in the picture (target picture) B11 by the direct mode.

This direct mode coding utilizes a motion vector (base motion vector) MVc3 of a block (base block) BLb3 which is included in the picture (base picture) P13 that is a backward reference picture for the picture B11 and is located in the same position as the target block BLa3. The motion vector MVc3 is a motion vector which is used when coding the block BLb3, and it is stored in the motion vector storage unit 116. This motion vector MVc3 is detected with reference to the picture P7, and indicates an area CRc3 in the picture P7, which area corresponds to the block BLb3. The block BLa3 is subjected to bidirectional predictive coding, using motion vectors MVd3 and MVe3 which are parallel to the motion vector MVc3, the picture which is referred to when coding the block BLb3 (the picture P7 selected as a forward reference picture), and the picture P13 as a backward reference picture. In this case, the motion vectors MVd3 and MVe3 which are used in coding the block BLa3 are a forward motion vector indicating an area CRd3 in the picture P7, corresponding to the block BLa3, and a backward motion vector indicating an area CRe3 in the picture P13, corresponding to the block BLa3, respectively.

The magnitudes MVF and MVB of the motion vectors MVd3 and MVe3 are obtained by the following formula (3) and the above-described formula (2), respectively.

$$MVF = MVR \times TRB/TRD \qquad (3)$$

where MVR is the magnitude of the motion vector MVc3.

As described above, in the direct mode coding shown in FIG. 5(a), the motion vector MVc3 of the block BLb3, which is included in the picture to be used as a backward reference picture when coding the target block and is located in relatively the same position as the target block, is scaled, thereby obtaining the forward motion vector MVd3 and the backward motion vector MVe4 for the target block. Therefore, when the direct mode is selected, it is not necessary to send information of the motion vector of the target block.

When the picture P13 to be referred to in coding the block BLb3 has already been deleted from the reference picture memory 117, the forward reference picture P10 that is timewise closest to the target picture is used as a forward reference picture in the direct mode. The direct mode coding in this case is identical to that shown in FIG. 4(a) (first example).

Fourth Example of Direct Mode Coding

Next, a fourth example of direct mode coding will be described.

FIG. 5(b) shows a fourth example of a process of coding a block (target block) BLa4 in the picture (target picture) B11 by the direct mode.

In this case, the target block BLa4 is subjected to bidirectional predictive coding with a motion vector being 0, on the basis of the closest picture P10 that is selected as a forward reference picture, and the picture P13 as a backward reference picture. That is, motion vectors MVf4 and MVh4 to be used for coding the block BLa4 are a motion vector indicating an area (block) CRf4 that is included in the picture P10 and is located in relatively the same position as the target block BLa4, and a motion vector indicating an area (block) CRh4 that is included in the picture P13 and is located in relatively the same position as the target block BLa4, respectively.

As described above, in the direct mode coding shown in FIG. 5(b), the motion vector of the target block is forcefully set to 0. Therefore, when the direct mode is selected, it is not necessary to send information of the motion vector of the target block, and scaling of the motion vector becomes unnecessary, resulting in a reduction in complexity of signal processing. This method is applicable to, for example, a case where a block which is included in the picture P13 as a backward reference picture of the picture B11 and is located in the same position as the block BLa4 is a block having no motion vector like an intra-frame-coded block. Accordingly, even when a block which is included in the backward reference picture and is located in the same position as the target block is coded without a motion vector, coding efficiency can be enhanced using the direct mode.

The above-mentioned direct mode processing (first to fourth examples) is applicable not only when the interval of picture display times is constant but also when the interval of picture display times is variable.

Fifth Example of Direct Mode Coding

Next, direct mode predictive coding to be performed when the interval of picture display times is variable will be described as a fifth example of direct mode coding.

FIG. 6(a) is a diagram for explaining a fifth example of a direct mode coding, wherein the direct mode predictive coding described as the second example is applied to the case where the picture display interval is variable.

In this case, bidirectional predictive coding for a target block BLa5 in the target picture B11 is carried out by using a motion vector (base motion vector) MVf5 of a block (base block) BLb5 which is included in the picture (base picture) P13 as a reference picture positioned backward the picture B11 and is located in the same position as the target block BLa5, in the same manner as the direct mode predictive coding (second example) shown in FIG. 4(b). The motion vector MVf5 is a motion vector which is used when coding the block BLb5 in the picture P13, and it indicates an area CRf5 in the picture P7, which area corresponds to the block BLb5. Further, motion vectors MVg5 and MVh5 corresponding to the target block are parallel to the motion vector MVf5. Further, these motion vectors MVg5 and MVh5 are a forward motion vector indicating an area CRg5 in the picture P10, corresponding to the block BLa5, and a backward motion vector indicating an area CRh5 in the picture P13, corresponding to the block BLa5, respectively.

Also in this case, the magnitudes MVF and MVB of the motion vectors MVg5 and MVh5 can be obtained by the above-described formulae (1) and (2), respectively, as in the direct mode processing of the second example.

[Process of Skipping Specific Block]

Next, a description will be given of direct mode coding where a specific block is treated as a skip block.

When difference data corresponding to a target block becomes zero in direct mode coding, the prediction error coding unit 103 does not generate coded data corresponding to the target block, and the bit stream generation unit 104 does not output a bit stream corresponding to the target block. Thus, a block whose difference data becomes zero is treated as a skip block.

Hereinafter, a case where a specific block is treated as a skip block will be described.

FIG. 6(b) shows a specific picture F as a component of a moving picture.

In this picture F, among adjacent blocks MB(r−1)~MB(r+3), the values of difference data (prediction error data) corresponding to blocks MB(r−1), MB(r), and MB(r+3) are nonzero, but the values of difference data (prediction error data) corresponding to blocks MB(r+1) and MB(r+2) which are positioned between the block MB(r) and the block MB(r+3), are zero.

In this case, the blocks MB(r+1) and MB(r+2) are treated as skip blocks in the direct mode, and a bit stream Bs corresponding to a moving picture does not include bit streams corresponding to the blocks MB(r+1) and MB(r+2).

FIG. 6(c) is a diagram for explaining a stream structure in the case where the blocks MB(r+1) and MB(r+2) are treated as skip blocks, in which portions of the bit stream Bs corresponding to the blocks MB(r) and MB(r+3) are shown.

Between a bit stream Bmb(r) corresponding to the block MB(r) and a bit stream Bmb(r+3) corresponding to the block MB(r+3), a skip identifier Sf(Sk: 2) indicating that there are two blocks regarded as skip blocks between these blocks is placed. Further, between a bit stream Bmb(r−1) corresponding to the block MB(r−1) and the bit stream Bmb(r) corresponding to the block MB(r), a skip identifier Sf(Sk: 0) indicating that there is no block regarded as a skip block between these blocks is placed.

The bit stream Bmb(r) corresponding to the block MB(r) is composed of a header section Hmb and a data section Dmb, and the data section Dmb includes coded image data corresponding to this block. Further, the header section Hmb includes a mode flag Fm indicating a macroblock type, i.e., a coding mode with which this block is coded; reference picture information Rp indicating a picture which is referred to in coding this block; and information Bmvf and Bmvb indicating motion vectors which are used in coding this block. This block MB(r) is coded by bidirectional predictive coding, and information Bmvf and Bmvb of the motion vectors indicate the values of a forward motion vector and a backward motion vector which are used in the bidirectional predictive coding, respectively. Further, bit streams corresponding to other blocks, such as a bit stream Bmb(r+3) corresponding to the block MB(r+3), have the same structure as that of the bit stream Bmb(r) corresponding to the block MB(r).

As described above, in the direct more, the amount of codes can be reduced by treating a block whose difference data becomes zero, as a skip block, i.e., by skipping, in the bit stream, the information corresponding to this block together with the mode information.

Whether a block is skipped or not can be detected from the skip identifier Sf that is placed just before the bit stream of each block. Further, whether a block is skipped or not can be known from block number information or the like, that is described in the bit stream corresponding to each block.

Furthermore, in the direct mode processing shown in FIG. 4(a) (first example), the direct mode processing shown in FIG. 4(b) (second example), and the direction mode processing shown in FIG. 5(a) (third example), all of blocks whose difference data become zero are not necessarily treated as skip blocks. That is, a target block is subjected to bidirectional prediction using a picture that is positioned just previous to the target picture as a forward reference picture, and a motion vector whose magnitude is zero, and only when the difference data of the target block becomes zero, this target block may be treated as a skip block.

By the way, selection of a coding mode for a target block is generally carried out so as to minimize a coding error corresponding to a predetermined amount of bits. A coding mode determined by the mode selection unit 109 is output to the bit stream generation unit 104. Further, prediction data that is obtained from the reference picture according to the coding mode determined in the mode selection unit 109 is output to the difference calculation unit 102 and the addition unit 106. However, when intra-picture coding is selected, no prediction data is outputted. Further, when the mode selection unit 109 selects intra-picture coding, the switch 111 is controlled such that the input terminal Ta is connected to the output terminal Tb1, and the switch 112 is controlled such that the output terminal Td is connected to the input terminal Tc1. When inter-picture predictive coding is selected, the switch 111 is controlled such that the input terminal Ta is connected to the output terminal Tb2, and the switch 112 is controlled such that the output terminal Td is connected to the input terminal Tc2.

Hereinafter, a description will be given of the operation of the moving picture coding apparatus 10 in the case where the mode selection unit 109 selects inter-picture predictive coding.

The difference calculation unit 102 receives the prediction data Pd outputted from the mode selection unit 109. The difference calculation unit 102 calculates difference data between image data corresponding to a target block in the picture B11 and the prediction data, and outputs the difference data as prediction error data PEd. The prediction error data PEd is input to the prediction error coding unit 103. The prediction error coding unit 103 subjects the inputted prediction error data PEd to coding processes, such as frequency conversion and quantization, thereby generating coded data Ed. The coded data Ed outputted from the prediction error coding unit 103 is input to the bit stream generation unit 104 and the prediction error decoding unit 104.

The bit stream generation unit 104 subjects the inputted coded data Ed to variable-length coding, and adds information such as a motion vector and a coding mode to the coded data Ed, thereby generating a bit stream Bs to output. When the coding mode is one performing forward reference, information (reference picture information) Rp indicating which one of the pictures P7, B9, and P10 is referred to when detecting the forward motion vector is also added to the bit stream Bs.

Next, a description will be given of a method for managing the reference picture memory, and a method for assigning reference picture information, in coding of the picture B11, with reference to FIG. 3.

When coding of the picture B11 is started, pictures P4, P7, P10, P13, and B9 are stored in the reference picture memory 117. The picture B11 is subjected to bidirectional predictive coding, using the pictures P7, B9, and P10 as candidate pictures for a forward reference, and the picture P13 as a candidate picture for a backward reference picture. The already-coded picture B11 is stored in the memory area (#2) where the picture P4 had been stored, because the picture P4 is not used as a reference picture in coding the pictures from the picture B11 onward.

In coding the picture B11, as a method for adding information indicating which one of the pictures P7, B9, and P10 is referred to in detecting the forward motion vector for the target block (reference picture information), there is employed a method of successively assigning indices to the reference candidate pictures, starting from one timewise closest to the target picture (picture B11). The reference candidate pictures are pictures which can be selected as a reference picture in coding the target picture.

To be specific, the picture P10 is assigned a reference picture index [0], the picture B9 is assigned a reference picture index [1], and the picture 7 is assigned a reference picture index [2].

Accordingly, when the picture P10 is referred to in coding the target picture, the reference picture index [0] is described in the bit stream corresponding to the target block, as information indicating that a candidate picture just previous to the target picture is referred to. Likewise, when the picture B9 is referred to, the reference picture index [1] is described in the bit stream corresponding to the target block, as information indicating that a candidate picture two-pictures previous to the target picture is referred to. Further, when the picture P7 is referred to, the reference picture index [2] is described in the bit stream corresponding to the target block, as information indicating that a candidate picture three-pictures previous to the target picture is referred to.

Assignment of codes to the reference picture indices [0], [1], and [2] is carried out such that a code of a shorter length is assigned to a smaller index.

Generally, a candidate picture that is timewise closer to a target picture is more likely to be used as a reference picture. Accordingly, by assigning the codes as described above, the total amount of codes, each indicating which one of plural candidate pictures is referred to in detecting the motion vector of the target block, can be reduced.

The prediction error decoding unit 105 subjects the inputted coded data corresponding to the target block to decoding processes such as inverse quantization and inverse frequency conversion to generate decoded difference data PDd of the target block. The decoded difference data PDd is added to the prediction data Pd in the addition unit 106, and decoded data Dd of the target picture which is obtained by the addition is stored in the reference picture memory 117.

The remaining blocks in the picture B11 are coded in like manner as described above. When all of the blocks in the picture B11 have been processed, coding of the picture B12 takes place.

Coding Process for Picture B12

Next, the coding process for the picture B12 will be described.

Since the picture B12 is a B picture, inter-picture predictive coding to be performed on a target block in the picture B12 is bidirectional inter-picture predictive coding in which two already-coded pictures that are positioned timewise forward or backward the target picture are referred to.

Hereinafter, a description will be given of a case where inter-picture predictive coding using bidirectional reference is performed as a coding process for the picture B12. Accordingly, in this case, as candidates for a forward reference picture, two pictures (I or P pictures) positioned close to the target picture in order of display times or a B picture positioned closest to the target picture in order of display times are used. Further, as a backward reference picture, an I or P picture positioned closest to the target picture in order of display times is used. Accordingly, reference candidate pictures for the picture B12 are the pictures P7, P10, and B11 (forward pictures) and the picture P13 (backward picture).

In coding a B picture to be used as a reference picture when coding another picture, the coding control unit 110 controls the respective switches so that the switches 113, 114, and 115 are turned ON. Since the picture B12 is to be used as a reference picture in coding another picture, the coding control unit 110 controls the respective switches so that the switches 113, 114, and 115 are turned ON. Accordingly, the image data corresponding to the block in the picture B12, which is read from the reference picture memory 101, is input to the motion vector detection unit 108, the mode selection unit 109, and the difference calculation unit 102.

The motion vector detection unit 108 detects a forward motion vector and a backward motion vector corresponding to the target block in the picture B12, using the pictures P7, P10, and B11 stored in the reference picture memory 117 as forward reference candidate pictures, and the picture P13 stored in the reference picture memory 117 as a backward reference picture.

The detected motion vectors are output to the mode selection unit 109.

The mode selection unit 109 determines a coding mode for the target block in the picture B12, using the motion vectors detected by the motion vector detection unit 108. In this case, as a coding mode for the B picture B12, one of the following coding modes is selected: intra-picture coding mode, inter-picture predictive coding mode using a forward motion vector, inter-picture predictive coding mode using a backward motion picture, inter-picture predictive coding mode using bidirectional motion vectors, and the direct mode. When the coding mode is inter-picture predictive coding using a forward motion vector, a most suitable picture is selected as a reference picture from among the pictures P7, P10, and B11.

Hereinafter, a process of coding the blocks in the picture B12 by the direct mode will be described.

First Example of Direct Mode Coding

FIG. 7(a) shows a case where a block (target block) BLa5 in the picture (target picture) B12 is coded in the direct mode. This direct mode coding utilizes a motion vector (base motion vector) MVc5 of a block (base block) BLb5 which is included in the picture (base picture) P13 as a reference picture positioned backward the picture B12 and is located in the same position as the target block BLa5. The motion vector MVc5 is a motion vector which is used when coding the block BLb5, and it is stored in the motion vector storage unit 116. This motion vector MVc5 indicates an area CRc5 in the picture P10, which area corresponds to the block BLb5. The block BLa5 is subjected to bidirectional predictive coding, using motion vectors parallel to the motion vector MVc5, on the basis of the pictures B11 and P13 as reference pictures for the block BLa5. The motion vectors to be used in coding the block BLa5 are a motion vector MVe5 indicating an area CRd5 in the picture B11, corresponding to the block BLa5, and a motion vector MVe5 indicating an area CRe5 in the picture P13, corresponding to the block BLa5. The magnitudes MVF and MVB of the motion vectors MVd5 and MVe5 can be obtained by the above-mentioned formulae (1) and (2), respectively.

Second Example of Direct Mode Coding

Next, a second example of direct mode coding will be described.

FIG. 7(b) shows a case where a block (target block) BLa6 in the picture (target picture) B12 is coded in the direct mode. This direct mode coding utilizes a motion vector (base motion vector) MVc6 of a block (base block) BLb6 which is included in the picture (base picture) P13 as a reference picture positioned backward the picture B12 and is located in the same position as the target block BLa6. The motion vector MVc6 is a motion vector which is used when coding the block BLb6, and it is stored in the motion vector storage unit 116. This motion vector MVc6 indicates an area CRc6 in the picture P7, which area corresponds to the block BLb6. The block BLa6 is subjected to bidirectional predictive coding, using motion vectors parallel to the motion vector MVc6, on the basis of the pictures B11 and P13 as reference pictures. The motion vectors to be used in coding the block BLa6 are a motion vector MVg6 indicating an area CRg6 in the picture B11, corresponding to the block BLa6, and a motion vector MVh6 indicating an area CRh6 in the picture P13, corresponding to the block BLa6. The magnitudes MVF and MVB of the motion vectors MVg6 and MVh6 can be obtained by the above-mentioned formulae (1) and (2), respectively.

As described above, in the direct mode, the motion vector MVf6 of the block BLb6, which is included in the picture to be used as a backward reference picture when coding the target block BLa6 and is located in relatively the same position as the target block, is scaled, thereby obtaining the forward motion vector MVg6 and the backward motion vector MVh6 corresponding to the target block. Therefore, when the direct mode is selected, it is not necessary to send information of the motion vector of the target block. Furthermore, since the already-coded picture which is positioned closest to the target picture in order of display times is used as a forward reference picture, prediction efficiency can be improved.

Third Example of Direct Mode Coding

Next, a third example of direct mode coding will be described.

FIG. 8(a) shows a third example of a process for coding a block (target block) BLa7 in the picture (target picture) B12 by the direct mode.

This direct mode coding utilizes a motion vector (base motion vector) MVc7 of a block (base block) BLb7 which is included in the picture (base picture) P13 as a reference picture positioned backward the picture B12 and is located in the same position as the target block BLa7. The motion vector MVc7 is a motion vector which is used when coding the block BLb7, and it is stored in the motion vector storage unit 116. This motion vector MVc7 indicates an area CRc7 in the picture P7, which area corresponds to the block BLb7. The block BLa7 is subjected to bidirectional predictive coding, using motion vectors parallel to the motion vector MVc7, the same picture as that referred to in coding the block BLb7 (i.e., the picture P7) as a forward reference picture), and the picture P13 as a backward reference picture. The motion vectors to be used in coding the block BLa7 are a motion vector MVd7 indicating an area CRd7 in the picture P7, corresponding to the block BLa7, and a motion vector MVe7 indicating an area CRe7 in the picture P13, corresponding to the block BLa7.

The magnitudes MVF and MVB of the motion vectors MVd7 and MVe7 can be obtained by the above-mentioned formulae (2) and (3), respectively.

When the picture which is referred to in coding the block BLb7 has already been deleted from the reference picture memory 117, a forward reference picture that is timewise closest to the target picture may be used as a forward reference picture in the direct mode. The direct mode coding in this case is identical to that described as the first example of direct mode coding.

As described above, in the direct mode coding shown in FIG. 8(a), the motion vector MVf7 of the block BLb7, which is included in the picture to be used as a backward reference picture when coding the target block and is located in relatively the same position as the target block, is scaled, thereby obtaining the forward motion vector MVd7 and the backward motion vector MVe7 corresponding to the target block. Therefore, when the direct mode is selected, it is not necessary to send information of the motion vector of the target block.

Fourth Example of Direct Mode Coding

Next, a fourth example of direct mode coding will be described.

FIG. 8(b) shows a fourth example of a process of coding a block (target block) BLa8 in the picture (target picture) B12 by the direct mode.

In this case, the target block BLa8 is subjected to bidirectional predictive coding with a motion vector being zero, on the basis of the closest picture P10 that is selected as a forward reference picture, and the picture P13 as a backward reference picture. That is, motion vectors MVf8 and MVh8 to be used for coding the block BLa8 are a motion vector indicating an area (block) CRf8 that is included in the picture B11 and is located in relatively the same position as the target block BLa8, and a motion vector indicating an area (block) CRh8 that is included in the picture P13 and is located in relatively the same position as the target block BLa8, respectively.

As described above, in the direct mode coding shown in FIG. 8(b), the motion vector of the target block is forcefully set to zero. Therefore, when the direct mode is selected, it is not necessary to send information of the motion vector of the target block, and scaling of the motion vector becomes unnecessary, resulting in a reduction in complexity of signal processing. This method is applicable to, for example, a case where a block which is included in the picture P13 as a backward reference picture of the picture B12 and is located in the same position as the block BLa8 is a block having no motion vector like an intra-frame-coded block. Accordingly, even when a block which is included in the backward reference picture and is located in the same position as the target block is coded without a motion vector, coding efficiency can be enhanced using the direct mode.

The above-mentioned direct mode processing for the picture B12 (first to fourth examples) is applicable not only when the interval of picture display times is constant but also when the interval of picture display times is variable, as in the case of the picture B11 shown in FIG. 6(*a*).

Furthermore, in direct mode coding for the picture B12, like the direct mode coding for the picture B11, when the difference data corresponding to the target block becomes zero, the prediction error coding unit 103 does not generate coded data corresponding to the target block, and the bit stream generation unit 104 does not output a bit stream corresponding to the target block. Thus, a block whose difference data becomes zero is treated as a skip block, as in the case of the picture B11 shown in FIGS. 6(*b*) and 6(*c*).

Furthermore, in the direct mode processing shown in FIG. 7(*a*) (first example), the direct mode processing shown in FIG. 7(*b*) (second example), and the direction mode processing shown in FIG. 8(*a*) (third example), all of blocks whose difference data become zero are not necessarily treated as skip blocks. That is, a target block is subjected to bidirectional prediction using a picture that is positioned just previous to the target picture as a forward reference picture, and a motion vector whose magnitude is zero, and only when the difference data of the target block becomes zero, this target block may be treated as a skip block.

When the coding mode for the target block in the picture B12 is determined by the mode selection unit 109, prediction data PEd for the target block is generated and outputted to the difference calculation unit 102 and the addition unit 106, as in the coding process for the target block in the picture B11. However, when intra-picture coding is selected, no prediction data is output from the mode selection unit 109. Further, the switches 111 and 112 are controlled in like manner as described for coding of the picture B11, according to that either intra-picture coding or inter-picture coding is selected as a coding mode by the mode selection unit 109.

Hereinafter, a description will be given of the operation of the moving picture coding apparatus 10 in the case where the mode selection unit 109 selects inter-picture predictive coding when coding the picture P12.

In this case, the difference calculation unit 102, the prediction error coding unit 103, the bit stream generation unit 104, the prediction error decoding unit 105, the addition unit 106, and the reference picture memory 117 are operated in like manner as described for the case where the mode selection unit 109 selects inter-picture predictive coding for coding the picture P11.

In this case, however, since the candidate pictures for a forward reference picture are different from those for coding the picture P11, when the coding mode for the target block is one performing forward reference, reference picture information to be added to the bit stream of the target block becomes information indicating which one of the pictures P7, P10, and B11 is referred to in detecting the forward motion vector.

Further, a method for managing the reference picture memory and a method for assigning reference picture information, which are to be employed in coding the picture B12, are identical to those employed in coding the picture B11 shown in FIG. 3.

As described above, according to the first embodiment of the invention, when coding a B picture (target picture), a B picture is used as a candidate picture for a forward reference picture, as well as P pictures. Therefore, a forward picture positioned closest to the target B picture can be used as a reference picture for the target B picture, whereby prediction accuracy of motion compensation for the B picture can be increased, resulting in an increase in coding efficiency.

In this first embodiment, no B picture is used as a reference picture in coding a P picture. Therefore, even when an error occurs in a picture during decoding, recovery from the error can be perfectly performed by resuming decoding from an I or P picture next to the picture where the decoding error occurs. However, the other effects obtained by the first embodiment are not changed even when a B picture is used as a reference picture in coding a P picture.

Further, since two P pictures and one B picture are used as candidate pictures for a forward reference picture in coding a B picture, the number of candidate pictures for a forward reference picture for a B picture is not changed in comparison with the conventional case where three P pictures are used as candidate pictures for a forward reference picture for a B picture. Therefore, it is possible to avoid an increase in the capacity of the reference picture memory for holding reference candidate pictures and an increase in the volume of processing for motion detection, which increases are caused by the inclusion of the B picture in the candidate pictures for a forward reference picture for a B picture.

Further, in this first embodiment, information indicating that a B picture is subjected to inter-picture prediction coding with reference to a forward B picture, and information indicating how many I or P pictures and how many B pictures are used as candidate pictures for forward reference, are described as header information of a bit stream to be generated. Therefore, it is possible to know the capacity of a reference picture memory that is needed when decoding the bit stream generated in the moving picture coding apparatus.

Furthermore, when information such as a motion vector, a coding mode, and the like is added to a bit stream, if the coding mode is one performing forward reference, reference picture information for identifying reference pictures, which is assigned to candidate pictures to be referred to, is added to the bit stream, and further, reference picture information assigned to a candidate picture that is timewise closest to the target picture is expressed with a code of a shorter code length, according to a method of managing the reference picture memory for reference pictures. Therefore, the total amount of codes expressing the reference picture information can be reduced. Further, in managing the reference picture memory, since the reference picture memory is managed regardless of the picture type, the capacity of the reference picture memory can be minimized.

Moreover, in this first embodiment, when the reference picture memory for reference pictures is managed with an area for P pictures and an area for B pictures being separated from each other, management of the reference picture memory is facilitated.

Further, when a block in a B picture is coded in the direct mode, a picture that is positioned closest to this B picture in order of display times is used as a forward reference picture, whereby prediction efficiency in the direct mode for the B picture can be improved.

Furthermore, when a block in a B picture is to be coded in the direct mode, a picture that is forward referred to in coding a backward reference picture is used as a forward reference picture, whereby prediction efficiency in the direct mode for the B picture can be improved.

Furthermore, when a block in a B picture is to be coded in the direct mode, bidirectional prediction with a motion vector being zero is carried out on the basis of a forward reference picture and a backward reference picture, whereby scaling of the motion vector in the direct mode becomes unnecessary, resulting in a reduction in complexity of information processing. In this case, even when a block which is included in the backward reference picture and is located in the same position as the target block is coded without a motion vector, coding efficiency can be enhanced using the direct mode.

Furthermore, when a block in a B picture is to be coded in the direct mode, if a prediction error with respect to the target block becomes zero, information relating to the target block is not described in the bit stream, whereby the amount of codes can be reduced.

In this first embodiment, motion compensation is performed in units of image spaces (macroblocks) each comprising 16 pixels in the horizontal direction×16 pixels in the vertical direction, and coding of a prediction error image is performed in units of image spaces (subblocks) each comprising 8 pixels in the horizontal direction×8 pixels in the vertical direction. However, the number of pixels in each macroblock (subblock) in motion compensation (coding of a prediction error image) may be different from that described for the first embodiment.

Further, while in this first embodiment the number of continuous B pictures is two, the number of continuous B pictures may be three or more.

For example, the number of B pictures placed between an I picture and a P picture or between two P pictures may be three or four.

Further, in this first embodiment, a coding mode for a P picture is selected from among intra-picture coding, inter-picture predictive coding using a motion vector, and inter-picture predictive coding using no motion vector, while a coding mode for a B picture is selected from among intra-picture coding, inter-picture predictive coding using a forward motion vector, inter-picture predictive coding using a backward motion vector, inter-picture predictive coding using bidirectional motion vectors, and direct mode. However, the coding mode for a P picture or a B picture may be other than those mentioned above.

For example, when the direct mode is not used as a coding mode for a B picture, the motion vector storage unit 116 in the moving picture coding apparatus 10 is dispensed with.

Further, while in this first embodiment the picture B11 (B12) as a B picture becomes a candidate picture for a reference picture in coding another picture, it is not necessary to store a B picture which is not to be used as a reference picture in coding another picture, in the reference picture memory 117. In this case, the coding control unit 110 turns off the switches 114 and 115.

Further, while in this first embodiment three pictures are used as candidate pictures for forward reference in coding a P picture, the present invention is not restricted thereto. For example, two pictures, or four or more pictures may be used as candidate pictures for forward reference in coding a P picture.

While in this first embodiment two P pictures and one B picture are used as candidate pictures for forward reference in coding a B picture, candidate pictures for forward reference in coding a B picture are not restricted to those mentioned above.

For example, in coding a B picture, candidate pictures for forward reference may be one P picture and two B pictures, or two P pictures and two B pictures, or three pictures closest to the target picture regardless of the picture type. Further, not a B picture closest to the target picture on the display time axis but a B picture apart from the target picture on the display time axis may be used as a reference candidate picture.

Further, in a case where, when coding a block in a B picture, one backward picture is referred to and only one picture closest to the target picture is used as a candidate picture for forward reference, it is not necessary to describe information indicating which picture is referred to in coding the target block (reference picture information) in the bit stream.

Further, in this first embodiment, when coding a B picture, a B picture which is positioned forward a P picture that is positioned forward and closest to the target picture is referred to. However, in coding a B picture, a B picture which is positioned forward an I or P picture that is forward and closest to the target picture is not necessarily referred to. In this case, when decoding a generated bit stream, even if an error occurs during the decoding, recovery from the error can be perfectly carried out by resuming decoding from an I or P picture next to the picture where the error occurs.

Figures 9A, 9B:
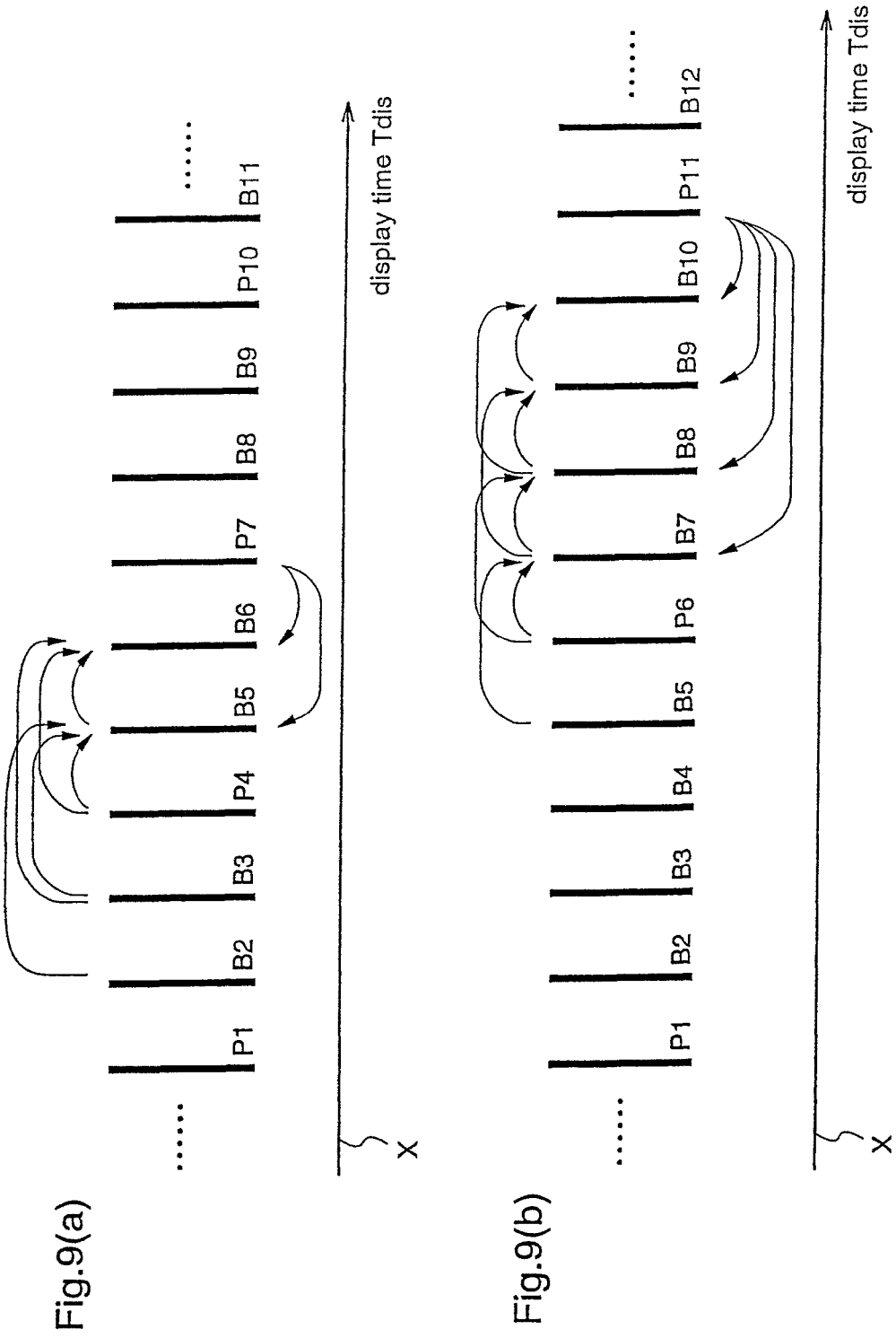

For example, FIGS. 9(a) and 9(b) are diagrams illustrating a case where, when coding a B picture, a B picture which is positioned forward a P picture that is positioned forward and closest to the target picture, is referred to.

FIG. 9(a) illustrates a picture arrangement, and relationships between B pictures and reference pictures. To be specific, in FIG. 9(a), two B pictures are positioned between adjacent P pictures, and one P picture and two B pictures are used as candidate pictures for a forward reference picture for a B picture (i.e., a picture to be referred to when coding the target B picture).

FIG. 9(b) illustrates another picture arrangement, and relationships between B pictures and reference pictures. To be specific, in FIG. 9(b), four B pictures are positioned between adjacent P pictures, and two pictures which are timewise closest to the target picture, regardless of the picture type, are used as candidate pictures for a forward reference picture for a B picture.

Further, FIGS. 10(a) and 10(b) are diagrams illustrating a case where, when coding a B picture, a B picture which is positioned forward an I or P picture that is positioned forward and closest to the target picture, is not referred to.

To be specific, in FIG. 10(a), two B pictures are positioned between adjacent P pictures, one P picture and one B picture are used as candidate pictures for a forward reference picture for a B picture, and a B picture which is positioned forward a P picture that is positioned forward and closest to the target picture is not used as a candidate picture for the forward reference picture.

In FIG. 10(b), four B pictures are positioned between adjacent P pictures, one P picture and one B picture are used as candidate pictures for a forward reference picture for a B picture, and a B picture which is positioned forward a P picture that is positioned forward and closest to the target picture is not used as a candidate picture for the forward reference picture.

Further, in this first embodiment, three pictures are used as reference candidate pictures for a P picture, and two P pictures and one B picture are used as candidate pictures for forward reference for a B picture, i.e., the number of pictures which can be referred to when coding a P picture is equal to the number of pictures which can be forward referred to when coding a B picture. However, the number of pictures which can be forward referred to when coding a B picture may be less than the number of pictures which can be referred to when coding a P picture.

Furthermore, while in this first embodiment four methods are described as examples of direct mode coding, one of these four methods or some of these four methods may be employed in the direct mode. However, when employing plural methods, it is desirable to describe information indicating the employed direct modes (DM mode information), in the bit stream.

For example, when one method is used over the whole sequence, DM mode information is described in the header of the whole sequence. When one method is selected for each picture, DM mode information is described in the header of the picture. When one method is selected for each block, DM mode information is described in the header of the block.

Although a picture or a block is described as a unit for which one of the direct mode coding methods is selected, it may be a GOP (Group of Pictures) comprising plural pictures, a GOB (Group of Blocks) comprising plural blocks, or a slice which is obtained by dividing a picture.

Further, while in this first embodiment a reference picture memory managing method is described with reference to FIG. 3, applicable reference picture memory managing methods are not restricted to that shown in FIG. 3.

Hereinafter, other reference picture memory managing methods will be described.

Initially, a first example of a reference picture memory managing method in which all pictures used as reference pictures are separated into P pictures and B pictures to be managed, will be described with reference to FIG. 11.

In this case, the reference picture memory 117 has memory areas for six pictures in total, i.e., P picture memory areas (#1)~(#4) and B picture memory areas (#1) and (#2). A storage for each picture is not restricted to an area in the reference picture memory, and it may be one memory.

When coding of the picture P13 is started, pictures P1, P4, P7, and P10 are stored in the P picture memory areas (#1)~(#4) in the reference picture memory 117, respectively, and pictures B8 and B9 are stored in the B picture memory areas (#1) and (#2), respectively. The picture P13 is coded using the pictures P4, P7., and P10 as candidate pictures for a reference picture, and the coded picture P13 is stored in the area (#1) where the picture P1 had been stored, because the picture P1 is not used as a reference picture when coding the picture P13 and the subsequent pictures.

In this case, a method for assigning reference picture information to the pictures P4, P7, and P10 as candidate pictures is identical to the method shown in FIG. 3, that is, a smaller reference picture index is assigned to a candidate picture that is timewise closer to the target picture.

To be specific, a reference picture index [0] is assigned to a forward candidate picture that is closest to the target picture, a reference picture index [1] is assigned to a candidate picture that is second-close to the target picture, and a reference picture index [2] is assigned to a candidate picture that is most distant from the target picture.

In FIG. 11, pictures to be used as backward reference pictures are assigned codes [b] as reference picture information, and pictures which are not used as reference pictures when coding the target picture and the subsequent pictures are assigned codes [n].

Next, a second example of a reference picture memory managing method in which all pictures used as reference pictures are separated into P pictures and B pictures to be managed, will be described with reference to FIG. 12.

Since memory management in this second example is identical to that in the first example shown in FIG. 11, repeated description is not necessary.

In this second example, as a method for assigning reference picture indices, assignment of indices to the pictures stored in the P picture memory areas is carried out prior to assignment of indices to the pictures stored in the B picture memory areas. However, in coding the picture P13, since no B pictures are used as reference pictures, no indices are assigned to the B pictures. Accordingly, a reference picture index [0] is assigned to the picture P10, a reference picture index [1] is assigned to the picture P7, and a reference picture index [2] is assigned to the picture P4.

Next, a third example of a reference picture memory managing method in which all pictures used as reference pictures are separated into P pictures and B pictures to be managed, will be described with reference to FIG. 13.

Since memory management in this third example is identical to that in the first example shown in FIG. 11, repeated description is not necessary.

In this third example, as a method for assigning reference picture indices, assignment of indices to the pictures stored in the B picture memory areas is carried out prior to assignment of indices to the pictures stored in the P picture memory areas. However, in coding the picture P13, since no B pictures are used as reference pictures, no indices are assigned to the B pictures. Accordingly, a reference picture index [0] is assigned to the picture P10, a reference picture index [1] is assigned to the picture P7, and a reference picture index [2] is assigned to the picture P4.

Next, a fourth example of a reference picture memory managing method in which all pictures used as reference pictures are separated into P pictures and B pictures to be managed, will be described with reference to FIG. 14.

Since memory management in this fourth example is identical to that in the first example shown in FIG. 11, repeated description is not necessary.

In this third example, as a method for assigning reference picture indices, either the pictures stored in the P picture memory area or the pictures stored in the B picture memory area are selected for each target picture to be coded, and reference picture indices are given to the selected pictures with priority.

To be specific, according to the type of a reference picture that is timewise closest to the target picture, it is determined that either the picture stored in the P picture memory area or the picture stored in the B picture memory area should be given priority in assigning reference picture indices.

In coding the picture P13, since no B picture is used as a reference picture, reference picture indices are assigned to the pictures stored in the P picture memory area with priority. Accordingly, a reference picture index [0] is assigned to the picture P10, a reference picture index [1] is assigned to the picture P7, and a reference picture index [2] is assigned to the picture P4. In this case, information indicating that the reference picture indices are given to the pictures stored in the P picture memory areas with priority, is described in the header of each picture.

In the reference picture index assigning methods shown in FIGS. 3 and 11 to 14, the smaller the reference picture index is, the shorter the length of a code indicating the reference picture index is. Since, generally, a picture that is timewise closer to the target picture is more likely to be used as a reference picture, the total amount of codes expressing the reference picture indices can be reduced by determining the lengths of the codes expressing the reference picture indices, as mentioned above.

While the five methods shown in FIGS. 3 and 11~14 are described relating to reference picture memory management and reference picture index assignment, one of these methods may be previously selected for use. Further, some of these methods may be used by switching them. In this case, however, it is desirable to describe information about the methods being used, as header information or the like.

Further, when information indicating that each P picture is subjected to inter-picture predictive coding using three reference candidate pictures is described as header information, it is possible to know the capacity of a reference picture memory that is needed in decoding the bit stream Bs generated in the moving picture coding apparatus 10 according to the first embodiment. These header information may be described in the header of the whole sequence, the header of each GOP (Group of Pictures) comprising plural pictures, or the header of each picture.

Hereinafter, as a reference picture memory managing method and a reference picture information assigning method to be used in coding the picture B11, methods other than that shown in FIG. 3 (i.e., methods of separating the reference candidate pictures into P pictures and B pictures for management) will be described.

Initially, a description will be given of a first example of a method for separating the reference candidate pictures into P pictures and B pictures to be managed, with reference to FIG. 11.

When coding of the picture B11 is started, in the reference picture memory 117, pictures P4, P7, P10, and P13 are stored in the P picture memory areas while pictures B8 and B9 are stored in the B picture memory areas. The picture P11 is coded using the pictures P7, B9, and P10 as candidate pictures for forward reference and the picture P13 as a candidate picture for backward reference, and then the coded picture P11 is stored in the area where the picture P8 had been stored, because the picture P8 is not used as a reference picture in coding the picture P11 and the subsequent pictures.

In this case, as a method for assigning reference picture information to each picture (i.e., information indicating which one of the reference candidate pictures P7, B9, and P10 is used as a reference picture in detecting the forward motion vector), a method for assigning reference picture indices to the reference candidate pictures, starting from one that is timewise closest to the target picture, is used as described with respect to FIG. 3.

That is, a reference picture index [0] is assigned to a candidate picture (picture P10) that is just previous to the target picture (picture B11), a reference picture index [1] is assigned to a candidate picture (picture B9) that is two-pictures previous to the target picture, and a reference picture index [3] is assigned to a candidate picture (picture 7) that is three-pictures previous to the target picture.

Next, a second example of a reference picture memory managing method in which reference candidate pictures are separated into P pictures and B pictures to be managed in coding the picture B11, will be described with reference to FIG. 12.

Since memory management in this second example is identical to that in the first example shown in FIG. 11, repeated description is not necessary.

In this second example, as a method for assigning reference picture indices, assignment of indices to the pictures stored in the P picture memory areas is carried out prior to assignment of indices to the pictures stored in the B picture memory areas. Accordingly, a reference picture index [0] is assigned to the picture P10, a reference picture index [1] is assigned to the picture P7, and a reference picture index [2] is assigned to the picture B9.

Next, a third example of a reference picture memory managing method in which reference candidate pictures are separated into P pictures and B pictures to be managed in coding the picture B11, will be described with reference to FIG. 13.

Since memory management in this third example is identical to that in the first example shown in FIG. 11, repeated description is not necessary.

In this third example, as a method for assigning reference picture indices, assignment of indices to the pictures stored in the B picture memory areas is carried out prior to assignment of indices to the pictures stored in the P picture memory areas.

Accordingly, a reference picture index [0] is assigned to the picture B9, a reference picture index [1] is assigned to the picture P10, and a reference picture index [2] is assigned to the picture P7.

Next, a fourth example of a reference picture memory managing method in which reference candidate pictures are separated into P pictures and B pictures to be managed in coding the picture B11, will be described with reference to FIG. 14.

Since memory management in this fourth example is identical to that in the first example shown in FIG. 11, repeated description is not necessary.

In this fourth example, as a method for assigning reference picture indices, either the pictures stored in the P picture memory areas or the pictures stored in the B picture memory areas are selected for each target picture to be coded, and reference picture indices are given to the selected pictures with priority.

To be specific, it is determined which one of the P picture memory and the B picture memory should be assigned reference picture indices, according to the type of the reference candidate picture that is timewise closest to the target picture to be coded.

In coding the picture B11, since the forward reference picture that is timewise closest to the target picture is the picture P10, reference picture indices are assigned to the pictures stored in the P picture memory area with priority.

Accordingly, a reference picture index [0] is assigned to the picture P10, a reference picture index [1] is assigned to the picture P7, and a reference picture index [2] is assigned to the picture B9. In this case, information indicating that the reference picture indices are given to the pictures stored in the P picture memory areas with priority, is described in the header of each picture.

In the methods of assigning reference picture indices when coding the picture B11 (the five methods shown in FIGS. 3 and 11 to 14), as in the case of coding the picture P13, the smaller the reference picture index is, the shorter the length of a code indicating the reference picture index is.

Further, in coding the B picture B11, as in the case of coding the P picture P13, one of the five methods may previously be selected for use. Further, some of these methods may be used by switching them. In this case, however, it is desirable that information about the methods being used should be described as header information or the like.

Further, by describing, as header information, information indicating that a B picture is subjected to inter-picture predictive coding using a forward B picture as a reference candidate picture, and information indicating that candidate pictures for forward reference, which are used in coding the B picture, are two I or P pictures and one B picture, it is possible to know the storage capacity of a reference picture memory that is needed in decoding the bit stream generated in the moving picture coding apparatus 10 according to the first embodiment. These header information may be described in the header of the whole sequence, the header of each GOP (Group of Pictures) comprising plural pictures, or the header of each picture.

Finally, as a reference picture memory managing method and a reference picture information assigning method to be employed in coding the picture B12, methods other than that shown in FIG. 3 (i.e., methods of separating reference candidate pictures into P pictures and B pictures to be managed) will be described.

Since the first to third examples shown in FIGS. 11 to 13 are identical to those in the case of coding the picture B11, repeated description is not necessary.

So, only a fourth example of managing reference candidate pictures being separated into P pictures and B pictures will be described for the picture B12, with reference to FIG. 14.

Since memory management in this fourth example is identical to that in the first example in which reference candidate pictures are separated into P pictures and B pictures to be managed in coding the picture B11, repeated description is not necessary.

In this fourth example, as for a method of assigning, to each picture, information indicating which of the reference candidate pictures P7, P10, and B11 is referred to in detecting the forward motion vector, a method of determining, for each picture to be coded, either the candidate pictures stored in the P picture memory areas or the candidate pictures stored in the B picture memory areas should be given priority is used.

To be specific, in coding the picture B12, which of the candidate picture in the P picture memory area and that in the B picture memory area should be assigned a reference picture index with priority, is determined according to the type of the reference picture that is timewise closest to the target picture.

In coding the picture B12, since the forward reference candidate picture that is timewise closest to the target picture (picture B12) is the picture B11, the pictures stored in the B picture memory areas are assigned indices with priority.

Accordingly, a reference picture index [0] is assigned to the picture B11, a reference picture index [1] is assigned to the picture P10, and a reference picture index [2] is assigned to the picture P7. In this case, information indicating that assignment of reference picture indices to the pictures in the B picture memory areas takes priority is described in the header of each picture.

Further, as in the case of coding the picture B11, there are described, as header information, that the B picture is subjected to inter-picture predictive coding using also the forward B picture as a reference candidate picture, and that the forward reference candidate pictures used in coding the B picture are two I or P pictures and one B picture.

Furthermore, in this first embodiment, the five examples of reference picture memory managing methods (FIGS. 3, 11~14) are described with respect to the case where there are three reference candidate pictures for a P picture, and there are two P pictures and one B picture as forward reference candidate pictures for a B picture. However, each of the five examples of reference picture memory management methods may be applied to cases where the number of reference candidate pictures is different from those mentioned for the first embodiment. When the number of reference candidate pictures differs from those of the first embodiment, the capacity of the reference picture memory differs from that of the first embodiment.

Further, in this first embodiment, in the methods of managing the reference picture memory in which reference candidate pictures are separated into P pictures and B pictures (four examples shown in FIGS. 11~14), P pictures are stored in the P picture memory areas while B pictures are stored in the B picture memory areas. However, a short-term picture memory and a long-term picture memory which are defined in H.263++ may be used as memory areas where pictures are stored. For example, the short-term picture memory and the long-term picture memory may be used as a P picture memory area and a B picture memory area, respectively.

Embodiment 2

Hereinafter, a second embodiment of the present invention will be described.

Figure 15:
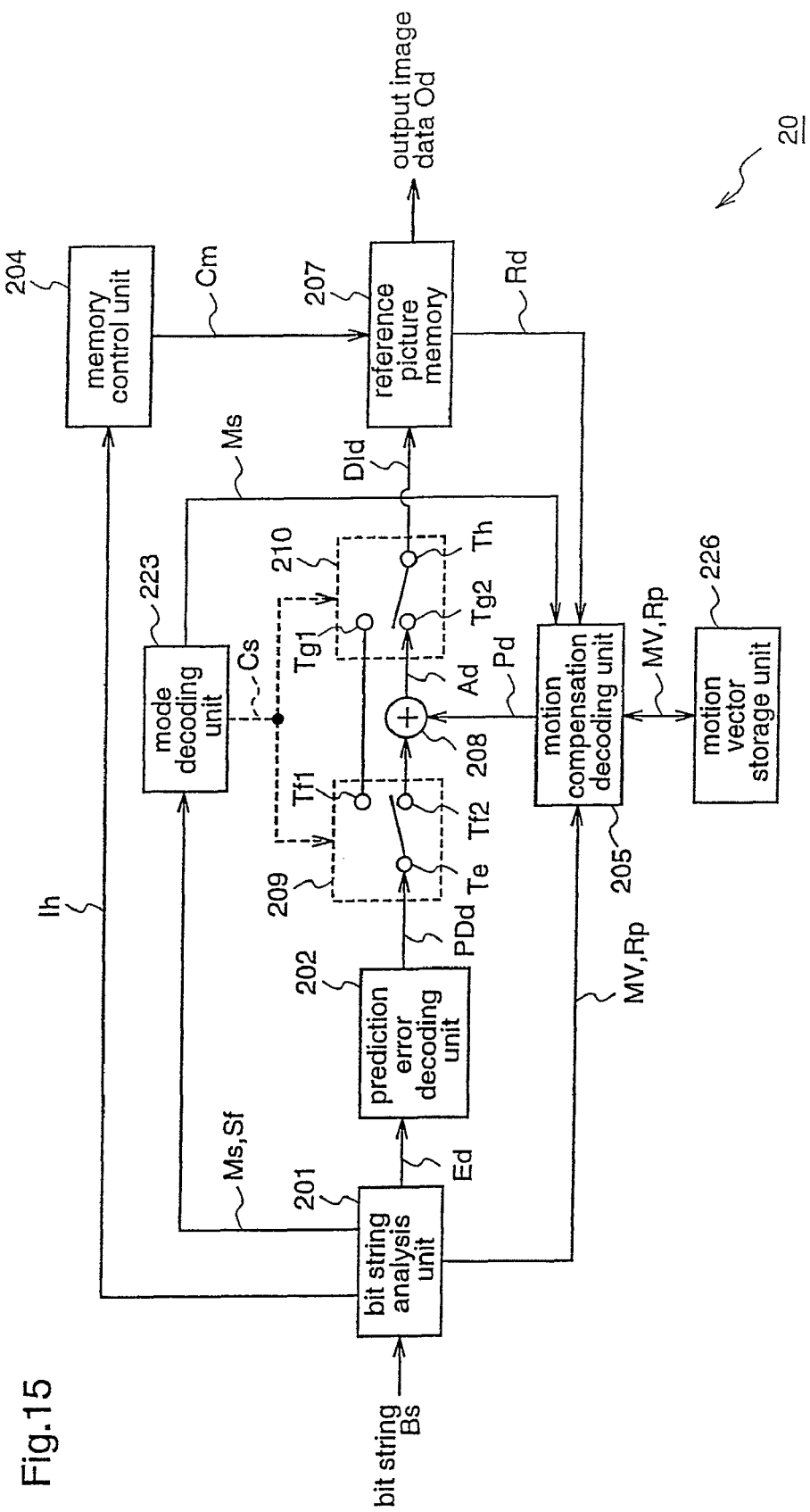
FIG. 15 is a block diagram for explaining a moving picture decoding apparatus according to the second embodiment of the invention.

FIG. 15 is a block diagram for explaining a moving picture decoding apparatus 20 according to a second embodiment of the present invention.

The moving picture decoding apparatus 20 decodes the bit stream Bs outputted from the moving picture coding apparatus 10 according to the first embodiment.

To be specific, the moving picture decoding apparatus 20 includes a bit stream analysis unit 201 for analyzing the bit stream Bs to extract various kinds of data; a prediction error decoding unit 202 for decoding coded data Ed outputted from the bit stream analysis unit 201 to output prediction error data PDd; and a mode decoding unit 223 for outputting a switch control signal Cs on the basis of mode information (coding mode) Ms relating to mode selection, which is extracted by the bit stream analysis unit 201.

The moving picture decoding apparatus 20 further includes a reference picture memory 207 for holding decoded image data DId, and outputting the stored image data as reference data Rd or output image data 0d; a motion compensation decoding unit 205 for generating prediction data Pd, on the basis of the data (reference image data) Rd that is read from the reference picture memory 207, information of a motion vector MV that is extracted by the bit stream analysis unit 201, and the coding mode Ms that is output from the mode decoding unit 223; and an addition unit 208 for adding the prediction data Pd to the output data PDd from the prediction error decoding unit 202 to generate decoded data Ad.

The moving picture decoding apparatus 20 further includes a memory control unit 204 for controlling the reference picture memory 207 with a memory control signal Cm, on the basis of header information Ih that is extracted by the bit stream analysis unit 201; a selection switch 209 placed between the prediction error decoding unit 202 and the addition unit 208; and a selection switch 210 placed between the addition unit 208 and the reference picture memory 207.

The selection switch 201 has one input terminal Te and two output terminals Tf1 and Tf2, and the input terminal Te is connected to one of the output terminals Tf1 and Tf2, according to the switch control signal Cs. The selection switch 210 has two input terminals Tg1 and Tg2 and an output terminal Th, and the output terminal Th is connected to one of the input terminals Tg1 and Tg2, according to the switch control signal Cs. Further, in the selection switch 209, the output data PDd from the prediction error decoding unit 202 is applied to the input terminal Te, and the output data PDd from the prediction error decoding unit 202 is output from one output terminal Tf1 to the input terminal Tg1 of the selection switch 210 while the output data PDd is output from the other output terminal Tf2 to the addition unit 208. In the selection switch 210, the output data PDd from the prediction error decoding unit 202 is applied to one input terminal Tg1 while the output data Ad from the addition unit 208 is input to the other input terminal Tg1, and either the output data PDd or the output data Ad is output from the output terminal Th to the reference picture memory 207 as decoded image data DId.

Further, the moving picture decoding apparatus 20 includes a motion vector storage unit 226 for holding the motion vector MV from the motion compensation decoding unit 205, and outputting the stored motion vector MV to the motion compensation decoding unit 205.

Next, the operation of the moving picture decoding apparatus 20 will be described.

In the following description, a picture which is positioned forward or backward a target picture to be decoded on a display time axis is referred to as a picture which is timewise forward or backward the target picture, or simply as a forward picture or a backward picture.

The bit stream Bs generated in the moving picture coding apparatus 10 of the first embodiment is input to the moving picture decoding apparatus 20 shown in FIG. 15. In this second embodiment, a bit stream of a P picture is obtained by performing inter-picture predictive coding with reference to one picture selected from among three candidate pictures (I or P pictures) which are positioned close to and timewise forward or backward the P picture. Further, a bit stream of a B picture is obtained by performing inter-picture predictive coding with reference to two pictures selected from among four candidate pictures positioned forward or backward the B picture (i.e., forward two I or P pictures that are timewise closest to the target picture, one B picture that is timewise closest to the target picture, and an I or P picture that is positioned timewise backward the target picture). The four candidate pictures for the target B picture include another B picture that is positioned timewise forward the target B picture.

Further, which candidate pictures are referred to when coding the target P picture or B picture may be described as header information of the bit stream. Accordingly, it is possible to know which pictures are referred to when coding the target picture, by extracting the header information in the bit stream analysis unit 201. This header information Ih is also output to the memory control unit 204.

Figure 16:
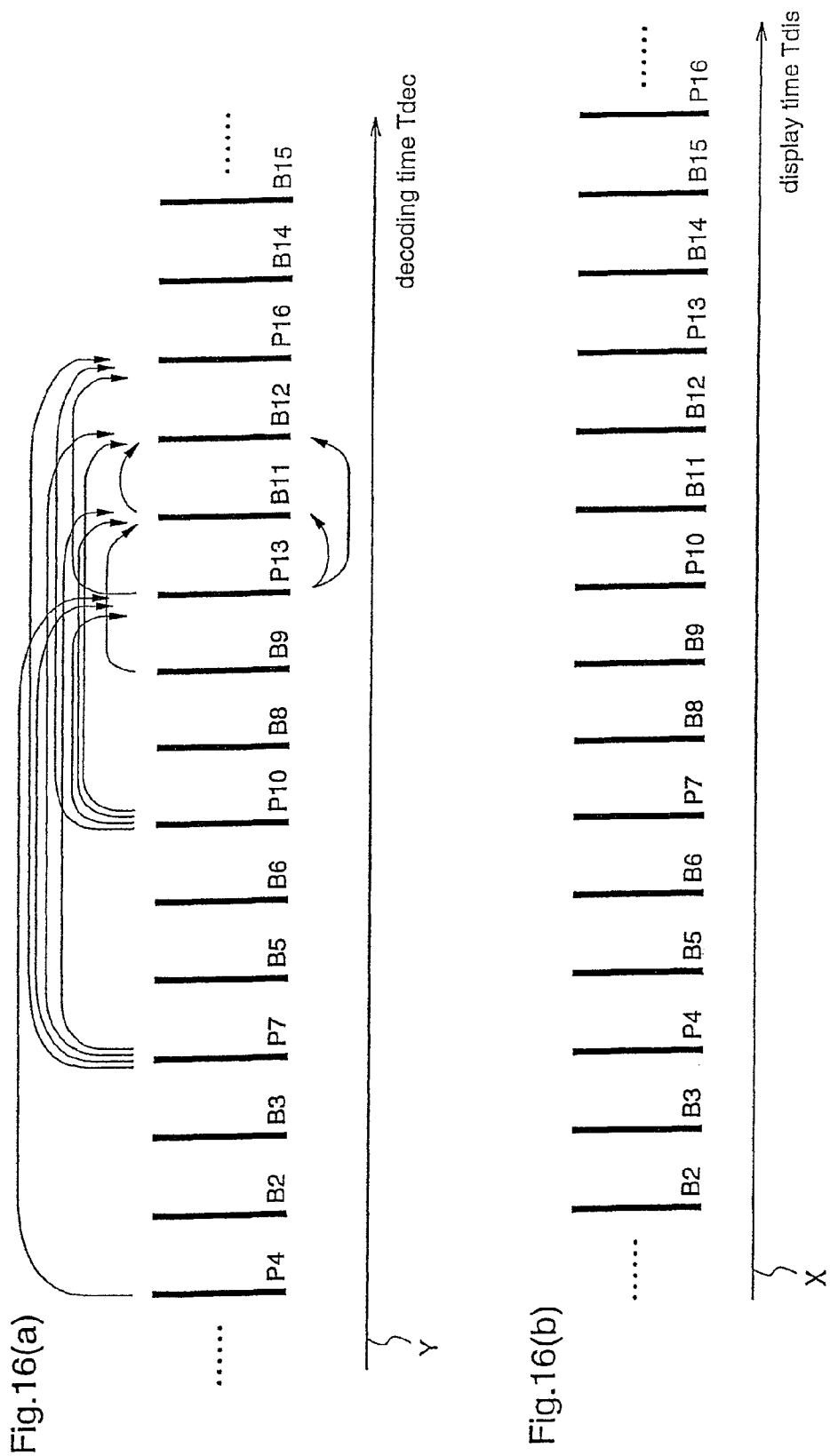

In this case, coded data corresponding to pictures in the bit stream are arranged in order of coding as shown in FIG. 16(*a*).

To be specific, the coded data of the pictures in the bit stream Bs are arranged in the other of P4, B2, B3, P7, B5, B6, P10, B8, B9, P13, B11, B12, P16, B14, and B15. In other words, in this picture arrangement, the respective pictures are successively arranged in order of decoding times on a decoding time axis Y that indicates decoding times Tdec of the pictures (arrangement in order of decoding).

FIG. 16(*b*) shows an arrangement of pictures in which the pictures arranged in order of decoding are rearranged in order of display. That is, in FIG. 16(*b*), the pictures B2, B3, P4, B5, B6, P7, B8, B9, P10, B11, B12, P13, B14, B15, and p16 are successively arranged in order of display times on a display time axis X that indicates display times Tdis of the respective pictures (arrangement in order of display).

Hereinafter, decoding processes for the pictures P13, B11, and B12 will be described in this order.

Decoding Process for Picture P13

The bit stream of the picture P13 is input to the bit stream analysis unit 201. The bit stream analysis unit 201 extracts various kinds of data from the inputted bit stream. The respective data are as follows: information for performing mode selection, i.e., information indicating a coding mode Ms (hereinafter referred to simply as a coding mode); information indicating a motion vector MV (hereinafter referred to simply as a motion vector), header information, coded data (image information), and the like. The extracted coding mode Ms is output to the mode decoding unit 203. Further, the extracted motion vector MV is output to the motion compensation decoding unit 205. Furthermore, the prediction error coded data Ed extracted by the bit stream analysis unit 201 is output to the prediction error decoding unit 202.

The mode decoding unit 203 controls the switches 209 and 210 on the basis of the coding mode Ms extracted from the bit stream. When the coding mode indicates inter-picture coding, the switch 209 is controlled such that the input terminal Te is connected to the output terminal Tf1, and the switch 210 is controlled such that the output terminal Th is connected to the input terminal Tg1. Further, when the coding mode indicates inter-picture prediction coding, the switch 209 is controlled such that the input terminal Te is connected to the output terminal Tf2, and the switch 210 is controlled such that the output terminal Th is connected to the input terminal Tg2. Further, the mode decoding unit 203 outputs the coding mode Ms to the motion compensation decoding unit 205.

Hereinafter, a description will be given of the case where the coding mode is inter-picture predictive coding.

The prediction error decoding unit 202 decodes the inputted coded data Ed to generate prediction error data PDd. The generated prediction error data PDd is output to the switch 209. In this case, since the input terminal Te of the switch 209 is connected to the output terminal Tf2, the prediction error data PDd is output to the addition unit 208.

The motion compensation decoding unit 205 performs motion compensation on the basis of the motion vector MV and the reference picture index Rp which are extracted by the analysis unit 201, and obtains a motion compensation image from the reference picture memory 207. This motion compensation image is an image in an area in the reference picture, which area corresponds to a target block to be decoded.

The picture P13 has been coded using the pictures P4, P7, and P10 as candidate pictures for forward reference. When decoding the picture P13, these candidate pictures have already been decoded and are stored in the reference picture memory 207.

So, the motion compensation decoding unit 205 determines which one of the pictures P4, P7, and P10 is used as a reference picture when coding the target block of the picture P13. Then, the motion compensation decoding unit 205 obtains an image in an area in the reference picture, which area corresponds to the target block, as a motion compensation image, from the reference picture memory 207 on the basis of the motion vector.

Hereinafter, a description will be given of how the pictures stored in the reference picture memory 207 change with time, and a method for determining a reference picture, with reference to FIG. 3.

The reference picture memory 207 is controlled by the memory control unit 204, on the basis of information indicating what kind of reference has been carried out to obtain P pictures and B pictures (reference picture information), which information is extracted from the header information of the bit stream.

As shown in FIG. 3, the reference picture memory 207 has memory areas (#1)~(#5) for five pictures. When decoding of the picture P13 is started, pictures B8, P4, P7, P10, and B9 are stored in the reference picture memory 207. The picture P13 is decoded using the pictures P4, P7, and P10 as candidate pictures for a reference picture. The decoded picture P13 is stored in the memory area where the picture P8 had been stored. The reason is as follows. While the pictures P4, P7, and P10 are used as candidate pictures for a reference picture when decoding the picture P13 and the following pictures, the picture B8 is not used as a reference picture when decoding these pictures.

In FIG. 3, each circled picture is a picture (target picture) which is finally stored in the reference picture memory 207 when decoding of the target picture has completed.

In this case, which picture has been referred to in detecting the motion vector of the target block in the picture P13 can be determined from the reference picture information that is added to the motion vector.

Specifically, the reference picture information is reference picture indices, and the reference picture indices are assigned to the reference candidate pictures for the picture P13. This assignment of the reference picture indices to the reference candidate pictures is carried out such that a smaller index is assigned to a reference candidate picture that is timewise closer to the target picture (picture P13).

To be specific, when the picture P10 has been referred to in coding the target block of the picture P13, information indicating that the candidate picture (picture P10) just previous to the target picture has been used as a reference picture (e.g., reference picture index [0]) is described in the bit stream of the target block. Further, when the picture P7 has been referred to in coding the target block, information indicating that the candidate picture which is two-pictures previous to the target picture has been used as a reference picture (e.g., reference picture index [1]) is described in the bit stream of the target block. Furthermore, when the picture P4 has been referred to in coding the target block of the picture P13, information indicating that the candidate picture which is three-pictures previous to the target picture has been used as a reference picture (e.g., reference picture index [2]) is described in the bit stream of the target block.

It is possible to know which one of the candidate pictures has been used as a reference picture in coding the target block, by the reference picture index.

In this way, the motion compensation decoding unit 205 obtains the motion compensation image (i.e., the image in the area in the reference picture, corresponding to the target block), from the reference picture memory 207, according to the motion vector and the reference picture information.

The motion compensation image thus generated is output to the addition unit 208.

Further, when performing decoding of a P picture, the motion compensation decoding unit 205 outputs the motion vector MV and the reference picture information Rp to the motion vector storage unit 226.

The addition unit 208 adds the prediction error data PDd and the data (prediction data) Pd of the motion compensation image to generate decoded data Ad. The decoded data Ad so generated is output as decoded image data DId, through the switch 210 to the reference picture memory 207.

In this way, the blocks in the picture P13 are successively decoded. When all of the blocks in the picture P13 have been decoded, decoding of the picture B11 takes place.

Decoding Process for Picture B11

Since the bit stream analysis unit 201, the mode decoding unit 203, and the prediction error decoding unit 202 operate in the same way as described for decoding of the picture P13, repeated description is not necessary.

The motion compensation decoding unit 205 generates motion compensation data from the inputted information such as the motion vector. The bit stream analysis unit 201 outputs the motion vector and the reference picture index to the motion compensation decoding unit 205. The picture P11 is obtained by predictive coding using the pictures P7, B9 and P10 as candidate pictures for forward reference, and the picture P13 as a candidate picture for backward reference. At decoding the target picture, these reference candidate pictures have already been decoded, and are stored in the reference picture memory 207.

Hereinafter, a description will be given of how the pictures stored in the reference picture memory 207 change with time, and a method for determining a reference picture, with reference to FIG. 3.

The reference picture memory 207 is controlled by the memory control unit 204, on the basis of information Ih indicating what kind of reference has been carried out in coding P pictures and B pictures, which information is extracted from the header information of the bit stream.

When decoding of the picture P11 is started, pictures P13, P4, P7, P10, and B9 are stored in the reference picture memory 207. The picture B11 is decoded using the pictures P7, B9, and P10 as candidate pictures for forward reference, and the picture P13 as a backward reference picture. The decoded picture B11 is stored in the memory area where the picture P4 had been stored, because the picture P4 is not used as a candidate for a reference picture when decoding the picture B11 and the following pictures.

In this case, which candidate picture has been referred to in detecting the forward motion vector can be determined from the reference picture information added to the motion vector.

To be specific, when the picture P10 has been referred to in coding the target block of the picture B11, information indicating that the candidate picture (picture P10) just previous to the target picture has been used as a reference picture (e.g., reference picture index [0]) is described in the bit stream of the target block. Further, when the picture B9 has been referred to in coding the target block, information indicating that the candidate picture which is two-pictures previous to the target picture has been used as a reference picture (e.g., reference picture index [1]) is described in the bit stream of the target block. Furthermore, when the picture P7 has been referred to in coding the target block of the picture P13, information indicating that the candidate picture which is three-pictures previous to the target picture has been used as a reference picture (e.g., reference picture index [2]) is described in the bit stream of the target block.

Accordingly, it is possible to know which one of the candidate pictures has been used as a reference picture in coding the target block, from the reference picture index.

When the selected mode is bidirectional predictive coding, the motion compensation decoding unit 205 determines which one of the pictures P7, B9 and P10 has been used for forward reference, from the reference picture index. Then, the motion compensation decoding unit 205 obtains a forward motion compensation image from the reference picture memory 207 on the basis of the forward motion vector, and further, it obtains a backward motion compensation image from the reference picture memory 207 on the basis of the backward motion vector.

Then, the motion compensation decoding unit 205 performs addition and averaging of the forward motion compensation image and the backward motion compensation image to generated a motion compensation image.

Next, a process of generating a motion compensation image using forward and backward motion vectors will be described.

(Bidirectional Prediction Mode)

Figure 17:
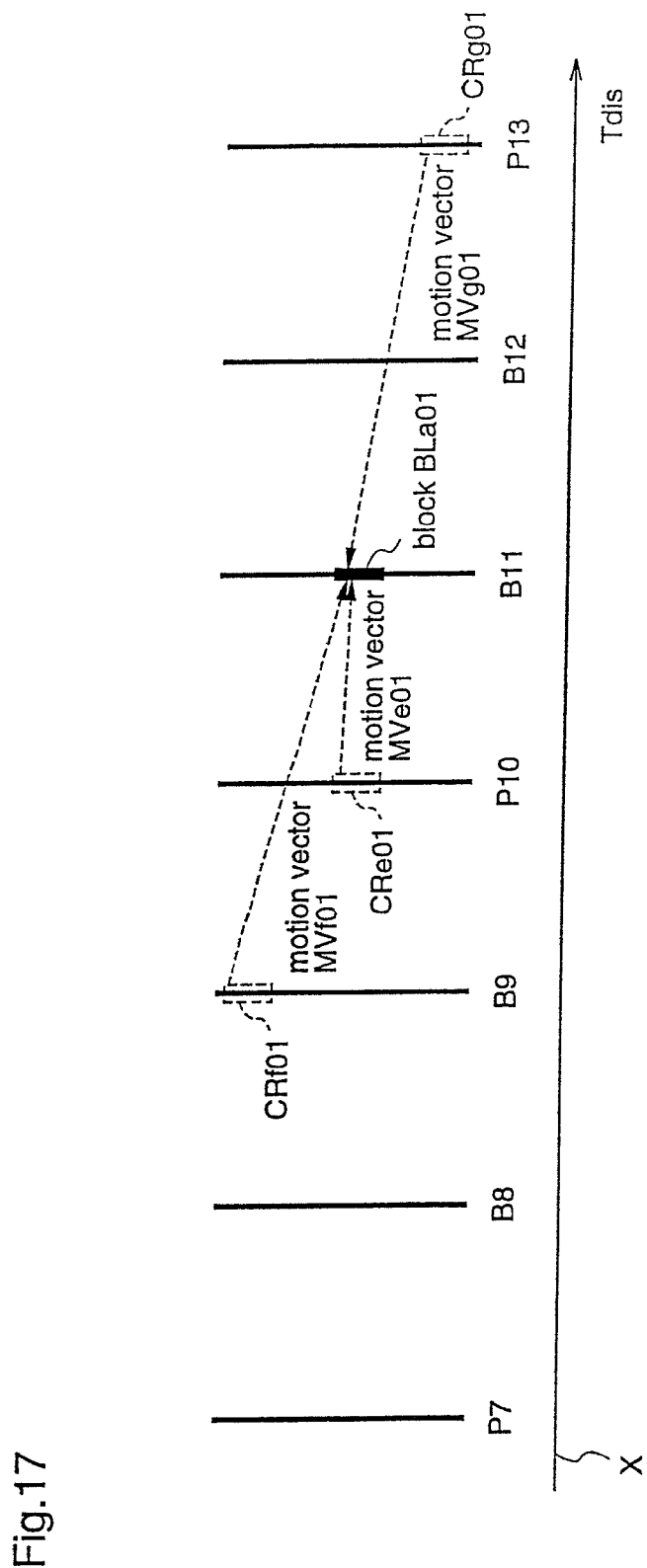
FIG. 17 is a diagram for explaining the second embodiment, illustrating bidirectional predictive decoding (for picture B11).

FIG. 17 illustrates a case where the target picture to be decoded is the picture B11, and bidirectional predictive decoding is performed on a block (target block) BLa01 to be decoded, in the picture B11.

Initially, a description will be given of a case where the forward reference picture is the picture P10, and the backward reference picture is the picture P13.

In this case, the forward motion vector is a motion vector MVe01 indicating an area CRe01 in the picture P10, which area corresponds to the block BLa01. The backward motion vector is a motion vector MVg01 indicating an area CRg01 in the picture P13, which area corresponds to the block BLa01.

Accordingly, the motion compensation decoding unit 205 obtains an image in the area CRe01 in the picture P10 as a forward reference image, and an image in the area CRg01 in the picture P13 as a backward reference image, from the reference picture memory 207, and performs addition and averaging of image data on the images in the both areas CRe01 and CRg01 to obtain a motion compensation image corresponding to the target block BLa01.

Next, a description will be given of a case where the forward reference picture is the picture B9, and the backward reference picture is the picture P13.

In this case, the forward motion vector is a motion vector MVf01 indicating an area CRf01 in the picture B9, which area corresponds to the block BLa01. The backward motion vector is a motion vector MVg01 indicating an area CRg01 in the picture P13, which area corresponds to the block BLa01.

Accordingly, the motion compensation decoding unit 205 obtains an image in the area CRf01 in the picture B9 as a forward reference image, and an image in the area CRg01 in the picture P13 as a backward reference image, from the reference picture memory 207, and performs addition and averaging of image data on the images in the both areas CRf01 and CRg01 to obtain a motion compensation image corresponding to the target block BLa01.

(Direct Mode)

Further, when the coding mode is the direct mode, the motion compensation decoding unit 205 obtains a motion vector (base motion vector) of a block that is included in the backward reference picture P13 for the target picture B11 and is placed relatively in the same position as the target block, which motion vector is stored in the motion vector storage unit 226. The motion compensation decoding unit 205 obtains a forward reference image and a backward reference image from the reference picture memory 207 by using the base motion vector. Then, the motion compensation decoding unit 205 performs addition and averaging of image data, on the forward reference image and the backward reference image, thereby generating a motion compensation image corresponding to the target block. In the following description, a block in a picture, whose relative position with respect to a picture is equal to that of a specific block in another picture is simply referred to as a block which is located in the same position as a specific block in a picture.

Figure 18A:
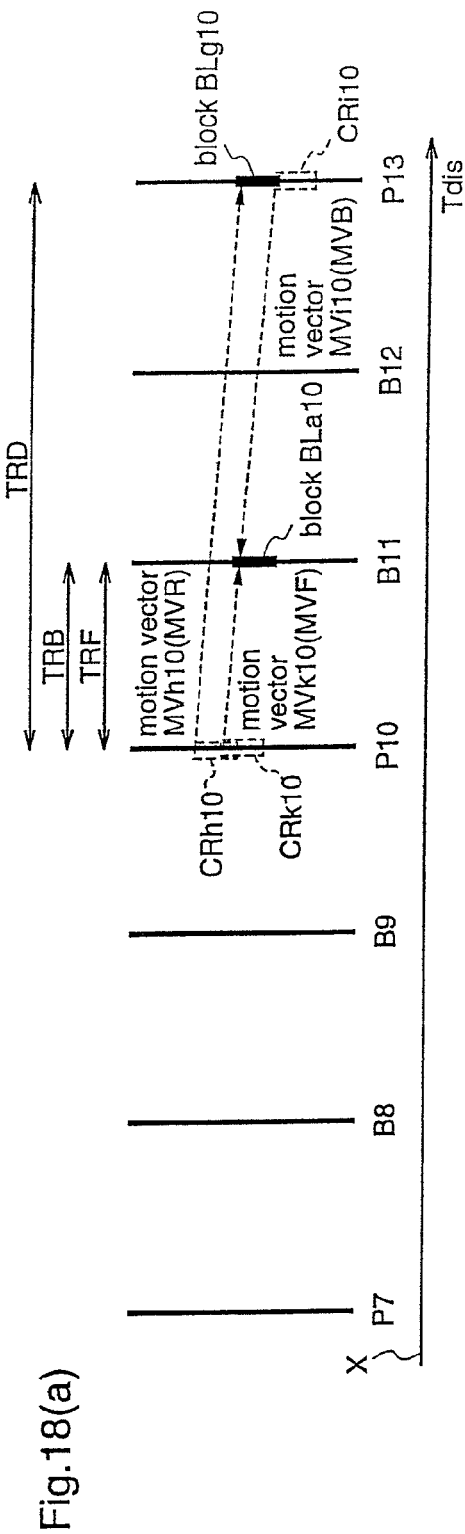
FIGS. 18(a) and 18(b) are diagrams for explaining the second embodiment, illustrating a first example (18(a)) and a second example (18(b)) of direct mode decoding (for picture B11).

FIG. 18(a) shows a case where the block BLa10 in the picture B11 is decoded in the direct mode with reference to the picture P10 that is just previous to the picture B11 (first example of direct mode decoding).

A base motion vector to be used for direct mode decoding of the block BLa10 is a forward motion vector (base motion vector) MVh10 of a block (base block) BLg10 located in the same position as the block BLa10, which block BLg10 is included in the picture (base picture) P13 that is backward referred to when decoding the block BLa10. The forward motion vector MVh10 indicates an area CRh10 corresponding to the base block BLg10, in the picture P10 that is just previous to the picture B11.

In this case, as a forward motion vector MVk10 of the target block BLa10 to be decoded, a motion vector, which is parallel to the base motion vector MVh10 and indicates an area CRk10 included in the picture P10 and corresponding to the target block BLa10, is employed. Further, as a backward motion vector MVi10 of the target block BLa10 to be decoded, a motion vector, which is parallel to the base motion vector MVh10 and indicates an area CRi10 included in the picture P13 and corresponding to the target block BLa10, is employed.

Accordingly, the motion compensation decoding unit 205 obtains an image in the area CRk10 of the forward reference picture P10 as a forward reference image, and an image in the area CRi10 of the backward reference picture P13 as a backward reference image, from the reference picture memory 207, and performs addition and averaging of image data of the both images to obtain a motion compensation image (prediction image) corresponding to the target block BLa10.

In this case, the magnitude (MVF) of the forward motion vector MVk10 and the magnitude (MVB) of the backward motion vector MVi10 are obtained by the above-described formulae (1) and (2), using the magnitude (MVR) of the base motion vector MVh10.

The magnitudes MVF and MVB of the respective motion vectors show the horizontal component and vertical component of the motion vector, respectively.

Further, TRD indicates a time-basis distance between the backward reference picture P13 for the target block BLa10 in the picture B11, and the picture P10 which is forward referred to when decoding the block (base block) BLg10 in the backward reference picture (base picture) P13. Further, TRF is the time-basis distance between the target picture B11 and the just-previous reference picture P10, and TRB is the time-basis distance between the target picture B11 and the picture P10 which is referred to when decoding the block BLg10 in the backward reference picture P13.

Figure 18B:
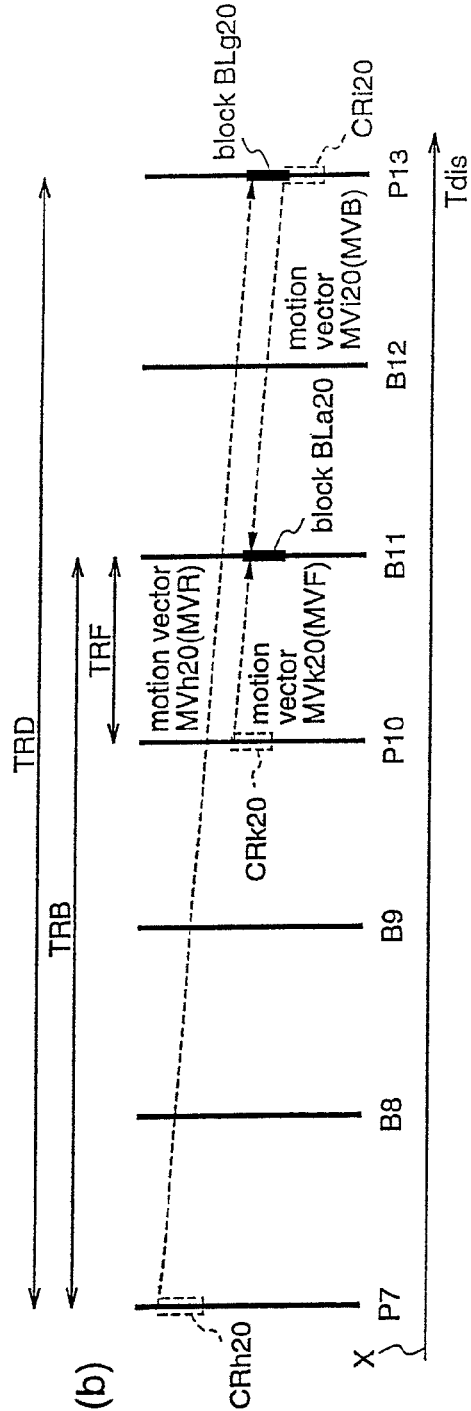

FIG. 18(b) shows a case where a block BLa20 in the picture B11 is decoded in the direct mode with reference to the picture P10 that is just previous to the picture B11 (second example of direct mode decoding).

In this second example of direct mode decoding, in contrast with the first example of direct mode decoding shown in FIG. 18(a), a picture which is forward referred to in decoding the base block (i.e., a block placed in the same position as the target block, in the backward reference picture for the target block) is the picture P7.

That is, a base motion vector to be used for direct mode decoding of the block BLa20 is a forward motion vector MVh20 of a block BLg20 located in the same position as the block BLa20, which block BLg20 is included in the picture P13 that is backward referred to when decoding the block BLa20. The forward motion vector MVh20 indicates an area CRh20 corresponding to the base block BLg20, in the picture P7 that is positioned forward the target picture B11.

In this case, as a forward motion vector MVk20 of the target block BLa20 to be decoded, a motion vector, which is parallel to the base motion vector MVh20 and indicates an area CRk20 included in the picture P10 and corresponding to the target block BLa20, is employed. Further, as a backward motion vector MVi20 of the target block BLa20 to be decoded, a motion vector, which is parallel to the base motion vector MVh20 and indicates an area CRi20 included in the picture P13 and corresponding to the target block BLa20, is employed.

Accordingly, the motion compensation decoding unit 205 obtains an image in the area CRk20 of the forward reference picture P10 as a forward reference image, and an image in the area CRi20 of the backward reference picture P13 as a backward reference image, from the reference picture memory 207, and performs addition and averaging of image data of the both images to obtain a motion compensation image (prediction image) corresponding to the target block BLa20.

In this case, the magnitude (MVF) of the forward motion vector MVk20 and the magnitude (MVB) of the backward motion vector MVi20 are obtained by the above-described formulae (1) and (2), using the magnitude (MVR) of the base motion vector MVh20, as described for the first example of direct mode decoding.

FIG. 19(a) shows a case where a block BLa30 in the picture B11 is decoded in the direct mode with reference to the picture P7 which is positioned forward the picture P10 that is positioned just previous to the picture B11 (third example of direct mode decoding).

In this third example of direct mode decoding, in contrast with the first and second examples of direct mode coding shown in FIGS. 18(a) and 18(b), a picture to be forward referred to in decoding the target block is not a picture just previous to the target picture, but a picture that is forward referred to in decoding the base block (a block in the same position as the target block) in the base picture. The base picture is a picture that is backward referred to in decoding the target block.

That is, a base motion vector to be used in direct mode decoding of the block BLa30 is a forward motion vector MVh30 of a block BLg30 located in the same position as the block BLa30, which block BLg30 is included in the picture P13 that is backward referred to in decoding the block BLa30. The forward motion vector MVh30 indicates an area CRh30 corresponding to the base block BLg30, in the picture P7 that is positioned forward the target picture B11.

In this case, as a forward motion vector MVk30 of the target block BLa30 to be decoded, a motion vector, which is parallel to the base motion vector MVh30 and indicates an area CRk30 included in the picture P7 and corresponding to the target block BLa30, is employed. Further, as a backward motion vector MVi30 of the target block BLa30 to be decoded, a motion vector, which is parallel to the base motion vector MVh30 and indicates an area CRi30 included in the picture P13 and corresponding to the target block BLa30, is employed.

Accordingly, the motion compensation decoding unit 205 obtains an image in the area CRk30 of the forward reference picture P7 as a forward reference image, and an image in the area CRi30 of the backward reference picture P13 as a backward reference image, from the reference picture memory 207, and performs addition and averaging of image data of the both images to obtain a motion compensation image (prediction image) corresponding to the target block BLa30.

In this case, the magnitude (MVF) of the forward motion vector MVk30 and the magnitude (MVB) of the backward motion vector MVi30 are obtained by the above-described formulae (2) and (3), using the magnitude (MVR) of the base motion vector MVh30.

When the picture to be referred to in decoding the block BLg30 has already been deleted from the reference picture memory 207, the forward reference picture P10 that is timewise closest to the target picture is used as a forward reference picture in the third example of direct mode decoding. In this case, the third example of direct mode decoding is identical to the first example of direct mode decoding.

FIG. 19(b) shows a case where a block BLa40 in the picture B11 is decoded in the direct mode by using a motion vector whose magnitude is zero (fourth example of direct mode decoding).

In this fourth example of direct mode decoding, the magnitude of the reference motion vector employed in the first and second examples shown in FIGS. 18(a) and 18(b) is zero.

In this case, as a forward motion vector MVk40 and a backward motion vector MVi40 of the block BLa40 to be decoded, a motion vector whose magnitude is zero is employed.

That is, the forward motion vector MVk40 indicates an area (block) CRk40 of the same size as the target block, which area is included in, the picture P10 and placed at the same position as the target block BLa40. Further, the backward motion vector MVi40 indicates an area (block) CRi40 of the same size as the target block, which area is included in the picture P13 and placed at the same position as the target block BLa40.

Accordingly, the motion compensation decoding unit 205 obtains an image in the area (block) CRk40 of the forward reference picture P10 as a forward reference image, and an image in the area (block) CRi40 of the backward reference picture P13 as a backward reference image, from the reference picture memory 207, and performs addition and averaging of image data of the both images to obtain a motion compensation image (prediction image) corresponding to the target block BLa40. This method is applicable to, for example, a case where a block which is included in the picture P13 as a backward reference picture of the picture B11 and is located in the same position as the block BLa40 is a block having no motion vector like an intra-frame-coded block.

The data of the motion compensation image thus generated is output to the addition unit 208. The addition unit 208 adds the inputted prediction error data and the motion compensation image data to generate decoded image data. The decoded image data so generated is output through the switch 210 to the reference picture memory 207, and the decoded image is stored in the reference picture memory 207.

The memory control unit 204 controls the reference picture memory 207 on the basis of the header information Ih indicating what kind of reference has been carried out in coding the P pictures and B pictures extracted from the header information of the bit stream.

As described above, the blocks in the picture B11 are successively decoded. When all of the blocks in the picture B11 have been decoded, decoding of the picture B12 takes place.

In the B picture decoding described above, a specific block is sometimes treated as a skip block. Hereinafter, decoding of a skip block will be briefly described.

When it is found that a specific block is treated as a skip block during decoding of an inputted bit stream, from a skip identifier or a block number information that is described in the bit stream, motion compensation, i.e., acquisition of a prediction image corresponding to a target block, is carried out in the direct mode.

For example, as shown in FIG. 6(b), when the blocks MB(r+1) and MB(r+2) between the block MB(r) and the block MB(r+3) in the picture B11 are treated as skip blocks, the bit stream analysis unit 201 detects the skip identifier Sf from the bit stream Bs. When the skip identifier Sf is input to the mode decoding unit 223, the mode decoding unit 223 instructs the motion compensation decoding unit 205 to perform motion compensation in the direct mode.

Then, the motion compensation decoding unit 205 obtains the prediction images of the blocks MB(r+1) and MB(r+2), on the basis of an image (forward reference image) of a block which is included in the forward reference picture P10 and placed in the same position as the block treated as a skip block, and an image (backward reference image) of a block in the same position as the block treated as a skip block, and then outputs the data of the prediction images to the addition unit 208. The prediction error decoding unit 202 outputs data whose value is zero, as difference data of the blocks treated as skip blocks. In the addition unit 208, since the difference data of the blocks treated as skip blocks is zero, the data of the prediction images of the blocks MB(r+1) and MB(r+2) are output to the reference picture memory 207 as decoded images of the blocks MB(r+1) and MB(r+2).

Furthermore, in the direct mode processing shown in FIG. 18(a) (first example), the direct mode processing shown in FIG. 18(b) (second example), and the direction mode processing shown in FIG. 19(a) (third example), all of blocks whose difference data become zero are not necessarily treated as skip blocks. That is, a target block is subjected to bidirectional prediction using a picture that is positioned just previous to the target picture as a forward reference picture, and a motion vector whose magnitude is zero, and only when the difference data of the target block becomes zero, this target block may be treated as a skip block.

In this case, when it is found, from the skip identifier or the like in the bit stream Bs, that a specific block is treated as a skip block, motion compensation should be carried out by bidirectional prediction whose motion is zero, using a just-previous reference picture as a forward reference picture.

Decoding Process for Picture B12

Since the bit stream analysis unit 201, the mode decoding unit 223, and the prediction error decoding unit 202 operate in the same way as described for decoding of the picture P10, repeated description is not necessary.

The motion compensation decoding unit 205 generates motion compensation image data from the inputted information such as the motion vector. The motion vector MV and the reference picture index Rp are input to the motion compensation decoding unit 205. The picture P12 has been coded using the pictures P7, P10 and B11 as candidate pictures for forward reference, and the picture P13 as a candidate picture for backward reference. At decoding the target picture, these candidate pictures have already been decoded, and are stored in the reference picture memory 207.

The timewise change of the pictures stored in the reference picture memory 207, and the method for determining a reference picture are identical to those in the case of decoding the picture B11 described with respect to FIG. 3.

When the coding mode is bidirectional predictive coding, the motion compensation decoding unit 205 determines which one of the pictures P7, P10 and B11 has been used for forward reference, from the reference picture index. Then, the motion compensation decoding unit 205 obtains a forward reference image from the reference picture memory 207 on the basis of the forward motion vector, and further, it obtains a backward reference image from the reference picture memory 207 on the basis of the backward motion vector. Then, the motion compensation decoding unit 205 performs addition and averaging of image data of the forward reference image and the backward reference image to generated a motion compensation image corresponding to the target block.

(BiDirectional Prediction Mode)

Figure 20:
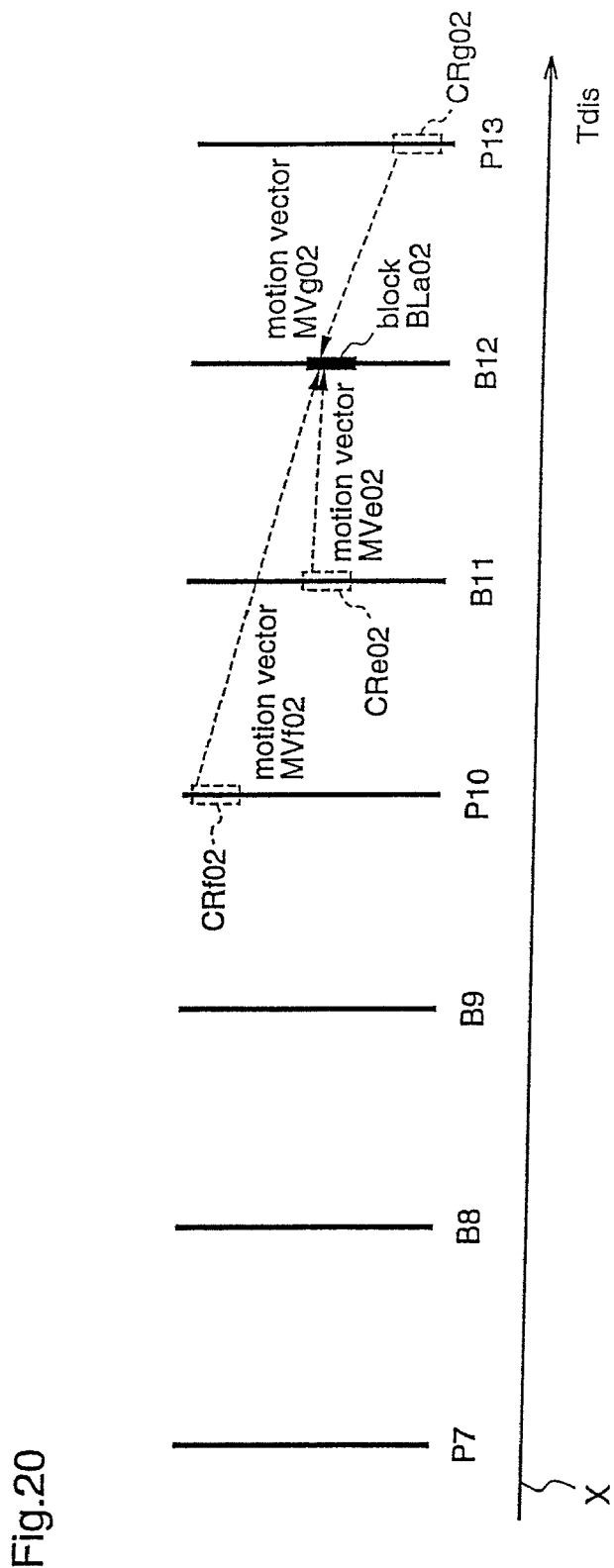
FIG. 20 is a diagram for explaining the second embodiment, illustrating bidirectional predictive decoding (for picture B12).

FIG. 20 illustrates a case where the target picture to be decoded is the picture B12, and bidirectional predictive decoding is performed on a block (target block) BLa02 to be decoded, in the picture B12.

Initially, a description will be given of a case where the forward reference picture is the picture B11, and the backward reference picture is the picture P13.

In this case, the forward motion vector is a motion vector MVe02 indicating an area CRe02 in the picture B11, which area corresponds to the block BLa02. The backward motion vector is a motion vector MVg02 indicating an area CRg02 in the picture P13, which area corresponds to the block BLa02.

Accordingly, the motion compensation decoding unit 205 obtains an image in the area CRe02 in the picture B11 as a forward reference image, and an image in the area CRg02 in the picture P13 as a backward reference image, from the reference picture memory 207, and performs addition and averaging of image data of the images in the both areas CRe02 and CRg02 to obtain a motion compensation image corresponding to the target block BLa02.

Next, a description will be given of a case where the forward reference picture is the picture P10, and the backward reference picture is the picture P13.

In this case, the forward motion vector is a motion vector MVf02 indicating an area CRf02 in the picture P10, corresponding to the block BLa02. The backward motion vector is a motion vector MVg02 indicating an area CRg02 in the picture P13, corresponding to the block BLa02.

Accordingly, the motion compensation decoding unit 205 obtains an image in the area CRf02 in the picture P10 as a forward reference image, and an image in the area CRg02 in the picture P13 as a backward reference image, from the reference picture memory 207, and performs addition and averaging of image data of the images in the both areas CRf02 and CRg02 to obtain a motion compensation image corresponding to the target block BLa02.

(Direct Mode)

Further, when the coding mode is the direct mode, the motion compensation decoding unit 205 obtains a motion vector (base motion vector) of a reference block (a block whose relative position is the same as that of the target position) in the backward reference picture P13 for the target picture B12, which motion vector is stored in the motion vector storage unit 226. The motion compensation decoding unit 205 obtains a forward reference image and a backward reference image from the reference picture memory 207 by using the base motion vector. Then, the motion compensation decoding unit 205 performs addition and averaging of image data of the forward reference image and the backward reference image, thereby generating a motion compensation image corresponding to the target block.

Figure 21:
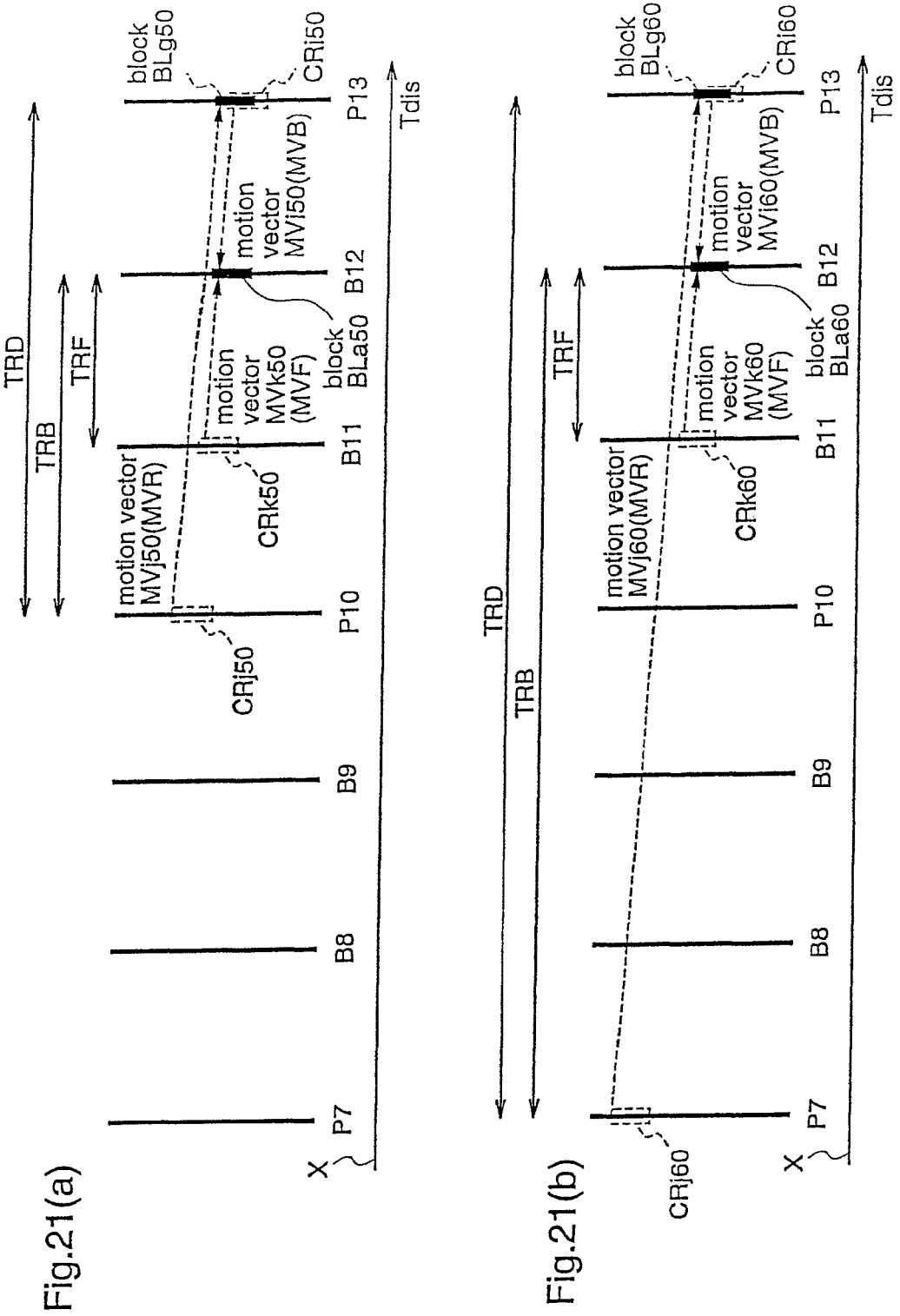
FIGS. 21(a) and 21(b) are diagrams for explaining the second embodiment, illustrating a first example (21(a)) and a second example (21(b)) of direct mode decoding (for picture B12).

FIG. 21(a) shows a case where the block BLa50 in the picture B12 is decoded in the direct mode with reference to the picture B11 that is just previous to the picture B12 (first example of direct mode decoding).

A base motion vector to be used for direct mode decoding of the block BLa50 is a forward motion vector MVj50 of the base block (i.e., the block BLg50 placed in the same position as the block BLa50) in the picture P13 that is backward referred to when decoding the block BLa50. The forward motion vector MVj50 indicates an area CRj50 corresponding to the base block BLg50, in the picture P10 that is positioned forward and close to the picture B11.

In this case, as a forward motion vector MVk50 of the target block BLa50 to be decoded, a motion vector, which is parallel to the base motion vector MVj50 and indicates an area CRk50 included in the picture B11 and corresponding to the target block BLa50, is employed. Further, as a backward motion vector MVi50 of the target block BLa50 to be decoded, a motion vector, which is parallel to the base motion vector MVj50 and indicates an area CRi50 included in the picture P13 and corresponding to the target block BLa50, is employed.

Accordingly, the motion compensation decoding unit 205 obtains an image in the area CRk50 of the forward reference picture B11 as a forward reference image, and an image in the area CRi50 of the backward reference picture P13 as a backward reference image, from the reference picture memory 207, and performs addition and averaging of image data of the both images to obtain a motion compensation image (prediction image) corresponding to the target block BLa50.

In this case, the magnitude (MVF) of the forward motion vector MVk50 and the magnitude (MVB) of the backward motion vector MVi50 are obtained by the above-described formulae (1) and (2), using the magnitude (MVR) of the base motion vector MVh10.

The magnitudes MVF and MVB of the respective motion vectors show the horizontal component and vertical component of the motion vector, respectively.

FIG. 21(b) shows a case where a block BLa60 in the picture B12 is decoded in the direct mode with reference to the picture B11 that is positioned forward the picture B12 (second example of direct mode decoding).

In this second example of direct mode decoding, in contrast with the first example of direct mode decoding shown in FIG. 21(a), a picture which is forward referred to in decoding the base block (i.e., a block placed in the same position as the target block, in the backward reference picture for the target block) is the picture P7.

That is, a base motion vector to be used for direct mode decoding of the block BLa60 is a forward motion vector MVj60 of the reference block (the block BLg60 in the same position as the block BLa60) in the picture P13 that is backward referred to when decoding the block BLa60. The forward motion vector MVj60 indicates an area CRj60 corresponding to the base block BLg60, in the picture P7 that is positioned forward the target picture B12.

In this case, as a forward motion vector MVk60 of the target block BLa60 to be decoded, a motion vector, which is parallel to the base motion vector MVj60 and indicates an area CRk60 included in the picture B11 and corresponding to the target block BLa60, is employed. Further, as a backward motion vector MVi60 of the target block BLa60 to be decoded, a motion vector, which is parallel to the base motion vector MVj60 and indicates an area CRi60 included in the picture P13 and corresponding to the target block BLa60, is employed.

Accordingly, the motion compensation decoding unit 205 obtains an image in the area CRk60 of the forward reference picture B11 as a forward reference image, and an image in the area CRi60 of the backward reference picture P13 as a backward reference image, from the reference picture memory 207, and performs addition and averaging of image data of the both images to obtain a motion compensation image (prediction image) corresponding to the target block BLa60.

In this case, the magnitude (MVF) of the forward motion vector MVk60 and the magnitude (MVB) of the backward motion vector MVi60 are obtained by the above-described formulae (1) and (2), using the magnitude (MVR) of the base motion vector MVj60, as described for the first example of direct mode decoding.

Figure 22:
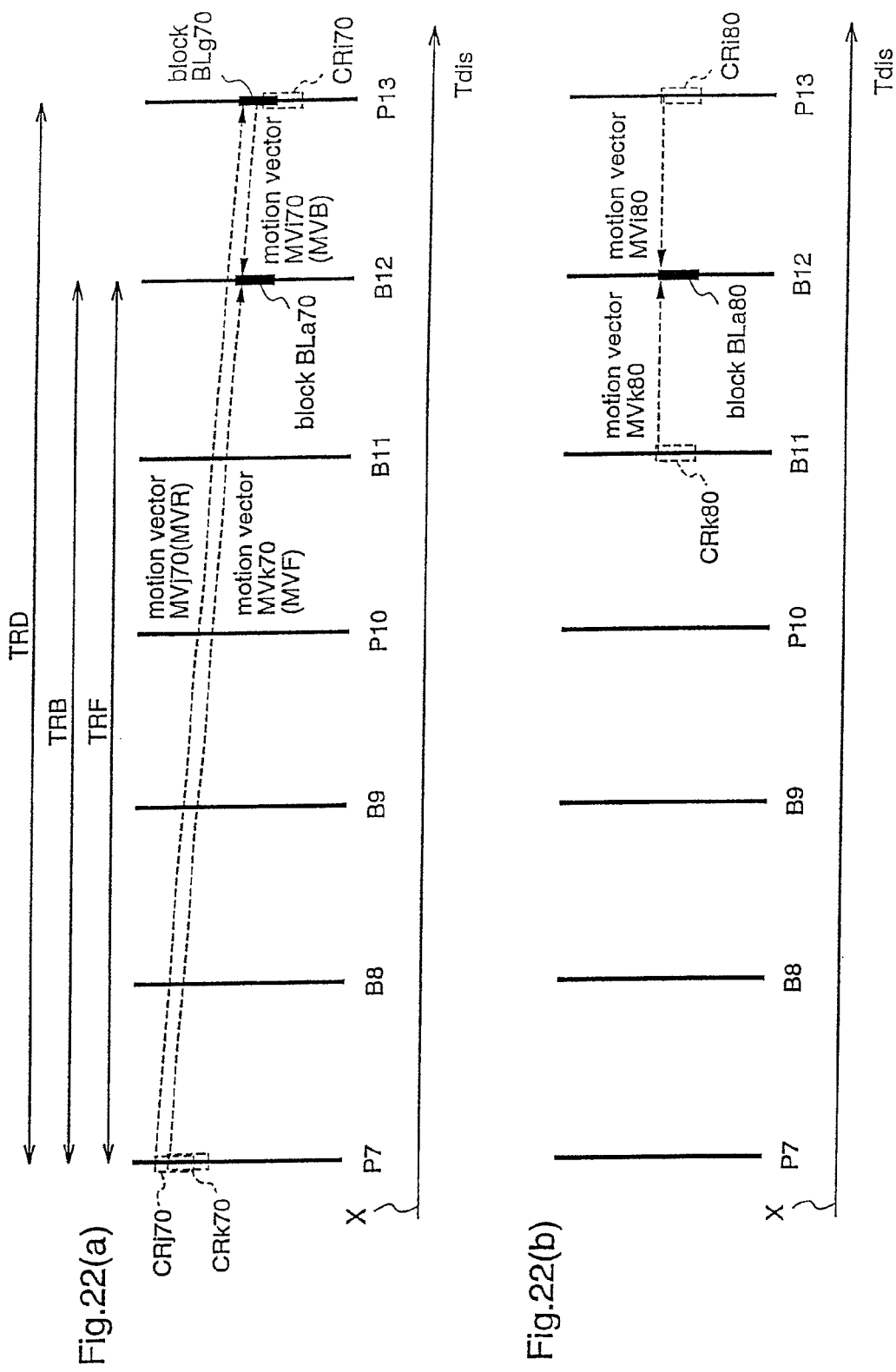
FIGS. 22(a) and 22(b) are diagrams for explaining the second embodiment, illustrating a third example (22(a)) and a fourth example (22(b)) of direct mode decoding (for picture B12).

FIG. 22(a) shows a case where a block BLa70 in the picture B12 is decoded in the direct mode with reference to the picture P7 which is positioned forward the forward picture P10 that is closest to the picture B12 (third example of direct mode decoding).

In this third example of direct mode decoding, in contrast with the first and second examples of direct mode coding shown in FIGS. 21(a) and 21(b), a picture to be forward referred to in decoding the target block is not a picture just previous to the target picture, but a picture that is forward referred to in decoding the base block in the base picture. The base picture is a picture that is backward referred to in decoding the target block.

That is, a base motion vector to be used in direct mode decoding of the block BLa70 is a forward motion vector MVj70 of a base block BLg70 (a block in the same position as the block BLa70) in the picture P13 that is backward referred to in decoding the block BLa70. The forward motion vector MVj70 indicates an area CRj70 corresponding to the base block BLg70, in the picture P7 that is positioned forward the target picture B12.

In this case, as a forward motion vector MVk70 of the target block BLa70 to be decoded, a motion vector, which is parallel to the base motion vector MVj70 and indicates an area CRk70 included in the picture P7 and corresponding to the target block BLa70, is employed. Further, as a backward motion vector MVi70 of the target block BLa70, a motion vector, which is parallel to the base motion vector MVj70 and indicates an area CRi70 included in the picture P13 and corresponding to the target block BLa70, is employed.

Accordingly, the motion compensation decoding unit 205 obtains an image in the area CRk70 of the forward reference picture P7 as a forward reference image, and an image in the area CRi70 of the backward reference picture P13 as a backward reference image, from the reference picture memory 207, and performs addition and averaging of image data of the both images to obtain a motion compensation image (prediction image) corresponding to the target block BLa70.

In this case, the magnitude (MVF) of the forward motion vector MVk70 and the magnitude (MVB) of the backward motion vector MVi70 are obtained by the above-described formulae (2) and (3), using the magnitude (MVR) of the base motion vector MVj70.

When the picture to be referred to in decoding the block BLg70 has already been deleted from the reference picture memory 207, the forward reference picture P10 that is timewise closest to the target picture is used as a forward reference picture in the third example of direct mode decoding. In this case, the third example of direct mode decoding is identical to the first example of direct mode decoding.

FIG. 22(b) shows a case where a block BLa80 in the picture B12 is decoded in the direct mode by using a motion vector whose magnitude is zero (fourth example of direct mode decoding).

In this fourth example of direct mode decoding, the magnitude of the reference motion vector employed in the first and second examples shown in FIGS. 21(a) and 21(b) is zero.

In this case, as a forward motion vector MVk80 and a backward motion vector MVi80 of the block BLa80 to be decoded, a motion vector whose magnitude is zero is employed.

That is, the forward motion vector MVk80 indicates an area (block) CRk80 of the same size as the target block, which area is included in the picture B11 and placed at the same position as the target block BLa80. Further, the backward motion vector MVi80 indicates an area (block) CRi80 of the same size as the target block, which area is included in the picture P13 and placed at the same position as the target block BLa80.

Accordingly, the motion compensation decoding unit 205 obtains an image in the area (block) CRk80 of the forward reference picture B11 as a forward reference image, and an image in the area (block) CRi80 of the backward reference picture P13 as a backward reference image, from the reference picture memory 207, and performs addition and averaging of image data of the both images to obtain a motion compensation image (prediction image) corresponding to the target block BLa80. This method is applicable to, for example, a case where a block which is included in the picture P13 as a backward reference picture of the picture B11 and is located in the same position as the block BLa80 is a block having no motion vector like an intra-frame-coded block.

The data of the motion compensation image thus generated is output to the addition unit 208. The addition unit 208 adds the inputted prediction error data and the motion compensation image data to generate decoded image data. The decoded image data so generated is output through the switch 210 to the reference picture memory 207.

As described above, the blocks in the picture B12 are successively decoded. The image data of the respective pictures stored in the reference picture memory 207 are rearranged in order of time to be output as output image data 0d.

Thereafter, the pictures following the picture B12, which are arranged in order of decoding times as shown in FIG. 16(a), are successively decoded according to the picture type, in like manner as described for the pictures P13, B11, and B12. FIG. 16(b) shows the pictures rearranged in order of display times.

During decoding of the inputted bit stream, if it is found that a specific block is treated as a skip block, from a skip identifier or a block number information that is described in the bit stream, motion compensation, i.e., acquisition of a prediction image corresponding to a target block, is carried out in the direct mode as in the case of decoding the picture B11.

As described above, in the moving picture decoding apparatus 20 according to the second embodiment, when decoding a block in a B picture, a prediction image corresponding to the target block is generated, using an already-decoded P picture and an already-decoded B picture as candidate pictures for forward reference, on the basis of information (reference picture index) indicating candidate pictures which are forward referred to in coding the target block, which information is included in the bit stream corresponding to the target block to be decoded. Therefore, it is possible to correctly decode a block in a target B picture which has been coded using a B picture as a candidate picture for forward reference.

Further, in the moving picture decoding apparatus 20, when a target block-to-be-decoded in a B picture has been coded in the direct mode, a motion vector of the target block is calculated on the basis of a motion vector of a block that is placed in the same position as the target block. Therefore, it is not necessary for the decoding end to obtain the information indicating the motion vector of the block that is coded in the direct mode, from the coding end.

Furthermore, in the moving picture decoding apparatus 20, the data of the already-decoded pictures which are stored in the reference picture memory are managed on the basis of the information indicating the candidate pictures which are used in coding p pictures and B pictures, which information is included as header information in the bit stream. For example, at the completion of decoding one picture, data of pictures which are not to be used as reference pictures in decoding the following pictures are successively deleted, whereby the picture memory can be used with efficiency.

Further, when decoding a target block in a P picture, it is possible to determine which one of plural candidate pictures is used as a reference picture (i.e., which one of the candidate pictures is referred to in detecting the motion vector of the target block to be decoded), from the reference picture information added to the motion vector information.

Likewise, when decoding a target block in a B picture, it is possible to determine which one of plural candidate pictures for forward reference is used as a reference picture (i.e., which one of the candidate pictures is referred to in detecting the forward motion vector of the target block to be decoded), from the reference picture information added to the motion vector information.

While in this second embodiment the direct mode is used as one of the plural coding modes for B pictures, the direct mode is not necessarily used as the coding mode for B pictures. In this case, the motion vector storage unit 226 in the moving picture decoding apparatus 20 is dispensed with.

Further, while in this second embodiment four specific methods are described as examples of direct mode (i.e., the first example shown in FIG. 18(a) or 21(a), the second example shown in FIG. 18(b) or 21(b), the third example shown in FIG. 19(a) or 22(a), and the fourth example shown in FIG. 19(b) or 22(b)), the decoding apparatus performs decoding using a method adapted to a coding method which is used as direct mode by the coding apparatus. More specifically, when plural methods are employed as direct mode, the decoding apparatus performs decoding, using information indicating which one of the plural methods is used as specific direct mode, that is described in the bit stream.

In this case, the operation of the motion compensation decoding unit 205 varies according to the information. For example, when this information is added in units of blocks for motion compensation, the mode decoding unit 223 determines which one of the four methods mentioned above is used as direct mode in coding, and notifies the motion compensation decoding unit 205 of the determined method. The motion compensation decoding unit 205 performs appropriate motion compensation predictive decoding according to the determined method of direct mode.

Further, when the information (DM mode information) indicating which one of the plural methods is used as direct mode is described in the header of the entire sequence, the GOP header, the picture header, or the slice header, the DM mode information is transferred for every sequence, GOP, picture, or slice, from the bit stream analysis unit 201 to the motion compensation decoding unit 205, and the motion compensation decoding unit 205 changes the operation.

While in this second embodiment two B pictures are placed between an I picture and a P picture or between adjacent P pictures, the number of continuous B pictures may be three or four.

Further, while in this second embodiment three pictures are used as candidate pictures for a forward reference picture for a P picture, the number of reference candidate pictures for a P picture may be other than three.

Furthermore, while in this second embodiment two I or P pictures and one B picture are used as candidate pictures for a forward reference picture in decoding a B picture, forward reference candidate pictures in decoding a B picture are not restricted thereto.

Moreover, in this second embodiment, as a method for managing the reference picture memory in decoding the picture P13, picture B11, and picture B12, a method of collectively managing the P pictures and B pictures to be used as candidates of a reference picture, as shown in FIG. 3, is described. However, the reference picture memory managing method may be any of the four methods which are described for the first embodiment with reference to FIGS. 11 to 14, wherein all of the pictures to be used as candidates for a reference picture are separated into P pictures and B pictures to be managed.

In this case, the reference picture memory 207 has memory areas for six pictures, i.e., P picture memory areas (#1)~(#4), and B picture memory areas (#1) and (#2). Further, these six memory areas are not necessarily formed in one reference picture memory, but each of the six memory areas may be constituted by one independent reference picture memory.

Further, when the coding end employs a reference picture index assigning method wherein it is determined, for each picture to be coded, which of the P picture memory area and the B picture memory area is given priority in assigning reference picture indices as shown in FIG. 14, the moving picture decoding apparatus can easily identify a picture which is used as a reference picture among plural candidate pictures, on the basis of the reference picture indices, by using information described in the bit stream, which indicates the memory area taking priority.

For example, when the target picture to be decoded is the picture B11, since the forward reference picture that is timewise closest to the target picture is the picture P10, reference picture indices are assigned to the pictures stored in the P picture memory with priority. Accordingly, a reference picture index [0] is added as header information to the bit stream of the target block when the picture P10 is used as a reference picture in coding the target block of the picture B11. Likewise, a reference picture index [1] is added as header information when the picture P7 is used as a reference picture, and a reference picture index [2] is added as header information when the picture B9 is used as a reference picture. Accordingly, the moving picture decoding apparatus can know which candidate picture is used as a reference picture in coding the target block, according to the reference picture index.

In this case, since information indicating that reference picture indices are assigned to the candidate pictures in the P picture memory with priority is included as header information in the bit stream, identification of the reference picture is further facilitated by using this information.

Further, when the target picture to be decoded is the picture B12, since the forward reference picture that is timewise closest to the target picture is the picture B11, reference picture indices are assigned to the pictures stored in the B picture memory with priority. Accordingly, a reference picture index [0] is added as header information to the bit stream of the target block when the picture B11 is used as a reference picture in coding the target block of the picture B12. Likewise, a reference picture index [1] is added as header information when the picture P10 is used as a reference picture, and a reference picture index [2] is added as header information when the picture P7 is used as a reference picture. Accordingly, the moving picture decoding apparatus can know which candidate picture is used as a reference picture in coding the target block, according to the reference picture index.

In this case, since information indicating that reference picture indices are assigned to the candidate pictures in the B picture memory with priority is included as header information in the bit stream, identification of the reference picture is further facilitated by using this information.

Furthermore, there are cases where, at the coding end, one of the above-mentioned five methods for managing the reference picture memory (refer to FIGS. 3, 11 to 14) is previously selected, or some of these five methods are used by switching them. For example, when the coding end employs some of the plural methods by switching them, the moving picture decoding apparatus can determine the reference picture index, according to information indicating which method is used for each picture, that is described in the bit stream.

Furthermore, in this second embodiment, the five methods for managing the reference picture memory (refer to FIGS. 3, 11 to 14) are described for the case where there are three reference candidate pictures for a P picture, and there are two P pictures and one B picture as forward reference candidate pictures for a B picture. However, the five methods for managing the reference picture memory are also applicable to cases where the number of reference candidate pictures is different to those mentioned above. When the number of reference candidate pictures is different from those mentioned for the second embodiment, the capacity of the reference picture memory is also different from that described for the second embodiment.

Moreover, in this second embodiment, in the method of managing the reference picture memory wherein the stored reference candidates are separated into P pictures and B pictures (four examples shown in FIGS. 11 to 14), the P pictures are stored in the P picture memory area while the B pictures are stored in the B picture memory area. However, a short-term picture memory and a long-term picture memory which are defined in H.263++ may be used as memory areas where pictures are stored. For example, the short-term picture memory and the long-term picture memory may be used as a P picture memory area and a B picture memory area, respectively.

Embodiment 3

Figure 23:
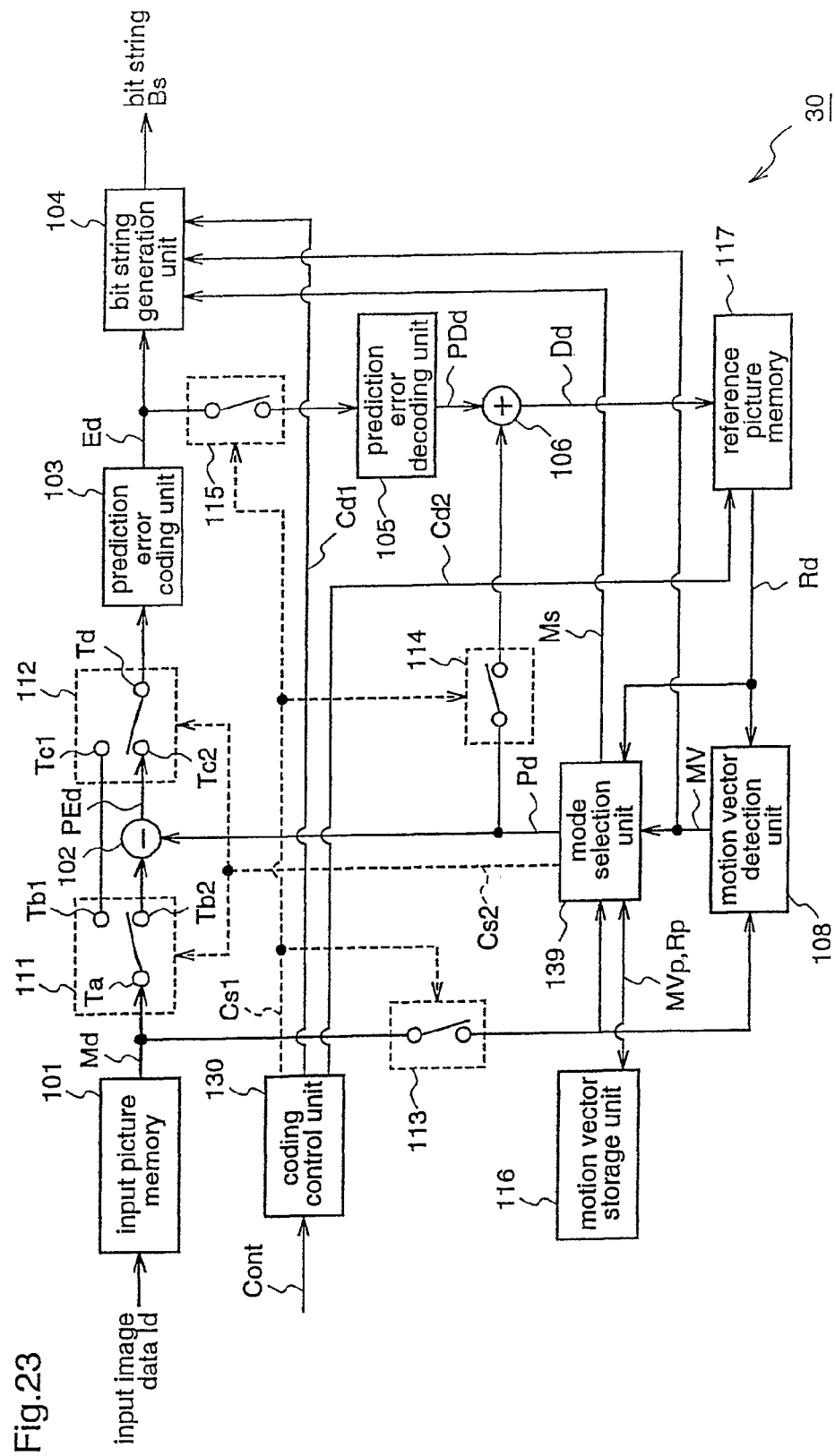
FIG. 23 is a block diagram for explaining a moving picture coding apparatus according to a third embodiment of the invention.

FIG. 23 is a block diagram illustrating a moving picture coding apparatus 30 according to a third embodiment of the present invention.

The moving picture coding apparatus 30 can switch, according to a control signal supplied from the outside, a method for assigning reference picture indices to candidate pictures, between a method of assigning reference picture indices to candidate pictures according to an initialized rule (default assignment method), and an adaptive assignment method of assigning reference picture indices to candidate pictures by the default assignment method and, further, adaptively changing the assigned reference picture indices according to the coding status.

To be specific, one operation mode of the moving picture coding apparatus 30 according to the third embodiment is the operation of the moving picture coding apparatus 10 according to the first embodiment. In other words, when the default assignment method is selected as a reference picture index assignment method of the moving picture coding apparatus 30, the moving picture coding apparatus 30 performs the same processing as that of the moving picture coding apparatus 10.

Hereinafter, the moving picture coding apparatus 30 will be described in detail.

The moving picture coding apparatus 30 is provided with a coding control unit 130, instead of the coding control unit 110 of the moving picture coding apparatus 10 according to the first embodiment. The coding control unit 130 switches, according to an external control signal Cont, a method for assigning reference picture indices to candidate pictures, between a method of assigning reference picture indices according to an initialized rule (default assignment method), and a method including a first step of assigning reference picture indices to candidate pictures by the default assignment method, and a second step of adaptively changing the reference picture indices which are assigned to the candidate pictures by the default assignment method (adaptive assignment method).

Further, the coding control unit 130 includes a detection unit (not shown) which detects, for every target picture to be coded, coding efficiency in a case where each of plural reference candidate pictures is used as a reference picture. The coding control unit 130 changes the reference picture index which is assigned to each candidate picture by the default assignment method, according to the coding efficiency detected by the detection unit.

More specifically, the coding control unit 130 changes the reference picture index, which is assigned to each candidate picture by the default assignment method, such that, among plural candidate pictures for a target picture, a candidate picture which provides a higher coding efficiency of the target picture when it is used as a reference picture is given a smaller reference picture index.

Then, the mode selection unit 139 selects, in the direct mode, a picture that is assigned a reference picture index [0], as a forward reference picture for a target block. In a predictive coding mode other than the direct mode, such as the bidirectional predictive coding mode, the mode selection unit 139 selects a reference picture from among plural candidate pictures according to the coding efficiency.

Other components of the moving picture coding apparatus 30 according to the third embodiment are identical to those of the moving picture coding apparatus 10 according to the first embodiment.

Hereinafter, the operation of the moving picture coding apparatus 30 will be described.

In the moving picture coding apparatus 30, when the default assignment method is selected as a method for assigning reference picture indices to candidate pictures according to the external control signal Cont, the operation of the moving picture coding apparatus 30 is identical to the operation of the moving picture coding apparatus 10 according to the first embodiment.

On the other hand, when the adaptive assignment method is selected as a method for assigning reference picture indices to candidate pictures according to the external control signal Cont, the moving picture coding apparatus 30 performs, in the first step, assignment of reference picture indices in like manner as described for the moving picture coding apparatus 10.

When the adaptive assignment method is selected, the moving picture coding apparatus 30 performs, in the second step, adaptive change of the reference picture indices that are assigned by the default assignment method.

Hereinafter, a description will be given of specific methods of assigning reference picture indices in the case where the adaptive assignment method is selected. In the following description, it is assumed that a target picture is the picture B12.

Initially, in the first step, as shown in FIG. 3, reference picture indices are assigned to candidate pictures for forward reference such that a smaller reference picture index is assigned to a candidate picture that is closer to the target picture. That is, a reference picture index [1] is assigned to the reference picture P10, a reference picture index [0] is assigned to the reference picture B11, and a reference picture index [2] is assigned to the reference picture P7.

Next, in the second step, as shown in FIG. 24, the reference picture index [1] of the reference picture P10 is changed to [0], and the reference picture index [0] of the reference picture B11 is changed to [1].

Such rewriting of reference picture indices is carried out for every target picture, according to the coding efficiency. Further, the moving picture coding apparatus 30 inserts information indicating which of the default assignment method and the adaptive assignment method is set as an assignment method, as header information, in the bit stream. Further, when the adaptive assignment method is set, information indicating how the assignment of reference picture indices is carried out is also inserted as header information in the bit stream.

As described above, in this third embodiment, the reference picture index of the candidate picture which is to be used as a forward reference picture in the direction mode, can be changed to [0].

That is, since, in the first embodiment, a smaller reference picture index is given to a reference candidate picture that is timewise closer to the target picture, only the picture B11 that is timewise closest to the target picture B12 can be referred to in the direct mode. In this third embodiment, however, any picture other than the picture B11 closest to the target picture B12 can be used as a forward reference picture, if the coding efficiency is improved.

Further, in this case, since the picture to be referred to in coding the picture B12 in the direct mode is not the picture B11 but the picture B10, decoding of the picture B11 becomes unnecessary. Accordingly, as shown in FIG. 25(a), a B picture immediately after a P picture can be processed without decoding it, whereby speedup of decoding is achieved when the picture B11 is not necessary. Further, since decoding can be carried out even when the data of the picture B11 is lost due to transmission error or the like, reliability of decoding is improved.

As described above, when a reference picture index can be arbitrarily assigned to a candidate picture to intentionally determine a picture to be referred to in the direct mode, a predetermined picture can be processed without decoding it, as shown in FIG. 25(a).

Furthermore, even when three B pictures are placed between P pictures as shown in FIG. 25(b), a predetermined picture can be processed without decoding it. Therefore, if a picture that is not needed by the user is previously known at the coding end, such picture can be omitted to reduce the processing time in decoding.

In FIG. 25(b), even when the picture B3 is not decoded, other pictures can be decoded.

That is, in the assignment method of the first embodiment, since the picture B4 refers to the picture B3 in the direct mode, the picture B3 must be decoded to decode the picture B4. In this third embodiment, however, since a picture to be referred to in the direct mode can be arbitrarily set, decoding of the picture B3 can be dispensed with.

Furthermore, in this third embodiment, assignment of reference picture indices is carried out such that a smaller reference picture index is assigned to a candidate picture that is timewise closer to the target picture, and a reference picture to be used in the direct mode is determined according to the reference picture indices. Therefore, the coding efficiency can be improved by a reduction in the motion vector, and further, the processing time can be reduced.

Furthermore, when the target block is processed in the direct mode at the decoding end, since the forward reference candidate picture to which the reference picture index [0] is assigned is immediately used as a reference picture, decoding time can be reduced.

Furthermore, while in this third embodiment a candidate picture whose reference picture index should be changed to [0] is determined according to the coding efficiency, a reference picture index of a picture which is most likely to be referred to, e.g., a P picture that is timewise closest to the target picture, may be changed to [0].

Moreover, while in this third embodiment a picture to be referred to in the direct mode is a picture whose reference picture index is [0], the present invention is not restricted thereto. For example, information indicating that a picture is to be referred to in the direct mode is coded, and decoding may be carried out in the direct mode on the basis of this information.

Embodiment 4

Figure 26:
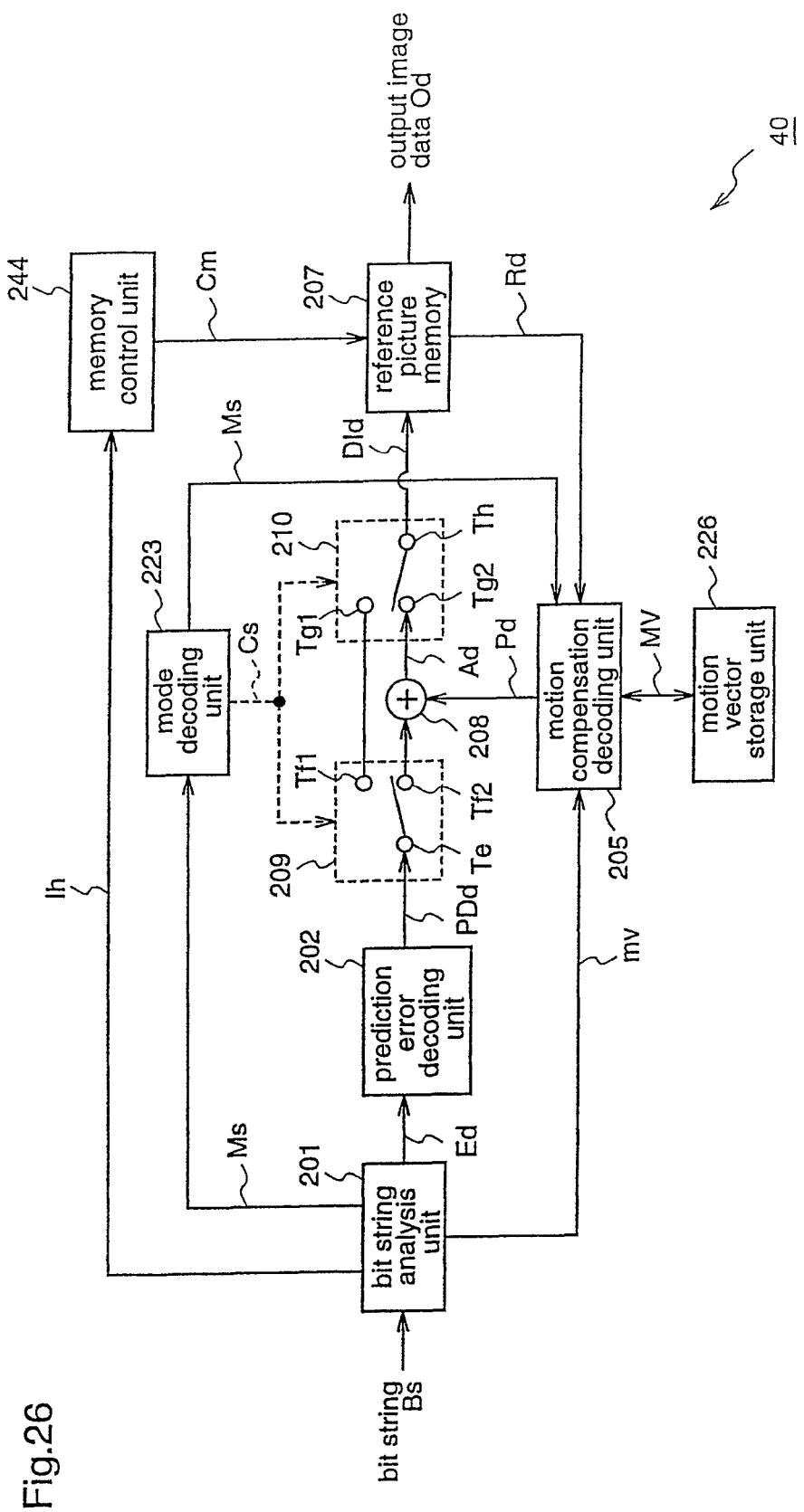
FIG. 26 is a block diagram for explaining a moving picture decoding apparatus according to a fourth embodiment of the invention.

FIG. 26 is a block diagram for explaining a moving picture decoding apparatus 40 according to a fourth embodiment of the present invention.

The moving picture decoding apparatus 40 receives the bit stream outputted from the moving picture coding apparatus 30 of the third embodiment, and performs decoding of each picture, on the basis of information indicating which of the default assignment method and the adaptive assignment method should be used when assigning reference picture indices (assignment method instruction information), which information is included in the bit stream.

That is, one operation mode of the moving picture decoding apparatus 40 according to the fourth embodiment is the operation of the moving picture coding apparatus 20 according to the second embodiment. In other words, when the default assignment method is used as a reference picture index assignment method in the moving picture decoding apparatus 40, the operation of the moving picture decoding apparatus 40 is identical to that of the moving picture decoding apparatus 20.

Hereinafter, the moving picture decoding apparatus 40 will be described in detail.

The moving picture decoding apparatus 40 is provided with a memory control unit 244, instead of the memory control unit 204 of the moving picture decoding apparatus 20 according to the second embodiment. The memory control unit 244 performs memory management according to either the default assignment method or the adaptive assignment method, on the basis of the assignment method instruction information included in the bit stream as header information.

Other components of the moving picture decoding apparatus 40 according to the fourth embodiment are identical to those of the moving picture decoding apparatus 20 according to the second embodiment.

Hereinafter, the operation of the moving picture decoding apparatus 40 will be described.

The moving picture decoding apparatus 40 operates in accordance with the assignment method instruction information that is included as header information in the bit stream supplied from the moving picture coding apparatus 30.

That is, when the default assignment method is selected as a reference picture index assignment method at the coding end, i.e., when information indicating that the default assignment method is selected is included in the bit stream, the moving picture decoding apparatus 40 operates in the same manner as the moving picture decoding apparatus 20 of the second embodiment.

On the other hand, when the adaptive assignment method is selected as a reference picture index assignment method at the coding end, i.e., when information indicating that the adaptive assignment method is selected is included in the bit stream, the moving picture decoding apparatus 40 operates in accordance with the adaptive assignment method. In this case, since information indicating how the assignment of reference picture indices is carried out is also included as header information in the bit stream, assignment of reference picture indices is carried out according to this information.

Hereinafter, a description will be given of the operation of the moving picture decoding apparatus 40 in the case where the adaptive assignment method is selected.

In the reference picture memory 207, as shown in FIG. 24, reference candidate pictures stored in the respective memory area are rewritten every time a target picture is processed.

To be specific, when the target picture to be decoded is the picture B12, decoding of a target block in the picture B12 is carried out with reference to a reference picture that is selected from candidate pictures according to the header information of the target block.

For example, when the coding mode for the target block is the bidirectional predictive mode, a candidate picture, which is given the same reference picture index as the reference picture index that is included in the header information of the target block, is selected as a forward reference picture from among the candidate pictures P10, B11, and P7. When the reference picture index included in the header information of the target block is [1], the candidate picture B11 is selected as a forward reference picture. Then, the target block is subjected to bidirectional predictive decoding with reference to the candidate picture B11 as a forward reference picture, and the picture P13 as a backward reference picture.

Further, when the decoding mode of the target block is the direct mode, a candidate picture (picture P10) which is given the reference picture index [0] is selected as a forward reference picture from among the candidate pictures P7, P10, and B9. Then, the target block is decoded with reference to the candidate picture P10 as a forward reference picture, and the picture P13 as a backward reference picture.

As described above, according to the fourth embodiment, the reference picture memory 207 is managed as shown in FIG. 24, that is, memory management is carried out using, as the reference picture indices of the respective candidate pictures, those obtained by changing the reference picture indices assigned by the default assignment method, according to the coding status. Therefore, it is possible to realize a decoding method adaptive to a coding method in which the reference picture indices of the candidate pictures are rewritten according to the coding efficiency.

That is, since, in the second embodiment, a smaller reference picture index is given to a reference candidate picture that is timewise closer to the target picture, only the picture B11 that is timewise closest to the target picture B12 can be used as a reference picture in the direct mode. In this fourth embodiment, however, a picture other than the picture B11 closest to the target picture B12 can be used as a forward reference picture.

Further, in this case, since the picture to be referred to in decoding a block in the picture B12 in the direct mode is not the picture B11 but the picture B10, decoding of the picture B11 becomes unnecessary. Accordingly, as shown in FIG. 25(*a*), a B picture immediately after a P picture can be processed without decoding it, whereby speedup of decoding is achieved when the picture B11 is not necessary. Further, since decoding can be carried out even when the data of the picture B11 is lost due to transmission error or the like, reliability of decoding is improved.

As described above, when a reference picture index to be assigned to each reference candidate picture is arbitrarily selected according to the coding status to intentionally determine a picture to be referred to in the direct mode, a predetermined picture can be processed without decoding it as shown in FIG. 25(*a*).

Furthermore, even when three B pictures are placed between P pictures as shown in FIG. 25(*b*), a predetermined picture can be processed without decoding it. Therefore, if a picture that is not needed by the user is previously known at the coding end, such picture can be omitted to reduce the processing time for decoding.

In FIG. 25(*b*), even when the picture B3 is not decoded, other pictures can be decoded.

That is, since, in the second embodiment, the picture B4 is decoded with reference to the picture B3 in the direct mode, the picture B3 must be decoded. In this fourth embodiment, however, since a picture to be referred to in the direct mode is arbitrarily set at the coding end, decoding of the picture B3 can be dispensed with.

Furthermore, when the target block is processed in the direct mode at the decoding end, since the forward reference candidate picture to which the reference picture index [0] is assigned is immediately used as a reference picture, decoding time can be reduced.

While in the first to fourth embodiments a B picture is not referred to when coding or decoding a P picture, a B picture may be referred to when coding or decoding a P picture.

Further, while in the first to fourth embodiments a time-basis distance between pictures is calculated according to the display times of the respective pictures, it may be calculated according to information other than time information such as the display times of pictures.

For example, a counter value that is incremented every time a picture is processed is set, and a time-basis distance between pictures may be calculated according to this count value.

To be specific, when time information is included in both of a video stream and an audio stream corresponding to a single contents, it is not easy to manage video data and audio data on the basis of the time information so as to maintain synchronization between these data, because a unit of time information is small. However, management considering synchronization between video data and audio data is facilitated by managing arrangement of the respective pictures with the counter value.

Furthermore, in the first to fourth embodiments, a header section and a data section in a data processing unit, such as a GOP or a picture, are not separated from each other, and they are included in a bit stream corresponding to each data processing unit to be transferred. However, the header section and the data section may be separated from each other to be transferred in different streams.

For example, when a stream is transferred in units of data transfer such as packets into which the stream is divided, a header section and a data section corresponding to a picture may be transferred separately from each other. In this case, the header section and the data section are not always included in the same stream. However, in data transfer using packets, even when the header section and the data section are not continuously transferred, the corresponding header section and data section are merely transferred in different packets, and the relationship between the corresponding header section and data section is stored in header information of each packet, and therefore, it is substantially identical to that the header section and the data section are included in the same bit stream.

Furthermore, while in the first to fourth embodiments the reference picture indices are used as information for identifying which one of plural reference candidate pictures is referred to in coding a target block, the reference picture indices may be used as information indicating the positions of plural forward reference candidate pictures for a target picture to be coded or decoded. To be specific, in the reference picture index assignment methods according to the first and second embodiments or the default assignment methods according to the third and fourth embodiments, reference picture indices are assigned to the plural forward reference candidate pictures such that a smaller reference picture index is assigned to a candidate picture closer to the target picture, and therefore, the position of each forward reference candidate picture (i.e., the ordinal rank of each forward reference candidate picture in nearness to the target picture, among all forward reference candidate pictures) can be detected according to the reference picture index assigned to the forward reference candidate picture.

Furthermore, position identification information indicating the positions of the respective pictures constituting a moving picture on the display time axis may be included in the bit stream corresponding to the moving picture, separately from the reference picture indices indicating the relative positions of the forward reference candidate pictures. The position identification information is different from the time information indicating the display times of pictures, and it is information specifying the relative positions of the respective pictures.

Moreover, in the first to fourth embodiments, a picture that is to be backward referred to when coding a block in a target picture to be coded or decoded (backward reference picture for a target picture) is used as a base picture in the direct mode. However, a base picture to be used in the direct mode may be an already-processed picture other than the backward reference picture for the target picture, e.g., a picture to be forward referred to when coding the block in the target picture.

Embodiment 5

Figure 27:
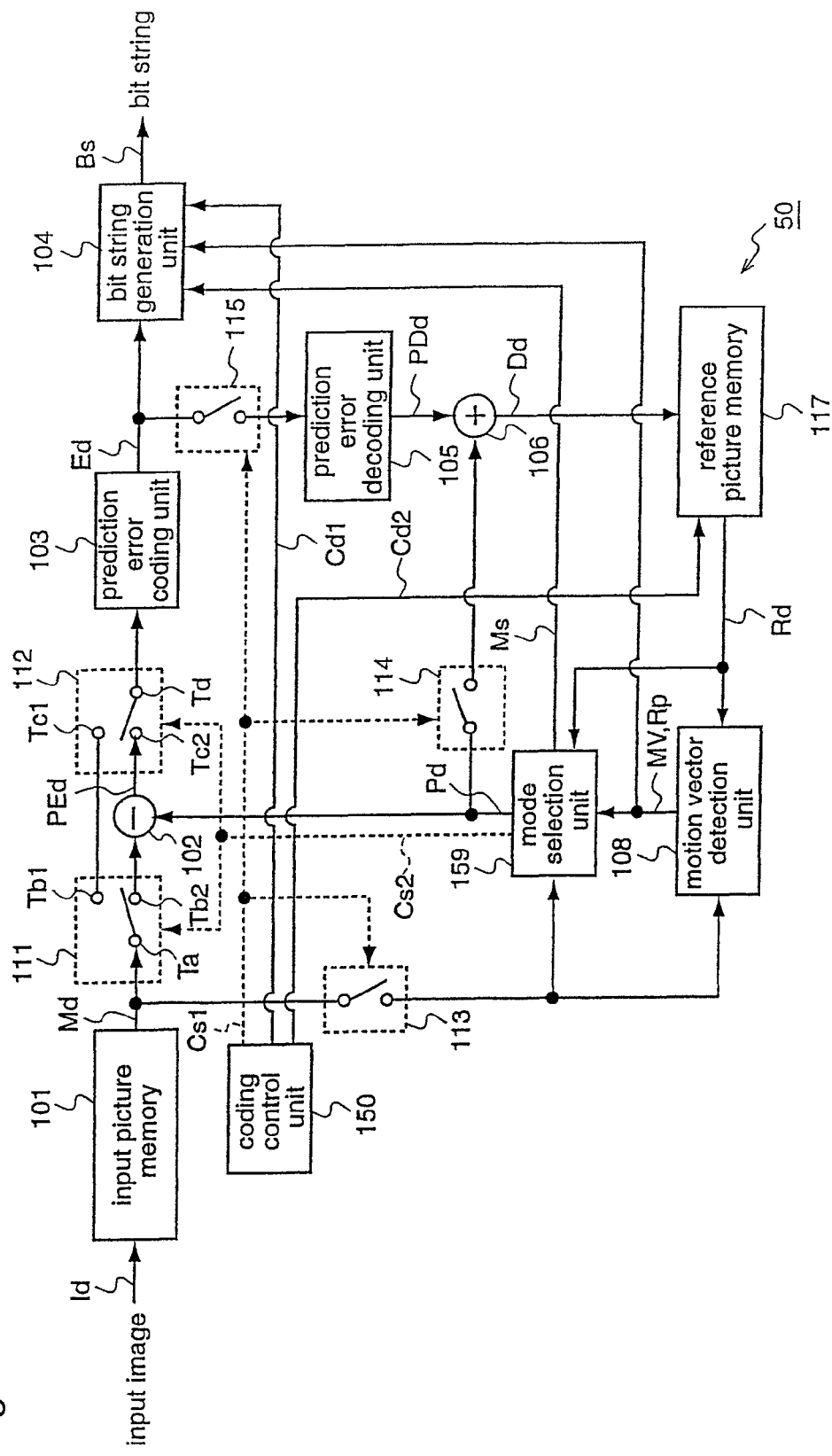
FIG. 27 is a block diagram for explaining a moving picture coding apparatus according to a fifth embodiment of the invention.

FIG. 27 is a block diagram for explaining a moving picture coding apparatus 50 according to a fifth embodiment of the present invention.

This moving picture coding apparatus 50 is different from the moving picture coding apparatus 10 according to the first embodiment in candidate pictures for forward reference pictures to be referred to when coding a P picture and a B picture, and coding modes for a B picture.

That is, the moving picture coding apparatus 50 is provided with, instead of the control unit 110 and the mode selection unit 109 according to the first embodiment, a control unit 150 and a mode selection unit 159 which operate in different manners from those described for the first embodiment.

To be specific, the control unit 150 according to the fifth embodiment controls a reference picture memory 117 such that, when coding a P picture, four pictures (I or P pictures) which are positioned forward the P picture are used as candidate pictures for forward reference, and when coding a B picture, four pictures (I or P pictures) which are positioned forward the B picture, a forward B picture that is closest to the B picture, and a backward I or P picture are used as candidate pictures.

Further, when coding a block (target block) in a P picture, the mode selection unit 159 according to the fifth embodiment selects, as a coding mode for the target block, one from among plural modes as follows: intra-picture coding, inter-picture predictive coding using a motion vector, and inter-picture predictive coding using no motion vector (a motion is treated as zero). When coding a block (target block) in a B picture, the mode selection unit 159 selects, as a coding mode for the target block, one from among plural modes as follows: intra-picture coding, inter-picture predictive coding using a forward motion vector, inter-picture predictive coding using backward motion vector, and inter-picture predictive coding using a forward motion vector and a backward motion vector. That is, the mode selection unit 159 of the moving picture coding apparatus 50 according to this fifth embodiment is different from the mode selection unit 109 of the moving picture coding apparatus 10 according to the first embodiment only in that it does not use the direct mode, and therefore, the moving picture coding apparatus 50 does not have the motion vector storage unit 116 of the moving picture coding apparatus 10.

Further, the moving picture coding apparatus 50 according to the fifth embodiment is identical to the moving picture coding apparatus 10 according to the first embodiment except the coding control unit 150 and the mode selection unit 159.

Next, the operation of the moving picture coding apparatus 50 will be described.

Figures 29A, 29B:
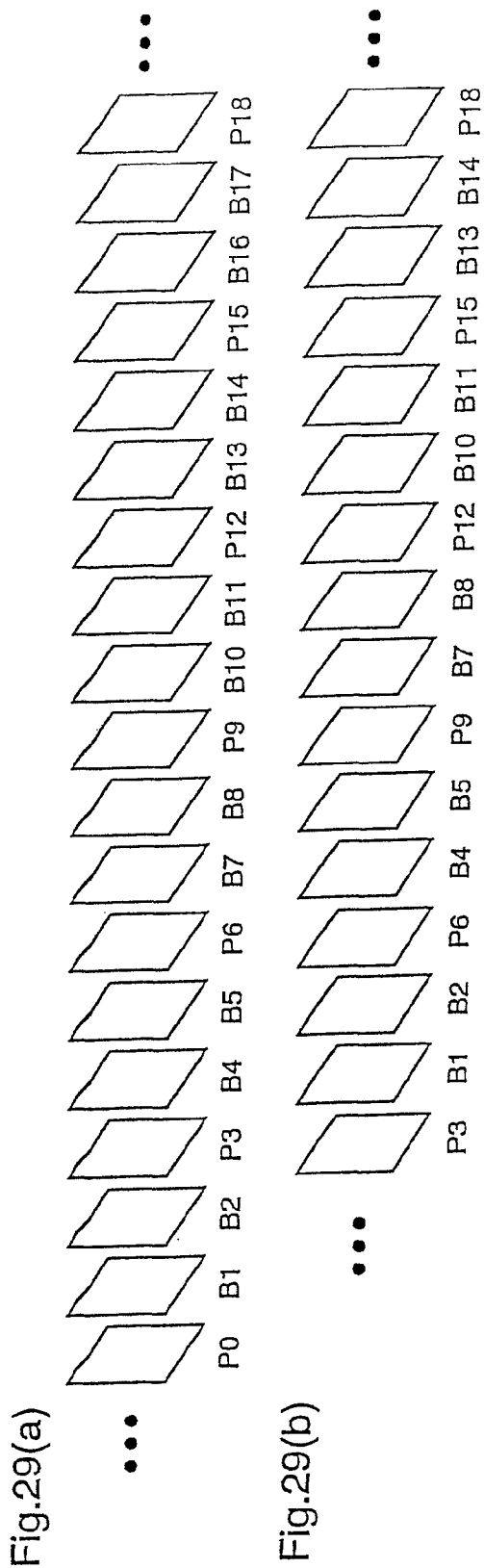
FIGS. 29(a) and 29(b) are diagrams for explaining the fifth embodiment, illustrating pictures arranged in order of display (29(a)), and pictures arranged in order of coding.

Input pictures are stored in the input picture memory 101, in units of pictures, in order of display times. As shown in FIG. 29(a), input pictures P0, B1, B2, P3, B4, B5, P6, B7, B8, P9, B10, B11, P12, B13, B14, P15, B16, B17, and P18 are stored in the input picture memory 101 in order of display times.

The respective pictures stored in the input picture memory 101 are rearranged in order of coding as shown in FIG. 29(b). This rearrangement is carried out according to the relationships between target pictures and reference pictures in inter-picture predictive coding. That is, rearrangement of the input pictures is carried out such that a second picture to be used as a candidate for a reference picture when coding a first picture should be coded prior to the first picture.

In this fifth embodiment, when coding a P picture (target picture), four pictures (I or P pictures) which are positioned timewise forward and close to the target picture are used as candidates for a reference picture. Further, when coding a B picture, four pictures (I or P pictures) which are positioned timewise forward and close to the target picture, a B picture which is positioned timewise forward and closest to the target picture, and an I or P picture which is positioned timewise backward and closest to the target picture, are used as candidates for a reference picture.

The respective pictures rearranged in the input picture memory 101 are read out for each unit of motion compensation. In this fifth embodiment, the unit of motion compensation is a rectangle area (macroblock) in which pixels are arranged in matrix, having a size of 16 pixels in the horizontal direction×16 pixels in the vertical direction. In the following description, a macroblock is simply referred to as a block.

Hereinafter, coding processes for the pictures P15, B13, and B14 will be described in this order.

Coding Process for Picture P15

Since the picture P15 is a P picture, this picture is subjected to inter-picture predictive coding using forward reference. Further, in coding a P picture, no B picture is used as a reference picture.

FIG. 28 shows the manner of picture management in the reference picture memory 117.

For example, at start of coding the picture P15, in the reference picture memory 117, the pictures P12, B11, P9, P6, and P3 are stored in memory areas to which logical memory numbers are assigned, in ascending order of the logical memory numbers. These pictures have already been coded, and the image data stored in the reference picture memory 117 are image data which have been decoded in the moving picture coding apparatus 50. Hereinafter, for simplification, a picture whose image data is stored in the memory is referred to as a picture stored in the memory.

The reference candidate pictures stored in the reference picture memory 117 are assigned reference picture indices, under control of the coding control unit 150. The assignment of reference picture indices is carried out not in order of picture coding but in order of display times. To be specific, a smaller reference picture index is assigned to a newer reference candidate picture, i.e., a reference candidate picture which is later in the display order. However, in coding a P picture, no reference picture indices are assigned to B pictures. Further, in coding a B picture, a newest reference candidate picture is assigned a code [b] indicating that this picture should be treated as a backward reference picture.

According to the above-mentioned reference picture index determining method, as shown in FIG. 28, reference picture indices [0], [1], [2], and [3] are assigned to the pictures P12, P9, P6, and P3, respectively, and no reference picture index is assigned to the picture B11.

By the way, in coding a P picture, the coding control unit 150 controls the respective switches so that the switches 113, 114, and 115 are turned ON. A block in the picture P15 that is read from the input picture memory 101 is input to the motion vector detection unit 108, the mode selection unit 109, and the difference calculation unit 102.

The motion vector detection unit 108 detects a motion vector of the block in the picture P15, using the pictures P12, P9, P6, and P3 to which the reference picture indices are assigned, among the pictures stored in the input picture memory 117. In this case, an optimum reference candidate picture is selected from among the pictures P12, P9, P6, and P3, and detection of the motion vector is carried out with reference to the selected reference picture. Then, the detected motion vector is output to the mode selection unit 159 and the bit stream generation unit 104. Further, information Rp indicating which one of the pictures P12, P9, P6, and P3 is referred to in detecting the motion vector, i.e., the reference picture index, is also output to the mode selection unit 159.

The mode selection unit 159 determines a coding mode for the block in the picture P15, using the motion vector detected by the motion vector detection unit 108. The coding mode indicates a method for coding the block. For example, for a block in a P picture, a coding mode is selected from among the following coding modes: intra-picture coding, inter-picture predictive coding using a motion vector, and an inter-picture predictive coding using no motion vector (i.e., motion is regarded as 0). Generally, selection of a coding mode is carried out so that coding error at a predetermined amount of bits is minimized.

The coding mode Ms determined by the mode selection unit 159 is output to the bit stream generation unit 104. Further, when the determined coding mode is the coding mode which performs forward reference, the reference picture index is also output to the bit stream generation unit 104.

Further, a prediction image Pd which is obtained according to the coding mode determined by the mode selection unit 152 is output to the difference calculation unit 102 and the addition unit 106. However, when the intra-picture coding is selected, no prediction image Pd is outputted. Further, when the intra-picture coding is selected, the switch 111 is controlled so that the input terminal Ta is connected to the output terminal Tb2, and the switch 112 is controlled so that the output terminal Td is connected to the input terminal Tc2.

Hereinafter, a description will be given of a case where the inter-picture predictive coding is selected in the mode selection unit 109. Since the operations of the difference calculation unit 102, prediction error coding unit 103, bit stream generation unit 104, and prediction error decoding unit 105 are identical to those mentioned for the first embodiment, repeated description is not necessary.

When coding of all blocks in the picture P15 is completed, the coding control unit 150 updates the logical memory numbers and the reference picture indices corresponding to the pictures stored in the reference picture memory 117.

That is, since the coded picture P15 is later than any pictures stored in the reference picture memory 117, in the display time order, the picture P15 is stored in the memory area on which the logical memory number (0) is set. Then, the logical memory numbers of the memory areas where other reference pictures have already been stored are incremented by 1.

Further, since the next target picture to be coded is the picture B13 that is a B picture, a reference picture index is also assigned to the picture B11. Thereby, the pictures P15, P12, B11, P9, P6, and P3 are stored in the memory areas on which the logical memory numbers (0)~(5) are set, respectively, and the reference picture indices [0], [1], [2], [3], and [4] are assigned to the pictures P12, B11, P9, P6, and P3, respectively. Since the next target picture is a B picture, the picture P15 stored in the memory area of the logical memory number 0 is assigned a code [b] indicating that this picture is treated as a backward reference picture, instead of the reference picture index.

Coding Process for Picture B13

Since the picture B13 is a B picture, this picture is subjected to inter-picture predictive coding using bidirectional reference. In this case, four I or P pictures which are timewise close to the target picture, and a B picture which is timewise closest to the target picture are used as candidate pictures for forward reference, and an I or P picture which is timewise closest to the target picture is used as a candidate picture for backward reference. Accordingly, the candidate pictures for forward reference for the picture B13 are the pictures P12, B11, P9, P6, and P3, and the candidate picture for backward reference for the picture B13 is the picture P15. These reference candidate pictures are stored in the reference picture memory 117. These reference candidate pictures are assigned logical memory numbers and reference picture indices as shown in FIG. 28.

In coding a B picture, the coding control unit 150 controls the respective switches so that the switches 113, 114, and 115 are turned ON. Accordingly, a block in the picture B11 that is read from the input picture memory 101 is input to the motion vector detection unit 108, the mode selection unit 109, and the difference calculation unit 102.

The motion vector detection unit 108 detects a forward motion vector and a backward motion vector of the block in the picture B13, using the pictures P12, B11, P9, P6, and P3 stored in the reference picture memory 117, as candidate pictures for forward reference, and the picture P15 as a candidate picture for backward reference. In this case, an optimum picture is selected from among the pictures P12, B11, P9, P6, and P3, and detection of the forward motion vector is carried out with reference to the selected picture. Then, the detected motion vector is output to the mode selection unit 159 and the bit stream generation unit 104. Further, information Rp indicating which one of the pictures P12, B11, P9, P6, and P3 is referred to in detecting the forward motion vector, i.e., the reference picture index, is also output to the mode selection unit 159.

The operations of the mode selection unit 150, difference calculation unit 102, bit stream generation unit 104, and prediction error decoding unit 105 are identical to those for coding the picture P15.

When coding of all blocks in the picture B13 is completed, the coding control unit 150 updates the logical memory numbers and the reference picture indices corresponding to the pictures stored in the reference picture memory 117.

That is, since the picture B13 is positioned, in order of display times, before the picture P15 stored in the reference picture memory 117, and later than the picture P12 stored in the reference picture memory 17, the picture B13 is stored in the memory area on which the logical memory number (1) is set. Further, since the picture B11 is not used as a reference picture in coding the subsequent pictures, the picture B11 is deleted. At this time, information indicating that the picture B11 is deleted from the reference picture memory is output to the bit stream generation unit 104 as a control signal Cs1. The bit stream generation unit 104 describes this information as header information in the bit stream. Further, the logical memory number of the memory area corresponding to the picture P12 is incremented by 1.

The next target picture to be coded is the picture B14 that is a B picture. Accordingly, the picture stored in the memory area with the logical memory number (0) is used as a backward reference picture, and reference picture indices are assigned to the other pictures. Thereby, the pictures P15, B13, P12, P9, P6, and P3 are stored in the memory areas corresponding to the logical memory numbers (0)~(5), respectively, and the reference picture indices [0], [1], [2], [3], and [4] are assigned to the pictures B13, P12, P9, P6, and P3, respectively.

Coding Process for Picture B14

Since the picture B14 is a B picture, this picture is subjected to inter-picture predictive coding using bidirectional reference. In this case, as reference pictures for the picture B14, the pictures B13, P12, P9, P6, and P3 are used as forward reference pictures, and the picture P15 is used as a backward reference picture. In processing a B picture, the coding control unit 150 controls the respective switches so that the switches 113, 114, and 115 are turned ON. Accordingly, a block in the picture B14 that is read from the input picture memory 101 is input to the motion vector detection unit 108, the mode selection unit 109, and the difference calculation unit 102.

The motion vector detection unit 108 detects a forward motion vector and a backward motion vector of the block in the picture B14, using the pictures B13, P12, P9, P6, and P3 stored in the reference picture memory 117, as candidate pictures for forward reference, and the picture P15 as a candidate picture for backward reference. In this case, an optimum picture is selected from among the pictures B13, P12, P9, P6, and P3, and detection of the forward motion vector is carried out with reference to the selected picture. Then, the detected motion vector is output to the mode selection unit 159 and the bit stream generation unit 104. Further, information Rp indicating which one of the pictures B13, P12, P9, P6, and P3 is referred to in detecting the forward motion vector, i.e., the reference picture index, is also output to the mode selection unit 159.

The operations of the mode selection unit 150, difference calculation unit 102, bit stream generation unit 104, prediction error decoding unit 105, and addition unit 106 are similar to those for coding the picture P15.

When coding of all blocks in the picture B14 is completed, the coding control unit 150 updates the logical memory numbers and the reference picture indices corresponding to the pictures stored in the reference picture memory 117.

That is, since, in order of display times, the picture B14 is positioned before the picture P15 stored in the reference picture memory 117 and later than the picture B13 stored in the reference picture memory 117, the picture B14 is stored in the memory area on which the logical memory number (1) is set. Further, since the picture B13 is not used as a reference picture in coding the subsequent pictures, the picture B13 is deleted. At this time, information indicating that the picture B13 is deleted from the reference picture memory is output to the bit stream generation unit 104 as a control signal Cd1. The bit stream generation unit 104 describes this information as header information in the bit stream.

The next target picture to be coded is the picture P18 that is a P picture. Accordingly, reference picture indices are assigned to the pictures other than B pictures. Thereby, the pictures P15, B14, P12, P9, and P6 are stored in the memory areas corresponding to the logical memory numbers (0)~(5), respectively, and the reference picture indices [0], [1], [2], and [3] are assigned to the pictures P15, P12, P9, and P6, respectively.

As described above, according to the fifth embodiment, plural candidate pictures for forward reference for a target picture to be coded are assigned reference picture indices such that a smaller index is assigned to a candidate picture whose display time is later (i.e., information for identifying which one of the candidate pictures is used in detecting the forward motion vector of the target block). Therefore, a candidate picture which is most likely to be selected as a reference picture among the plural candidate pictures is assigned a smaller reference picture index. Accordingly, the amount of codes of the reference picture indices can be minimized, resulting in an increase in coding efficiency.

Hereinafter, the effects of this fifth embodiment will be described taking a case where coding of a B picture is carried out using another B pictures as a reference candidate picture, together with the problems of the prior art.

For example, it is assumed that pictures of a moving picture are arranged in order of display as shown in FIG. 29(a), and four P pictures and one B picture are used as candidate pictures for forward reference in coding a target picture.

FIG. 30 shows an example of management of pictures stored in the reference picture memory. The candidate pictures are stored in order of coding, in the memory.

When coding the picture P15, in the reference picture memory, the pictures B11, P12, P9, P6, and P3 are stored in the memory areas, in ascending order of the logical memory numbers. Further these candidate pictures are assigned the reference picture indices [0], [1], [2], [3], and [4], respectively. Therefore, a reference picture index is assigned to a B picture (picture B11 in this case) which is not used as a reference picture in coding a P picture, and the reference picture index not to be used causes degradation in coding efficiency.

Further, when coding the picture B13, in the reference picture memory, the pictures P15, B11, P12, P9, P6, and P3 are stored in the memory areas, in ascending order of the logical memory numbers. The picture P15 is assigned a code [b] indicating that this picture is used as a backward reference picture, and the remaining pictures are assigned the reference picture indices [0], [1], [2], [3], and [4], respectively. Therefore, the reference picture index assigned to the picture B11 that is timewise far from the picture B13 (target picture) is smaller than the reference picture index assigned to the picture P12 that is timewise close to the target picture B13. In performing motion detection, generally, a candidate picture that is timewise closer to a target picture is more likely to be used as a reference picture. Accordingly, when the reference picture index of the picture B11 that is far from the target picture is smaller than the reference picture index of the picture P12 that is close to the target picture, coding efficiency is degraded.

Furthermore, when coding the picture B14, in the reference picture memory, the pictures B13, P15, B11, P12, P9, and P6 are stored in the memory areas, in ascending order of the logical memory numbers. The picture B13 is assigned a code [b] indicating that this picture is used as a backward reference picture, and the remaining pictures are assigned the reference picture indices [0], [1], [2], [3], and [4], respectively. Therefore, the picture P15, which should actually be used as a candidate picture for backward reference for the picture B14, is used as a candidate picture for forward reference. Moreover, the picture B13, which should actually be used as a candidate picture for forward reference for the picture B14, is used as a candidate picture for backward reference. As a result, it becomes difficult to perform correct coding. Further, in coding the picture B14, the picture B11 which is not used as a reference picture exists in the reference picture memory.

On the other hand, according to the fifth embodiment of the invention, as shown in FIG. 28, the reference candidate pictures for the target picture are stored in order of display in the reference picture memory, and the candidate pictures for forward reference are assigned the reference picture indices such that a candidate picture whose display time is later is assigned a smaller reference picture index, and therefore, a candidate picture which is more likely to be selected as a reference picture from among the candidate pictures is assigned a smaller reference picture index. Thereby, the amount of codes of the reference picture indices can be minimized, resulting in an increase in coding efficiency.

Further, since, in coding a P picture, no reference picture indices are assigned to B pictures, occurrence of reference picture indices that will never be used is avoided, resulting in a further increase in coding efficiency.

Moreover, when coding a B picture, no reference picture index is assigned to the picture that is stored in the memory area corresponding to the smallest logical memory number, and this picture is used as a backward reference picture. Therefore, in predictive coding of a B picture, a P picture to be used as a backward reference picture is prevented from being used as a forward reference picture.

Further, when a picture that is not used as a reference picture is deleted from the reference picture memory, information indicating this deletion is described in the bit stream. Therefore, the decoding end can detect that the picture which is not to be used as a reference picture in decoding a target picture and the following pictures, is deleted from the reference picture memory.

In this fifth embodiment, motion compensation is performed in units of image spaces (macroblocks) each comprising 16 pixels in the horizontal direction×16 pixels in the vertical direction, and coding of a prediction error image is performed in units of image spaces (subblocks) each comprising 8 pixels in the horizontal direction×8 pixels in the vertical direction. However, the number of pixels in each macroblock (subblock) in motion compensation (coding of a prediction error image) may be different from that described for the fifth embodiment.

Further, while in this fifth embodiment the number of continuous B pictures is two, the number of continuous B pictures may be three or more.

Further, while in this fifth embodiment four pictures are used as candidate pictures for a forward reference picture in coding a P picture, the number of forward reference candidate pictures for a P picture may be other than four.

Furthermore, while in this fifth embodiment four P pictures and one B picture are used as candidate pictures for a forward reference picture in coding a B picture, forward reference candidate pictures for a B picture are not restricted thereto.

Furthermore, in this fifth embodiment, each of plural pictures constituting a moving picture, which is a target picture to be coded, is used as a reference picture when coding another picture that follows the target picture. However, the plural pictures constituting a moving picture may include pictures not to be used as reference pictures. In this case, the pictures not to be used as reference pictures are not stored in the reference picture memory, whereby the same effects as described for the fifth embodiment can be achieved.

Furthermore, while in this fifth embodiment coding of a B picture is carried out using another B picture as a reference candidate picture, coding of a B picture may be carried out without referring to another B picture. In this case, no B pictures are stored in the reference picture memory. Also in this case, the same effects as described for the fifth embodiment can be achieved by assigning reference picture indices according to the order of picture display times.

Furthermore, while in this fifth embodiment a single system of reference picture indices are assigned, different systems of reference picture indices may be assigned in the forward direction and the backward direction, respectively.

Moreover, while in this fifth embodiment a smaller reference picture index is assigned to a candidate picture for forward reference whose display time is later, the reference picture index assignment method is not restricted thereto so long as a smaller reference picture index is assigned to a candidate picture that is more likely to be selected as a reference picture.

Figure 31:
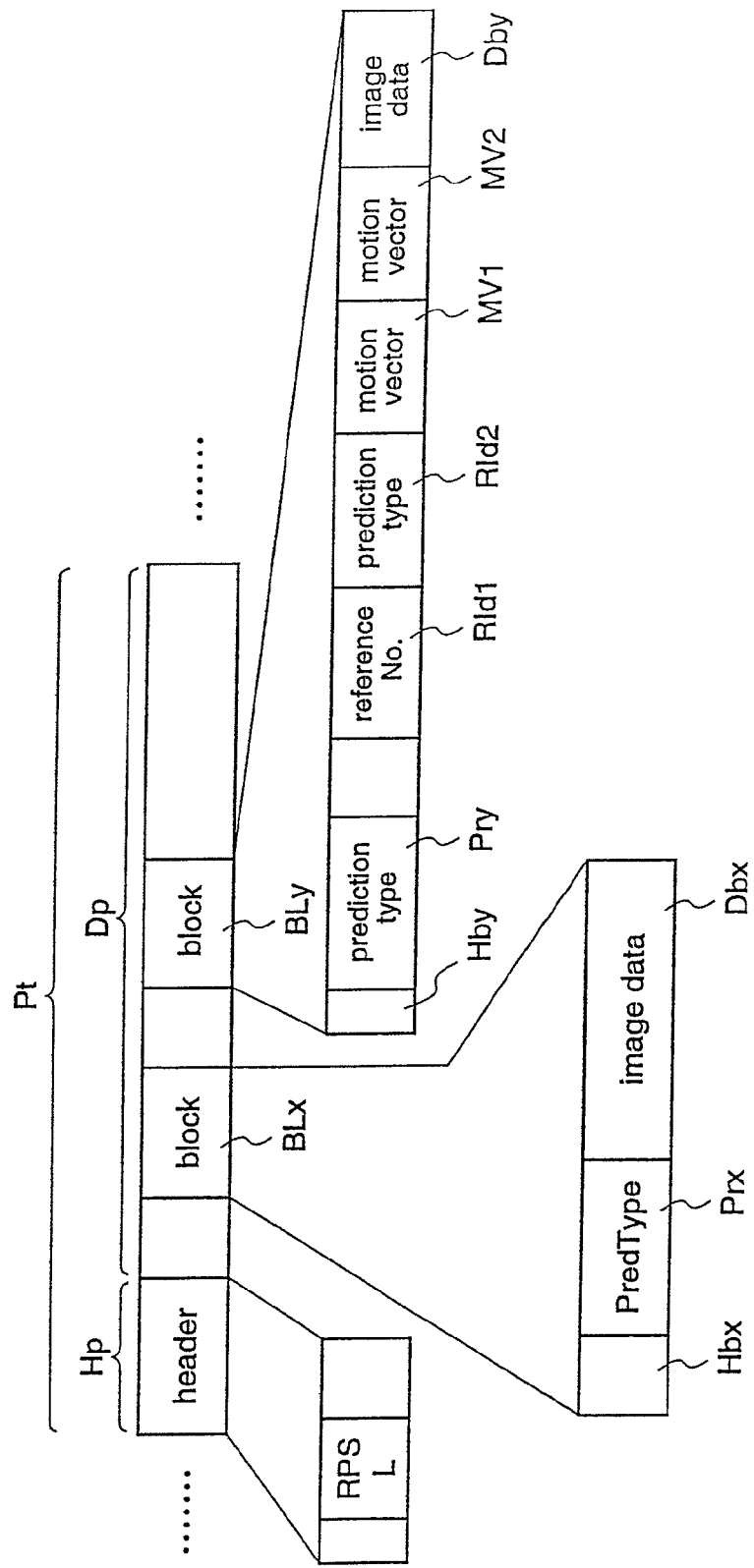
FIG. 31 is a diagram for explaining the fifth embodiment, illustrating a data structure of a bit stream corresponding to a block in a case where two systems of reference picture indices are used.

FIG. 31 is a conceptual diagram illustrating the structure of a bit stream (format of a coded image signal) corresponding to pictures to which reference picture indices are assigned.

A coded signal Pt equivalent to one picture includes header information Hp placed at the beginning of the picture, and a data section Dp that follows the header information Hp. The header information Hp includes a control signal (RPSL). The data section Dp includes coded data (bit stream) corresponding to each block.

For example, a bit stream BLx is a bit stream of a block that is coded in intra-picture coding mode, and a bit stream BLy is a bit stream of a block that is coded in inter-picture predictive coding mode other than intra-picture coding mode.

The block bit stream BLx includes header information Hbx, information Prx relating to a coding mode, and coded image information Dbx. The block bit stream BLy includes header information Hby, information Pry relating to a coding mode, first reference picture index R1$d$1, a second reference picture index R1$d$2, a first motion vector MV1, a second motion vector MV2, and coded image information Dby. Which of the first and second reference picture indices R1$d$1 and R1$d$2 should be used is determined from the information Pry relating to the coding mode.

A reference picture index R1$d$1 is assigned to a forward reference candidate picture with priority over a backward reference candidate picture. A reference picture index R1$d$2 is assigned to a backward reference candidate picture with priority over a forward reference candidate picture.

Embodiment 6

Figure 32:
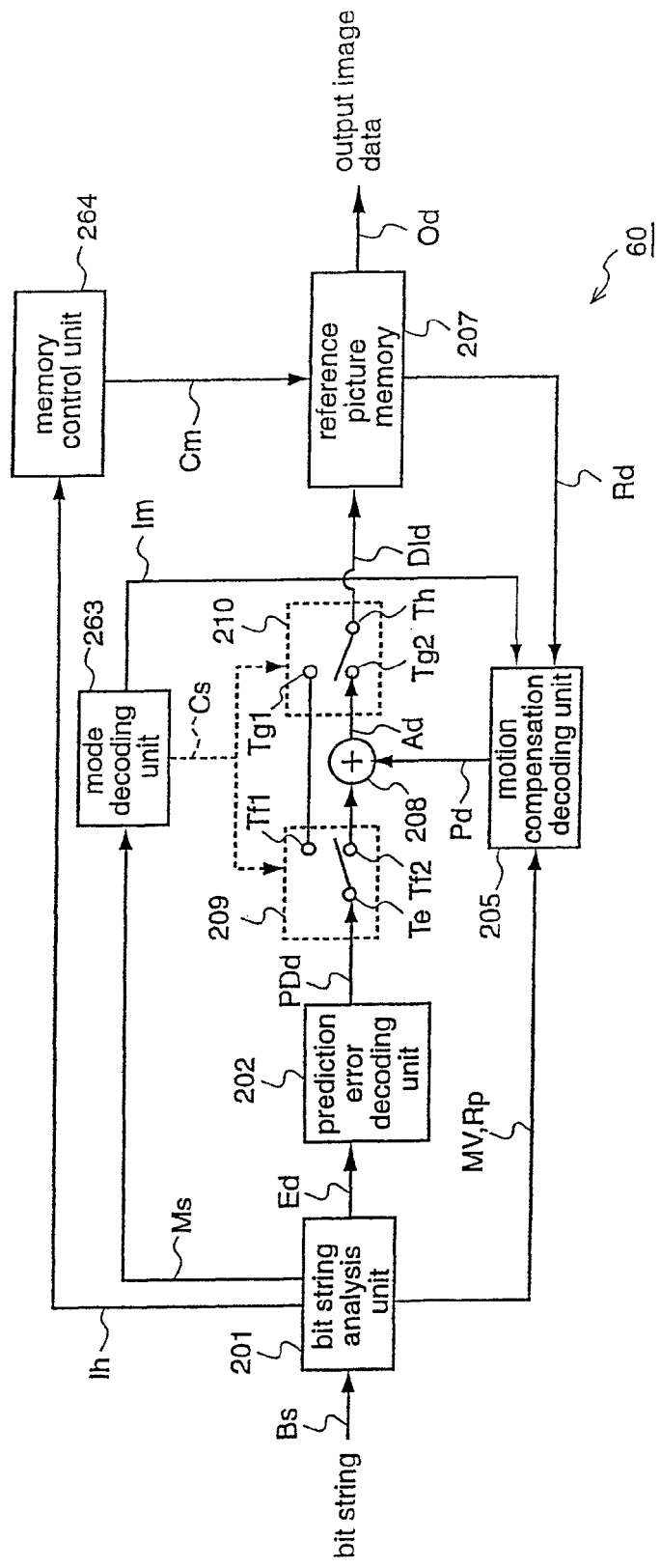
FIG. 32 is a block diagram for explaining a moving picture decoding apparatus according to a sixth embodiment of the present invention.

FIG. 32 is a block diagram for explaining a moving picture decoding apparatus 60 according to a sixth embodiment of the present invention.

The moving picture decoding apparatus 60 according to the sixth embodiment decodes the bit stream Bs outputted from the moving picture coding apparatus 50 according to the fifth embodiment.

The moving picture decoding apparatus 60 is different from the moving picture decoding apparatus 20 according to the second embodiment in candidate pictures for forward reference pictures to be referred to when coding a P picture and a B picture, and coding modes for a B picture.

That is, the moving picture decoding apparatus 60 is provided with, instead of the memory control unit 204 and the mode decoding unit 223 according to the second embodiment, a memory control unit 264 and a mode decoding unit 263 which operate in different manners from those described for the second embodiment.

To be specific, the memory control unit 264 according to the sixth embodiment controls a reference picture memory 207 such that, when decoding a P picture, four pictures (I or P pictures) which are positioned forward the P picture are used as candidate pictures for forward reference, and when decoding a B picture, four pictures (I or P pictures) which are positioned forward the B picture, a forward B picture that is closest to the B picture, and a backward I or P picture are used as candidate pictures.

Further, when decoding a block (target block) in a P picture, the mode decoding unit 263 according to the sixth embodiment selects, as a coding mode for the target block, one from among plural modes as follows: intra-picture decoding, inter-picture predictive decoding using a motion vector, and inter-picture predictive decoding using no motion vector (a motion is treated as zero). When decoding a block (target block) in a B picture, the mode decoding unit 263 selects, as a decoding mode for the target block, one from among plural modes as follows: intra-picture decoding, inter-picture predictive decoding using a forward motion vector, inter-picture predictive decoding using backward motion vector, and inter-picture predictive decoding using a forward motion vector and a backward motion vector.

That is, the mode decoding unit 263 of the moving picture decoding apparatus 60 according to this sixth embodiment is different from the mode decoding unit 223 of the moving picture decoding apparatus 20 according to the second embodiment only in that it does not use a decoding process corresponding to the direct mode, and therefore, the moving picture decoding apparatus 60 does not have the motion vector storage unit 226 of the moving picture decoding apparatus 20.

Further, the moving picture decoding apparatus 60 according to the sixth embodiment is identical to the moving picture decoding apparatus 20 according to the second embodiment except the memory control unit 264 and the mode decoding unit 263.

Next, the operation of the moving picture decoding apparatus 60 will be described.

The bit stream Bs outputted from the moving picture coding apparatus 50 according to the fifth embodiment is input to the moving picture decoding apparatus 60 shown in FIG. 32. In the bit stream Bs, each P picture has been subjected to inter-picture predictive coding, using four I or P pictures which are positioned timewise forward and close to the P picture, as reference candidate pictures. Further, each B picture has been coded using four P pictures which are positioned timewise forward and closest to the B picture, a B picture which is positioned timewise forward the B picture, and an I or P picture which is positioned timewise backward and closest to the B picture.

In this case, the order of the pictures in the bit stream is as shown in FIG. 29($b$).

Hereinafter, decoding processes for the pictures P15, B13, and B14 will be described in this order.

Decoding Process for Picture P15

The bit stream of the picture P15 is input to the bit stream analysis unit 201. The bit stream analysis unit 201 extracts various kinds of data from the inputted bit stream Bs. The various kinds of data are information such as a coding mode, a motion vector, and the like. The extracted information for mode selection (coding mode) Ms is output to the mode decoding unit 263. Further, the extracted motion vector MV is output to the motion compensation decoding unit 205. Furthermore, the prediction error coded data Ed is output to the prediction error decoding unit 202.

The mode decoding unit 263 controls the switches 209 and 210 with reference to the coding mode Ms extracted from the bit stream. When the coding mode is inter-picture coding, the switch 209 is controlled such that the input terminal Te is connected to the output terminal Tf1, and the switch 210 is controlled such that the output terminal Th is connected to the input terminal Tg1. When the coding mode is inter-picture predictive coding, the switch 209 is controlled such that the input terminal Te is connected to the output terminal Tf1, and the switch 210 is controlled such that the output terminal Th is connected to the input terminal Tg2.

Further, the mode decoding unit 263 outputs the coding mode Ms also to the motion compensation decoding unit 205.

Hereinafter, a description will be given of the case where the coding mode is inter-picture predictive coding.

The prediction error decoding unit 202 decodes the inputted coded data Ed to generate prediction error data PDd. The generated prediction error data PDd is output to the switch 209. Since the input terminal Te of the switch 209 is connected to the output terminal Tf1, the prediction error data PDd is output to the addition unit 208.

The motion compensation decoding unit 205 generates a motion compensation image from the inputted information such as the motion vector. The information inputted to the motion compensation decoding unit 205 is the motion vector MV and the reference picture index Rp. The motion compensation decoding unit 205 obtains a motion compensation image (prediction image) from the reference picture memory 207, on the basis of the inputted information. The picture P15 has been coded using the pictures P12, P9, P6, and P3 as candidates for a reference picture, and these candidate pictures have already been decoded and are stored in the reference picture memory 207.

FIG. 28 shows the pictures stored in the reference picture memory 207. As shown in FIG. 28, when decoding the picture P15, the pictures P12, B11, P9, P6, and P3 are stored in the reference picture memory 207.

The memory control unit 264 assigns reference picture indices to the reference candidate pictures stored in the reference picture memory 117. This assignment of reference picture indices is carried according to the order of picture display times such that a smaller reference picture index is assigned to a newer reference candidate picture. In decoding a P picture, no reference picture indices are assigned to B pictures. Accordingly, reference picture indices [0], [1], [2], and [3] are assigned to the pictures P12, P9, P6, and P3, respectively, and no reference picture index is assigned to the picture B11.

The motion compensation decoding unit 205 determines which one of the pictures P12, P9, P6, and P3 is used as a reference picture when coding the target block, from the reference picture indices. Then, the motion compensation decoding unit 205 obtains a prediction image (prediction data Pd) from the reference picture memory 207 on the basis of the determined reference picture and the motion vector to generate a motion compensation image. The motion compensation image so generated is input to the addition unit 208.

The addition unit 208 adds the prediction error data PDd and the motion compensation image to generate a decoded image (data Ad). The decoded image so generated is output through the switch 210 to the reference picture memory 207.

When all of the macroblocks in the picture P15 have been decoded, the memory control unit 264 updates the logical memory numbers and the reference picture indices corresponding to the pictures stored in the reference picture memory 207.

At this time, since, in order of time, the picture P15 is later than any pictures stored in the reference picture memory 117, the picture P15 is stored in the memory area on which the logical memory number (0) is set. Then, the logical memory numbers of the memory areas where other reference pictures have already been stored are incremented by 1.

Further, since the next target picture to be decoded is the picture B13, a reference picture index is assigned to the picture B11. Thereby, the pictures P15, P12, B11, P9, P6, and P3 are stored in the memory areas on which the logical memory numbers (0)~(5) are set, respectively, and the reference picture indices [0], [1], [2], [3], and [4] are assigned to the pictures P12, B11, P9, P6, and P3, respectively.

Decoding Process for Picture B13

Since the operations of the bit stream analysis unit 201, the mode decoding unit 203, and the prediction error decoding unit 202 are identical to those described for decoding of the picture P15, repeated description is not necessary.

The motion compensation decoding unit 205 generates a motion compensation image from the inputted information such as the motion vector. The information inputted to the motion compensation decoding unit 205 is the motion vector and the reference picture index. The picture B13 has been coded using the pictures P12, B11, P9, P6, and P3 as candidate pictures for forward reference, and the picture P15 as a candidate picture for backward reference. At decoding of the picture B13, these candidate pictures have already been decoded and are stored in the reference picture memory 207.

When the coding mode is forward predictive coding or bidirectional predictive coding, the motion compensation decoding unit 205 determines which one of the candidate pictures P12, B11, P9, P6, and P3 is used as a forward reference picture when coding the picture B13, on the basis of the reference picture indices. Then, the motion compensation decoding unit 205 obtains a forward motion compensation image from the reference picture memory 207 on the basis of the determined reference picture and the motion vector. When the coding mode is bidirectional predictive coding or backward predictive coding, the motion compensation decoding unit 205 obtains a backward motion compensation image from the reference picture memory 207 on the basis of the determined reference picture and the backward motion vector. Then, the motion compensation decoding unit 205 generates a motion compensation image (prediction picture) using the forward motion compensation image and the backward motion compensation image.

The motion compensation image so generated is output to the addition unit 208. The addition unit 208 adds the inputted prediction error image and motion compensation image to generate a decoded image. The decoded image so generated is output through the switch 210 to the reference picture memory 207.

When all of the blocks in the picture B13 have been decoded, the memory control unit 264 updates the logical memory numbers and the reference picture indices corresponding to the pictures stored in the reference picture memory 207. Since the picture B13 is forward the picture P15 stored in the reference picture memory 207 in the display time order and it is later than the picture P12 stored in the reference picture memory 207, the picture B13 is stored in the memory area on which the logical memory number (1) is set.

Further, information indicating that the picture B11 is to be deleted from the reference picture memory is described in the bit stream, the memory control unit 264 controls the reference picture memory 207 so as to delete the picture B11 from the memory.

Further, the logical memory number of the memory area where the other reference candidate picture P12 is stored is incremented by 1. Thereby, the pictures P15, B13, P12, P9, P6, and P3 are stored in the memory areas on which the logical memory numbers (0)~(5) are set, respectively, and the reference picture indices [0], [1], [2], [3], and [4] are assigned to the pictures B13, P12, P9, P6, and P3, respectively.

Decoding Process for Picture B14

Since the operations of the bit stream analysis unit 201, the mode decoding unit 203, and the prediction error decoding unit 202 are identical to those described for decoding of the picture P15, repeated description is not necessary.

The motion compensation decoding unit 205 generates a motion compensation image from the inputted information such as the motion vector. The information inputted to the motion compensation decoding unit 205 is the motion vector and the reference picture index. The picture B14 has been coded using the pictures B13, P12, P9, P6, and P3 as candidate pictures for forward reference, and the picture P15 as a candidate picture for backward reference. At decoding of the picture B14, these candidate pictures have already been decoded and are stored in the reference picture memory 207.

When the coding mode is forward predictive coding or bidirectional predictive coding, the motion compensation decoding unit 205 determines which one of the candidate pictures B13, P12, P9, P6, and P3 is used as a forward reference picture when coding the picture B14, on the basis of the reference picture indices. Then, the motion compensation decoding unit 205 obtains a forward motion compensation image from the reference picture memory 207 on the basis of the determined reference picture and the forward motion vector. When the coding mode is bidirectional predictive coding or backward predictive coding, the motion compensation decoding unit 205 obtains a backward motion compensation image from the reference picture memory 207 on the basis of the determined reference picture and the backward motion vector. Then, the motion compensation decoding unit 205 generates a motion compensation image, using the forward motion compensation image and the backward motion compensation image.

The motion compensation image so generated is output to the addition unit 208. The addition unit 208 adds the inputted prediction error image and motion compensation image to generate a decoded image. The decoded image so generated is output through the switch 210 to the reference picture memory 207.

When all of the blocks in the picture B14 have been decoded, the memory control unit 264 updates the logical memory numbers and the reference picture indices corresponding to the pictures stored in the reference picture memory 207. Since the picture B14 is forward the picture P15 stored in the reference picture memory 207 in the display time order and it is later than the picture B13 stored in the input picture memory 207, the picture B14 is stored in the memory area on which the logical memory number (1) is set. Further, since information indicating that the picture B13 is to be deleted from the reference picture memory is described in the bit stream, the memory control unit 264 controls the reference picture memory 207 so as to delete the picture B13 from the memory.

Since the next target picture to be decoded is the picture P18 that is a P picture, reference picture indices are assigned to pictures other than B pictures. Thereby, the pictures P15, B14, P12, P9, and P6 are stored in the memory areas on which the logical memory numbers (0)~(5) are set, respectively, and the reference picture indices [0], [1], [2], [3], and [4] are assigned to the pictures P15, P12, P9, and P6, respectively.

Furthermore, the decoded pictures are outputted from the reference picture memory 207, as output images arranged in order of display times.

Thereafter, the subsequent pictures are similarly decoded according to the picture type.

As described above, according to the sixth embodiment, reference picture indices are assigned to plural candidate pictures for forward reference for a target picture to be decoded such that a smaller reference picture index is assigned to a candidate picture whose display time is later (i.e., information for identifying which candidate picture is referred to in detecting a forward motion vector of a target block), and a reference picture is determined from among the plural candidate pictures on the basis of the reference picture indices included in the bit stream of the target picture. Therefore, a smaller reference picture index is assigned to a candidate picture that is more likely to be used as a reference picture. Accordingly, it is possible to correctly decode a bit stream which is obtained by a highly-efficient coding method that can minimize the amount of codes corresponding to the reference picture indices.

Further, since, in decoding a P picture, no reference picture indices are assigned to B pictures, it is possible to correctly decode a bit stream which is obtained by a highly-efficient coding method that can avoid occurrence of reference picture indices which will never be used.

Furthermore, since, in decoding a B picture, a picture stored in a memory area on which a smallest logic memory number is set is used as a backward reference picture and no reference picture index is assigned to this picture, it is possible to correctly decode a bit stream which is obtained by a highly-efficient coding method that can prevent a P picture from being used as a forward reference picture in predictive coding of a B picture.

Moreover, when information indicating that a picture which will never be used as a reference picture is deleted from the reference picture memory, is described in the bit stream, the reference picture is deleted from the reference picture memory according to the information, whereby the reference picture memory can be effectively used.

Further, in this sixth embodiment, as an arrangement of plural pictures constituting a moving picture, an arrangement of pictures in which two B pictures are placed between adjacent P pictures. However, the number of B pictures placed between adjacent P pictures may be other than two, for example, it may be three or four.

Further, while in this sixth embodiment four pictures are used as candidate pictures for forward reference for a P picture, the number of forward reference candidate pictures for a P picture may be other than four.

While in this sixth embodiment four P pictures and one B picture are used as candidate pictures for forward reference for a B picture, forward reference candidate pictures for a B picture are not restricted thereto.

While in this sixth embodiment each of plural pictures constituting a moving picture is used as a reference picture when decoding another picture that follows this picture, plural pictures constituting a moving picture, which are to be decoded, may include pictures which will never be used as reference pictures. In this case, the pictures useless as reference pictures are not stored in the reference picture memory, whereby the same effects as described for the sixth embodiment can be achieved.

While in this sixth embodiment decoding of a B picture is carried out using another B picture as a reference candidate picture, decoding of a B picture may be carried out without referring to another B picture. In this case, no B pictures are stored in the reference picture memory. Also in this case, the same effects as described for the sixth embodiment can be achieved by assigning reference picture indices according to the order of picture display times.

While in this sixth embodiment, for simplification, a memory for managing reference candidate pictures, and a memory for rearranging decoded pictures in order of display to output them are not separated but described as a single reference picture memory, the moving picture decoding apparatus 60 may be provided with a management memory for managing reference candidate pictures, and a rearrangement memory for rearranging decoded pictures in order of display, respectively.

In this case, the management memory is controlled by the memory controller 264, and outputs reference candidate pictures to the motion compensation decoding unit 205. Further, the rearrangement memory rearranges the decoded pictures arranged in order of decoding, in order of display, and sequentially outputs the pictures.

Further, in this sixth embodiment, assignment of reference picture indices to candidate pictures is carried out according to a single rule, i.e., one system of reference picture indices are used. However, two systems of reference picture indices may be used, as described for the fifth embodiment.

Embodiment 7

Figure 33:
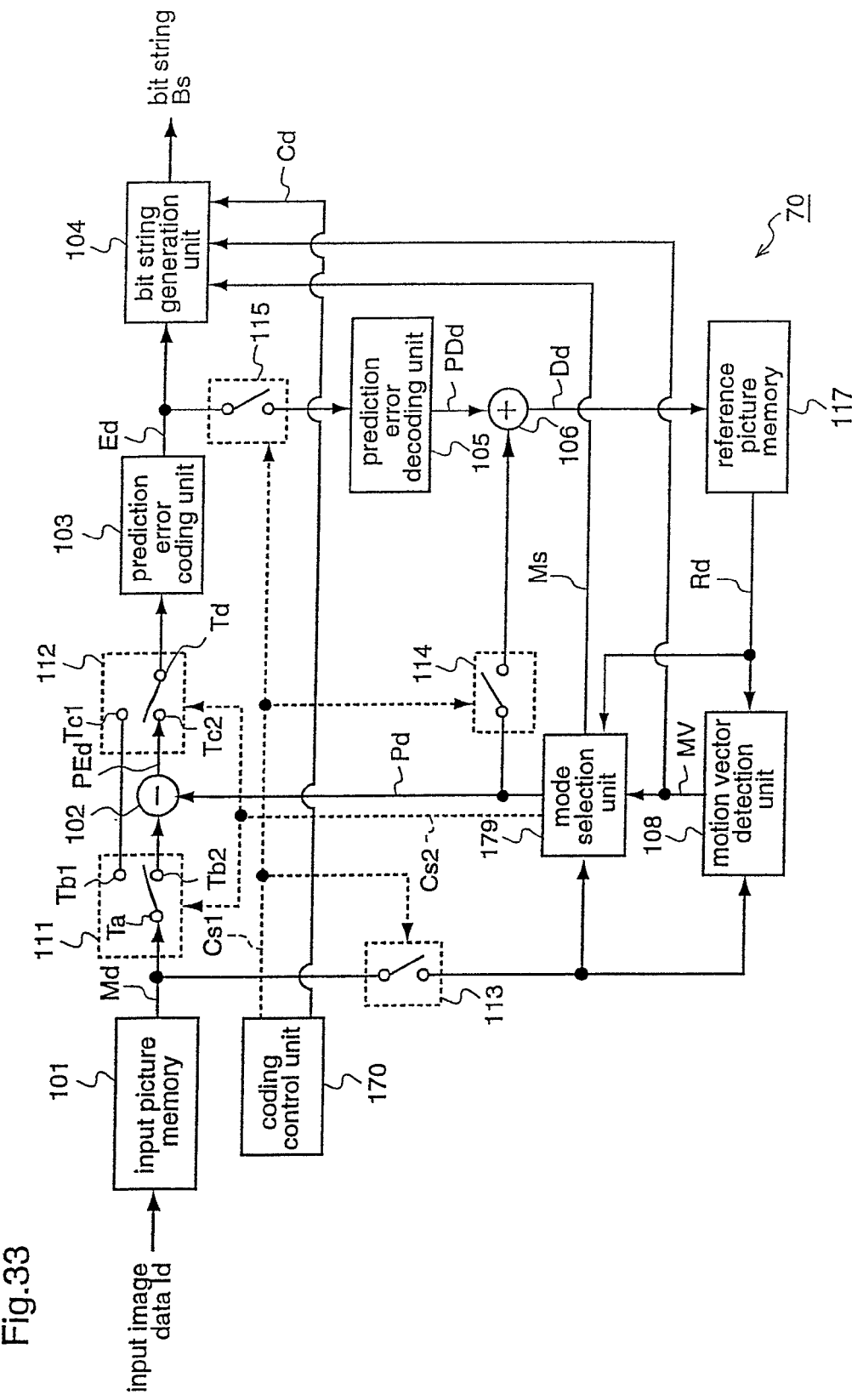
FIG. 33 is a block diagram for explaining a moving picture coding apparatus according to a seventh embodiment of the invention.

FIG. 33 is a block diagram for explaining a moving picture coding apparatus 70 according to a seventh embodiment of the present invention.

This moving picture coding apparatus 70 is different from the moving picture coding apparatus 10 according to the first embodiment in candidate pictures for forward reference pictures to be referred to when coding a P picture and a B picture, and coding modes for a B picture.

That is, the moving picture coding apparatus 70 is provided with, instead of the control unit 110 and the mode selection unit 109 according to the first embodiment, a coding control unit 170 and a mode selection unit 109 which operate in different manners from those described for the first embodiment.

To be specific, the coding control unit 170 according to the seventh embodiment controls a reference picture memory 117 such that, when coding a P picture, three pictures (I or P pictures) which are positioned forward the P picture are used as candidate pictures for forward reference, and when coding a B picture, two pictures (I or P pictures) which are positioned forward the B picture, a forward B picture that is closest to the B picture, and a backward I or P picture are used as candidate pictures. However, a B picture, which is positioned forward an I or P picture that is positioned forward and closest to the target picture, is not referred to.

The coding control unit 170 controls the bit stream generation unit 104 with a control signal Cd so that a flag indicating whether or not a target picture is to be referred to when coding subsequent pictures is inserted in the bit stream. To be specific, the code generation unit 104 is controlled with the control signal Cd so that information indicating that data of the target picture should be stored in the reference picture memory 117 at decoding as well as information indicating a period of time for the storage are added to the bit stream.

Furthermore, when coding a block (target block) in a P picture, the mode selection unit 109 according to the seventh embodiment selects, as a coding mode for the target block, one from among plural modes as follows: intra-picture coding, inter-picture predictive coding using a motion vector, and inter-picture predictive coding using no motion vector (a motion is treated as zero). When coding a block (target block) in a B picture, the mode selection unit 179 selects, as a coding mode for the target block, one from among plural modes as follows: intra-picture coding, inter-picture predictive coding using a forward motion vector, inter-picture predictive coding using backward motion vector, and inter-picture predictive coding using a forward motion vector and a backward motion vector. That is, the mode selection unit 179 of the moving picture coding apparatus 70 according to this seventh embodiment is different from the mode selection unit 109 of the moving picture coding apparatus 10 according to the first embodiment only in that it does not use the direct mode, and therefore, the moving picture coding apparatus 70 does not have the motion vector storage unit 116 of the moving picture coding apparatus 10. Other constituents of the moving picture coding apparatus 70 according to the seventh embodiment are identical to those of the moving picture coding apparatus 10 according to the first embodiment.

The moving picture coding apparatus 70 according to the seventh embodiment is different from the moving picture decoding apparatus 50 according to the fifth embodiment in that the coding control unit 170 controls the bit stream generation unit 104 so that a flag indicating whether or not a target picture is to be referred to when coding subsequent pictures is inserted in the bit stream. To be specific, the code generation unit 104 is controlled with the control signal Cd so that a flag indicating whether or not a target picture is to be referred to when coding subsequent pictures is inserted in the bit stream corresponding to the target picture. Further, the moving picture coding apparatus 70 is different from the moving picture coding apparatus 50 in candidate pictures to be referred to in coding a P picture and a B picture. The moving picture coding apparatus 70 is identical to the moving picture coding apparatus 50 in aspects other than those mentioned above.

Next, the operation of the moving picture coding apparatus 70 will be described.

Input image data Id are stored into the input picture memory 101, in units of pictures, in order of time.

Figure 34:
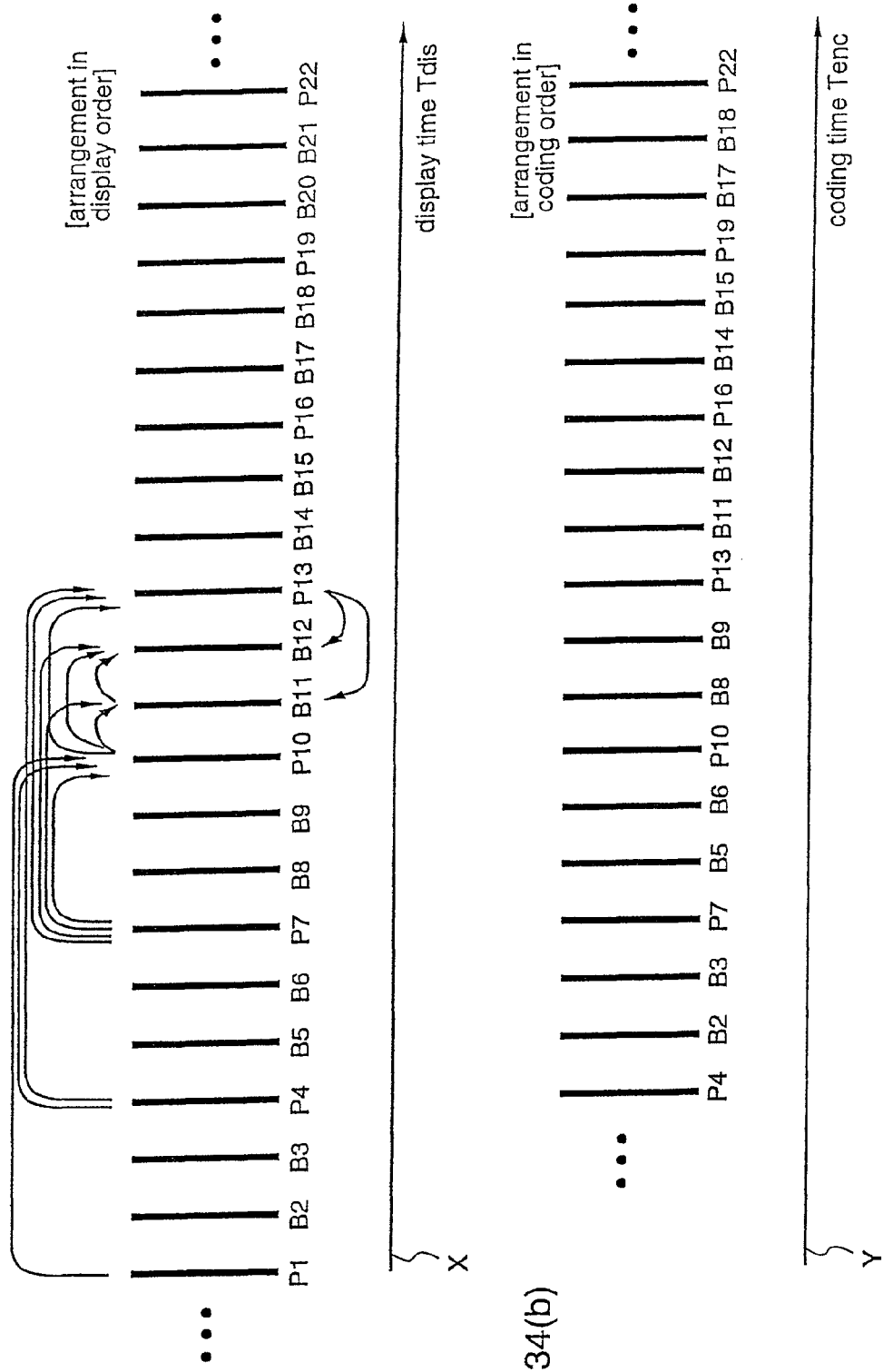
FIGS. 34(a) and 34(b) are schematic diagrams for explaining a moving picture coding method according to the seventh embodiment, illustrating pictures arranged in order of display (34(a)), and pictures arranged in order of coding (34(b)).

FIG. 34(a) shows the order of pictures inputted to the input picture memory 101.

As shown in FIG. 34(a), the respective pictures are successively inputted to the input picture memory 101, starting from a picture P1. In FIG. 34(a), pictures P1, P4, P7, P10, P13, P16, P19, and P22 are P pictures while pictures B2, B3, B5, B6, B8, B9, B11, B12, B14, P15, B17, P18, B20, and B21 are B pictures.

When coding a P picture, three pictures (I or P pictures) which are timewise forward and close to the P picture are used as candidates for a reference picture. Further, when coding a B picture, two pictures (I or P pictures) which are timewise forward and close to the B picture, one B picture that is forward and closest to the B picture, and an I or P picture that is forward the B picture, are used as candidates for a reference picture. However, in coding a B picture, a B picture which is positioned forward an I or P picture that is timewise forward and closest to the B picture is not referred to. When coding an I picture, other pictures are not referred to.

The data Id of the respective pictures inputted to the input picture memory 101 are rearranged in order of coding. Thereinafter the data of each picture is referred to simply as a picture.

That is, the process of changing the order of the pictures from the input order to the coding order is carried out on the basis of the relationships between target pictures and reference pictures in inter-picture predictive coding. In the rearrangement, the respective pictures are rearranged so that a second picture to be used as a candidate for a reference picture in coding a first picture is coded prior to the first picture.

To be specific, the correspondences between the pictures P10~P13 and the reference candidate pictures are shown by arrows in FIG. 34(a). That is, when coding the P picture P10, the pictures P1, P4, and P7 are referred to, and when coding the P picture P13, the pictures P4, P7, and P10 are referred to.

Further, when coding the B picture B11, the pictures P7, P10, and P13 are referred to, and when coding the B picture B12, the pictures P7, P10, B11, and P13 are referred to.

FIG. 34(b) shows the order of the pictures after rearranging the pictures B2 to P22 shown in FIG. 34(a). After the rearrangement, the respective pictures are arranged in order of P4, B2, B3, P7, B5, B6, P10, B8, B9, P13, B11, B12, P16, B14, B15, P19, B17, B18, and p22.

The respective pictures rearranged in the reference picture memory 101 are successively read out, for each predetermined data processing unit, in order of coding times. In this seventh embodiment, the data processing unit is a unit of data on which motion compensation is carried out and, more specifically, it is a rectangle image space (macroblock) in which 16 pixels are arranged in both the horizontal direction and the vertical direction. In the following description, a macroblock is simply referred to as a block.

Hereinafter, coding processes for the pictures P13, B11, and B12 will be described in this order.

Coding Process for Picture P13

Since the picture P13 is a P picture, inter-picture predictive coding using forward reference is carried out as a coding process for the picture P13. In this case, three I or P pictures which are positioned forward the target picture (picture P13) are used as reference candidate pictures, and specifically, the pictures P4, P7, and P10 are used. These reference candidate pictures have already been coded, and the corresponding to decoded image data Dd are stored in the reference picture memory 117.

In coding a P picture, the coding control unit 170 controls the respective switches so that the switches 113, 114, and 115 are turned ON.

Data Md corresponding to a block in the picture P13, which is read from the input picture memory 101, is input to the motion vector detection unit 108, the mode selection unit 179, and the difference calculation unit 102.

The motion vector detection unit 108 detects the motion vector MV of the block in the picture P13, using the decoded image data Rd of the pictures P4, P7, and P10 stored in the reference picture memory 117. In this case, an optimum picture is selected from among the pictures P4 P7, and P10, and detection of the motion vector is carried out with reference to the selected picture. Then, the detected motion vector MV is output to the mode selection unit 179 and the bit stream generation unit 104. Further, information indicating which one of the pictures P4, P7, and P10 is referred to in detecting the motion vector MV (reference picture information) is also output to the mode selection unit 179.

The mode selection unit 179 determines a coding mode for the block in the picture P13, using the motion vector detected by the motion vector detection unit 108.

To be specific, in the case of coding a P picture, a coding mode is selected from among the following coding modes: intra-picture coding, inter-picture predictive coding using a motion vector, and an inter-picture predictive coding using no motion vector (i.e., motion is regarded as 0). In determining a coding mode, generally, a coding mode which minimizes coding errors when a predetermined amount of bits is given to the block as an amount of codes, is selected.

The coding mode Ms determined by the mode selection unit 179 is output to the bit stream generation unit 104. Further, when the determined coding mode Ms is the coding mode which performs forward reference, information indicating which one of the pictures P4, P7, and P10 is referred to in detecting the forward motion vector (forward motion vector) is also output to the bit stream generation unit 104.

Then, prediction image data Pd, which is obtained from the reference picture according to the coding mode Ms that is determined by the mode selection unit 179, is output to the difference calculation unit 102 and the addition unit 106. However, when the intra-picture coding mode is selected, no prediction image data Pd is outputted. Further, when the intra-picture coding is selected, the switches 111 and 112 are controlled in the same manner as described for the fifth embodiment.

Hereinafter, a description will be given of a case where the inter-picture predictive coding mode is selected as the coding mode Ms.

The difference calculation unit 102, the prediction error coding unit 103, the bit stream generation unit 104, the prediction error decoding unit 105, and the coding control unit 170 are identical to those described for the fifth embodiment.

However, in this seventh embodiment, information indicating that the picture P13 is coded using forward three I or P pictures as reference candidate pictures, is added as header information of the picture P13. Further, since the picture P13 will be referred to when coding another picture, information (flag) indicating that decoded data Dd corresponding to the picture P13 should be stored in the reference picture memory 117 at decoding, is also added as header information of the picture P13. Further, information indicating that the picture P13 should be stored in the reference picture memory until decoding of the picture P22 is completed, is also added as header information of the picture P13.

The storage period for the picture P13 may be indicated by time information of the picture P22 (e.g., time-basis positional information such as a picture number, decoding time information, or display time information), or period information from the picture P13 to the picture P22 (e.g., the number of pictures). The header information described above may be described as header information in picture units, i.e., as header information for every target picture to be coded. Alternatively, it may be described as header information of the entire sequence, or as header information in units of frames (e.g., in units of GOPs in MPEG).

When the coding mode for each block in the picture P13 is one performing forward reference, information indicating which one of the pictures P4, P7, and P10 is referred to in detecting the forward motion vector (reference picture information) is also added to the bit stream. For example, when the motion vector is obtained with reference to the picture P10, information indicating that the P picture just previous to the target picture is used as a reference picture (reference picture index) is added to the bit stream. When the motion vector is obtained with reference to the picture P7, information indicating that the P picture two-pictures previous to the target picture is used as a reference picture (reference picture index) is added to the bit stream. When the motion vector is obtained with reference to the picture P4, information indicating that the P picture three-pictures previous to the target picture is used as a reference picture (reference picture index) is added to the bit stream. For example, a reference picture index [0] may be used to indicate that the P picture just previous to the target picture is used as a reference picture, a reference picture index [1] may be used to indicate that the P picture two-pictures previous to the target picture is used as a reference picture, and a reference picture index [2] may be used to indicate that the P picture three-pictures previous to the target picture is used as a reference picture.

Further, information indicating that the P picture is subjected to inter-picture predictive coding using three reference candidate pictures is described as header information.

The remaining macroblocks in the picture P13 are coded in like manner as described above. When all of the macroblocks in the picture P13 have been coded, coding of the picture B11 takes place.

Coding Process for Picture B11

Since the picture B11 is a B picture, inter-picture predictive coding using bidirectional reference is carried out as a coding process for the picture B11. In this case, two pictures (I or P pictures) which are timewise close to the target picture (picture B11) and a B picture which is timewise closest to the target picture are used as candidate pictures for forward reference, and an I or P picture which is timewise closest to the target picture is used as a candidate picture for backward reference. However, a B picture which is positioned beyond an I or P picture closest to the target picture is never be referred to.

Accordingly, the pictures P7 and P10 are used as forward reference pictures for the picture B11, and the picture P13 is used as a backward reference picture for the picture B11. In processing a first B picture between continuous two B pictures, since this first B picture is used as a reference picture in coding the other B picture, the coding control unit 170 controls the respective switches so that the switches 113, 114, and 115 are turned ON. Accordingly, the image data Md corresponding to the block in the picture B11, which is read from the input picture memory 101, is input to the motion vector detection unit 108, the mode selection unit 179, and the difference calculation unit 102.

The motion vector detection unit 108 detects a forward motion vector and a backward motion vector corresponding to the target block in the picture B11, with reference to the pictures P7 and P10 stored in the reference picture memory 117, as candidate pictures for forward reference, and the picture P13 stored in the reference picture memory 117, as a backward reference picture. In this case, either the picture P7 or the picture P10 is selected as a most suitable reference picture, and detection of a forward motion vector is carried out according to the selected picture. The detected motion vectors are output to the mode selection unit 179 and the bit stream generation unit 104. Further, information indicating which one of the pictures P7 and P10 is referred to in detecting the forward motion vector (reference picture information) is also output to the mode selection unit 179.

The mode selection unit 179 determines a coding mode for the target block in the picture B11, using the motion vectors detected by the motion vector detection unit 108. As a coding mode for the B picture, one of the following coding modes is selected: intra-picture coding mode, inter-picture predictive coding mode using a forward motion vector, inter-picture predictive coding mode using a backward motion picture, and inter-picture predictive coding mode using bidirectional motion vectors. Also in this case, a general method (mode) which minimizes coding errors when a predetermined amount of bits are given as the amount of codes, should be selected.

The coding mode determined by the mode selection unit 179 is output to the bit stream generation unit 104. Further, prediction image data Pd, which is obtained from the reference picture according to the coding mode Ms that is determined by the mode selection unit 179, is output to the difference calculation unit 102 and the addition unit 106. However, when the intra-picture coding mode is selected by the mode selection unit 179, no prediction image data Pd is outputted. Further, when the intra-picture coding is selected, the switches 111 and 112 are controlled in the same manner as described for the coding process of the picture P13.

Hereinafter, a description will be given of a case where the inter-picture predictive coding is selected by the mode selection unit 179.

In this case, the operations of the difference calculation unit 102, the prediction error coding unit 103, the bit stream generation unit 104, the prediction error decoding unit 105, and the coding control unit 170 are identical to those described for the fifth embodiment.

When the coding mode is one performing forward reference, information indicating which one of the pictures P7 and P10 is referred to in detecting the forward motion vector (reference picture information) is also added to the bit stream. For example, when picture P10 is referred to, reference picture information indicating that a candidate picture just previous to the target picture is used as a reference picture is added to the bit stream. When the picture P7 is referred to, reference picture information indicating that a candidate picture two-pictures previous to the target picture is used as a reference picture is added to the bit stream. For example, a reference picture index [0] may be used to indicate that a candidate picture just previous to the target picture is used as a reference picture, and a reference picture index [1] may be used to indicate that a candidate picture two-pictures previous to the target picture is used as a reference picture.

Further, in this case, information indicating that the target B picture is subjected to inter-picture predictive coding using a forward B picture as a reference picture is not added as header information. Furthermore, information indicating that the forward reference candidate pictures for the target B picture are two I or P pictures and one B picture is added as header information. Moreover, information indicating that a B picture, which is positioned forward an I or P picture that is positioned forward and closest to the target B picture, is not referred to is added as header information.

Thereby, it is possible to know the capacity of a reference picture memory that is needed in decoding the bit stream Bs generated in the moving picture coding apparatus 70 according to the seventh embodiment. The header information described above may be described as header information in units of pictures, i.e., as header information for every target picture to be coded. Alternatively, it may be described as header information of the entire sequence, or as header information in units of several pictures (e.g., in units of GOPs in MPEG).

Further, since the picture B11 is used as a reference picture when coding a picture positioned backward the picture B11, information indicating that decoded image data Dd corresponding to the picture B11 should be stored in the reference picture memory 117 at decoding, is also added as header information. Further, information indicating that the data Dd should be stored in the reference picture memory 117 until decoding of the picture B12 is completed, is also added as header information.

When all of the remaining blocks in the picture B11 have been coded, coding of the picture B12 takes place.

Coding Process for Picture B12

Since the picture B12 is a B picture, inter-picture predictive coding using bidirectional reference is carried out as a coding process for the picture B12. In this case, two I or P pictures which are timewise close to the target picture B12, and a B picture which is timewise closest to the target picture B12 are used as candidate pictures for forward reference. Further, an I or P picture which is timewise closest to the target picture B12 is used as a candidate picture for backward reference. To be specific, the pictures P7, P10, and B11 are used as candidate pictures for forward reference for the picture B12, and the picture P13 is used as a backward reference picture for the picture B12.

Since the picture B12 is not used as a reference picture when coding another picture, the coding control unit 170 controls the respective switches with the control signal Cs1 so that the switch 113 is turned ON and the switches 114 and 115 are turned OFF. Accordingly, the image data Md corresponding to the block in the picture B12, which is read from the input picture memory 101, is input to the motion vector detection unit 108, the mode selection unit 179, and the difference calculation unit 102.

The motion vector detection unit 108 detects a forward motion vector and a backward motion vector corresponding to the macroblock in the picture B12, with reference to the pictures P7, P10, and B11 stored in the reference picture memory 117, as forward reference pictures, and the picture P13 stored in the reference picture memory 117, as a backward reference picture.

In this case, a most suitable reference picture is selected from among the pictures P7, P10, and B11, and detection of a forward motion vector is carried out according to the selected picture. The detected motion vectors are output to the mode selection unit 179 and the bit stream generation unit 104. Further, information indicating which one of the pictures P7, P10, and B11 is referred to in detecting the forward motion vector (reference picture information) is also output to the mode selection unit 179.

The mode selection unit 179 determines a coding mode for the block in the picture B12, using the motion vectors detected by the motion vector detection unit 108. As a coding mode for the B picture, one of the following coding modes is selected: intra-picture coding mode, inter-picture predictive coding mode using a forward motion vector, inter-picture predictive coding mode using a backward motion picture, and inter-picture predictive coding mode using bidirectional motion vectors.

The coding mode Ms determined by the mode selection unit 179 is output to the bit stream generation unit 104. Further, prediction image data Pd, which is obtained from the reference picture according to the coding mode that is determined by the mode selection unit 179, is output to the difference calculation unit 102 and the addition unit 106. However, when the intra-picture coding mode is selected, no prediction image data Pd is output.

Further, when the intra-picture coding mode is selected by the mode selection unit 179, the switches 111 and 112 are controlled in the same manner as described for the coding process of the picture P13.

Hereinafter, a description will be given of a case where the inter-picture predictive coding mode is selected by the mode selection unit 179.

In this case, the operations of the difference calculation unit 102, the prediction error coding unit 103, the bit stream generation unit 104, the prediction error decoding unit 105, and the coding control unit 170 are identical to those described for the fifth embodiment.

When the coding mode is one performing forward reference, information indicating which one of the pictures P7, P10, and B11 is referred to in detecting the forward motion vector (reference picture information) is also added to the bit stream.

Further, information indicating that the target B picture B12 is subjected to inter-picture predictive coding using a forward B picture B11 as a candidate for a reference picture is described as header information. Furthermore, information indicating that the candidate pictures for forward reference are two I or P pictures and one B picture is described as header information.

Moreover, information indicating that the picture B12 is not to be used as a reference picture when coding the following pictures is added as header information.

Thereby, it is easily determined that there is no necessity to store the decoded image data Dd corresponding to the picture B12 in the reference picture memory at decoding, whereby management of the reference picture memory is facilitated.

The above-mentioned header information may be described as header information in units of pictures, i.e., as header information for every target picture to be coded. Alternatively, it may be described as header information of the entire sequence, or as header information in units of several pictures (e.g., in units of GOPs in MPEG).

The remaining blocks in the picture B12 are coded in the same manner as described above.

Thereafter, the image data corresponding to the respective pictures following the picture B12 are coded in like manner as described above according to the picture type. For example, P pictures are processed like the picture P13, and the first B picture of the continuous B pictures (picture B14, B17, or the like) is processed like the picture P11. Further, the second B picture of the continuous B pictures (picture B15, B18, or the like) is processed like the picture P12.

As described above, in the moving picture coding apparatus 70 according to the seventh embodiment, when coding a B picture as a target picture, since a B picture is also used as a candidate picture for forward reference as well as P pictures, a forward reference picture that is positioned closest to the target picture can be used as a forward reference picture. Thereby, prediction accuracy in motion compensation for a B picture can be increased, resulting in enhanced coding efficiency.

Moreover, when coding a B picture as a target picture, information indicating whether or not the target picture is to be used as a reference picture when coding (decoding) another picture is added as header information. Further, when the target picture is used as a reference picture when coding (decoding) another picture, information indicating a period during which the target picture should be stored in the reference picture memory is added. Therefore, when decoding the bit stream Bs outputted from the moving picture coding apparatus 70, the decoding end can easily know which picture should be stored in the picture memory and how long the storage period is, whereby management of the reference picture memory at decoding is facilitated.

In this seventh embodiment, when a target B picture is coded using another B picture as a reference picture, this is described as header information of the target B picture. However, the header information is not necessarily described in picture units. It may be described as header information of the entire sequence, or as header information in units of several pictures (e.g., GOP in MPEG).

In this seventh embodiment, motion compensation is performed in units of macroblocks each comprising 16 pixels (horizontal direction)×16 pixels (vertical direction), and coding of a prediction error image data is performed in units of blocks each comprising 4 pixels (horizontal direction)×4 (vertical direction), or in units of blocks each comprising 8 pixels (horizontal direction)×8 (vertical direction). However, motion compensation and coding of prediction error image data may be carried out in units of image spaces, each comprising different number of pixels from those mentioned above.

Further, in this seventh embodiment, a coding mode for a P picture is selected from among intra-picture coding mode, inter-picture predictive coding mode using a motion vector, and inter-picture predictive coding mode using no motion vector, while a coding mode for a B picture is selected from among intra-picture coding mode, inter-picture predictive coding mode using a forward motion vector, inter-picture predictive coding mode using a backward motion vector, and inter-picture predictive coding mode using bidirectional motion vectors. However, selection of a coding mode for a P picture or a B picture is not restricted to that mentioned for the seventh embodiment.

Further, while this seventh embodiment employs an image sequence in which two B pictures are inserted between an I picture and a P picture or between adjacent P pictures, the number of B pictures inserted between an I picture and a P picture or between adjacent P pictures in an image sequence may be other than two, for example, it may be three or four.

Furthermore, while in this seventh embodiment three pictures are used as candidate pictures for forward reference when coding a P picture, the number of forward reference candidate pictures for a P picture is not restricted thereto.

Furthermore, while in this seventh embodiment two P pictures and one B picture are used as candidate pictures for forward reference when coding a B picture, forward reference candidate pictures to be used in coding a B picture are not restricted thereto. For example, forward reference candidate pictures for a B picture may be one P picture and two B pictures, or two P pictures and two B pictures, or three pictures which are timewise closest to the target picture regardless of the picture type.

When, in coding a B picture, only one picture that is closest to the target B picture is used as a reference picture, it is not necessary to describe information indicating which picture is referred to in coding a target block in the B picture (reference picture information), in the bit stream.

Further, in this seventh embodiment, when coding a B picture, a B picture which is positioned forward an I or P picture that is positioned forward and closest to the target B picture, is not referred to. However, when coding a B picture, a B picture which is positioned forward an I or P picture that is positioned forward and closest to the target B picture, may be used as a reference picture.

Embodiment 8

Figure 35:
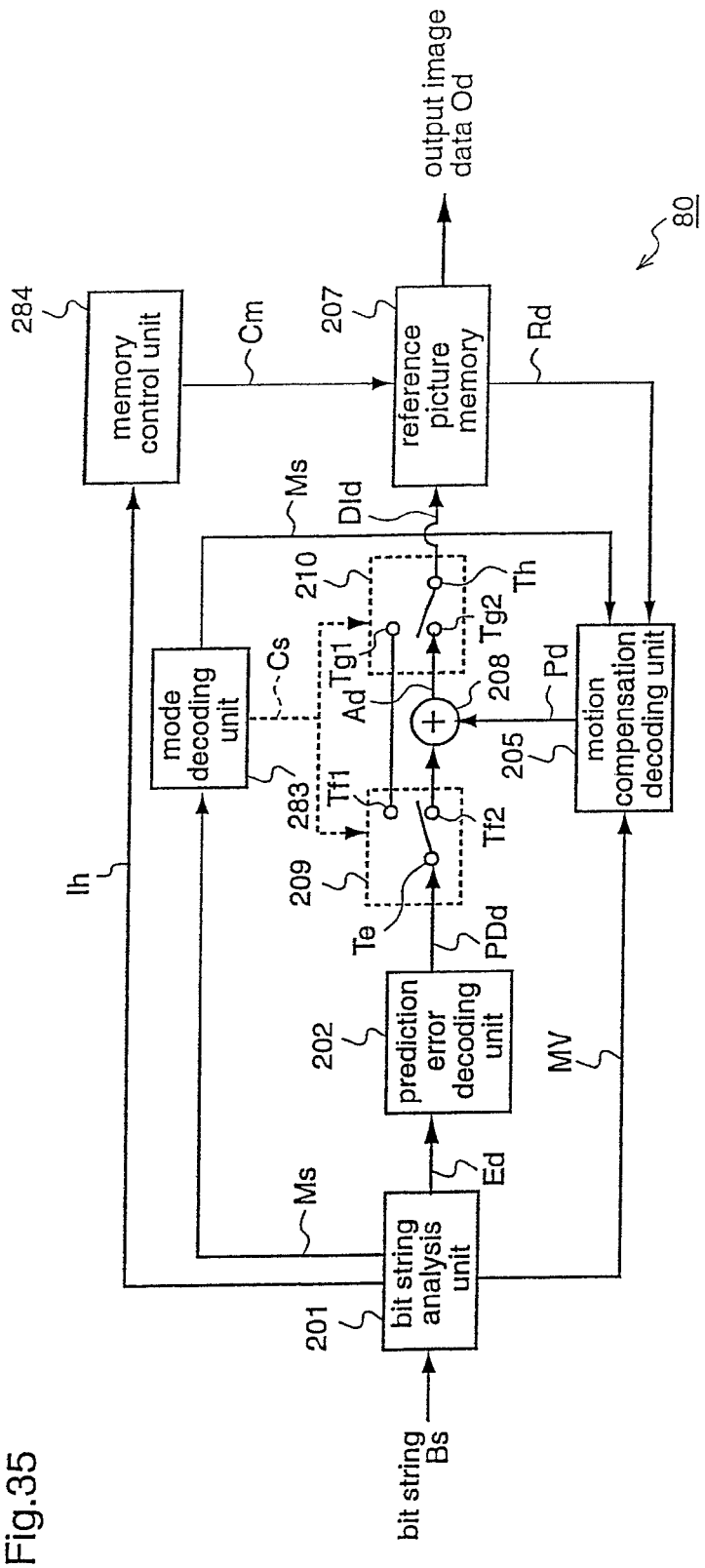
FIG. 35 is a block diagram for explaining a moving picture decoding apparatus according to an eighth embodiment of the invention.

FIG. 35 is a block diagram for explaining a moving picture decoding apparatus 80 according to an eighth embodiment of the present invention.

The moving picture decoding apparatus 80 according to the eighth embodiment decodes the bit stream Bs outputted from the moving picture coding apparatus 70 according to the seventh embodiment.

The moving picture decoding apparatus 80 is different from the moving picture decoding apparatus 20 according to the second embodiment in candidate pictures for forward reference pictures to be referred to when coding a P picture and a B picture, and decoding modes for a B picture.

That is, the moving picture decoding apparatus 80 is provided with, instead of the memory control unit 204 and the mode decoding unit 223 according to the second embodiment, a memory control unit 284 and a mode decoding unit 283 which operate in different manners from those described for the second embodiment.

To be specific, the memory control unit 284 according to the eighth embodiment controls a reference picture memory 287 such that, when decoding a P picture, three pictures (I or P pictures) which are positioned forward the P picture are used as candidate pictures for forward reference, and when decoding a B picture, two pictures (I or P pictures) which are positioned forward the B picture, a forward B picture that is closest to the B picture, and a backward I or P picture are used as candidate pictures. However, a B picture which is positioned forward an I or P picture that is positioned forward and closest to the target picture, is not referred to.

The memory control unit 284 controls the reference picture memory 287, with a control signal Cm, on the basis of a flag indicating whether or not the target picture is to be referred to in coding a picture that follows the target picture, which flag is inserted in the code strong corresponding to the target picture.

To be specific, information (flag) indicating that the data of the target picture should be stored in the reference picture memory 287 at decoding, and information indicating a period during which the data of the target picture should be stored, are included in the bit stream corresponding to the target picture.

Further, when decoding a block (target block) in a P picture, the mode decoding unit 283 according to the eighth embodiment selects, as a coding mode for the target block, one from among the following modes: intra-picture decoding, inter-picture predictive decoding using a motion vector, and inter-picture predictive decoding using no motion vector (a motion is treated as zero). When decoding a block (target block) in a B picture, the mode decoding unit 283 selects, as a decoding mode for the target block, one from among the following modes: intra-picture decoding, inter-picture predictive decoding using a forward motion vector, inter-picture predictive decoding using backward motion vector, and inter-picture predictive decoding using a forward motion vector and a backward motion vector. That is, the mode decoding unit 283 of the moving picture decoding apparatus 80 according to this eighth embodiment is different from the mode decoding unit 223 of the moving picture decoding apparatus 20 according to the second embodiment only in that it does not use the direct mode, and therefore, the moving picture decoding apparatus 80 does not have the motion vector storage unit 226 of the moving picture decoding apparatus 20. Other constituents of the moving picture decoding apparatus 80 according to the seventh embodiment are identical to those of the moving picture decoding apparatus 20 according to the second embodiment.

Further, the moving picture decoding apparatus 80 according to the eighth embodiment different from the moving picture decoding apparatus 60 according to the sixth embodiment in that the memory control unit 284 controls the bit stream generation unit 104 so that a flag indicating whether or not the target picture is to be referred to in coding a picture after the target block is inserted in the bit stream corresponding to the target picture. Further, in the moving picture decoding apparatus 80, candidate pictures to be referred to in decoding a P picture and a B picture are also different from those employed in the moving picture decoding apparatus according to the sixth embodiment. Other constituents of moving picture decoding apparatus 80 according to the seventh embodiment are identical to those of the moving picture decoding apparatus 60 according to the sixth embodiment.

Next, the operation of the moving picture decoding apparatus 80 will be described.

The bit stream Bs outputted from the moving picture coding apparatus 70 according to the seventh embodiment is input to the moving picture decoding apparatus 80.

In this eighth embodiment, when decoding a P picture, three pictures (I or P pictures) which are timewise forward and close to the P picture are used as candidates for a reference picture. On the other hand, when decoding a B picture, two pictures (I or P pictures) which are positioned timewise forward and close to the B picture, a B picture which is positioned forward and closest to the B picture, and an I or P picture which is positioned backward the target picture, are used as candidate pictures for a reference picture. However, in decoding a B picture, a B picture which is positioned forward an I or P picture that is positioned forward and closest to the target picture, is not referred to. Further, in decoding an I picture, other pictures are not referred to.

Further, information indicating which of the candidate pictures is used as a reference picture in decoding a P picture or a B picture is described as header information Ih of the bit stream Bs, and the header information Ih is extracted by the bit stream analysis unit 201.

The header information Ih is output to the memory control unit 284. The header information may be described as header information of the entire sequence, header information in units of several pictures (e.g., GOP in MPEG), or header information in picture units.

Figure 36:
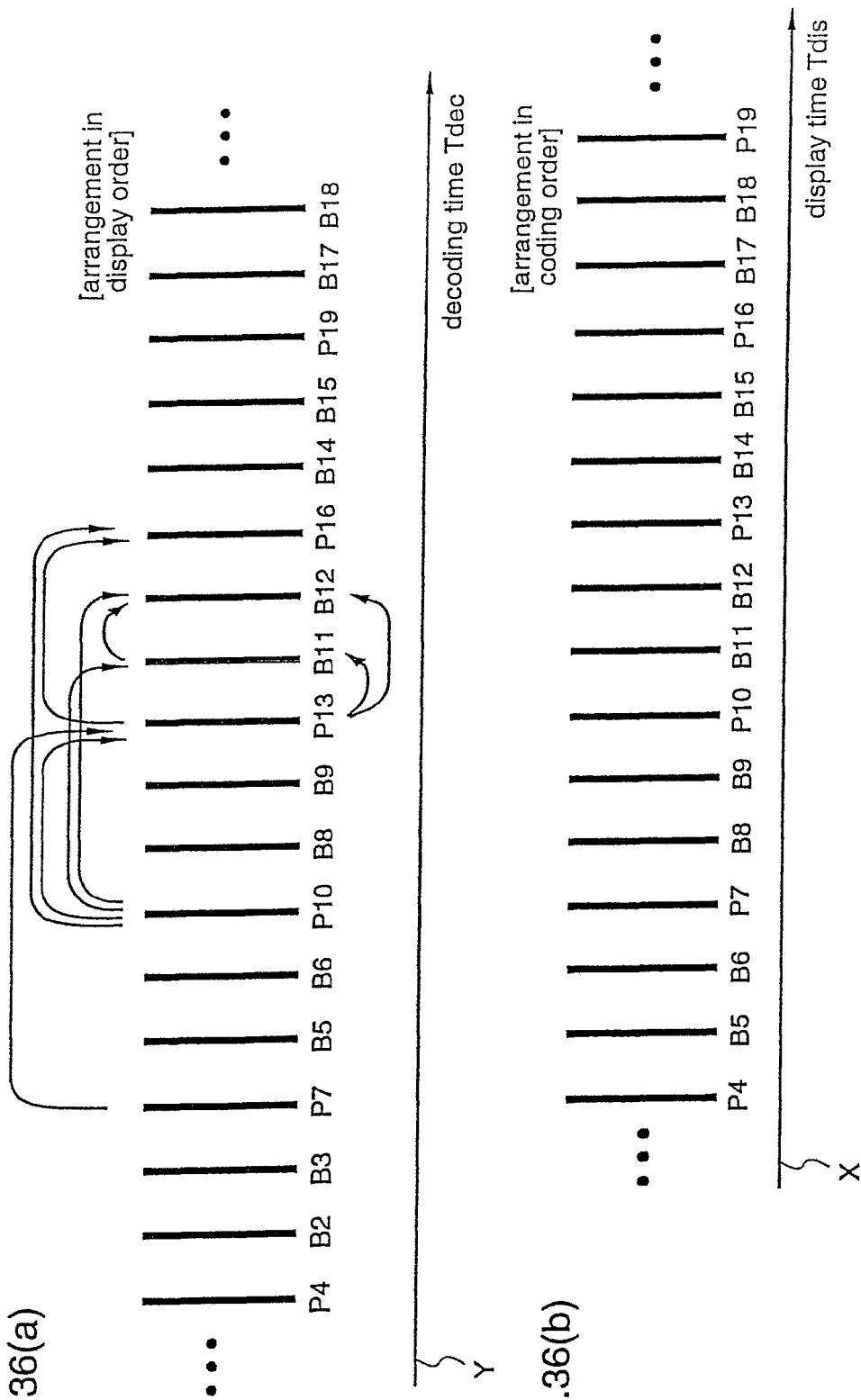
FIGS. 36(a) and 36(b) are schematic diagrams for explaining a moving picture decoding method according to the eighth embodiment, illustrating pictures arranged in order of decoding (36(a)), and pictures arranged in order of display (36(b)).

The pictures in the bit stream Bs inputted to the moving picture decoding apparatus 80 are arranged in order or picture decoding as shown in FIG. 36(*a*). Hereinafter, decoding processes for the pictures P13, B11, and B12 will be specifically described in this order.

Decoding Process for Picture P13

When the bit stream corresponding to the picture P13 is input to the bit stream analysis unit 201, the bit stream analysis unit 201 extracts various kinds of data from the inputted bit stream. The various kinds of data are information (coding mode) Ms relating to mode selection, information of the motion vector MV, the above-described header information, and the like. The extracted coding mode Ms is output to the mode decoding unit 283. Further, the extracted motion vector MV is output to the motion compensation decoding unit 205. Furthermore, the coded data Ed extracted by the bit stream analysis unit 201 is output to the prediction error decoding unit 202.

The mode decoding unit 283 controls the switches 209 and 210 with reference to the mode selection information (coding mode) Ms extracted from the bit stream. When the coding mode Ms is intra-picture coding mode and when the coding mode Ms is inter-picture predictive coding mode, the switches 209 and 210 are controlled in like manner as described for the sixth embodiment.

Further, the mode decoding unit 283 outputs the coding mode Ms to the motion compensation decoding unit 205.

Hereinafter, a description will be given of the case where the coding mode is inter-picture predictive coding mode.

Since the operations of the prediction error decoding unit 202, the motion compensation decoding unit 205, and the addition unit 208 are identical to those described for the sixth embodiment, repeated description is not necessary.

FIG. 37 shows how the pictures, whose data are stored in the reference picture memory 207, change with time.

When decoding of the picture P13 is started, the pictures B8, P7, and P10 are stored in areas R1, R2, and R3 of the reference picture memory 207. The picture P13 is decoded using the pictures P7 and P10 as candidates for a reference picture, and the picture P13 is stored in the memory area R1 where the picture B8 had been stored. Such rewriting of image data of each picture in the reference picture memory is carried out based on the header information of each picture which is added to the bit stream. This header information indicates that the picture P7 should be stored in the reference picture memory 207 until decoding of the picture P13 is completed, the picture P10 should be stored in the memory until decoding of the picture P16 is completed, and the picture B8 should be stored in the memory until decoding of the picture B9 is completed.

In other words, since it can be decided that the picture B8 is not necessary for decoding of the picture P13 and the following pictures, the picture P13 is written over the reference picture memory area R1 where the picture B8 is stored.

Further, since information indicating that the picture P13 should be stored in the reference picture memory until decoding of the picture P19 is completed is described as header information of the picture P13, the picture P13 is stored in the reference picture memory at least until that time.

As described above, the blocks in the picture P13 are successively decoded. When all of the coded data corresponding to the blocks in the picture P13 have been decoded, decoding of the picture B11 takes place.

Decoding Process for Picture B11

Since the operations of the bit stream analysis unit 201, the mode decoding unit 203, and the prediction error decoding unit 202 are identical to those described for decoding of the picture P13, repeated description is not necessary.

The motion compensation decoding unit 205 generates motion compensation image data Pd from the inputted information such as the motion vector. That is, the information inputted to the motion compensation decoding unit 205 is the motion vector MV and reference picture index corresponding to the picture B11. The picture B11 has been coded using the picture P10 as a forward reference picture, and the picture P13 as a backward reference picture. Accordingly, in decoding of the picture B11, these candidate pictures P10 and P13 have already been decoded, and the corresponding decoded image data DId are stored in the reference picture memory 207.

When the coding mode is bidirectional predictive coding mode, the motion compensation decoding unit 205 obtains a forward reference image from the reference picture memory 207 on the basis of the information indicating the forward motion vector, and obtains a backward reference image from the memory 207 on the basis of the information indicating the backward motion vector. Then, the motion compensation decoding unit 205 performs addition and averaging of the forward reference image and the backward reference image to generated a motion compensation image. Data Pd of the motion compensation image so generated is output to the addition unit 208.

The addition unit 208 adds the inputted prediction error image data PDd and motion compensation image data Pd to output addition image data Ad. The addition image data Ad so generated is outputted as decoded image data DId, through the switch 210 to the reference picture memory 207.

The memory control unit 284 controls the reference picture memory 207 on the basis of information indicating which candidate pictures are referred to in coding the P picture and the B picture, which information is header information of the bit stream.

FIG. 37 shows how the pictures stored in the reference picture memory 207 change with time.

When decoding of the picture P11 is started, the pictures P13, P7, and P10 are stored in the reference picture memory 207. The picture P11 is decoded using the pictures P10 and P13 as reference pictures, and the picture P11 is stored in the memory area R2 where the picture P7 had been stored. Such rewriting of each picture in the reference picture memory 207 is carried out based on the header information of each picture which is added to the bit stream. This header information indicates that the picture P7 should be stored in the reference picture memory 207 until decoding of the picture P13 is completed, the picture P10 should be stored in the memory until decoding of the picture P16 is completed, and the picture P13 should be stored in the memory until decoding of the picture P19 is completed.

In other words, since it is decided that the picture P7 is not necessary for decoding of the picture P13 and the following pictures, the picture P11 is stored in the reference picture memory area R2 where the picture P7 is stored.

Further, since information indicating that the picture B11 should be stored in the reference picture memory 207 until decoding of the picture B12 is completed is described as header information of the picture B11, the picture B11 is stored in the reference picture memory 207 at least until that time.

As described above, the coded data corresponding to the blocks in the picture B11 are successively decoded. When all of the coded data corresponding to the blocks in the picture B11 have been decoded, decoding of the picture B12 takes place.

Decoding Process for Picture B12

Since the operations of the bit stream analysis unit 201, the mode decoding unit 203, and the prediction error decoding unit 202 are identical to those described for decoding of the picture P13, repeated description is not necessary.

The motion compensation decoding unit 205 generates motion compensation image data Pd from the inputted information such as the motion vector. That is, the information inputted to the motion compensation decoding unit 205 is the motion vector MV and reference picture index corresponding to the picture B12. The picture B12 has been coded using the pictures P10 and B11 as candidates for a forward reference picture, and the picture P13 as a backward reference picture. These reference candidate pictures P10, B11, and P13 have already been decoded, and the corresponding decoded image data are stored in the reference picture memory 207.

When the coding mode is bidirectional predictive coding mode, the motion compensation decoding unit 205 determined which one of the pictures P10 and B11 is used as a forward reference picture in coding the picture B12, according to the reference picture indices, and obtains a forward reference image from the reference picture memory 207 according to the information indicating the forward motion vector. Further, the motion compensation decoding unit 205 obtains a backward reference image from the memory 207 according to the information indicating the backward motion vector. Then, the motion compensation decoding unit 205 performs addition and averaging of the forward reference image and the backward reference image to generated a motion compensation image. Data Pd of the motion compensation image so generated is output to the addition unit 208.

The addition unit 208 adds the inputted prediction error image data PDd and motion compensation image data Pd to output addition image data Ad. The addition image data Ad so generated is outputted as decoded image data DId, through the switch 210 to the reference picture memory 207.

The memory control unit 284 controls the reference picture memory 207 on the basis of information indicating which reference pictures are used in coding the P picture and the B picture, which information is extracted from the header information of the bit stream.

FIG. 37 shows how the pictures stored in the reference picture memory 207 change with time. When decoding of the picture B12 is started, the pictures P13, B11, and P10 are stored in the reference picture memory 207. The picture B12 is decoded using the pictures P13, B11, and P10 as reference candidate pictures. Since information indicating that the picture B12 is not to be used as a reference picture when decoding another picture is described as header information, the decoded data of the picture B12 is not stored in the reference picture memory 207 but outputted as output image data Od.

As described above, the coded data corresponding to the blocks in the picture B12 are successively decoded. The decoded image data of the respective pictures which are stored in the reference picture memory 207, and the decoded image data which are not stored in the reference picture memory 207 are rearranged in order of their display times as shown in FIG. 36(b), and outputted as output image data Od.

Thereafter, the coded data corresponding to the respective pictures are decoded in like manner as described above according to the picture type.

To be specific, the coded data of the P pictures are decoded like the picture P13, and the first B picture (picture B14, B17, or the like) of the continuous B pictures is decoded like the picture P11. Further, the second B picture (picture B15, B18, or the like) of the continuous B pictures is decoded like the picture P12.

As described above, in the moving picture decoding apparatus 80 according to the eighth embodiment, since a B picture is used as a reference candidate picture when decoding a B picture, a bit stream, which is obtained in a coding process that uses a B picture as well as P pictures as forward reference candidate pictures when coding a B picture, can be accurately decoded. Further, since the reference picture memory is controlled using information obtained from the bit stream, indicating which reference pictures are used in coding a P picture and a B picture, the reference picture memory can be effectively utilized. That is, image data of pictures to be used as reference pictures in the following decoding process are maintained in the reference picture memory, while image data of pictures not to be used as reference pictures in the following decoding process are successively erased from the memory, whereby the reference picture memory can be effectively utilized.

While this eighth embodiment employs a bit stream corresponding to an image sequence in which two B pictures are inserted between adjacent P pictures, the number of B pictures positioned between adjacent P pictures may be other than two, for example, it may be three or four.

Furthermore, while in this eighth embodiment two pictures are used as candidate pictures for forward reference when decoding a P picture, the number of forward reference candidate pictures to be referred to in decoding a P picture is not restricted thereto.

Furthermore, in this eighth embodiment, when decoding a B picture, one P picture and one B picture are used as candidate pictures for forward reference, and a B picture which is positioned forward an I or P picture that is timewise closest to the target B picture, is not used as a reference picture. However, pictures to be used as reference candidate pictures in decoding a B picture may be other than those described for the eighth embodiment. Further, when decoding a B picture, a B picture which is positioned forward an I or P picture that is timewise closest to the target B picture, may be used as a reference picture.

Furthermore, while in the eighth embodiment decoded image data of pictures which are not to be used as reference pictures when decoding other pictures are not stored in the reference picture memory, the decoded image data of these pictures may be stored in the memory.

For example, when output of decoded image data of each picture is carried out with a little delay from decoding of each picture, the decoded image data of each picture must be stored in the reference picture memory. In this case, a memory area, other than the memory area where the decoded image data of the reference candidate pictures are stored, is provided in the reference picture memory, and the decoded image data of the pictures not to be used as reference pictures are stored in this memory area. Although, in this case, the storage capacity of the reference picture memory is increased, the method for managing the reference picture memory is identical to that described for the eighth embodiment and, therefore, the reference picture memory can be easily managed.

While all pictures are used as reference candidate pictures in the second, fourth, sixth, and eighth embodiments, all pictures are not necessarily used as reference candidate pictures.

To be brief, in a moving picture decoding apparatus, usually, already-decoded pictures are once stored in a decoding buffer (decoded frame memory) regardless of whether they will be used as reference candidate pictures or not, and thereafter, the already-decoded pictures are successively read from the decoding buffer to be displayed.

In the second, fourth, sixth, and eighth embodiments of the present invention, all pictures are used as reference candidate pictures and, therefore, all of already-decoded pictures are stored in a reference picture memory for holding pictures to be used as reference candidate pictures, and thereafter, the already-decoded pictures are successively read from the reference picture memory to be displayed.

However, as described above, all of the already-decoded pictures are not necessarily used as reference candidate pictures. Accordingly, the already-decoded pictures may be once stored in a decoding buffer (decoded frame memory) for holding not only pictures not to be used as reference candidate pictures but also pictures to be used as reference candidate pictures, and thereafter, the already-decoded pictures are successively read from the decoding buffer to be displayed.

The moving picture coding apparatus or the moving picture decoding apparatus according to any of the aforementioned embodiments is implemented by hardware, while these apparatuses may be implemented by software. In this case, when a program for executing the coding or decoding process according to any of the aforementioned embodiments is recorded in a data storage medium such as a flexible disk, the moving picture coding apparatus or the moving picture decoding apparatus according to any of the aforementioned embodiments can be easily implemented in an independent computer system.

Figure 38A:
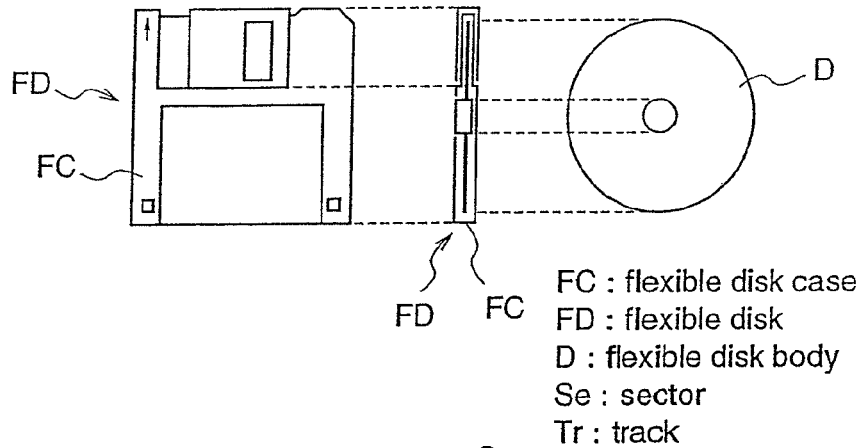
FIGS. 38(a) and 38(b) are diagrams illustrating a storage medium which contains a program for implementing the apparatuses according to the respective embodiments with software.
Figure 38B:
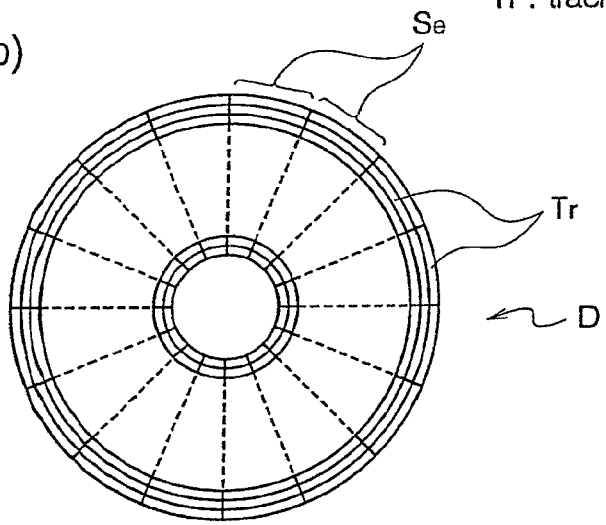
Figure 38C:
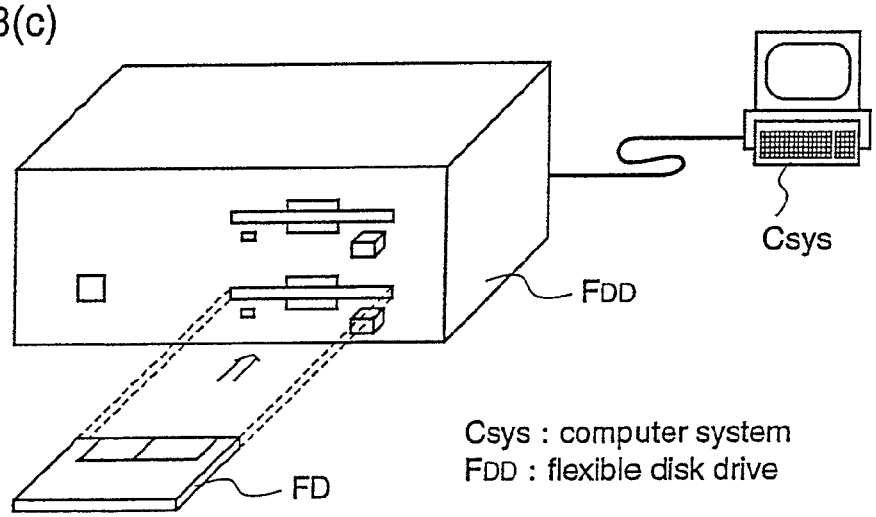
FIG. 38(c) is a diagram illustrating a computer system using the storage medium.

FIGS. 38(*a*)-38(*c*) are diagrams for explaining a computer system for executing the moving picture coding process according to any of the first, third, fifth, and seventh embodiments and the moving picture decoding process according to any of the second, fourth, sixth, and eighth embodiments.

FIG. 38(*a*) shows a front view of a flexible disk FD which is a medium that contains a program employed in the computer system, a cross-sectional view thereof, and a flexible disk body D. FIG. 38(*b*) shows an example of a physical format of the flexible disk body D.

The flexible disk FD is composed of the flexible disk body D and a case FC that contains the flexible disk body D. On the surface of the disk body D, a plurality of tracks Tr are formed concentrically from the outer circumference of the disk toward the inner circumference. Each track is divided into 16 sectors Se in the angular direction. Therefore, in the flexible disk FD containing the above-mentioned program, data of the program for executing the moving picture coding process or the moving picture decoding process are recorded in the assigned storage areas (sectors) on the flexible disk body D.

FIG. 38(*c*) shows the structure for recording or reproducing the program in/from the flexible disk FD. When the program is recorded in the flexible disk FD, data of the program are written in the flexible disk FD from the computer system Csys through the flexible disk drive FDD. When the above-mentioned moving picture coding or decoding apparatus is constructed in the computer system Csys by the program recorded in the flexible disk FD, the program is read from the flexible disk FD by the flexible disk drive FDD and then loaded to the computer system Csys.

Although in the above description a flexible disk is employed as a storage medium, an optical disk may be employed. Also in this case, the moving picture coding or decoding process can be performed by software in like manner as the case of using the flexible disk. The storage medium is not restricted to these disks, and any medium may be employed as long as it can contain the program, for example, a CD-ROM, a memory card, or a ROM cassette. Also when such data storage medium is employed, the moving picture coding or decoding process can be performed by the computer system in the same manner as the case of using the flexible disk.

Applications of the moving picture coding method and the moving picture decoding method according to any of the aforementioned embodiments and systems using the same will be described hereinafter.

Figure 39:
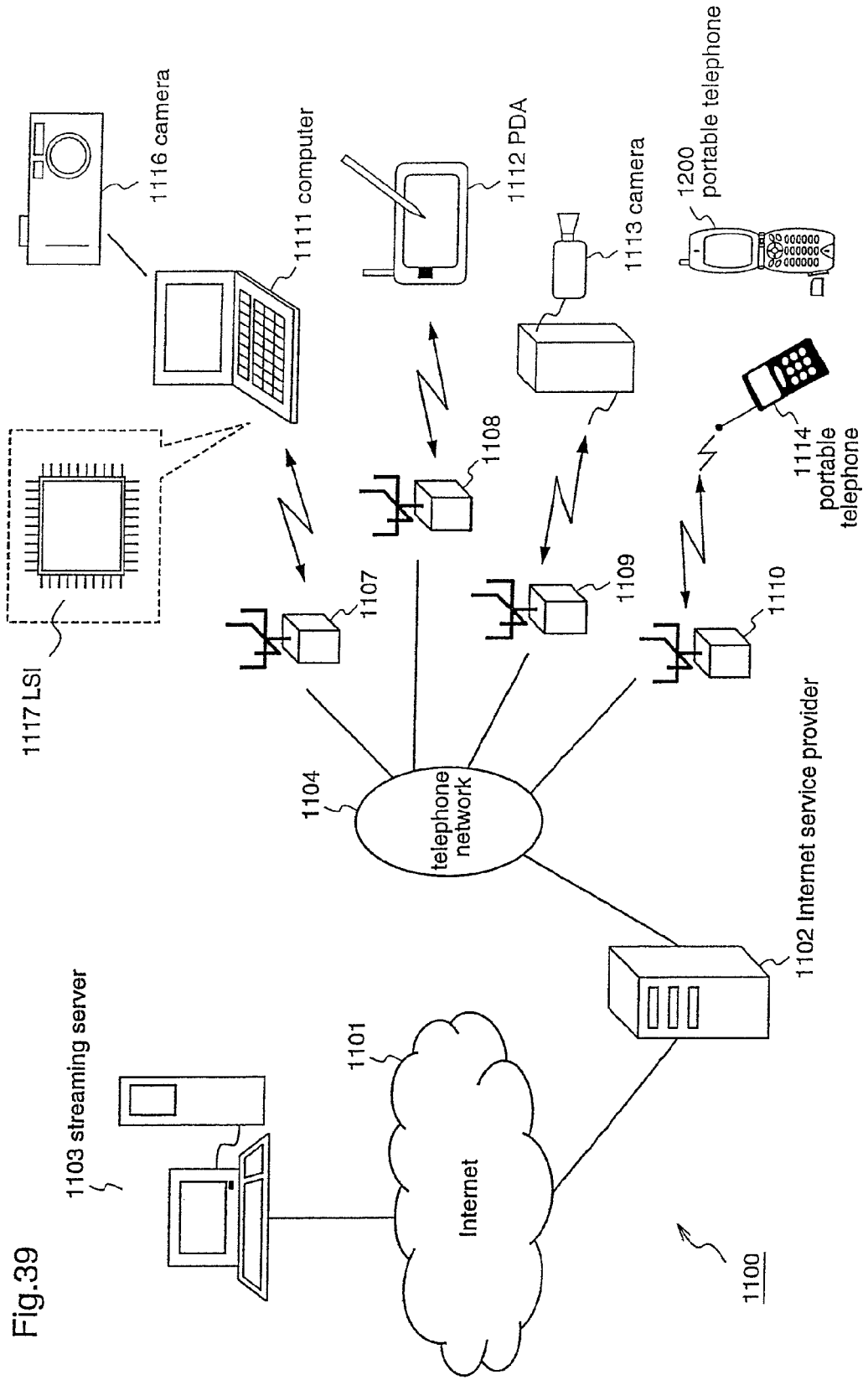
FIG. 39 is a diagram for explaining applications of the moving picture coding methods and decoding methods according to the respective embodiments, illustrating a contents supply system which realizes contents distribution services.

FIG. 39 is a block diagram illustrating an entire construction of a contents provision system 1100 that performs contents distribution services.

A communication service provision area is divided into regions (cells) of desired size, and base stations 1107 to 1110 which are each fixed radio stations are established in the respective cells.

In this contents provision system 1100, various devices such as a computer 1111, a PDA (personal digital assistant) 1112, a camera 1113, a portable telephone 1114, and a portable telephone with a camera 1200 are connected to the Internet 1101 through an Internet service provider 1102, a telephone network 1104, and the base stations 1107 to 1110.

However, the contents provision system 1100 is not restricted to a system including all of the plural devices shown in FIG. 39, but may be one including some of the plural devices shown in FIG. 39. Further, the respective devices may be connected directly to the telephone network 1104, not through the base stations 1107 to 1110 as the fixed radio stations.

The camera 1113 is a device that can take moving pictures of an object, like a digital video camera. The portable telephone may be a portable telephone set according to any of PDC (Personal Digital Communications) system, CDMA (Code Division Multiple Access) system, W-CDMA (Wideband-Code Division Multiple Access) system, and GSM (Global System for Mobile Communications) system, or PHS (Personal Handyphone System).

A streaming server 1103 is connected to the camera 1113 through the base station 1109 and the telephone network 1104. In this system, live distribution based on coded data which are transmitted by a user using the camera 1113 can be performed. The coding process for the data of taken images may be carried out by either the camera 1113 or the server that transmits the data. Moving picture data which are obtained by taking moving pictures of an object by means of the camera 1116 may be transmitted to the streaming server 1103 through the computer 1111. The camera 1116 is a device that can take still images or moving pictures of an object, such as a digital camera. In this case, coding of the moving picture data can be performed by either the camera 1116 or the computer 1111. Further, the coding process is carried out by an LSI 1117 included in the computer 1111 or the camera 1116.

Image coding or decoding software may be stored in a storage medium (a CD-ROM, a flexible disk, a hard disk, or the like) which is a recording medium that contains data readable by the computer 1111 or the like. The moving picture data may be transmitted through the portable telephone with a camera 1200. The moving picture data are data which have been coded by an LSI included in the portable telephone 1200.

In this contents provision system 1100, contents corresponding to images taken by the user by means of the camera 1113 or the camera 1116 (for example, live video of a music concert) are coded in the camera in the same manner as any of the aforementioned embodiments, and transmitted from the camera to the streaming server 1103. The contents data are subjected to streaming distribution from the streaming server 1103 to a requesting client.

The client may be any of the computer 1111, the PDA 1112, the camera 1113, the portable telephone 1114 and the like, which can decode the coded data.

In this contents provision system 1100, the coded data can be received and reproduced on the client side. When the data are received, decoded, and reproduced in real time on the client side, private broadcasting can be realized.

The coding or decoding in the respective devices that constitute this system can be performed using the moving picture coding apparatus or the moving picture decoding apparatus according to any of the aforementioned embodiments.

A portable telephone will be now described as an example of the moving picture coding or decoding apparatus.

Figure 40:
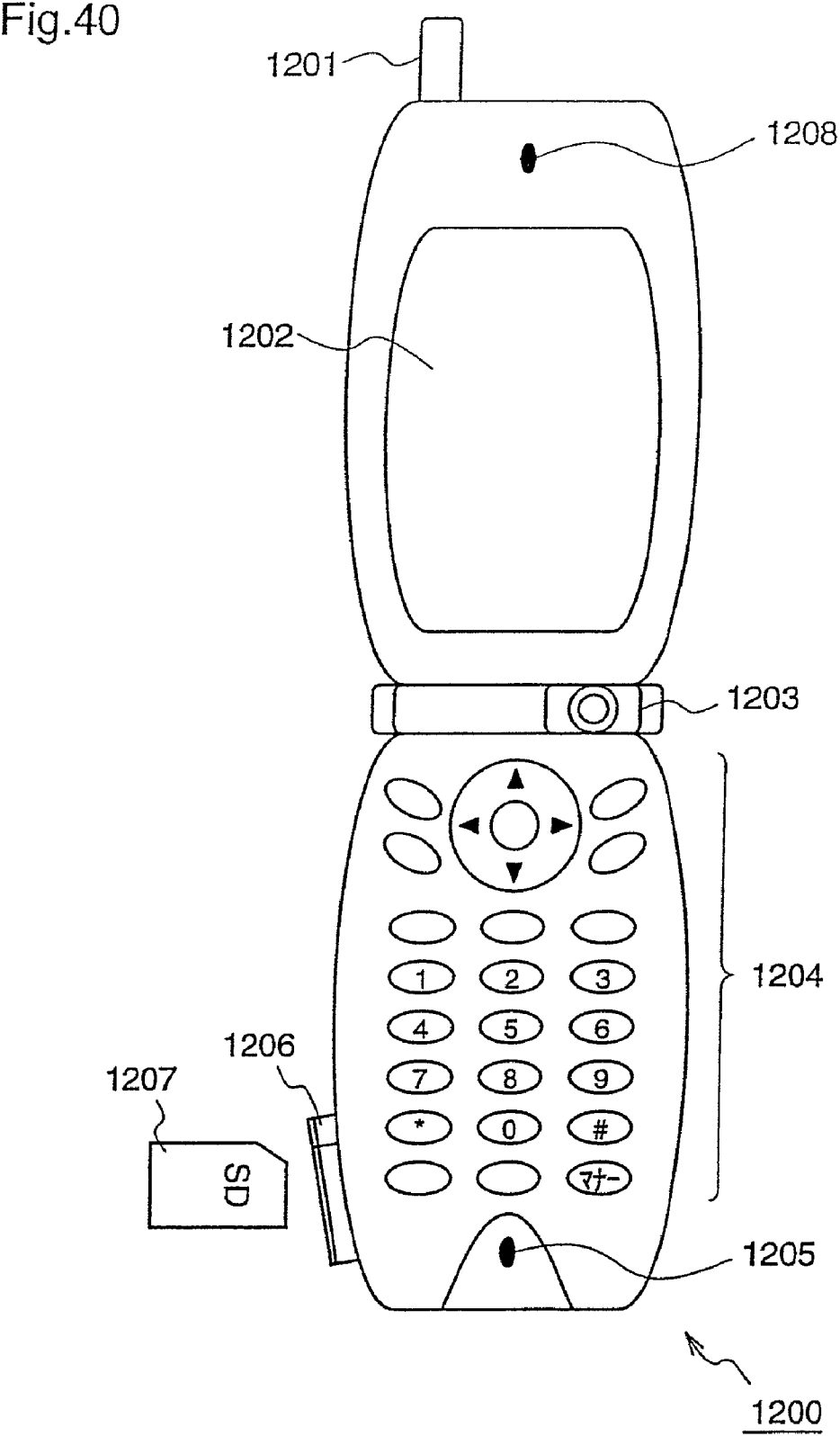
FIG. 40 is a diagram for explaining a portable phone utilizing the moving picture coding methods and decoding methods according to the respective embodiments.

FIG. 40 is a diagram illustrating a portable telephone 1200 that employs the moving picture coding method and the moving picture decoding method according to any of the aforementioned embodiments.

This portable telephone 1200 includes an antenna 1201 for transmitting/receiving radio waves to/from the base station 1110, a camera unit 1203 that can take video or still images of an object, such as a CCD camera, and a display unit 1202 such as a liquid crystal display for displaying data of the video taken by the camera unit 1203 or video received through the antenna 1201.

The portable telephone 1200 further includes a main body 1204 including plural control keys, a voice output unit 1208 for outputting voices such as a speaker, a voice input unit 1205 for inputting voices such as a microphone, a recording medium 1207 for retaining coded data or decoded data such as data of taken moving pictures or still images, or data, moving picture data or still image data of received e-mails, and a slot unit 1206 which enables the recording medium 1207 to be attached to the portable telephone 1200.

The recording medium 1207 has a flash memory element as a type of EEPROM (Electrically Erasable and Programmable Read Only Memory) that is an electrically programmable and erasable non-volatile memory contained in a plastic case, like a SD card.

The portable telephone 1200 will be described more specifically with reference to FIG. 41.

The portable telephone 1200 has a main control unit 1241 that performs general control for the respective units of the main body including the display unit 1202 and the control key 1204.

The portable telephone 1200 further includes a power supply circuit 1240, an operation input control unit 1234, an image coding unit 1242, a camera interface unit 1233, a LCD (Liquid Crystal Display) control unit 1232, an image decoding unit 1239, a multiplexing/demultiplexing unit 1238, a recording/reproduction unit 1237, a modulation/demodulation unit 1236, and an audio processing unit 1235. The respective units of the portable telephone 1200 are connected to each other via a synchronization bus 1250.

The power supply circuit 1240 supplies power from a battery pack to the respective units when a call end/power supply key is turned ON under the control of a user, thereby activating the digital portable telephone with a camera 1200 to be turned into an operable state.

In the portable telephone 1200, the respective units operate under control of the main control unit 1241 that is constituted by a CPU, a ROM, a RAM and the like. To be more specific, in the portable telephone 1200, an audio signal that is obtained by voice inputting into the voice input unit 1205 in a voice communication mode is converted into digital audio data by the audio processing unit 1235. The digital audio data is subjected to a spectrum spread process by the modulation/demodulation circuit 1236, further subjected to a DA conversion process and a frequency transformation process by the transmission/receiving circuit 1231, and transmitted through the antenna 1201.

In this portable telephone set 1200, a signal received through the antenna 1201 in the voice communication mode is amplified, and then subjected to a frequency transformation process and an AD conversion process. The received signal is further subjected to a spectrum inverse spread process in the modulation/demodulation circuit 1236, converted into an analog audio signal by the audio processing unit 1235, and this analog audio signal is outputted through the voice output unit 1208.

When the portable telephone 1200 transmits an electronic mail in a data communication mode, text data of the e-mail that is inputted by manipulation of the control key 1204 on the main body is transmitted to the main control unit 1241 via the operation input control unit 1234. The main control unit 1241 controls the respective units so that the text data is subjected to the spectrum spread process in the modulation/demodulation circuit 1236, then subjected to the DA conversion process and the frequency transformation process in the transmission/receiving circuit 1231, and then transmitted to the base station 1110 through the antenna 1201.

When this portable telephone 1200 transmits image data in the data communication mode, data of an image taken by the camera unit 1203 is supplied to the image coding unit 1242 via the camera interface unit 1233. When the portable telephone 1200 does not transmit the image data, the data of the image taken by the camera unit 1203 can be displayed directly on the display unit 1202 via the camera interface unit 1233 and the LCD control unit 1232.

The image coding unit 1242 includes the moving picture coding apparatus according to any of the aforementioned embodiments. This image coding unit 1242 compressively encodes the image data supplied from the camera unit 1203 by the moving picture coding method according to any of the above embodiments to convert the same into coded image data, and outputs the obtained coded image data to the multiplexing/demultiplexing unit 1238. At the same time, the portable telephone 1200 transmits voices which are inputted to the voice input unit 1205 while the image is being taken by the camera unit 1203, as digital audio data, to the multiplexing/demultiplexing unit 1238 through the audio processing unit 1235.

The multiplexing/demultiplexing unit 1238 multiplexes the coded image data supplied from the image coding unit 1242 and the audio data supplied from the audio processing unit 1235 by a predetermined method. Resultant multiplexed data is subjected to a spectrum spread process in the modulation/demodulation circuit 1236, then further subjected to the DA conversion process and the frequency transformation process in the transmission/receiving circuit 1231, and obtained data is transmitted through the antenna 1201.

When the portable telephone 1200 receives data of a moving picture file that is linked to a home page or the like in the data communication mode, a signal received from the base station 1110 through the antenna 1201 is subjected to a spectrum inverse spread process by the modulation/demodulation circuit 1236, and resultant multiplexed data is transmitted to the multiplexing/demultiplexing unit 1238.

When the multiplexed data that is received via the antenna 1201 is decoded, the multiplexing/demultiplexing unit 1238 demultiplexes the multiplexed data to divide the data into a coded bit stream corresponding to the image data and a coded bit stream corresponding to the audio data, and the coded image data is supplied to the image decoding unit 1239 and the audio data is supplied to the audio processing unit 1235, via the synchronization bus 1250.

The image decoding unit 1239 includes the moving picture decoding apparatus according to any of the aforementioned embodiments. The image decoding unit 1239 decodes the coded bit stream of the image data by the decoding method corresponding to the coding method according to any of the above-mentioned embodiments, to reproduce moving picture data, and supplies the reproduced data to the display unit 1202 through the LCD control unit 1232. Thereby, for example, the moving picture data included in the moving picture file that is linked to the home page is displayed. At the same time, the audio processing unit 1235 converts the audio data into an analog audio signal, and then supplies the analog audio signal to the voice output unit 1208. Thereby, for example, the audio data included in the moving picture file that is linked to the home page is reproduced.

Figure 42:
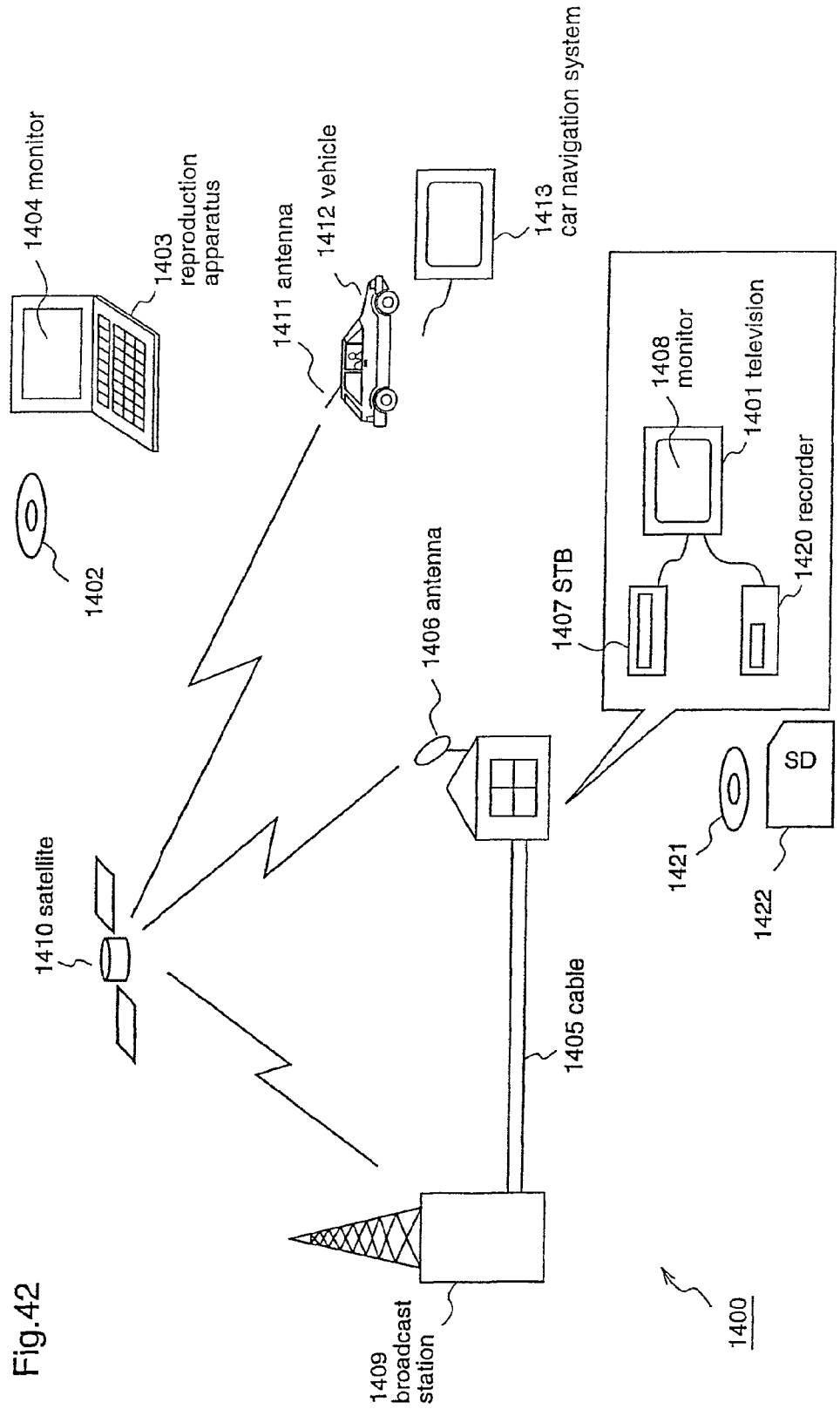
FIG. 42 is a conceptual diagram illustrating a system for digital broadcasting that utilizes the moving picture coding methods and decoding methods according to the respective embodiments.
Figure 43:
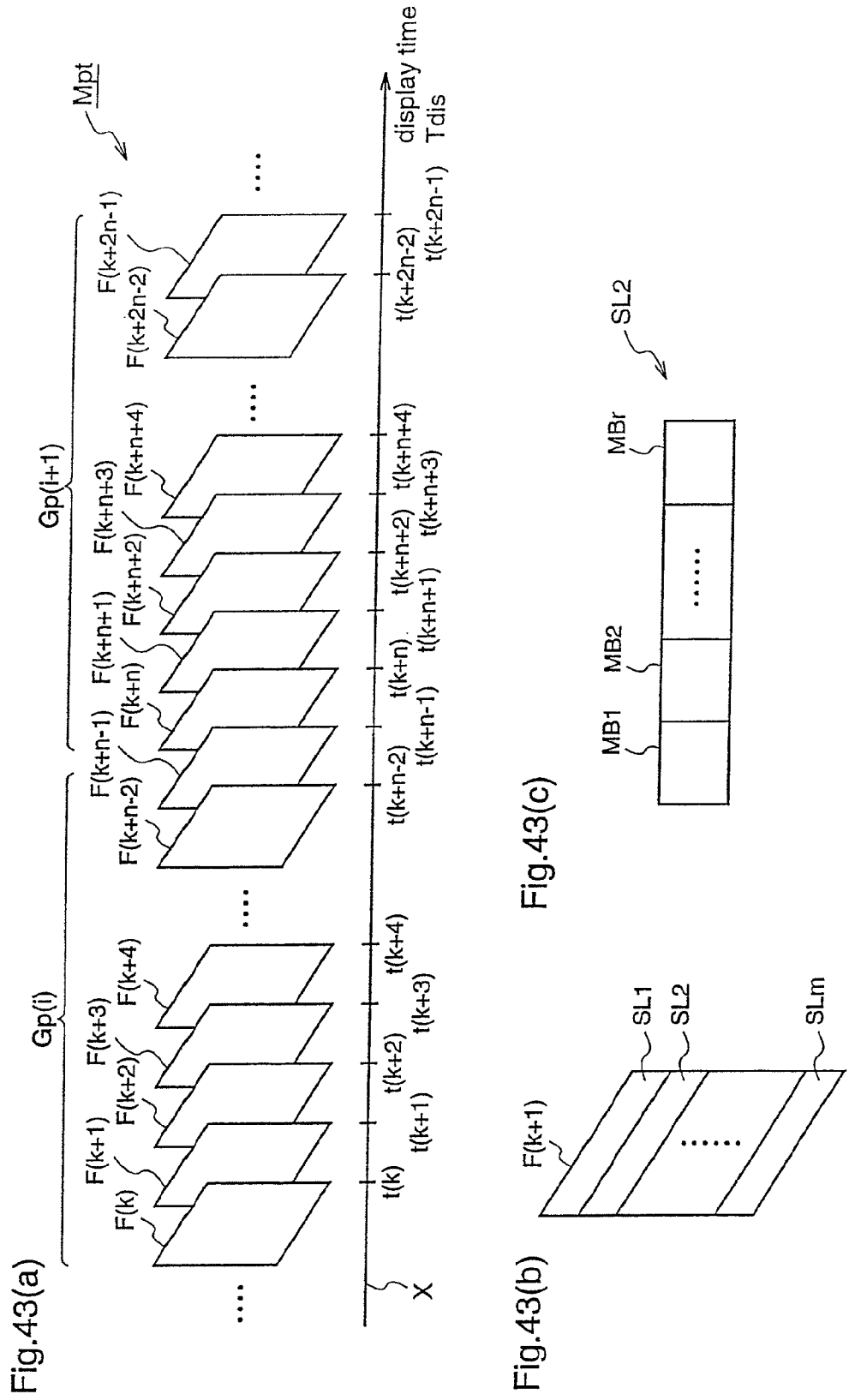
FIGS. 43(a)-43(c) are diagrams for explaining a conventional moving picture coding method, illustrating an arrangement of pictures constituting a moving picture (43(a)), a slice obtained by dividing a picture (43(b)), and a macroblock (43(c)).
Figure 44:
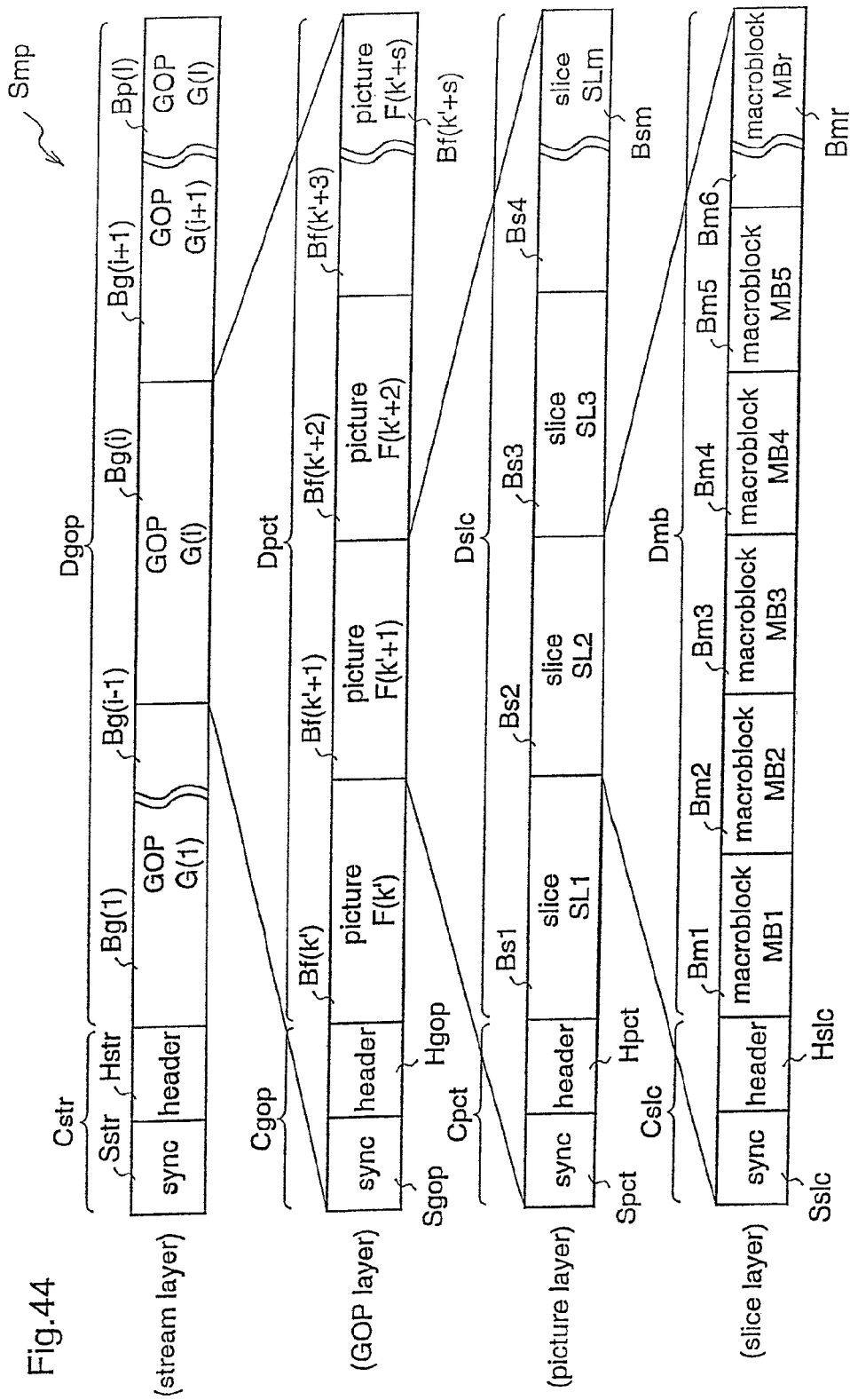
FIG. 44 is a diagram for explaining coded data of an ordinary moving picture, illustrating structures of streams which are obtained by coding pictures constituting a moving picture.
Figure 46A:
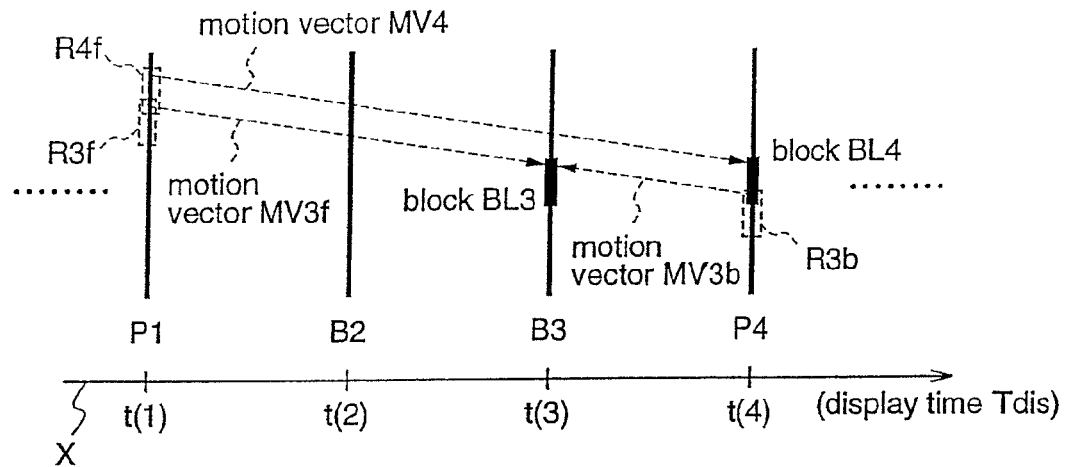
FIGS. 46(a) and 46(b) are diagrams for explaining conventional direct mode coding, illustrating motion vectors used in the direct mode (46(a)), and relative positions of pictures to blocks (46(b)).
Figure 46B:
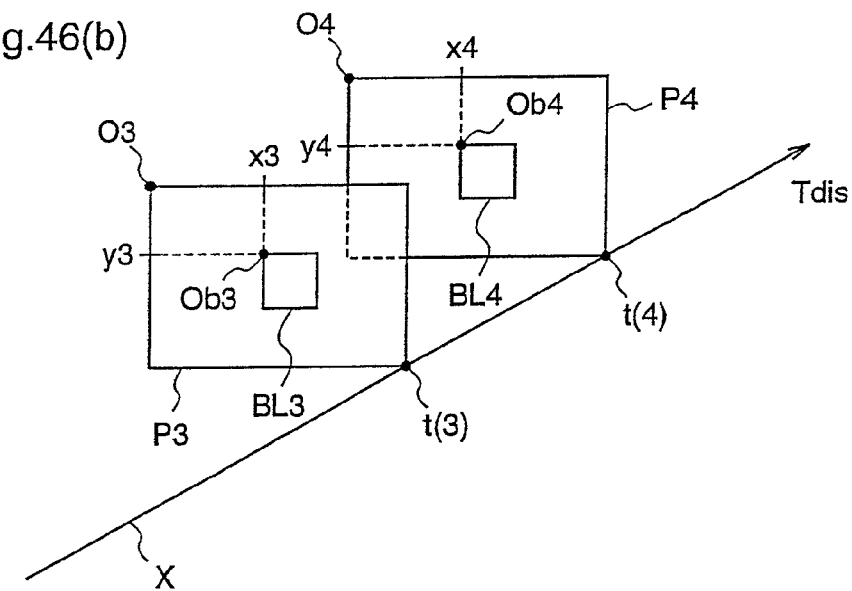
Figure 50A:
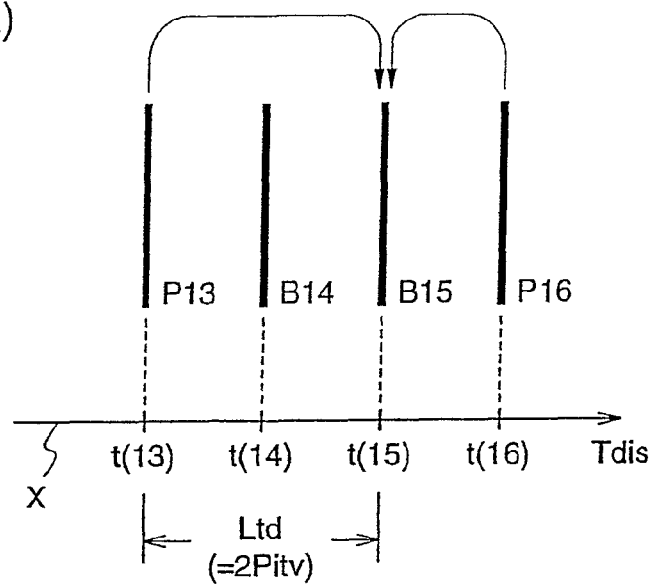
FIGS. 50(a) and 50(b) are diagram for explaining problems of the conventional inter-picture predictive coding method, illustrating a case where bidirectional reference is carried out (50(a)), and a case where two pictures are backward referred to (50(b)).
Figure 50B:
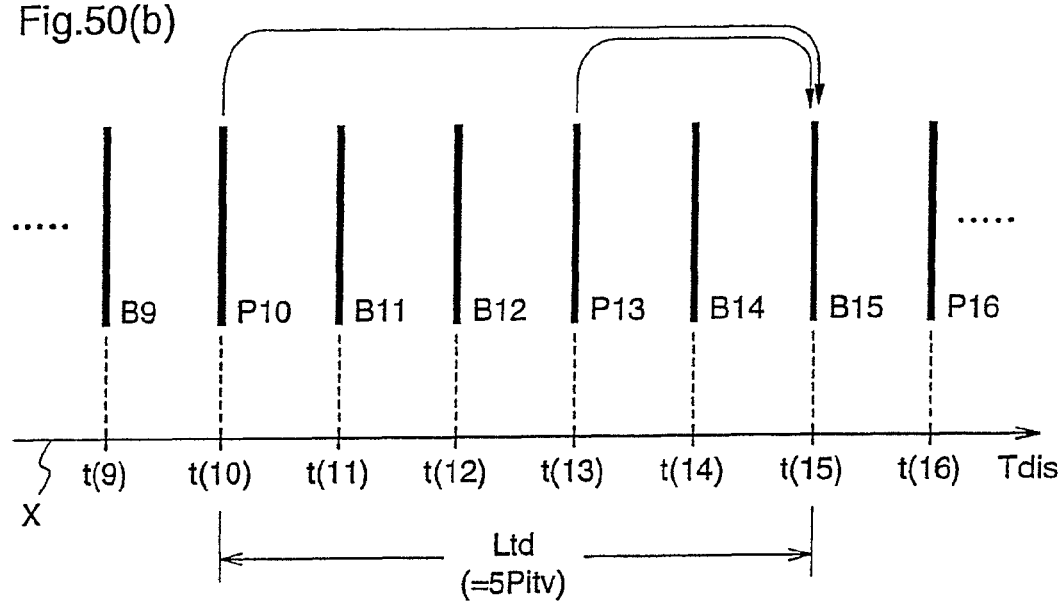
Figure 51A:
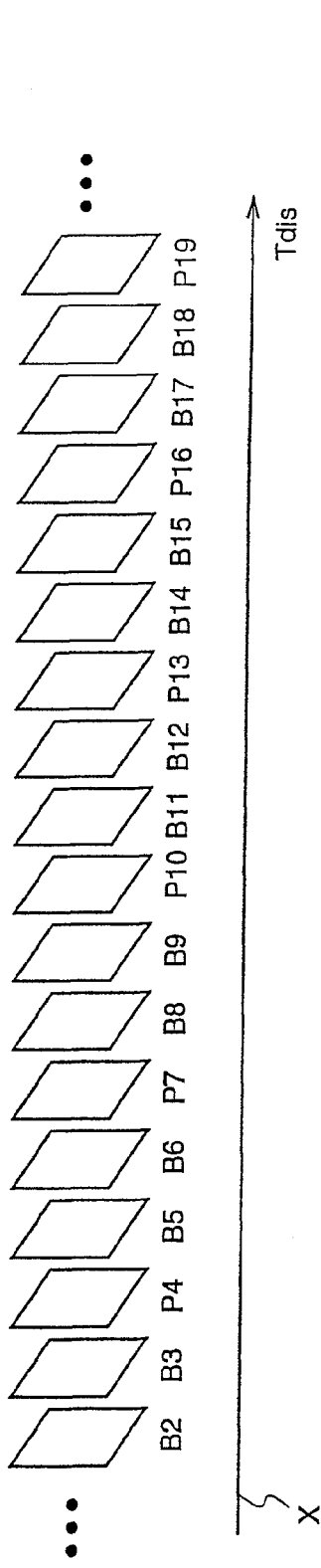
FIGS. 51(a) and 51(b) are diagrams for explaining problems of the conventional method of assigning reference picture indices, illustrating pictures arranged in order of display (51(a)), and pictures arranged in order of coding (51(b)).
Figure 51B:
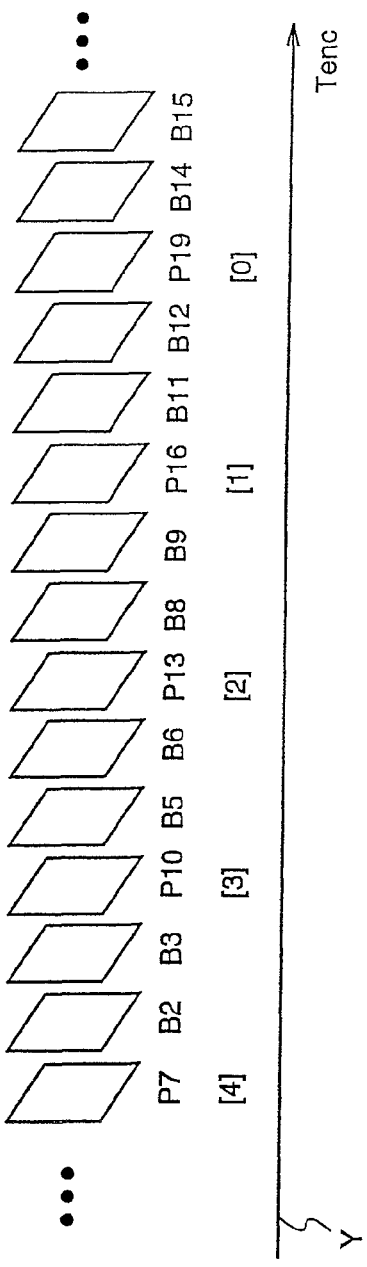

Here, a system to which the moving picture coding method and the moving picture decoding method according to any of the aforementioned embodiments is applicable is not restricted to the above-mentioned contents provision system. Recently, digital broadcasting using satellites or terrestrial waves is talked frequently, and the image coding apparatus and the image decoding apparatus according to the above embodiments is applicable also to a digital broadcasting system as shown in FIG. 42.

More specifically, a code bit stream corresponding to video information is transmitted from a broadcast station 1409 to a satellite 1410 such as a communication satellite or a broadcast satellite, via radio communication. When the broadcast satellite 1410 receives the coded bit stream corresponding to the video information, the satellite 1410 outputs broadcasting waves, and these waves are received by an antenna 1406 at home including satellite broadcast receiving facility. For example, an apparatus such as a television (receiver) 1401 or a set top box (STB) 1407 decodes the coded bit stream, and reproduces the video information.

Further, the image decoding apparatus according to any of the aforementioned embodiments can be mounted also on a reproduction apparatus 1403 that can read and decode the coded bit stream recorded on a storage medium 1402 such as a CD or a DVD (recording medium).

In this case, a reproduced video signal is displayed on a monitor 1404. The moving picture decoding apparatus may be mounted on the set top box 1407 that is connected to a cable for cable television 1405 or an antenna for satellite/terrestrial broadcast 1406, to reproduce an output of the moving picture decoding apparatus to be displayed on a monitor 1408 of the television. In this case, the moving picture decoding apparatus may be incorporated not in the set top box but in the television. A vehicle 1412 having an antenna 1411 can receive a signal from the satellite 1410 or the base station 1107, and reproduce a moving picture to display the same on a display device of a car navigation system 1413 or the like which is mounted on the vehicle 1412.

Further, it is also possible that an image signal can be coded by the moving picture coding apparatus according to any of the aforementioned embodiments and recorded in a recording medium.

A specific example of a recording device is a recorder 1420 such as a DVD recorder that records image signals on a DVD disk 1421, and a disk recorder that records image signals on a hard disk. The image signals may be recorded on a SD card 1422. Further, when the recorder 1420 includes the moving picture decoding apparatus according to any of the aforementioned embodiments, the image signals which are recorded on the DVD disk 1421 or the SD card 1422 can be reproduced by the recorder 1420 and displayed on the monitor 1408.

Figure 41:
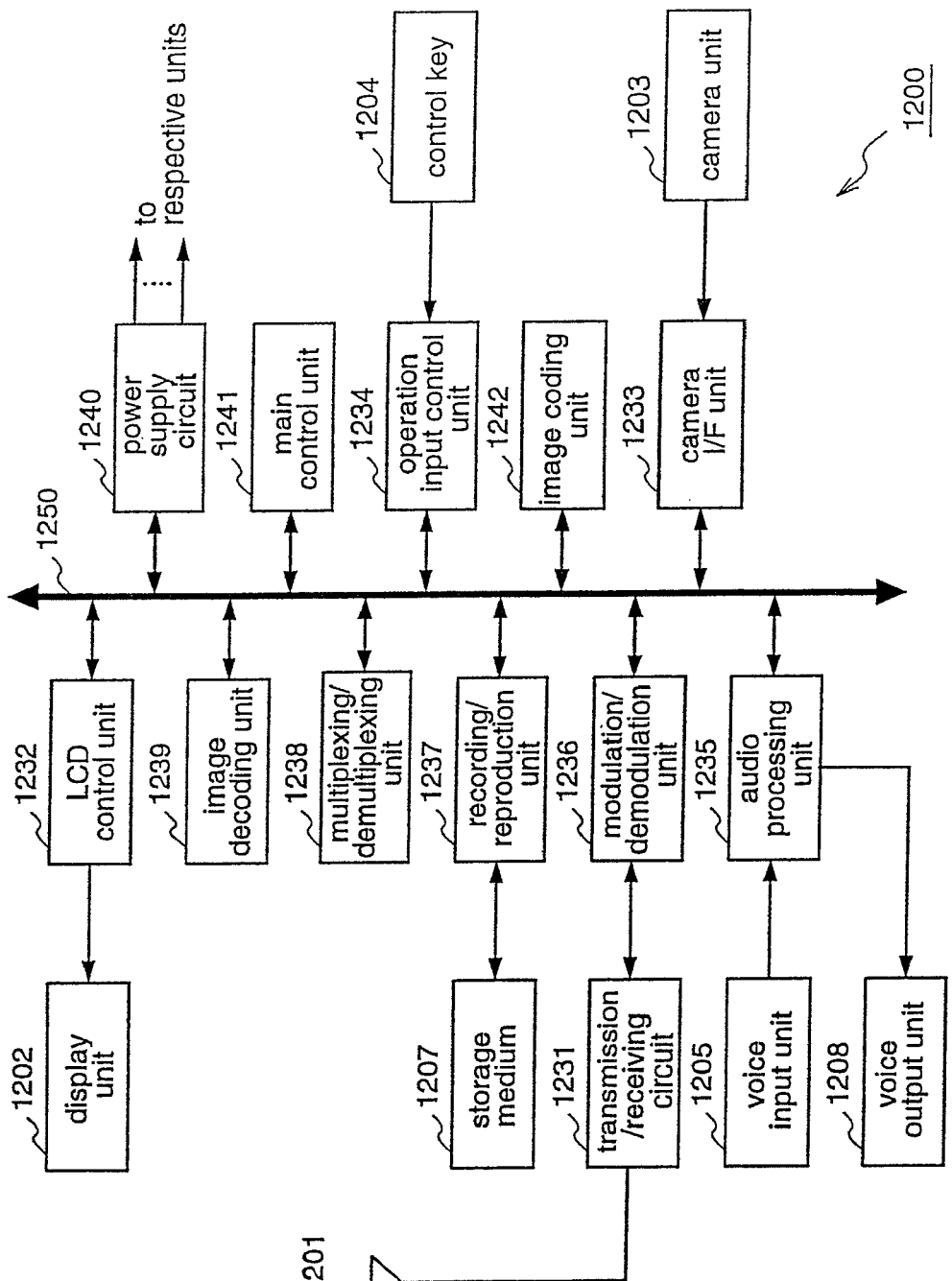
FIG. 41 is a block diagram illustrating a specific construction of the portable phone shown in FIG. 40.

Here, the structure of the car navigation system 1413 may include, for example, the components of the portable telephone shown in FIG. 41 other than the camera unit 1203, the camera interface unit 1233 and the image coding unit 1242, and the same apply to the computer 1111, or the television (receiver) 1401.

Further, as the terminal such as the portable telephone 1114, one of three types of terminals: a transmission-receiving type terminal having both of an encoder and a decoder, a transmission terminal having only an encoder, and a receiving terminal having only a decoder can be mounted.

As described above, the moving picture coding method or the moving picture decoding method according to any of the aforementioned embodiments is applicable to any of the above-mentioned devices or systems, whereby the effects as described in the above embodiments can be obtained.

Moreover, it is needless to say that the embodiments of the present invention and the applications thereof are not restricted to those described in this specification.

APPLICABILITY IN INDUSTRY

As described above, in the moving picture coding method and the moving picture decoding method according to the present invention, when a target picture to be coded or decoded is a B picture, a forward picture that is positioned closest to the target picture can be used as a reference picture for the target picture, whereby prediction accuracy in motion compensation for the B picture is increased, resulting in enhanced coding efficiency. Particularly, these methods are useful in data processing for transferring or recording moving picture data.

The invention claimed is:

1. A decoding method, performed by a decoding apparatus, for decoding a current block included in a current picture by performing motion compensation on the current block using two motion vectors and two reference pictures which are selected from among a plurality of candidate reference pictures for the current picture, the decoding method comprising:

a co-located block specifying step of specifying a co-located block included in a first picture, the first picture being one of the plurality of candidate reference pictures that is different from the current picture and located immediately after the current picture in display order, and the co-located block being a block located identically to the current block;

a motion vector setting step of (i) setting the two motion vectors of the current block by referring to one motion vector used for motion-compensation of the co-located block, in a case where the co-located block is an inter-picture coded block that is coded using only the one motion vector and one reference picture, and (ii) setting the two motion vectors of the current block to have zero-values, in a case where the co-located block is an intra-picture coded block that is coded without using a motion vector;

a reference picture selecting step of (i) selecting, as one of the two reference pictures, a picture that is used as a reference picture in performing motion compensation on the co-located block and selecting, as the other of the two reference pictures, the first picture that is selected from among the plurality of candidate reference pictures for the current picture, in a case where the co-located block is an inter-picture coded block that is coded using only the one motion vector and one reference picture, and (ii) selecting, as one of the two reference pictures, a second picture which is one of the plurality of candidate reference pictures for the current picture and located immediately before the current picture in display order and selecting, as the other of the two reference pictures, the first picture, in a case where the co-located block is an intra-picture coded block that is coded without using a motion vector; and a motion compensation step of performing motion compensation on the current block by using the two motion vectors set in the motion vector setting step and the two reference pictures selected in the reference picture selecting step, wherein the reference picture selecting step selects the two reference pictures from an I picture which is decodable by intra-picture prediction, a P picture which is decodable by one- directional-reference inter-picture prediction, and a reference B picture which is decodable by two-directional-reference inter-picture prediction and can be referred to when decoding other pictures, wherein the P picture refers to I or P pictures, without referring to the reference B picture, wherein the reference B picture refers to I or P pictures which are closest to the reference B picture in display order.

* * * * *